United States Patent
Minakami et al.

[19]

[11] Patent Number: 6,129,025
[45] Date of Patent: Oct. 10, 2000

[54] TRAFFIC/TRANSPORTATION SYSTEM

[76] Inventors: Hiroyuki Minakami, 1-1, Nishiokamoto 2-chome, Higashinada-ku, Kobe-shi, Hyogo 658; Motoyuki Minakami, 201 Tou 104, 12-2, Kasuga 1-chome, Tsukuba-shi, Ibaraki 350, both of Japan

[21] Appl. No.: 08/983,292

[22] PCT Filed: Jul. 4, 1995

[86] PCT No.: PCT/JP95/01350

§ 371 Date: Apr. 10, 1998

§ 102(e) Date: Apr. 10, 1998

[87] PCT Pub. No.: WO97/02167

PCT Pub. Date: Jan. 23, 1997

[51] Int. Cl.[7] .................................. B61J 3/00; B61K 1/00
[52] U.S. Cl. .................................. 104/88.01; 104/88.02; 104/288; 104/292
[58] Field of Search .................... 104/18, 20, 88.01, 104/88.02, 88.03, 140, 146, 288, 290, 292, 295, 296, 304, 305, 130.07, 130.09; 105/159

[56] References Cited

U.S. PATENT DOCUMENTS 5,577,593  11/1996  Hooper .................................. 104/88.02
5,590,604   1/1997  Lund ..................................... 104/88.04

*Primary Examiner*—S. Joseph Morano
*Assistant Examiner*—Robert J. McCarry, Jr.
*Attorney, Agent, or Firm*—Limbach & Limbach L.L.P.

[57] ABSTRACT

In a transportation/logistics system in which a pallet/vehicle with an automobile/container mounted/fixed thereon travels, a normal steering operation is carried out by changing the direction of the wheels (including tires) by an electronically controlled automatic steering system on the basis of steering information, whereby comfortable travel and a smooth turns are obtained. When the pallet/vehicle is about to run off a lane on which it travels, the run-off thereof is prevented physically and mechanically since a fin provided on the pallet/vehicle is inserted in a groove provided in a road, whereby a safe traffic/transportation system is obtained. The pallet/vehicle obtains a driving force by a gap length regulated/controlled linear induction motor so that the pallet/vehicle can travel at high speeds. In diverging (branching) and merging (converging) points, the diverging (branching)/merging (converging) of the pallet/vehicles is practiced by steering the wheels (tires) by the automatic steering system, and the pallet/vehicle advances with the fin inserted in a groove in a main line or a ramp, whereby a reliable, safe traffic/transportation system adapted to practice high-speed diverging (branching) is obtained. At the exit/entrance of the present invention to/from a general road, a mode interchange is provided which is adapted to convert a traveling mode of an automobile/container, and mounts and fixes an automobile/container on the pallet/vehicle and unfastens such automobile/container.

82 Claims, 79 Drawing Sheets

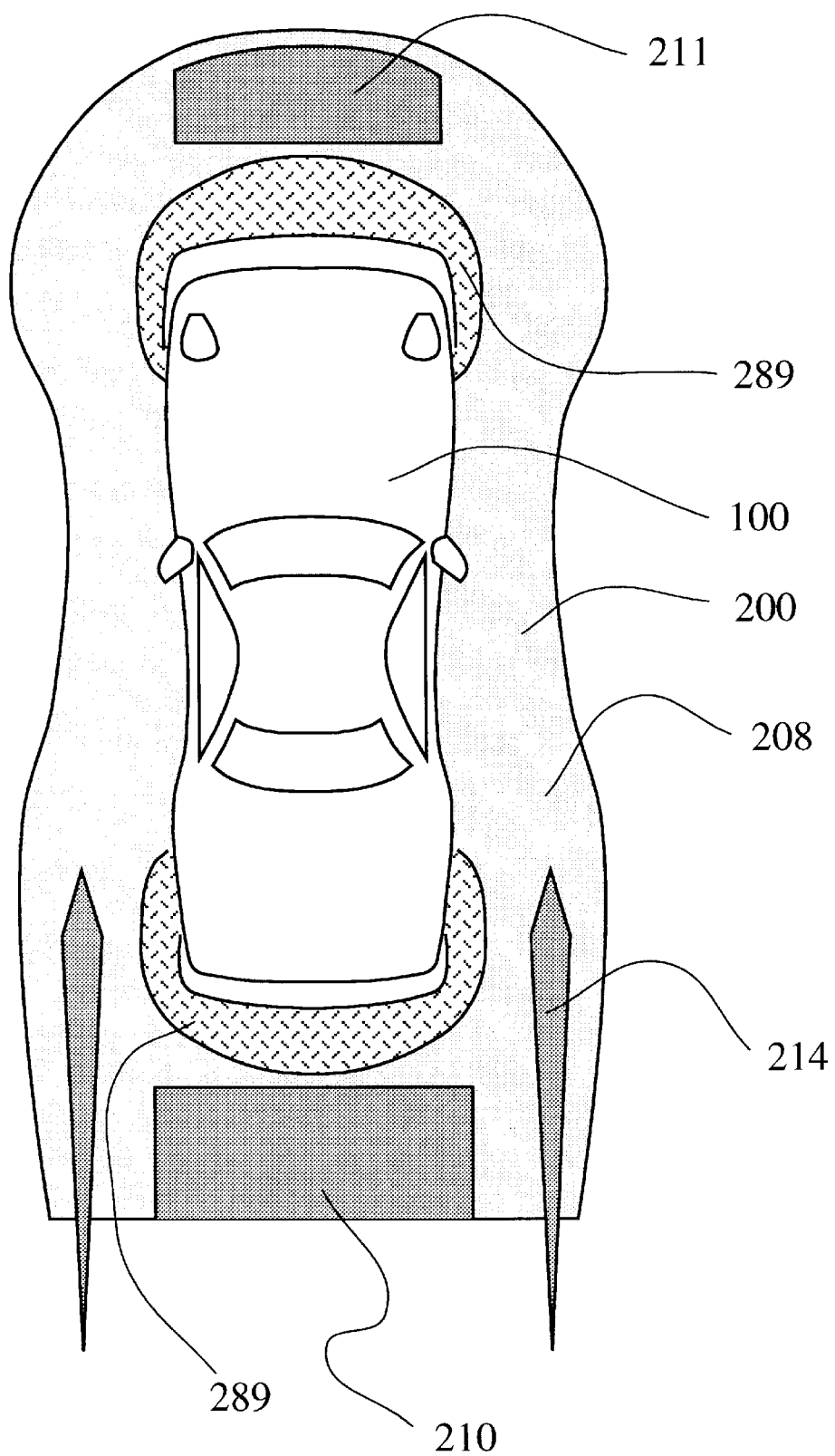
Fig.52(amended)

(A)

(B)

(C)

TRAFFIC/TRANSPORTATION SYSTEM

FIELD OF THE INVENTION

This invention centers on transportation and it's logistics system. In regards to vehicle transportation, this invention provides low amounts of noise and vibration, smoother and safer direction changes, environmental respect produced by electricity energy. In addition, it revolutionizes the structure and use of the present roadway system by introducing a new and more efficient method of transporting all types of vehicles.

BACKGROUND OF THE INVENTION

When developing a new transportation system based on the current roadway and railway systems and incorporating the linear motor system into those, problems arise that require dealing with. These includes the driving force, support systems, guiding and steering, preventing lane deviation, merging and diverging, deceleration, and vehicle structure. The following defines those concerns.

In this invention, deviation is defined as a vehicle straying from the provided lane and losing it's power and control. This occurs when the vehicle exceeds the range provided for it within it's designated lane.

Also, within this invention, the term "vehicle" includes automobiles (cars, trucks, busses etc.), railroad cars, pallet vehicles, vehicles of new transportation system and so on. Customarily, in the automobile field, a vehicle is called an automobile or a car, and in railroad system, it is also called a car.

In this invention, the general term "vehicle" includes the whole scope of vehicles with the wheel supported system.

This pallet system is more understandable when the vehicle and the pallet are separated, even though pallet is connected to the vehicle. Hence, these are alluded to separately in this invention.

In this invention, pallet includes the vehicle that is able to mobile and it carries automobile or container after fixing it onto the pallet. This also includes the pallet which does not have wheels.

In this invention, lane means the road surface on which the vehicle moves.

In this invention, the mode-interchange means the place or facility where the vehicle or container is loaded and unloaded to and from the pallet where it is fixed and unfixed to the pallet. The mode of mobility and transportation is changed from an internal combustion engine to the pallet carrying system. Also, the mode interchange is the place where the vehicle, which has an ability of automated driving system, drags down the fin, which is described in detail later, the fin is then inserted into the ditch, which is also described later in the invention, to prevent the lateral deviation mechanically. The mode-interchange provides mechanical fail safe system to make fully automated driving possible, and it is installed to the entrance or exit of the new transportation/logistics system.

In this invention, wireless means any method not using a wire. Specifically, it includes not only electric waves, but also lights, rays, electromagnetic waves, infrared lights, ultra-violet lights, laser beams, supersonic waves and so on.

In this invention, guide means not only the guideway such as in railroads which control the wheels on the track, but also the autonomous steering along the roadway or driving lane. Thus, steering an automobile enables "curving" is in the definition of the guide or to guide using both the noun and verb forms of the word.

The current road-automobile system is comprised of the road which is linear in shape and provide the structure to support the automobile, and the automobile moves along the road.

The elementary mobility system of the automobile is comprised of three basic functions which are "forward progression", "direction change" and "deceleration". The "forward progression" is provided by the power generator which produces the driving force, "direction change" is performed by steering right and left, "deceleration" is generally made by breaking the wheel to slow or stop the vehicle.

Also, there are other movements such as vertical movement or pitching which is an important factor related to the comfort of the ride in the vehicle. ("Maneuverability and stability of automobile" author: Katsumi Kageyama, published by Sankaido, Feb. 10, 1992, p.1)

To power the vehicle, how most automobiles are driven by using combustion of fossil fuel. As a result, this method of generating power is not environmentally friendly. The current automobile has an intrinsic problem which is polluting atmosphere.

Most automobiles can produce speed of 180 to 200 km/h (most automobile's speedometer maximizes at about 180 km/h). The legal speed limit is generally regulated at about 100 km/h because automated driving system is not available and keep safety must be maintained by the driver. Therefore, this system of travel is, in a sense, defective because the automobiles cannot maximize their engine's output and travel at potential top speeds. Human error affects the road-highway system and forces the drivers to maintain relatively low speeds when in comparison to the rail or air system.

The automobile obtains it's power from the engine, the obtained power is then transferred to the wheel base through the crutch, transmission, propelling shaft and differential gears etc. Finally the tire revolves on the ground to utilize the driving power.

All of the power is not utilized while obtaining the driving force directly. This is because the vertical movement which is generated by the combustion of the fuel in the engine is converted to a rotational movement by the crank shaft. Secondly, the original rotation speed is changed, then the rotation power is transmitted to the propelling shaft. Thus rolls the wheel and provides the power to move the tire. In this manner, there are many transmitting and converting processes. Thus, it is easily suggested that the road-automobile transportation system is not efficient as long as the consumption of fossil fuel is concerned.

For example, according to "Energy Handbook for Transportation" which is published by the Department of Transportation of Japan, energy consumption of passenger automobiles is as large as five times that of a train when the train contains a regular number of passengers.

In the case of the automobile, the tire moves along the ground and produces friction from the ground to maintain a driving force. Thus, the driving force is affected by the condition of the ground. Because the climate or condition of the ground affects the efficiency of the consumption energy, design of the road becomes a critical and complicated issue.

For example, even if the same type of automobile is driven, each automobile's energy efficiency depends on the conditions of each wheel. The surface of the wheel can be new or old, slippery or wet, size and material of the tire and even the internal tire pressure all affect it's efficiency.

The affects by the road condition cannot be ignored. If the surface of road gets wet, the friction between tire and the road lessens. The same thing happens when the material of the road is different. When the wheel gets stuck in the mud, even though the engine can generate the horse power, it will not be able to move the automobile. Moreover, in order to achieve higher efficiency, the friction between the tire and the road surface becomes more important. Usually, to increase the friction, one of the conventional method is to increase the vehicle's weight. However, this conflicts with the original purpose and that is to be more efficient.

For example, when the automobile drives at high speeds, the automobile is supplied a lifting force. The wheel can not sustain enough weight any more, so it is then necessary to push the wheel down somehow. Otherwise, the wheel cannot maintain the generated driving force. Therefore, some automobiles have a front and rear spoiler to force the automobile down to maintain the proper friction with the road.

Thereafter, it is not until the tire touches to the road with enough friction that the tire produces the driving force. In order to be efficient, as long as the vehicle's weight is concerned, the lighter the better. However, in order to be efficient, as far as the friction between the vehicle and road is concerned, the heavier the better. Thus these two objectives are in total conflict.

The speed of the automobile is controls by depressing the acceleration pedal, brake pedal and changing gears using the clutch. Therefore, even though the automobile maintains a direct motion, the driver must control these devices.

Regarding deceleration, because the only contact point to the road is the tire. Braking the wheel creates the breaking friction with the road. This is the philosophy behind deceleration. The mechanism of breaking or deceleration is simply the regulation of the rotation of the wheel. The current braking system is the wheel braking mechanism. In this mechanism, each wheel has an inner disc which is encased by the pad, which expands to produce friction and slow the disc and wheel. Therefore, the area being pushed is limited, so that the breaking power is relatively small. Also, the area which the tire touches the ground is also small, usually around 150 cm2 per wheel. Thus, the braking ability is limited and usually automobiles cannot stop on demand. Therefore, automobiles have an imperfect braking system which causes traffic accidents.

Also, if the braking system is used often, the temperature of the break pad increases, then the friction coefficient of tire plummets and it will cause the fade-phenomenon. Once this phenomenon occurs, the break w ill not operate even if the break pedal is pushed excessively. Therefore, this type of breaking system has an essential defect. The major cause of this defect is based on the excessive power produced by pushing pad and is then loaded on to the small pad to try to obtain the breaking power.

The capability of the automobile is connected not only with ability of the mechanism, but also the ability of the driver. For example, according to the road law in Japan, the breaking distance is defined by each driving speed. In order to define the distance, the reaction time is taken into consideration. This reaction time is designated at 2.5 second. In this reaction time, two times are included, one is the human reaction time which is 1.5 seconds and the other is the action time which is 1.0 second.

Thus, traffic regulations and road structures are affected by the factor of such human sensory organs and reaction time. In other words, the road-automobile transportation system is greatly affected by these human factors. This indicates that the current road-automobile transportation has fundamental potential flaws.

As it is described above, because the automobile has adopted the internal combustion engine, harmful exhaust gases such as NOx, SOx and CO2 are polluting the atmosphere. Especially, trucks for logistics are the major cause of this problem. Recently, global warming, global green house effect are becoming serious problems. In Japan, more than 18% of all CO2 exhaust comes from automobile transportation, and more than 80% of CO2 from all transportation derives from the automobile transportation. Thus, CO2 exhaustion from the automobile is a significant problem. In such circumstances, electric vehicles are now under development. However, there are many hurdles to clear such as efficiency, light and a longer lasting economical battery for generating power. Because of these problems, the electric car is far from prevalence in comparison in use to the internal combustion engine automobile.

In the United States, in 1982, the Department of Energy studied the "Electric-Powered Highway" in which electrical power is supplied from the road to the vehicle. The LIM (Linear Induction Motor) is installed on the specifically designed road and the reaction plate is installed on the vehicle. The vehicle also contains the internal combustion engine to drive on general roads. When the vehicle drives onto the LIM-road, the reaction plate is pull out to obtain the driving force from the LIM. This type of vehicle is called "LIM type automobile. Cited from the book of "Handbook of Linear Motor Application", author; Hajime Yamada, Association of Industrial Research, Dec. 10, 1986, p32–p33)

This LIM type automobile is driven by clean energy because the power is generated by the electrified highway. Although it is an environmentally friendly system, it is necessary to reconstruct the regular automobile to fit on the electrified highway. This reconstruction is the car owner's responsibility. The cross section of the roadway is composed of a convex shaped road surface and the automobile is held to the convex section with rollers. Because of this road shape, it is very difficult to perform fast merging and diverging. When the automobile needs to change lanes, the convex section hinders diverging. Therefore traversing the convex section becomes absolutely necessary. Due to these disadvantages, the LIM type automobile concept, in which the driving force comes from the road, can not be realized yet.

The automobile gains it's driving force from the engine and the wheel is rotated then the tire turns and move, as described above. There are many types of road, such as asphalt paved roads, concrete paved roads and gravel roads. However, in this patent, unless otherwise specified, "road" means the road which is somehow paved. The subject vehicle drives on it.

The contact point between the road and the vehicle is the paved surface of the road and the tire of the vehicle.

General automobiles use air pressurized tires as wheels and have elasticity. The main function of the tire is to support the heavy weight of the automobile. It also suspends the automobile's body by utilizing the elasticity of rubber and contraction capability of air, in order to absorb the unevenness of the road surface. The second important function is that it transmits the driving force, wheel speed changes which accelerate and decelerate the vehicle. Another important function is the steering force which is generated by friction and elasticity to change the direction. ("Getting started mechanism of automobile" published by the Grand Prix, edited by GP Planning center, p 152, Mar. 15, 1988).

The suspension system is for connecting the vehicle body to the wheel, and it's major assignments are to absorb shock from uneven ground, to make the rode comfortable, to stabilize the driving condition, to obtain more braking ability and to be more maneuverable.

With such a mechanism, the automobile has a more advanced suspension system than the railroad with respect to noise and vibration.

In order to change the vehicle's traveling direction, the automobile steers it's wheels. The usual steering system is first comprised of a handling mechanism such as the steering wheel which the driver handles, the steering shaft which transmits the rotation power from the steering wheel to the steering gear box. The gear mechanisms in the gear box amplifies the rotation motion from the steering shaft and converts the rotating motion to a reciprocal motion. The comprised link mechanism which transmits the reciprocal motion from the gear box to the wheel in order to change the wheel angle. ("Handbook of car mechanism" published by Natsume Company, author; Motoo Aoyama, p 165, 1994).

With an automobile steering system, the human needs to drive the automobile. The steering wheel, which the human controls, controls the direction of the automobile and is necessary to transmit the angle of rotation of the steering wheel to the angle of the tire. Then the complex mechanisms of transmitting and converting becomes necessary. Because of these necessities, there are some problems. For instance: the body of the automobile becomes heavier and the transmitting and converting mechanisms become very complex.

The angle for steering the tire is usually obtained by the steering system. However, when the tire is angled by the steering system, the tire begins to slip sideways, and sideways sliding generates the sideways force to the tire. All the while, this generates friction between the road surface and the wheel. The wheel then is rolling and sliding sideways at the same time. This is how the steering force is generated. Therefore, the automobile doesn't go in the direction of the tire direction. In order to obtain the sideways force (guiding force or cornering force), sliding sideways is necessary.

Thus, for general automobiles, the driver controls the steering wheel while he watches the front of the automobile. Steering the front wheels change the direction. Consequently, the tire obtains the cornering force from the friction which is generated by the sliding force from the tire, then the automobile can turn on the road.

The guiding force (cornering force) is obtained by the steering system, suspension system, tire and friction between the tire and the road. Therefore, the conditions of the surface of the road also affects the steering and guiding forces.

Usually, the method with which the driver controls the front wheels is steering. However, another system such as the four-wheel steering system is also available.

Though the usual road is constructed from concrete or asphalt, the real conditions of the road surface is affected by the weather. When it rains, the surface of the road becomes wet, then the tire becomes slippery and this results in difficulties controlling the steering. Also, when wind blows from the side, controlling the steering wheel becomes difficult. When it is foggy, visibility of the driver becomes low, therefore, the steering conditions are affected significantly.

Therefore, the steering conditions are always affected by not only the course of the direction, but also the weather, the driver's mental conditions and capability conditions. Then, the driver must consider all of these different and changing conditions. Thus, the burden to the driver is significant and there are many opportunities for human error to step in.

Basically, automated driving can be established by the control of speed and steering. Both factors are necessary.

The method of controlling the speed of the automobile is as follows. The driver steps on the acceleration pedal to control the throttle of the air/gasoline valve carburetor to put more rotation in the engine, and steps on the clutch to convert the transition gear to control the rotation power of the wheel to control the speed. (In automatic transition systems, selecting the speed level lever, and controlling the acceleration pedal to control the speed) The other speed control is braking. Braking is controlled by stepping on the brake pedal.

Usually, this speed control is carried out by the driver. Especially on the highway, the driver pays attention to the front of the automobile so as to not tailgate the automobile ahead. To keep a safe distance between automobiles. On the other hand, the driver cannot pay attention to the rear direction as much as the front direction. The driver cannot watch the back at all times. Therefore, rear-end collisions sometimes occur.

Thus, in a usual automobile, controlling the speed contains the possibility of human error, because it depends totally on human thinking and reaction time. Sometimes, decisions cannot be made in time to prevent accidents.

Even though some automobiles are highly mobile, humans control these abilities by riding and driving in the automobile. On the other hand, as each driver has different driving skills. Different drivers judge their driving environment, and drive accordingly. Therefore, the capability of controlling the automobile is limited by the human abilities such as the senses, reaction time and response time.

To improve the above limitations in human ability, supporting measures are now being considered and are becoming available. In the automobile industries, concepts of integrated control systems have been introduced recently. Each developed technology such as 4WS, 4WD, ABS active suspension are integrated to higher levels of control to be a more sophisticated system. For example, to prepare for the ever changing circumstances, learning driver's skill to adapt optimally, there is a proposed system called "Adaptive Vehicle" (U.S. Pat. No. 4,829,434).

However, this integrated control system is only for the supporting system which assists the driver. This is an attempt to help the driver perform better. The system is not damaged for autonomous control by the automobiles with automatic steering systems which sense the driving conditions. It does changing speeds of the automobile automatically nor braking automatically. Also, the system can only provide a limited maximum speed which does not exceed usual automobile's speed. The engine is still the usual gasoline engine. Therefore, the environmental issue is not totally solved yet.

Regarding the steering system of the proposed automobile, in order to control the direction of the automobile, the usual steering system is adopted. By rotating the steering wheel, the angle of the tire is changed. Then the friction between tire and road surface is generated. This friction is converted into a sideways force on the tire, which results in a side direction change of the automobile.

By this sideways force to the tire, the sideways direction of the automobile is controlled. This steering system is completely different from the other transportation system. Therefore, in the automobile transportation system, in multi-lane roads and even in single lane roads where there are no oncoming cars, changing lanes is possible. However, driving in the opposite direction lane frequently causes traffic accidents.

In both speed control and steering control, the basic system is controlled by the judgment of the human to drive according to his judgment.

In the general automobile-road systems, as it is described above, the control performance is totally dependent upon human driving skills and the condition of the tire or surface of the road. Because the directional control is dependent upon the control of steering, the directional control is completely dependent upon the circumstances surrounding the automobile. Thus, when it is raining, the tire becomes slippery, then the diver must consider this while operating the vehicle. If the driver makes a mistake while steering, the automobile may deviate from the lane it's supposed be in.

In the general automobile-road systems, there is no mechanical fail safe system to prevent the automobile from deviation from the driving lane. All of the control of operating the automobile is totally dependent upon the driver's perceptions, skill and technique, reaction and circumstances affecting the road such as weather.

Of course some roads have guard rails or guard cables installed to prevent the automobile from intruding onto the sidewalk to protect the pedestrian's safety. However, this guard rail or cable is not for preventing the deviation from the driving lane. The center divider is the same, the center divider is to prevent the automobile's head on collisions, not for preventing the deviation from the driving lane.

After all, prevention of deviation from the driving lane is absolutely depended upon the driver's control. There is no fully automated control system which prevents the automobile's deviation from the driving lane yet.

Diverging and merging the automobile on the road from one lane to another lane occurs all the time especially on the interchange section or junction area of a highway. Also, from the general road to the highway, the automobile must merge into the highway driving lane. Even when the automobile diverges from the highway to a general road, the automobile must merge into the general road from the highway. Basically to traverse from the main roadway to sub-roadway or vice versa the automobile must diverge and or merge to the other. There are many such cases. However, in this patent, it is described only in highway cases.

In diverging and merging systems of general automobile-road system, control by the driver's steering wheel rotation changes the direction of the automobile toward the next traversing lane. From the main driving lane to the diverging ramp, or the merging ramp to the main driving lane, in the acceleration or deceleration areas, the driver controls the steering system. As a result, the automobile's diverging and merging are complete.

Therefore, when the driver wants to diverge from the highway on the interchange section, the driver must prepare to diverge. In other words, the driver must have had previously decelerated, then change lanes from the main driving lane to the diverging lane. Because the driver must decelerate and change lanes, as it is described, the capacity of the traffic is decreased around the interchange section. This is the significant problem of the existing transportation system.

Not only in the case of diverging, but also with the merging case, when the automobiles proceeds through the interchange section, the driver must observe the traffic conditions of the main driving lane of the highway while increasing the speed. The driver must find a space to fit in the main driving lane on the highway. Often, the driver cannot accelerate the automobile enough to find a space on the highway. Sometimes drivers who are on the main driving lane must decelerate their automobile to make space for the other automobile which wants to get into the main driving lane. Thus, around the diverging and merging areas there are accelerating automobiles, decelerating automobiles and lane changing automobiles. Because of such conditions, interchanges or junction area decrease their traffic capacity when compared to the straight roads which do not have interchanges and diverging or merging sections. Also, the probability of a traffic accident becomes higher in such an area.

Concerning general diverging and merging procedures on the road, because the driver must rotate the steering wheel to change the automobile's direction to diverge or merge by himself, then change from the main lane to the ramp toward the diverging or the merging lane, if the driver make a mistake of judging circumstances or steering, there is a high probability of accidents occurring in the area where with deviating from the lane is allocated to take place.

While diverging or merging on the road, such diverging or merging is completed by the driver's rotating the steering wheel. In other words, the diverging and merging is performed by the driver's steering and speed control. Thus, diverging and the merging are one of the functions of the steering system.

In the general road-automobile transportation system, in order to diverge and merge to other traffic lanes, it is necessary that the steering is controlled by the driver's rotating the steering wheel.

There is only one method available to control the steering wheel, which is that the driver must manually rotate the steering wheel by himself according to his interpretation the circumstances such as weather, condition of the road or the situation of other automobile.

According to the manual steering method, steering is controlled by the rotation of the steering wheel by the driver, and the driver observes the circumstances and around the automobile such as the situation of other automobiles and the timing needed to change the direction or lane in order to diverge or merge. Not until the driver makes a mistake controlling the steering will deviation from the driving lane not occur. However, if the driver makes a dangerous mistake controlling the steering, deviation from the lane occurs and may result in sever accident.

In the railroad system a train cannot change it's lane without switching rails itself. But general automobiles can change their lane by changing the direction progressing forward. Even passing other vehicles is possible on regular roads. However, this freedom of changing lanes is perilous, because if the driver or automobile falters steering could lead the car into an oncoming lane. This may result in ahead on collision or the driver may cut off another automobile's right of way which may also result in a sever accident.

The general automobile-road system has intrinsic problems which are explained above. Also the control of steering is totally dependent upon the skill of the driver, there are many accidents based on this transportation system. In Japan, nearly 10,000 people are killed annually by traffic accidents.

Regarding the bumper of the automobile, the current bumper can absorb some collision force. However, the bumper can absorb the force only after the collision taken place by changing the shape of the bumper. Therefore, the amount of force it can absorb is limited to a small amount. Thus, this limited absorption of a collision force is a problem.

However, there are proposed force absorbing methods; one of which is that of the air bag being installed in the automobile and before the collision occurs, the air bag is inflated to absorb some force of collision instead of direct absorption by the bumper. (Japanese Patent Application No. Tokkaihei 6-144154). However, according to this method, the air bag may inflate even in the case in which the drive may have avoid the accident. Therefore, this proposed method is difficult to use realistically. Also, even if the driver is driving perfectly, another automobile may strike this driver. The perfect driver has the possibility of being involved in many accidents. That is why they are called accidents.

In other words, during responsibility is not solely dependent your own driving skills, but also dependent on other divers too.

In Europe, the United States and Japan, these three regions, automobiles and road transportation systems, railroad and airplane transportation systems along with other transportation systems, development of the ideal transportation system has been studied and deployed intensely with intellectualization of all types of transportation systems, such as ITS (Intelligent Transport Systems). (Akio Hosaka, "Trend of development of ITS in Europe", Journal Road, Mar. Japan Road Association).

According to the European research and development project of ITS, the automatic steering system is installed on regular automobiles. Then the automobile is driven on specified roads. This system has been experimentally tested.

In the USA, the development of an automated highway system and it's field testing is mandatory under the law. (Kentaro Sakanoto, "Trend of development of ITS in the United States of America" Journal of Road, Mar. Japan Road Association, pp. 25)

So far, in the development of an automated highway system in the United States of America, there are three phases. The first phase is the preparatory phase, the second phase is the system definition phase, third phase is the operation and evaluation phase of ITS. Now it is just after the end of the first phase.

For example, on the highway, when an accident happens in front of an automobile, the automobile has a high probability of getting involved in the accident. That accident may cause a multi-collision accident. Also, in case of the road doesn't have a center divider, even if the driver keeps his proper driving procedure, the other oncoming automobile's driver might suddenly move over the lane and this results in a head-on collision.

Trains or railroad can only run on the rail. Thus, unless the train moves onto the other oncoming rail as in the automobile's case, the head-on collision will not occur.

As explained above, in the general automobile-road transportation system, even if the driver pays attention to his own driving, his safety is totally dependent on the probability of another driver's action, skill or manner. Therefore, the automobile-road transportation system has intrinsic problems.

On the other hand, recently the automated highway system has been developed. This provides that control and sensing devices are attached to the regular automobile. These allow the driver to drive automatically on the specially made road which has magnet markers installed on it.

Regarding the field tests of the automated driving system, in California, there are actual field tests which have been carried. This is called the PATH (California Partners for Advanced Transit and Highway) project. Under the PATH project, development of sensor and communication methods, experiments on driving lanes, while diverging and merging and tests of control of distances between cars and lateral distances are being undertaken.

Regarding the field testing of an automated driving system, for example, in California, there is the PATH (California Partners for Advanced Transit and Highway) project. Under the PATH project, development of sensors, communication methods, lane changing methods, diverging and merging methods, and control methods of distance between cars and lateral distance methods are being undertaken.

To further explanation detailed field testing, each car has sensors which detect the distance between cars and their relative speed. The distance between the cars is then controlled. Also, communication and information exchange between the cars by radio waves is being tested.

Concerning lateral distance between cars, at Richmond Field Station, University of California, the method of utilizing automatic steering system has been tested. The method of lateral control is that basically magnets are buried in the road surface, the magnetic sensors detect the magnetic wave to grasp the direction of the road. (Takayuki Ooba, "Topics of ITS in the United States", "Journal of road-transportation economics" January 1995, published by the Economic Research Group Incorporated Foundation).

In Europe, there have been two major projects, the first one being PROMETHEUS (Program for European Traffic with Highest Efficiency and Unprecedented Safety) project which promotes high level functioning of the automobile and the second is the DRIVE (Dedicated Road Infrastructure for Vehicle Safety in Europe) project which promotes a higher level of road-vehicle transportation.

The PROMETHEUS project was started by mainly European automobile manufacturers in 1986. The project has developed an improved safety level, efficient transportation, convenience and remedies some environmental pollution. However, it was stopped in 1994. Then the new project named PROMOTE (Program for Mobility in Transportation in Europe) was started in 1995. In the new project, not only develops vehicle technology, but also controls traffic are being researched.

In the PROMETHEUS project, control of the distance between the cars has been studied to maintain a constant distance. Automatic steering using the information from the distance sensors has been tested.

In Japan, the ARTS (Advanced Road Transportation System) project which promotes and studies a higher level of the road control has been carried out. In this project, for example, lateral control for cars has been studied.

In the ARTS project, according to the current phase of the development, provides information and warnings, and driver support while fully automated driving is assumed. In the last fully automated driving phase, the car becomes fully automated and controlled by the collected information concerning the distance in front and behind, on the sides or side barriers. This information is controlled by the sensors which are installed in the infrastructure, such as on the surface of the road and in the car. These regulate the accelerator, throttle, brake and steering wheel automatically.

As described above, in various countries, the automated driving system has been studied intensely by using radio waves, light waves, sound waves, electromagnetic waves to communicate with the road and other vehicles. However, this wireless communication method has many problems which must be solved. These include interference by wave noise which is untraceable. This will result in circumstances when the cause of a problem cannot be determined.

If an accident occurs in this fully automated driving system using the wireless method where the control system is totally dependent upon the insubstantial waves; identifying the true cause of the accident would be difficult.

More precisely, the real cause of the accident is either interference caused by wave noise, which is totally unpredictable and insubstantial, or control failure of the vehicle traffic control system. Therefore, identification of the real cause would be difficult. Also, who will take responsibility and how the responsibility will be taken would be totally indeterminable.

In the case of the fully automated driving system which is controlled by road-vehicle communication and intellectualization, because the car has the wireless devices, boundaries of responsibility of an accident become unclear. As a result, this fully automated driving system can only work in the testing phase. It will definitely not work in the real world, because it is difficult to obtain a social consensus under such conditions.

Moreover, in the automated driving system based on advanced information systems, there is no mechanical or physical fail safe mechanism or system to prevent the vehicle from deviating from the driving lane.

Problems also occur when there are accidents, system failures or even strong wind. These also affect the automatic steering of the automated vehicle. This automatically puts the driver in danger. (if the vehicle runs at high speed, it's inertia increases significantly and this will result in difficulties to avoid danger) Thus, in this system, there is always the possibility that the vehicle will deviate from it's driving lane. These problems are significant.

So long as this automated driving system has the potential to cause sever problems, it is difficult to obtain a social consensus to accept it as normal infrastructure of society.

The automated driving system has been studied and developed in many countries. However, the proposed systems has not guaranteed mechanical or physical fail safe system yet, even if the designated lane is installed for the automated driving automobile, there is still a possibility that regular car, which is not automated, may enter the designated lane because there is no physical barriers. Therefore, the lanes are basically mixed for automated and not automated automobiles. If the designated lane excludes regular automobiles, the road would become very high cast to construct.

Due to this problem, even in the automated driving lane, the automated automobile must be driven considering the other regular car's behavior. And the automated car must have all type of sensors to detect the other car's movement. Under such conditions, there is too much information to collect. This is because analysis of the surrounding conditions is too vast to process in real time. In addition, based on this enormous information, calculations regarding the driving environment such as the velocity, the direction and the position of each car must be done in a moment. Then, all of the commands to control the vehicle driving are determined and decided. The necessary information is transmitted to the steering system and the engine. Finally, each vehicle in traffic is integrated and controlled.

Generally, because all automobiles do not run on restricted guideways such as train tracks, there are intrinsic problems. These include the vast amount of information to control the vehicle's movement. Such problems also include control of an automobile with rubber tires. The unpredictability of rubber wheels is uncontrollable by computer because of constant slippage.

In order to realize the automated driving system, it is absolutely necessary to utilize the sensors, the CPU (computer), and the control devices. As a result, the cost of the installation of these devices will be passed on to the driver.

The driver is also responsible for maintenance of these devices. This means that the driver must inspect all of the devices to make sure they are functioning correctly before he uses the automated driving system.

The improvement of road, for example, with LCX (leaky coaxial cables) or inductive magnetic cables involves installation on the road surface. Maintenance of these communication cables is assumed by the road administration. However, in the long run, maintenance cost will be greater for the consumer. In effect, if the driver wants to automate his automobile, a tremendous investment is necessary.

The road management administration may be able to enforce inspection of cars before they enter the driving system. However, it is also possible that during automated driving, some electronics devices breaks down or malfunction. Whichever the case, as long as the automated driving devices are installed on the automobile, the responsibility of the automated driving belongs to the driver. The more advanced or complicated systems, the more important is the maintenance of those sophisticated devices. Such advanced and complicated automobiles may not be accepted by the consumer, because the more advanced and complicated the automobile becomes, the more the burden to the consumer. Not only will the initial price more expensive, but also maintenance will carry a high price tag.

The semiconductor chips utilized in electronic controllers, can be affected by electromagnetism, as a result, malfunctions occur. For example, in the airplanes, passengers are regulated and asked not to use any electronic devices such as radios, cellular-phones and PC's, etc. when the airplane takes off and lands.

Semiconductors do not tolerate high temperatures above 40 degrees C. They malfunction when this temperature is exceeded. When the automobile is exposed to direct sun light, the temperature may reach 50 or 60 degrees C. Also, the automobile propulsion section, such as the engine area generates a much higher temperature. Therefore, even if the automobile is inspected at the entrance of the automated driving road, and no problem is found, this will not guarantee a malfunction of the electronic devices. Thus, when the automated driving system, which relies completely on automatization, experiences an electronic malfunction, it is difficult to guarantee total safety. System failure caused by these situations at high speeds is extremely dangerous for who use the system. Unlike system failure at low speeds, the driver does not have enough time to secure manual control of the automobile. This is a basic problem with the fully automated system.

For example, while the automobile is in the traffic congestion, the automated driving system is carried out more easily during low speed. Also, even if some electronics malfunction occurs, manual measures can be tackled. However, if the same problem occurs during high speed, it will result in sever traffic accident.

The electronics devices can support or help automobile control. However, there is a limitation on electronics technology for letting it control driving completely. Driving control affects the passenger's life.

It is highly possible of fully automated driving system which is supported by the intellectualization of information using electronics devises. However, there is a significant problem in driver's "anxiety" (which anxiety lies on insecurity in a fully automated automobile is something to be considered). This insecurity is mainly caused by fully automated driving system which is dependent only on invisible "wireless" electronic control system on both road and vehicles. The public's consent is necessary for full automation. But obtaining public consent seems to be difficult based on the fully automated driving system. For example, if the automated driving vehicle accidentally deviates from the lane by device's malfunction, no driver can react in less than a second. Because the malfunction could occur in very short period of time. The insecurity is caused by non-existence of physical and mechanical fail safe mechanism in the fully automated driving system.

As mentioned above, there are many problems in the automated driving system. In this system, the driver grasps the steering wheel to control the lateral direction of the automobile. This includes merging and diverging from lane to lane by controlling the steering wheel. Such manual methods have the potential for making mistakes.

The lateral control by steering system of the automobile provides smooth traveling. This steering system is better than the other lateral guiding system such as railroad, monorail and cable car transportation system. However, from the safety point of view, this lateral control by steering system does not guarantee driving safety. Because the lateral movement is free and is not guided mechanically.

Even if the automated driving system is realized, the automobile itself is still powered by the internal combustion engine. This is powered by burning gasoline. Thus, this automatization will not remedy environmental pollution perfectly. Also, the maximum speed of the vehicle will not exceed the maximum speed of automobile. As a result, it will not provide fast transportation such as the Bullet Train System. For future transportation, faster transportation development is required for human and commercial mobility.

As explained above, there are many problems related to the automated driving system using electronics devices.

Now, the objectives regarding the development of roads for the automated automobile driving system are as follows.

On general roads, passenger automobiles and trucks travel together. Also, they can use any lane. Most general roads are designed as heavy duty in order to meet the needs for the heaviest truck. Therefore, from a different point of view, most of the road is unnecessarily over designed, especially paved structures and bridge structures.

For example, the general bridge floor is designed to meet with the weight of the heaviest truck that uses any lane on the bridge. If the truck is restricted to some particular driving lane, the other lane is not necessarily designed for heavy trucks. This lane is reserved for passenger vehicles, which are usually lighter than trucks. Therefore, such restricted driving lanes let the bridge be designed lighter and more economic.

In general bridge design, passenger vehicle bridges are much wider than bridges designed for only trains.

Furthermore, on the bridge, traffic is always intermixed with passenger vehicle and trucks on the same regular road. The strength of the structure of the bridge is usually designed based on the heavy automobile such as heavy duty trucks.

In designing a bridge, any driving lane of a bridge floor is designed to allow any type of vehicle from light to heavy. In order to accommodate to the large moment force from the heavy duty vehicle, the girder structure becomes bigger and heavier. This designing issue causes several problems. For example, to obtain a large space or a longer cross-section, the longer span length must be sacrificed.

In order to pave the road, currently asphalt or concrete is used. However, asphalt is an elastic material, it makes a wheel track easily. Also, the concrete needs seams to install, and has a technology to have cracks. Therefore, to maintain road surface cost becomes greater.

Why not use steel for the road pavement? It is too heavy to use for the road, it must cover the whole road surface because the wheel running track is not fixed. Also, when it gets wet with rain water, the coefficient factor of friction between road surface and wheel becomes small and this causes a slippery surface and drainage is a problem.

Recently, an energy-saving road has been promoted, such as solar-cell panels, heat panels and heat pumps have been started to install on the side walls of the road. Sound-proofed walls or sunshade roof have also been used. Usually, the road surface takes the widest area in road section, but this surface is used for the runway of the vehicle, this has not been used for energy-saving purposes.

The leaky coaxial cable (LCX) for the road communication system has less quality unless the antenna and overhead line directly faces the direction of the moving vehicle. If it is installed on the side of the shoulder of the road, sometimes other vehicles between the vehicles and the side shoulder hinders transmission, and the quality of the communication decreases. In the current system architecture of the road-automobile system, the automobile doesn't run on a restricted lane, but anywhere on the road. Thus, the problem described above becomes a real problem. To solve this type of problems, the place to install the LCX becomes the main issue.

The laser beam reflection detecting system is utilized to measure the longitudinal and lateral distance between the vehicles. This method is very accurate. However, there are no reflecting materials without interruption on general roads, and there are no places to install such reflecting devices.

In the highway system, the intersection is designed for crossing with an overpass or underpass to avoid vehicles running into each other and to maintain traffic capacity and safety, but this system is costly to build.

In tunnel, ventilation is necessary because of the vehicles exhaust gasses, thus the area of cross section becomes wider.

Also, in the general highway system, the road cannot control the movement of each vehicle. Therefore, if there are vehicles which way collide with one another, there is no method to make the distance longer between the vehicles, or to stop the vehicles. It means that the current road system doesn't have the ability to control the vehicle's movement actively.

The next issue is related to the railroad. In the railroad system, the guide for traveling is performed by steel wheels and railroad. Then, the traveling of steel is restricted physically and mechanically. Therefore, the rail car does not de-rail unless a significant accident happens such as large scale earthquake or natural disaster or human error.

Based on the facts which are explained above, a rail car transportation system is much safer than the road automobile transportation system.

Most of the rail car system can be powered by the electric motor, therefore this system is more environmentally friendly than the road automobile system.

However, this railroad car system contains a demerit of individuality and free accessing. Because the car can drive only on the rail which is limited by the railroad network. Thus, the railroad car is used for traveling from fixed point to fixed point.

In this electric motor driven railroad car system, the propulsion force is gained by the rotation of the steel wheel on the rail. Actually, from the friction between the steel wheel and the steel rail. This is called "adhesion propulsion method". In this mechanism, the maximum speed is approximately 330 km/lh. (an France, TGV recorded 515.3 km/h in 1990 as the worlds highest speed for a railroad, but this has been recorded under ideal conditions not under normal operation conditions.) In the railroad system, there is a potential possibility of an accident when a natural disaster occurs such as an earthquake or strong wind, etc. However, the wheel is restricted to the guide-rail, so that the lateral movement is regulated by the rail. Thus, the probability of accidents of lateral crashing is much less than the road-automobile system, even if the car loses control. The Shinkansen in Japan, which is the bullet train system, since service started in 1964, a regular diagram has been set at the highest speed of 210 km/h. So far, there have been no accidents resulting in injury or death (Currently, "Nozomi" is traveling at 270 km/h as it's highest speed).

Basically, the railroad transportation system is safe. But, the metallic noise, and sound problems exist. This is because it is driven by the steel wheel and the steel rail, which are rigid bodies, to obtain the propulsion friction, also to support the car.

This system adopted steel wheels and steel rails not only to support the car, but also to guide the direction of the car. The flange type wheel is utilized to travel on the rail. The internal ring flange of the wheel pushes out the rail and expands the distance between the rails. This function makes a more reliable guiding toward the rail by receiving a lateral restriction force.

In order to guide the car, a 1/20 grading of internal flange is put on the surface which contacts with the rail surface. (The Shinkansen system adopts 1/40 grading) Due to this lateral guiding system, especially in straight rail lines, the force from the both right and left rails centralize the position of the car. In the curb section, the wheel is shifted to the outer direction by centrifugal force. This results in smooth curbing. ("An illustrated references book of railroad car", written by Kazuo Ihara, Sep. 10, 1987, published by Grand Prix Publishing Co., page 225).

Therefore, the wheel receive both supporting and lateral force from the rail. In order to sustain these loads, the wheel and the rail must be made from steel. In general, a unit rolled wheel is utilized.

In the general railroad system, supporting and guiding are completed by adopting steel wheels and steel rails. The accuracy of installing the rail affects directly to the ride the feel, the noise and the vibration. Thus, continuous maintenance of the rail conditions is absolutely necessary. But this maintenance cost is high and it is tedious work.

Also, when the rail car needs to merge or diverge, the rail which is always supporting and guiding the wheel, must switch the whole section of railroad from one track to another.

In the turnout of the railroad, it is comprised of the point, the crossing point the leading part and the gird part. It is then switched by the transferring tongue rail mechanically.

The speed of merging and diverging depends on the speed of the mechanical switching points. Thus, in the railroad system, it is difficult to merge and diverge in a short period of time.

Also, when the train changes its driving lane, a crossing over section is needed between the lanes. Often, the scissors crossing section between the lanes is used. It is usually comprised of four turnouts, and a diamond crossing section and this forms an "X" shape. These mechanical mechanisms are complicated, therefore, it takes a long time to switch over from one lane to another.

In addition, the railroad transportation system is not individually driven, and it is not a random transportation. Basically, it is mass a transportation system. This is really a demerit of the railroad, because it cannot meet with the individual, but is attached to a plurality of cars to make one train.

Usually, the train is composed of many cars, it then becomes heavy as a whole train. Thus, the railroad structure usually requires heavy and strong structure to endure the heavy load. Also, the bridge for the railroad is designed based on the heavy weight of the train system.

In the guide rail transportation system, which is categorized as a unique form of railroad, in order to decrease noise and vibration from the steel wheel and steel rail, a rubber wheel support car "I" shaped steel guiding rail, which is installed in the ditch which is located in the center of the driving lane, is installed. The other method is the reversed "T" shaped rail which is installed in the center of ditch. Guiding or the side wall is pushed out by the wheel towards the outside. (Both of them are called center guided systems). The side wall is made inside of the outside wall of the driving lane. And the lateral guiding wheel is pushes the side wall to obtain the guiding force for the car.

The method of the reversed "T" shape rail is set in the center of the guideway. The guiding wheels hold the rail. This has been constructed in Sapporo in Japan as the city subway system. This system makes less noise and vibration. ("Civil Engineering Handbook II", Japan Society of Civil Engineers, The thirty sixth edition, page 1582).

There was a transportation system which is comprised of the ditch which is installed at the center of the driving way, and the guiding wheel is introduced to contact with the side wall of the ditch. This system has been developed as CVS (Computer Vehicle System) in 1970 by Japan Society for the Promotion of Machine Industry. ("CVS technical Report", Japan Society for The Promotion of Machine Industry, published in March, 1973).

The double sided guidance system in which the side wall is installed and on which the guide wheel runs, has been in use as Kobe's new transit system named "Port Liner", for example.

These new transit systems utilized the guide wheel system. The control is performed by the guide wheel and the rail or the wall. The point is that the guide wheel is always running on these rails or walls with direct contact. It is not steered by the wheel like a regular automobile. The guide wheel guides the vehicle with rolling on the guide rail or wall. In other words, the angle of the front wheel guides the direction of the vehicle.

Thus, the guide wheel easily reduces the noise from the guide rail or wall. Vibration usually becomes the significant issue.

In "U" shaped guideway transit system, which is sometime called the "both-side" guidance system, the vehicle is driven in the guideway as the guide wheel is protruding from under the vehicle to push out to the side walls to obtain a sustaining and guiding force to the vehicle. This type transportation is in use in the Osaka Nanko Port Town line. According to this system, the suspension system is installed between guide wheel and the support of the vehicle body.

Also, the installation of guiding wheels is necessary. Thus, it becomes an enormous machine, and not only the ditch is necessary, but also it requires the guidance rail. In the "U" shaped guideway, the transit vehicles are dipped into the guideway, so that in case of an emergency, it is very difficult to evacuate the vehicle from the guideway. (It is almost impossible for the vehicle evacuate using the other guideway, because the guideway is restrained).

Therefore, the transportation system which needs to operate many vehicles on the guideway, the "U" shaped guideway has potential difficulties to accommodate emergency case. It is also difficult to remove the malfunctioned vehicle from the guideway, because the vehicle is dipped into the guideway.

Moreover, such a "U" shape guideway has much less compatibility with other guideways. If one lane malfunctions and many vehicles are stuck, those vehicles face difficulty to change their driving lane. This is because the guideway itself becomes an obstacle for the vehicles to move over.

There are many methods for diverging and merging procedures and rail changing methods. The flexible guidance plate, which operates on the diverging section connected with the diverging wheel is installed and the diverging guidance wheel is gripped in the ditch. The up-down guidance rail method: the vehicle is guided by the straight flexible guidance rail which is controlled up and down next to each other. The horizontal rotary guidance girder method: the wheel guidance girder rotates to the diverging lane. The tongue rail method: the edge of the tongue rail is switched. ("Figure book railroad Engineering", written by Kozo Amano, Yasuhiro Maeno, Toshihide Miwa, Maruzen Co., LTD., Published on Apr. 30, 1992, P. 264–268.) All of the above need a mechanical ground machine. They diverge perfectly but can not accommodate many vehicles at one time. These are not quick enough for the vehicles which have only a short distance between them.

Regarding the CVS which was mentioned above, it requires much maintenance. The guiding wheel tire always contacts the guidance rail, which is installed in the center of the ditch. Due to the guiding system, either guiding wheel tire is always pushed to the guidance rail.

These new transit systems do not realize the individual accessibility randomly. They do not accommodate automobiles on the road and they don't remain compatibility with current road-automobile transportation systems. Thus, these systems are in use only in limited areas such as in large cities.

There are several inter modal transportation system other than road system such as the piggy-back system which carries trucks on trailers directly. In this system, the consignee can save some transportation cost by doing direct transportation which has the ability to extract the automobile's character by utilizing the railroad's designated transportation line. ("Handbook-2, civil engineering" published on Nov. 18, 1989, article: railroad and guideway, page 1545).

However, these are not the systems which carry automobiles, or trucks one by one. There are several demerits with this system. One is the schedule is restricted by the diagram of the train. They must stop at the station even though it is not the destination. It loses the defining character of individuality of the automobile. There is no random accessibility. Therefore, these systems are in use in limited areas such as in long-distance transportation, tunnels etc.

There is another transportation system called the "Car-Train" system as an inter modal transportation system of automobiles and railroads. For example, the "Eurotunnel" which connects the Dover-straight between England and France. The train carries many automobiles, and those are contained in the cargo. There is no car fixing apparatus to the floor. Each automobile is just fixed to the floor by only the hand brake. This is just like parking in a train. This is because the automobile is not exposed to the outside directly, but is housed in the train car. If the automobile is carried by the vehicle singularly, and it is not housed, the automobile must be fixed on the floor firmly. The "Euro-Tunnel" car-train system can accommodate many automobiles carried per car. Thus, the individuality of the automobile is non-existent.

As explained above, concerning the usual piggy back system, the car train system is the system which carries many automobiles at one time. Therefore, these systems inherit the drawbacks of train transportation because of no capability with individual transportation as with the automobile, which boasts a quick diverging and merging system.

There exists a linear motor propulsion transportation system which doesn't require adhesives between the wheel and rail.

A magnetically levitated railroad system with superconductivity was developed by Japan Railroad Inc. This is one of the linear motor systems. It adopts the LSM (linear synchronous motor) utilizing superconductivity magnets as propulsion. However, it is difficult to control because the magnetic poles must be synchronized. Also, only one train can run per electric substation. Thus, in order to operate, many substations must be constructed. Substation to substation experiments have yet to be completed.

The Transrapid system in Germany uses the magnetically levitated train system under normal temperatures and a linear synchronous motor. The levitation is performed by the mechanism of absorption power which is generated by the electromagnet that is installed under the vehicle opposite the top rail which is installed on the guideway on the ground. This basic mechanism is nearly the same as that of the HSST. The difference between these systems is the mechanism guiding the vehicle. Transrapid adopted the separate side electromagnet on both sides of the vehicle, but HSST's guiding electromagnet is integrated into the levitation electromagnet.

With the HSST system in Japan, the guiding force is obtained by the electromagnet This is the same magnet with generates the levitation power. Because support of the vehicle's body is obtained by magnetic levitation, the rail and wheel are not necessary. This provides for less noise and smoother rides for the passenger.

In this system, the LSM (linear synchronous motor) is adopted as the propulsion force. Generally, in a system which uses electromagnets to obtain guiding force, it is necessary to reduce the vehicle's weight and inertia as much as possible. When this electromagnetic guidance is performed, the ride becomes smoother, the noise and vibrations can be diminished, because no wheels or rollers are used.

However, in case of utilizing the HSST method for heavy duty transportation systems which deal with trucks, container and freight logistics, the weight and inertia increase. Thus, generating the power of the levitation and guidance at the same time becomes difficult.

HSST is a train. Therefore, it's longitudinal length is long at approximately 8.5 meters. The support body or the levitation and guidance module is approximately 2.5 meters long, one car consists of three modules.

Because the longitudinal length of the train and module is great, the mechanism to accommodate the curved section of the guidance track is a complicated link.

In the HSST system, the cross section of the vehicle structure straddles over the center guideway. So that when the vehicle needs to diverge or merge, the switching section becomes as the monorail car system. The monorail traverses the whole section of merging and diverging section. ("Technology of magnetically levitated train system", written by Eisuke Syoda et al, Aum Co. LTD., Sep. 25, 1992, page 157).

Thus, for the transportation system which accommodates heavy traffic, accomplishes quick diverging, merging and maintains the individuality of each vehicle, any of the urgent magnetic levitation train systems such as HSST or Transrapid cannot be applied.

The HSST or Transrapid magnetic levitation systems have not been developed to transport individual vehicles individually. These systems are, in effect modified train systems. When one considers the compatibility these systems maintain between the vehicle and the road, they contribute little to individual vehicle transportation. HSST or Transrapid cannot provide an individual transportation system. They are just same system as regular train system, from the compatibility point of view. Therefore, their contribution to the transportation system is not great.

Also, in the HSST and Transrapid systems, in the case of the absorption force that is generated from the LIM (linear induction motor) which is used to obtain the propulsion force; the magnetic levitation force is in the complete opposite direction. So, the levitation force is reduced. This is another drawback of the HSST and Transrapid systems.

Moreover, in HSST, when the car needs to reduce it's speed, the LIM is utilized. However, emergencies there is separate system and device that grasps the reversed "U" shaped rail to brake using hydraulics. ("Technology of magnetically levitated train system", written by Eisuke Syoda et al, Aum Co. LTD., Sep. 25, 1992, page 157).

In this type of method, the shoe of the brake straddles the reversed "U" shape mechanism. Thus, the lateral movement of the vehicle is restricted. This restriction makes diverging or merging impossible unless the whole guideway is traversed.

With the linear motor system, the most important condition for obtaining an efficient propulsion force, is controlling the gap length. This is the case whether it is the linear induction method or the linear synchronous method.

The M-Bahn system in Germany adopts a permanent magnet to levitate the car. When the number of passengers increases the system lengthen the gap. The mechanical link system then minimizes the gap length to increase the absorption force. Also, linear synchronous motors are installed on the guideway surface and the permanent magnet is installed on the bottom of the car. Then, the propulsion force is obtained by controlling the cycle frequency of the linear synchronous motor. ("Illustrated Book of Railroad Technology", written by Kozo Amano, Yasuhiro Maeda, Toshihide Miwa, Maruzen Publishing Co. LTD., Apr. 30, 1992, Page 282).

This method depends on the mechanical link system. The control of the gap is not sufficiently accurate. Therefore, a complete non-contact system is not possible using these methods.

The linear motor driven car and is supported by steel wheels, the reaction plate is installed on the ground side. The primary coil plate is installed on the side of the car. It is important to keep the minimum gap length less than 10 mm. However, in this system, the car is supported by a rigid structure. Therefore, a mechanism gap length system is adopted.

The gap length is controlled by a rigid supporting structure. Therefore, the wheel and guide rail is made from steel. As a result of adopting a rigid structure, the drawback of railroad system are inherited in this system. Also, the position of the guideway and reaction plate must be fixed accurately. Thus, the cost of construction of the guideway becomes significant.

There is another type of carrying system in which the linear induction plate is installed not on the car, but on the ground. For example, the carrying system is installed on the automobile in the automobile manufacturing facility. In this system, the primary magnet coil plate is installed on the ground side. The reaction plate is installed on the carrying pallet without any electronic control devices. However, even in this system, the gap length is kept by the rigid supporting structure. Therefore, if it is applied to the transportation system, fast diverging and merging would not be possible. This system also inherits the drawbacks of the railroad system.

In linear motor system, the higher the temperature, the less efficient the system. Thus, there is no actual in use the primary magnet coil plate installed on the ground side.

There are other transportation systems incorporate a vehicle traveling on a guideway. When the vehicle is on a regular road, the vehicle travels as regular automobile. There are two major ideas, one is "Dual Mode Bus" (Illustrated book of railroad technology", written by Kozo Amano, Yasuhiro Maeda, Toshihide Miwa, Maruzen Publishing Co. LTD.), the other is "Dual Mode Truck" (Journal of Road Traffic Economics, published by Japan Society of Economy Research, October, 1994, page 35) which has been developed in Japan. In these systems, it is necessary that the vehicle attach itself to the lateral control guidance roller and the power generator. This system requires specialized equipment Therefore, for the user, the cost will be high. Thus, the Dual Mode System (DMS) has an intrinsic problem from the view point of social acceptability and feasibility. The DMS has been studied, developed and investigated. However, it is not in use until June, 1995.

This research has continued. However, regarding the subsystems such as providing electricity, the non-contact electricity supply line has not been developed yet. The contact method needs more maintenance than the non-contact method.

The fully automated driving system has also been considered. However, the equipment for automation must be installed in and the responsibility boundary become uncertain.

There is an another transportation system called "Palleted Automated Transportation system (PAT)", which maintains it's individuality using the automobile carrying pallet, and it has been patented in 1972 in the United States of America ("Electric Guideway Transportation System", U.S. Pat. No. 3,673,966).

In this PAT system, with the individuality of the automobile, the system is driven by electricity, thus it is more environmentally friendly. However, the guideway has lateral side walls on which the rack is installed, and the pinion is installed on the side of the pallet, it is then driven by using a synchronous motor. The basic guiding system is the side wall method. Therefore, the drawbacks that the "U" shape guiding system has exist with this system, because the basic design of the guideway is almost same. Also, the rack and pinion method is adopted. Thus, mechanical vibration may occur, and it is uncomfortable to ride on. As a result, it has not been in actual use.

There is an another transportation system using the similar pallet transportation system, which actually utilizes different diverging and merging systems using the electromagnetic method, and a propulsion system using linear motor. This system has been applied as an invention in Japan by an innovator of this patent application, named "Cyber Highway System", as Published Japanese Patent Application No. 2-175463. In this "Cyber Highway System", the automobile, which is carried by the pallet, doesn't require any remodeling work. The pallet carries the individual automobile, then moves on the designated guideway. Thus, it can retain each automobile's individuality. Also, driving is controlled by the road side (guideway), and fully automated driving can be done. In addition to this, because the linear motor system is adopted as the propulsion force, much higher speed can be expected, and cleaner automobile transportation is possible. Condensed traffic can be performed because fully automated transportation is possible. Thus, the traffic capacity per lane increases more than 10 times.

However, in the specialized guideway, the guiding system is basically the "U" shape and the pallet has guidance wheels. The pallet has no steering function. Therefore, smooth guiding cannot be expected. There are still many problems which occur from the "U" shape guideway to be solved. Also, the "U" shape guideway has significantly high side walls. Thus, sight from the automobile is hindered, and it lacks an open feeling. For the passenger, the amusement level will be less than the regular highway system.

In the case of the "U" shaped guideway of the "Cyber Highway System", the vehicle moves on the guideway and must have guiding wheels both on the right and left side of the vehicle. Because of this, the design of the vehicle is limited especially from the aerodynamic point of view.

Moreover, because it adopts a linear synchronous motor using superconductivity electromagnetic forces as the propulsion power, the unit of magnet cost must be high. In this system, conventional force such as the linear induction motor may not be installed due to the much longer gap length. (In the case of the "Cyber Highway System" invention, the magnetic field is obtained by the electromagnet which is installed on the pallet vehicle, and a direct current motor is used. However, it is necessary to install the electricity supplying cable. Thus, the excess cost for electricity is needed). Also, it adopts a linear synchronous motor. Therefore, the control of the motor is not so easy. There is the remaining problem that the realization of the linear propulsion system is difficult.

In this "Cyber Highway System", electromagnetic force is utilized for diverging and merging. When the vehicle needs to shift to one direction, the electromagnetic force is generated laterally to diverge or merge. This method improves the speed of diverging or merging much more than the whole guideway traversing method, which is used for the "U" shaped guideway.

However, if the lateral electromagnetic control system fails, there is no other way to control the movement of the vehicle. In that case, the vehicle may crash into the side wall of the guideway, because when the vehicle loses it's control, the range of the vehicle's movement is w ide. Also, the vehicle is driving at high speed, so that the carried automobile has no time to escape. Thus, the automobile may crash at the same time.

According to the method of this diverging system, the diverging operation is performed only by the electromagnetic force. Therefore, if the vehicle begins to lose it's control, the leeway of the movement of vehicle is wide. This means that there is no method to prevent the vehicle's deviation at the begging stage. Therefore, there is a high probability of crashing against the side wall of diverging island with a large amount of inertia.

Furthermore, in this "Cyber Highway System", method of fixing the automobile is merely holding the automobile from the horizontal directions not pushing down the tires. Therefore, the suspension system of automobile is inactivated. Thus, the vibration and rattling from the vehicle cannot be absorbed, and it results in an uncomfortable feeling for the passenger. This implies that it is necessary to install some suspension system to the vehicle. It then becomes a more complicated structure, and the thickness of the pallet vehicle increases. The thicker the pallet vehicle becomes, the more space necessary for the pallet vehicle parking lot, creating higher costs for building this system.

Concerning the example shown in figure (FIGS. 7 and 7-B), the automobile is surrounded by part of the pallet vehicle. In this method, the automobile will not come out from the pallet vehicle. However, the tires of the automobile are not pushed down to the floor. Thus, the automobile's suspension system is inactivated, and this results in uncomfortable riding. Also, the size of the pallet vehicle increases, so that more space is necessary for the pallet vehicle stockyard at the mode-interchange, thus causing higher costs for building this system.

Also, in the example method (FIG. 7), the automobile's tires are not fixed to the pallet vehicle floor firmly, this may cause the automobile to move from the pallet vehicle when the vehicle accelerates quickly or on hairpin curbs.

In high speed pallet vehicle transportation systems, the pallet vehicle must hold the automobile tightly especially when the vehicle moves or stops suddenly. However, according to the fixing system which the above reference cited, fixing is completed by part of the body or the airbag. Thus, does not guarantee perfect fixing, and accidents may happen.

Also, this system has a limited communication system. Thus, the driver or passenger has a difficulty to communicating to the road and pallet vehicle system.

Generally, in summer, an air conditioning system is necessary inside the car. But according to the "Cyber Highway System", the automobile cannot turn on the air conditioner unless its engine is idling on the pallet vehicle. The "Cyber Highway System" has not considered this point of view.

In the "Cyber Highway System", the main target of carrying is passenger cars, not trucks or buses. It is not a written detail of how to carry these large sized automobiles such as trucks or buses.

Also, it is not clearly written how to carry container freight for trucks. However, containerization is increasing now, due to increasing international container freight distribution.

There is a system which adopts the electromagnet force to diverge and merge. This has been presented as a Japanese patent application 51-6404. In this method, diverging is performed by the propulsion force which is generated by the linear motor as is aforementioned. However, this system has adopted the "U" shaped guideway. Thus, there is still a possibility of an accident such as crashing to the diverging island. This type of accident may cause more sever damage than in the normal transportation system.

In the aforementioned Japanese patent application, a linear motor diverging system can be applied to the railway also. But, when the vehicle on the rail transfers from the rail to another rail, there should be a gap length must be longer than the thickness of the outer flange wheel. Therefore, there is always a disruption between the rail, and this results in a big difference in grade. At the point of the gap, there are significant problems: vibrations and rattling, if only the electromagnet force is utilized to divert (egress).

In the conveyance field, not in transportation system, there is the LIM type X-Y actuator system which is comprised of the X direction winding generating the X direction propulsion magnetic field, and the Y direction winding generating the Y direction propulsion magnetic field. ("Handbook of linear motor application", written by Hajime Yamada, Japan, published by Industrial Research Association).

In this actuator system, it is possible to have non-contacting diverging (egress) by using electromagnetic control while arranging the balance of forces both the X-Y directions.

The basic mechanism of the aforementioned diverging system is electronic switching. This makes possible quick diverging. However, there are several problems, as follows.

One is that the diverging force totally depends on the magnet. Therefore, in the case of the large sized transportation system such as an automobile carrying system, it requires a large amount of power. Therefore, in case it needs much more power, if the electric failure or malfunction of the controller occurs, diverging is not completed. This is the most different aspect in the mechanical diverging system.

In the "Cyber Highway System", the electronically controlled air brake system is proposed as a substitute for the linear motor brake system. But the basic mechanism of braking is the same as the wheel braking system. Thus, the braking force is still limited.

The above mentioned problems are propulsion, supporting, guidance, steering, lane deviation methods, diverging and merging methods, structure of the road/guideway, vehicle structure and the traffic issue such as passing in current transportation when the vehicle is traveled on the system. This invention is proposed to solve all of these issues and problems.

In the vehicle traveling transportation system, the primary objectives of the invention are to maintain full compatibility with the regular road-automobile transportation system, to network with the regular road-automobile transportation system, not to burden to the automobile's owner with altering any remodeling of the automobile, to maintain full individuality of the automobile, to make the passenger or driver convey driving demands or destination demands for container freight, to ease driving itself for the driver while introducing the automated driving system, to operate at higher speeds, to be more comfortable, to be safer, to have smoother traveling, to have less noise and rattling, to be more environmentally friendly, to increase more traffic per lane and to reduce the cost for land acquisition and maintenance.

The following paragraph, details each subject in order to accomplish the primary objectives as they are explained above.

The second objective is to obtain an automated guided transportation system which automatically guides the traveling the vehicle which travels on the transportation system. It travels with less noise and rattling. It has a smooth suspension system which supports the vehicle for it's traveling and it travels on the system automatically based on the guidance information.

The third objective is that when the vehicle to happens to deviate from the lane caused by some malfunction in the vehicle automated guidance system, or by wind or rain related slipping the vehicle has a prevention system not to deviate from the driving lane.

The fourth objective is that in the case of utilizing the linear motor as the propulsion force, the vehicle has a linear motor system which has the ability to control the gap length, to have an enough power for the propulsion force even though the superconductivity magnet is not used, to control each individual vehicle's traveling, and can travel a long distance at high speeds. Also, the other issue is to provide the system with remedies to the environmental pollution problem and to prevent air pollution.

The fifth objective is to obtain a system which has the capability to diverge and merge quickly, smoothly and safely.

The sixth objective is to obtain an interchange system which has the capability to change modes when an automobile or freight container needs to be loaded or unloaded from the pallet vehicle automatically.

The seventh objective is to obtain a non-contacting electricity collecting system which has the capability to minimize the gap length between the electricity providing cable and pantagraph, more efficiently.

The eighth objective is to obtain a brake system which doesn't affect fading like normal automobile brakes and has the capability to stop effectively and doesn't allow lateral sliding.

The ninth objective is to obtain a detector system for longitudinal or lateral distance sensing of the vehicle with high accuracy, security and swiftness.

The tenth objective is to obtain a level intersection system which can provide accessibility toward any direction on the guideway without deceleration.

The eleventh objective is to obtain an intelligent pallet vehicle which loads and unloads automobiles or freight containers by fixing or release from the floor of the vehicle. Also, the vehicle has the ability to levitate when it carries light automobiles by electromagnetic force, and can make possible quick diverging and merging. The vehicle is to be lighter for reducing the loading force to the ground by utilizing the aerodynamic body shape, or magnetic levitation. Introducing the sliding system to the vehicle makes for a more flexible support system. Also, the flexible pallet vehicle can accommodate any type of freight container to be loaded.

The twelfth objective is to obtain a road structure which can reduce maintenance costs and requirements, and can drain easily.

The thirteenth objective is to obtain an emergency traffic shut down system from the road side in case of accidents, or weather problems.

The fourteenth objective is to obtain a system which can greatly decrease the severity of an accident when vehicles collide.

The fifteenth objective is to obtain an integrated fail safe system which has the flexibility to accommodate any situation and is able to minimize the affects if an accident or emergency occurs such as an earthquake or fire. Also, the system needs compatibility so that vehicles can move to a new lane in case of these emergency occurs.

The sixteenth objective is to obtain a system which makes it possible for a faster vehicle to pass a slower vehicle quickly and safely.

DETAIL DESCRIPTION OF THE INVENTION

In order to realize the aforementioned objectives, the invented transportation system is comprised and integrated as explained below. In addition, the outline of general, basic system is now explained. The detailed subsystems are explained later. (Some of the explanations are overlapping.)

The most important elements in the invention are as follows, automobile/container, pallet, automated fixing apparatus for the automobile/container, the specialized road with fail-safe ditch (FSD), lane deviation prevention fin, automobile which has a lane deviation preventing fin (LDPF), automated guidance equipment, LIM (linear induction motor) with a controller/adjuster for gap length, diverge/merge system, mode-interchange and the automated traveling control system.

First of all, an automobile is carried, fixed on the pallet, and transfers and travels individually in the specialized road guidance system. According to the new concept of this system, the individuality of the automobile is maintained. The same conditions can be applied to a container. Basically a container is carried and fixed on a pallet, then it travels in the specialized road system. Also, the automobile, which is attached to the LDPF, is not required to be fixed onto the pallet to travel.

Because the pallets are traveling while carrying the automobile/container, the responsibility of the traveling is shifted to the road (guideway) system. Therefore, if a traffic accident occurs, all of the responsibility is taken by the pallet-road management. As a result, attribution of traffic management rests with the road system. Therefore, social consensus to build this automated driving system becomes much easier to obtain than the current system.

With this automobile carrying, traveling system, the automobile becomes a fully automated, traveling, transportation/logistics system without the need for altering anything on the automobile.

This can be applied to the container as well.

Regarding the automobile which has the LDPF, the automobile is within a safe system by adopting the LDPF. Thus, the fully automated driving can be realized. Therefore, social consensus also becomes easier to obtain. Also, for the driver or passengers, because the vehicle is secured by the LDPF mechanically, the passengers are psychologically secure, as well.

The mode-interchange is installed in order to accommodate entering and exiting to and from the regular road. In the mode-interchange, the pallet is loaded and unloaded with an automobile, truck or container. Also, the automobile which is loaded and fixed on the pallet is loosened and unloaded to be driven on the regular road. The automobile, which has LDPF, puts it up and down from the bottom of the automobile to insert or pull out from the FSD of the specialized road. And this is how to change the mode. This mode-interchange makes it possible for regular automobiles to be transferred to the automated highway system.

As the vehicles travel in this transportation system, there are pallets and cars present. The car, in this invention, means there are such cars which are utilized in the new transit/logistics system. Also, regular automobiles which have LDPF on the bottom of the body. The car's standard equipment such as it's driving control system, LDPF, the FSD of the specialized road can be standardized, then every pallet or car can be driven in the system.

In this article, the main issue is to describe how a regular automobile is loaded onto the pallet and fixed to it, and how it is driven by the system. Thus, a description of how to carry and fix the automobile in the system is provided.

Basically, the pallet system is named in order to simplify the explanation. Other car applications for this system can be varied, and the effect can be determined.

The basic design of the transportation/logistics system is comprised of the highway area and the mode-interchange are. All the vehicles are driven on the highway which connects between the mode-interchanges. The integrated information collection center collects the information from the traveling vehicles. It is built in order to supervise, manage and control all the traffic systematically.

By installing the integrated transportation control center (ITCC), the optimal distribution of the pallet becomes possible in the entire transportation/logistics system.

The component of the highway area is comprised of a main lane, a diverge/merge section and a lane changing section. Also, parking and rest areas are installed as are on the regular highway.

By having these areas and sections, the pallet can pass, change driving lanes and stop at the service and rest area. These can accommodate any demand or desire from the driver or passenger anytime anywhere. Thus, a more customer oriented transportation/logistics system can be built.

The control system of the automobile carrying pallet system is comprised of the following components.

There are two ways to support the pallet. One is the wheel supporting method, such as the shock absorbing rubber material used on either the road or the pallet side. The other method is support by the magnetic levitation system. The former usually adopts a rubber tire as the wheel of the vehicle. Thus, the noise and vibration from the wheel can be eliminated as it is usually produced from the railroad. Also, In this case, the side of the road is comprised of the steel road surface to prevent making ruts and a shock absorber which can be installed, such as rubber pad in between the surface and the ground, to prevent noise and vibration. The latter, a cost effective magnetic levitation system is used as an absorbing type magnetic levitation and not a superconductivity magnet which is much more expensive and is hard to maintain. However, when the superconductivity becomes effective and reasonable, it can be applied as a magnetic levitation system for the transportation/logistics system.

In the case of support from the tire wheel, the wheel of the pallet is there basically to support the body. The propulsion force is not gained by the tire. Unlike the regular automobile, which gains ifs propulsion force from by pushing against the ground with friction between the surface of the road. Thus, this new method provides for less area on the wheel surface, and as a result it lasts longer. Also, the wheel has nothing to do with propulsion, therefore, the diameter of the wheel can be reduced. (In order to obtain the propulsion force while the wheel is running high speed, the wheel must rotate, therefore, the larger the diameter of the wheel, the greater the propulsion force provided.) Also, this smaller diameter of the wheel makes for a thinner pallet body.

The pallets are only traveling within the system. Therefore, the lane for curving, cornering, diverging and merging can be designed as a gradual curve, not a sharp bend such as the regular road, which are small diameter curves. Therefore, the wheels of the pallet can be set as wide width wheels (tire), and the multiple front wheel system can be applied and when the equalizer is installed. The loading weight can be averaged with the total weight, and distributed widely. Thus, the weight supporting system which is able to disperse the weight of the pallet becomes possible to design. Based on this new system, the loading impact per area to the road surface can be diminished. Thus, the damage on the road will be reduced dramatically, and the maintenance cost can be reduced.

In the magnetic levitation system, the magnetically supported suspension of the pallet system is performed by lifting the LDPF as it is applied to the magnetic absorption force. In this case, the LDPF is inserted into the FSD, it then not only prevents the automobile from deviation, but also supports the car itself. In the FSD system, in order to enable the LDPF to support the car, the overhang support encasement rail is installed, and the interactive magnetic absorbing force is generated between the rail and the LDPF to support the car magnetically. In order to retain the gap length between the rail and the LDPF, one of either can be magnetically controlled. Considering with the pallet stability, the LDPF is installed both to the right and left side. Levitation of the pallet is possible, when the distance sensor is installed to maintain a certain distance, both LDPFs support the car. In such a case, it can be designed to levitate the pallet, which carries regular automobiles of which are relatively light weight The regular automobile's weight is approximately lighter than 2 tons. In the HSST, the system lifts about 1 ton per one meter guide rail, in comparison, the automobile's length is about 4.5 meters. Thus, when same magnetic levitation system is used for this invention, there is still a leeway of 2 tons. Generally, almost 1 kW (kilo watt) is necessary to a 1 ton object to lift 1 centimeter. 1 kW is almost the same as a hair dryer's electric power. Therefore, it doesn't require a lot of energy. This automatically is suggested that the magnetic absorption method is not difficult to levitate the pallet on which carries the automobile.

The gap control system using the gap length sensor has already been applied in HSST, Transrapid. The difference between this HSST, Transrapid system and the invention system is that the individual electric magnets are installed both side of LDPF, which supports the car. Both right and left sides of the electromagnetic system function individually. A non-traversing diverging guiding system becomes possible. Thus, the invention system can provide an electromagnetic diverging system for the first time. The detail of this first electromagnetic diverging system are described later.

By introducing the magnetic levitation system to the automobile carrying system of the pallet system, low levels of noise and vibration transportation are realized. What follows is about the pallet traveling system. The pallet traveling control system is comprised of three major parts, which are the propulsion system, the guiding system and braking system.

Regarding the propulsion system, electricity is the major power source for the propulsion of t he pallets circulation. By introducing electricity for the propulsion power, an environmentally friendly transportation and logistics system is realized.

As a electronic propulsion system, there are two basic systems, one uses an electronic rotation motor, the other uses a linear motor. In the case of high speed pallet transportation system, the linear motor system is adopted to mobilize each pallet on the system, and enables high speed traveling by the strong propulsion power generated by the linear motor. Therefore, the precise gap control system between the induction plate and the reaction plate is developed by the invention. The details of the gap control method are also described later.

Even in the case of using a linear motor system, for emergency purposes, the rotation motor is carried on the pallet. Usually, the strong propulsion power is generated by the linear motor, however, when an emergency happens, the rotation motor is also utilized for minimum propulsion. Thus, this combined system enables the emergency evacuation each pallet autonomously.

The next topic is regarding the guiding system. This guiding system has an important relationship with the pallet supporting system. There are two major supporting systems.

The first, in the case of the wheel (tire) supporting system, the wheel is steered smoothly by the automatic steering system, as this system is described below.

The pallet senses the conditions or shape of the traveling road, and gains information from such CD-ROM to collect all information regarding the road. Then, the steering is controlled by the automatic steering apparatus (ASA) to guide the pallet on the system.

The pallet is guided by the ASA. As the guiding is performed by the steering supporting wheel automatically, rattling, noise or vibration is minimized and results in smooth traveling. Also, as the pallet controls its steering, the driver or passenger of the carried/fixed automobile on the pallet doesn't contributes to the system.

The LDPF (Lane Deviation Preventing Fin) is installed for the mechanical fail safe system if the pallet loses control and deviates from the traveling lane. By combining the ASA and LDPF, smooth traveling and guidance for regular automobiles keeps the same lane perfectly, guaranteed. Simple control of the steering is usually performed.

The ASA of the wheel supporting system is described in detail later.

The other method is that the magnetic levitation system supports the pallet. In this case, when magnetic levitation supports the pallet, the electromagnetic power guides the traveling pallet along the tracking lane automatically. A more detailed explanation: the first method is like the HSST, the pallet travels while hanging on the reversed "U" shape rail, then the pallet obtains the levitation and guiding force. The other is similar to the Transrapid system, the electromagnet controls the traveling and guiding by controlling the gap length. Regarding magnetic levitation, it is better to guide the pallet by electromagnetic power than by the steering to utilize the advantages of magnetic levitation. Because the magnetic levitation system doesn't require a steering system, the total system becomes simple.

More details of the ASA are explained later. What follows is the total traveling system. The automobile is carried on the pallet in this invention system. The system needs to control the transportation/logistics system to match each requirement of all automobiles to run the system as a whole.

First of all, the passenger receives the remote-controller at the mode-interchange. This remote-controller is to transmit the following demands to the integrated information control center (IICC). It is used for setting the final destination, speed, route, passing and rest areas. These demands to the IICC meet with all the requirements necessary for an optional journey.

This remote-controller also functions to communicate with the road side through either road side beacons or fiber optic cables. The passenger also can control the options of the pallet, as if he/she were actually driving.

The passenger or driver can access the IICC at anytime, anywhere utilizing all of the demands while using the controller.

The pallet's information and communication apparatus such as the leaky coaxial cable (LCX) and beacon which is set along the road at regular intervals are installed to communicate at any point on the road. These collect each passenger's demand. Also, all pallets have a bar-code or an ID tag to be identified. The tag is identified by the vehicle identifying line, and the position of the vehicle is identified by the positioning line. Thus, the road side controller can always identify which pallet is traveling where.

The driver or passenger transmit their demand information regarding traveling on the system to the road side controller through the pallet's information and communication apparatus.

For example, the computer of the road side controller can receive the demands from the passenger of each pallet and what kind of traveling they want by accessing the registration ID #. On the other hand, the road side controller's computer can detect which pallet is traveling where by using the information communicated between the pallet and the road side (for example: the LCX, beacons, induction cables, crossing induction cables, cameras, vehicle registration barcode system, vehicle ID system, the radar system and two-way communication between vehicle and road system).

The road side controller's integrated traffic control center (ITCC) identifies each pallet's traveling position, and collects all the demands from the vehicle. It then calculates the optimized traffic conditions, and controls each vehicle's traveling by regulating the linear motor installed on the road or the electric motor installed on the vehicle.

The ITCC regulates the pallet traveling according to the passenger's demands, such as speed, passing and exiting at a service area, etc.

Thus, the regulation of each pallet's trip is performed by the demand-feedback system, by harmonizing demands from each vehicle's passenger and reorganizing the total traffic condition. It then predicts what would be the most optional condition, and commands each pallet's travel status.

Then, the ITCC regulates the output or direction of the magnetic field by the inverter controller of linear motor or the inverter of the electric motor to control the each vehicle's traveling conditions to meet with the demands of each passenger. The ITCC actually regulates those to meet with the speed, and the ASA to pass other pallet's or change the traveling lane.

Also, as the ITCC receives all the pallet's traveling condition within the traffic control area. Therefore, it controls pallet-to-pallet distance, as described as the headway distance, safely without any restriction. When the traffic increases, the headway distance decreases.

As the ITCC receives all the traffic of pallet in the system, if an pallet malfunctions or an emergency happens, the ITCC considers the conditions far the whole system. The ITCC regulates the inverter of the linear motor or loads the inverse magnetic field to brake and slow or stop the other pallets around the malfunctioned pallet. The ITCC control each pallet's traveling in the system while considering safety and harmonizing the other pallets, to satisfy their demands as much as possible.

The ITCC collects and gathers all the information about which pallet travels where or what demands the passenger has made by collecting all the information from the passengers or drivers while considering and optimizing each demand with the total traffic conditions at the same time.

Each pallet travels autonomously on the tracking lane by the ASA. Because the rapid diverging (branching) system to diverge (branch), merging and passing system is introduced in the system, the system has a large quantity of traffic. Because the road side controls each pallet's traveling, the system can prevent traffic accidents. Also, because the system can brake each traveling pallet by utilizing the linear motor, the pallet-to-pallet interval can be diminished, thus the traffic capacity becomes much larger with fewer tracking lanes.

Due to the larger capacity of traffic, the cost of construction per vehicle on the road is reduced. Also, the pallet only travels on the same traveling lane, frequent re-pavement is no longer necessary. Thus, the total cost of the road becomes less. Moreover, because the trucking line is fixed compared to the regular road-vehicle system, the rigidity of the road is easily designed and steel plates can be used. Therefore, the total cost of road construction and it's maintenance becomes less.

The first objectives is achieved by establishing the aforementioned transportation/logistics system.

What follows shows the details of each element of the aforementioned transportation/logistics system. The wheel fixing apparatus (WFA) for the automobile to be fixed on the pallet has been developed by the inventors (Japanese Patent Application No. 6-228594, published on Aug. 18, 1995). It is best to use the WFA to fix the automobile to the pallet.

The WFA fixes the automobile wheel by pushing it down by the belt from the upper direction, and the wheel side supporting apparatus (WSSA) fixes it laterally. By applying this apparatus, automobile's own elasticity of tire and suspension remains in it's usual operating mode as on the regular road. The suspension system absorbs the vibration and shaking of the pallet.

By employing this WFA system to fix the automobile to the pallet, the system doesn't require larger scale suspension system. Also, the original suspension system remains in operation, securing a comfortable ride.

In addition to the suspension, the thickness of the pallet decreases, due to the simplicity of the support system. (It is necessary to make the thickness of the pallet thin, especially when the pallets are stored in the mode-interchange while waiting to carry the automobiles. If the thickness is too much, the volume of stored pallets becomes a problem and more space will be needed, this results in higher costs.)

Linear Motor

What follows is an explanation of details of the propulsion system of the pallet. When high speed traveling is expected in the transportation/logistics system, the linear induction motor (LIM) is employed. In this invention's transportation/logistics system, especially for a high speed system, employing the LIM is better, because direct propulsion and high accleration/deceleration are applicable. However, an usual electric motor can be used for the propulsion power of pallet too.

When LIM is applied for the propulsion power of the system, an electric motor for emergencies is attached on the pallet just in case of a shut down on the LIM system. Even in such cases, the pallet is able to be mobile at low speed. The total system becomes safer.

Because the pallet can mobilize anytime, when emergencies happen, the system is still able to mobilize the pallet. The emergency electric motor operates only in emergency situations. Thus, the compact motor is enough.

Because the Linear Synchronous Motor LSM needs to synchronize the magnetic field and control, it is difficult to manage all the pallets maneuvering in the system and to control this complicated traffic system. On the other hand, the LIM provides easier control of the complicated maneuvering of the pallet because the LIM doesn't require a synchronizing operation.

In this paragraph, the LIM system is explained. The mechanism of the LIM varies and depends on the car body supporting system. Thus, the wheel supporting system is explained first.

The most important factor of the LIM is to minimize the gap length between the primary plate and the secondary plate while considering energy efficiency. When the gap length is minimized to be maintained at under 10 millimeters, an efficient inductive magnetic field is maintained, and this results in a higher propulsion power for the pallet.

There are two different methods of installation for the LIM in the system. One is to install the (primary) induction plate on the road, the other is to install the (primary) induction plate on the pallet. In case of road-side induction motor, the initial construction cost is higher than the other, however, the structural design becomes simple, with a lighter body. Thus, when many pallets needs to travel in the system, the road-side induction motor LIM is better. In this case, the roadside controls take all the responsibility of propulsion and braking of the pallet.

On the other hand, in case of the pallet-side induction motor LIM, an electric power supply system and the inverter are necessary, thus the pallet becomes heavy. However, the installment of the LIM on the road becomes unnecessary, thus the initial construction cost is lower.

Either method can be applied, however, the key technology is the same. The key is how to minimize, maintain and control the gap length between the primary and secondary plates. The following describes the detailed methods.

To minimize and maintain the gap length, a flexible link mechanism of the induction plate is invented. The flexible link mechanism goes up and down, independent from the body of the pallet. The reaction plate is supported by the link mechanism. In case of road-side reaction method, all the weight of the pallet is supported by the wheels (tire), and the reaction plate is installed under the body of the pallet with the link mechanism, as a suspension system. Thus, the weight of pallet doesn't load to the gap mechanism.

According to the new mechanism, the weight of the pallet doesn't load to the reaction plate, thus control of the gap becomes easier. In other words, the reaction plate is linked in the space by the new mechanism, and becomes totally free from the body weight of the pallet.

The gap length is measured by the distance sensor to keep a minimal length between the plates, then the gap is more precisely controlled by moving the reaction plate with the link mechanism by the actuator. When the pallet position is changed, the actuator moves the position of the reaction plate as to absorb the displacement to keep it within several millimeters.

To utilize the actuator more effectively, the link mechanism should be balanced. The balancing mechanism controls the link with minimal power because the mechanism cancels out the weight of the reaction plate.

Thus, the gap length is electronically controlled by introducing the actuator link method, and the primary and secondary plates do not physically come in contact with each other. Therefore, the reaction and induction plates do not touch each other.

While the pallet travels on the system, four acceleration sensors are installed in the corner of the pallet. They detect vibrations and the distance to the ground. Based on the detected gap length measured by the distance sensor on the reaction plate, the gap is maintained within several millimeters by computer calculations actively by the hydraulic actuator. While this gap control system is operating, the pallet vibrates while traveling, the gap length is minimized within several millimeters but still does not touch; keeping the non-contact system active.

The WFA remains the automobile's suspension system on the pallet. Thus, a long stroke suspension system is not necessary. Therefore, because the pallet doesn't vibrate with long strokes, there is no need to install a long stroke gap length control system.

When the automobile is loaded on the pallet, the gap length is adjusted by rotating the ball thread to maintain several millimeters between the plates. In this case, it is possible that once the position of the reaction plate is settled, it is not necessary to adjust the gap. Also, the basic structure of the pallet becomes simple. In case of the regular passenger automobile is loaded on the pallet, the active gap control mechanism is no longer necessary because of its light weight. (However, in such a case, the road structure, line shape, longitudinal gradient, surface unevenness must be confirmed. Also, to accomplish these factors, the road pavement has to be rigid, and the line shape must be standardized.)

The new active gap control system enables a maintained, minimized gap between the plates. The system is totally independent from the weight of loading. Also, this system is applied to heavy duty loads such as loading trucks or containers on the pallet.

The higher the temperature of induction plate, the lower the speed of propulsion the pallet receives. A radiator is installed to prevent this heat problem to decrease the temperature. Thereby, installing the radiator on the pallet lowers the temperature.

When the pallet is traveling at high speeds, the incoming air flow is applied to compress the air. It blows down the compressed air from the vehicle side reaction plate to the road surface to maintain the gap length between the plates. This new system maintains the gap with less energy.

In the case of an automobile with a lower LDPF traveling in the system, the same pallet linear propulsion system is installed on the bottom of the automobile's body.

What follows is related to the pallet supported by magnetic levitation (Maglev), and it's LIM system. For the Maglev, the gap control between the induction plate and the reaction plate occurs and at the same time the levitation control is completed.

In the case of loading regular automobiles on the pallet, a normal automobile's weight is relatively light. Usually it weighs 2 tons at most. It's size consists of: length less than 5 meters; wheel base, less than 3 meters; tread, less than 1.5 meters; total width, less than 2 meters; and total height, less than 1.5 meters.

Therefore, the small size of the pallet is enough to load these regular automobiles. Thus, the pallet for automobiles is levitated by electromagnetic levitation. (Of course, the superconductive magnetic levitation system is also applicable to the system. However, at this moment, this superconductive maglev is hard to deal with. Thus, utilizing the electromagnetic levitation is much more realistic.)

In the regular electromagnetic maglev system, it is necessary to innovate a guideway system which is different from the traversing systems such as HSST, when the vehicle diverges or merges.

The absorbing electromagnet is installed on the pallet side to suspend from the road to levitate. Therefore, the overhang shape rail for absorbing and levitating is installed under the overhang section of the expanded FSD which is installed center to the track lane longitudinally.

The absorbing electromagnet is installed either on the underside of the overhang section of the FSD of the road or the fin. However, it is better that the absorbing electromagnet is installed on the fin (LDPF), to be more stable while traveling on the road and to minimize construction costs.

As for the method of installing the absorbing electromagnet, a part of the pallet section of the magnet goes under the overhang rail section, then it absorbs the rail to levitate.

The electromagnet section for absorbing the road side rail protrudes from the bottom of the pallet to form a part of the LDPF. The mechanism of the electromagnet attached to the LDPF is explained in detail later. The LDPF protrudes from the bottom of the pallet to be inserted into the road side FSD to prevent the deviation of the automobile from the track lane physically and mechanically as a basic function.

Since the pallet has a LDPF, the electromagnet for absorbing the road side rail to levitate is also attached on the upper side of the LDPF.

At the diverging or merging point, the electromagnet is installed on both upper side of the LDPF so as to not traverse the track lane.

In the road section, the two side overhang shaped FSD is installed, then the reversed "U" shape rails are installed. Two electromagnets are installed on a LDPF and a pair of reversed "U" shape rail is installed to match with the electromagnet. A pair of LDPF are usually installed on the bottom of the pallet. The reversed "U" shape rail is made of steel, thus it is magnetized by the electromagnet on the LDPF.

Since this electromagnet levitation system is employed, the LDPF obtains a guiding force by the magnetic field. Thus, automatic guiding is conducted without installing the ASA.

When the reversed "U" shape rail is applied, not only the levitation force but also the guiding force is generated automatically. It is also possible that the guiding electromagnet is installed on the LDPF to obtain the guidance force to travel right or left. However, the reversed "U" shape rail is better because it is simpler considering diverging. (The place to install the rail is on the side wall, opening or bottom of the FSD etc.

The system can control the levitation height by regulating the electricity output by regulating the electromagnetic strength.

The electromagnet force generated from the levitation of the LDPF is utilized to control the gap length of the LIM.

For example, the HSST system controls the levitation height within several millimeters to one centimeter. Thus, in this transportation/logistics system, to levitate the pallet while carrying the regular automobile, this system is applied. Also, the levitation height from the ground is utilized for the gap length of LIM system. This means that the designated gap maintaining link mechanism can be eliminated.

To mobilize many pallets on the system automatically, a rapid diverging and merging system is absolutely necessary. Thus, traversing the track lane system to diverge and merge is too slow to convert the lane to deal with a large number of pallets in a short time.

To meet with this demand, this invention's mechanism is constructed as the pallet has two LDPFs on both right and left sides on bottom. Each LDPF has pair of electromagnets (as a result, there are totally more than four electromagnet units per a pallet). Basically, there are at least a pair of electromagnet units necessary for the system. To levitate the pallet, the gap length between the electromagnet unit for levitation and the rail is controlled by measuring the gap length by the distance sensor. This basic mechanism is almost the same as the HSST or Transrapid system. The basic magnetic levitation mechanism to levitate the vehicle without grounding controlled by the electromagnet output has been invented by Herman Kemper in Germany, 1935. But we invented a new idea to address the necessity of rapid diverging and merging in the system utilizing the magnetic levitation system, which has never been invented. To realize rapid diverging and merging with a large number of pallets, one pair of electromagnets are installed on the body supporting the LDPF. At a diverging or merging section, one side of the electromagnet is turned on to steer the pallet to quickly diverge or merge.

At the diverging section, the pallet can select in which lane to travel, using the selection independently while the installed electromagnet is turned on.

When the output of the right or left side of the electromagnet is changed, a rotational moment is generated. Thus, to stabilize the attitude of the pallet, the output of electromagnet is adjusted.

What follows is the guiding system which steers the pallet. The basic concepts of the guiding system performed by the magnetic levitation system is mentioned above. The details for the wheel supporting system is now described in detail.

In this patent, a flat road (guideway) structure is adopted instead of a "U" shaped guideway structure which comprises an enclosure or side-wall.

The flat road structure enables the pallet to move freely on the road, because there are no obstacles such as a side-wall when the pallet needs to cross the road. Thus, the pallet can rapidly diverge and merge freely by itself, without depending on a mechanical change while of road (guideway).

In case of an emergency, the pallet can evacuate from the center of the lane to the corner and can travel to the other tracking lane by itself freely.

The road has a flat surface, and the pallet has it's own steering system which is attached to the weight supporting wheel. The steering power is given to the steering wheel to control the direction of the pallet. As a result of giving steering power to the wheel, the pallet changes it's traveling direction.

Also, basically the electronic control system is attached to the steering system to control steering automatically.

Smooth steering is achieved by utilizing conventional automatic steering (the basic method of turning the wheel). This is the steered system which has been developed in automobile industry. By adopting this ASA, mechanical shaking and vibrations which originate from the guideway-steel wheel system, can be eliminated.

The ASA for the patent is comprised of the steering angle sensor, the CPU, the stepping motor, the steering-gear box and link structure. Sensors collect all the information to determine the steering angle. Also, all the information is obtained from detecting radio waves using magnet sensors from the underground LCX (Leaky Coaxial Cable) or inductive cable installed under the track lane. These measure the gap length between the LDPF and the side-wall of the FSD using radar to electronically identify the precise position of the pallet on the lane.

Also, when it is necessary, GPS (Global Positioning System) and quantified maps or CD/ROM which are installed in the controller of the pallet are applied to determine the position, and collect all information from the sensors.

The information is may be taken from the beacon which is installed under the track lane to control the ASA.

By adopting the ASA to the pallet, the pallet becomes able to travel around the system autonomously on the track lane. Therefore, the driver does not need to control steering wheel.

When the automobile is carried on the pallet which has an ASA, the pallet is steered autonomously. Thus, in other words, the regular automobile is turned into an automatic steering automobile.

As it is easily implied, to utilize the new transportation/logistics system, the automobile owner doesn't need to alter or improve their automobile. Anybody can use their own car in the system without any burden or responsibility.

In the pallet carrying automobile transportation/logistics system, the pallet is controlled by the steering system autonomously. Thus, the passenger no longer needs to grasp their steering wheel. In this system, automated and autonomous steering is demanded, and the ASA is the method to realize this.

As the ASA, the same system can be used as the one in AGV (automated guided vehicle) systems in production plants.

For example, the induction cable method is utilized for this ASA. This method has been used in the actual plant already.

Details of the induction cable method are that the two underground sensors detect the signal of electromagnetic field generated from the induction cable to measure deflections (error). The ASA is controlled to decrease the deflection. Then, the regulation motor moves the steering shaft.

There is another method. Magnet tape is affixed on the floor to introduce the track lane, then the sensor detects the magnetic field from the tape. Then, the pallet travels along the tape. Also, the tape is fixed on the road surface to indicate the track of the lane. Then, the photo-sensor detects the tape optically.

The other method is that the pallet communicates with the LCX with more precise information for controlling the ASA while on the track lane.

Moreover, using the beacon method the pallet communicates and relays all details and information about the journey with the road-side to control the ASA more precisely.

In all of the aforementioned methods, the LCX the induction cable, magnetic tape and tape are installed in or on the road-side. Then, information is detected and collected by the pallet side sensors or receivers. The central computing unit, carried on the pallet, computes the collected information to regulate the stepping motor to convert the angle of steering automatically.

One aspects of this invention different from other general steering systems is that the position or place of the pallet traveling is permanently set. Thus, the steering control is much easier than general steering methods.

Simply, the curvatures such as at the curving, diverging or merging sections are already set. For example, when the pallet approaches the curve, because the curvature is already known, the pallet detects the signal of the curvature, then it steers along the already settled steering angle. Therefore, pre-programmed traveling can be accomplished. Simple steering is sufficient for the invented system, because it is not necessary to cover a wide range of steering from deep angles to shallow angles. For the pallet steering, only shallow steering is enough to travel in the system, because, in the system, the steering width is limited. The ASA doesn't prevent the pallet from deviating from the lane, but the LDPF and the road side FSD prevent the deviation from the lane.

Furthermore, in the structure of the invention system, the LDPF is applied to control the steering angle as a sensor.

The laser or ultrasonic sensor detects distance from the LDPF to the side wall of the road FSD and confirms the position of the LDPF in the FSD. If there is an error between the actual position and the center of the FSD, the steering angle is automatically set to reduce the error. Because steering is controlled by the degree of error of the LDPF from the center, precise and fine control of the steering is possible.

In greater detail, the laser or ultrasonic distance sensor can measure the gap between the LDPF and the side wall of the FSD continuously without any interruption, because the side wall is continuously built. Also, for laser sensor, because the side wall itself becomes the reflector, it measures the accurate distance to the LDPF. Thus, the accurate position of the pallet is measured (especially the lateral position). The ASA is controlled based on this accurate information.

As the procedure of the ASA is described, this system is also attached to the automobile which has the LDPF and can travel on the system while using the same concept.

What follows is FSD which is installed on the center of the track lane. The FSD prevents the LDPF, which is installed on the bottom of the pallet or automobile, from deviating from the center of the track lane. The LDPF is inserted in the FSD.

The width of the FSD is wider than the thickness of the LDPF, and under usual traveling modes, the LDPF doesn't contact the side wall of the FSD. Then the ASA is used together with this LDPF and the FSD system. In usual traveling modes, the LDPF leads the center of the FSD, so that the LDPF travels in the FSD without touching the side walls of the FSD.

In this system, there is no need to install a guiding wheel for guiding rail system. It then becomes a simple structure, also the size of the LDPF decreases.

Also, the FSD can be much simpler and more compact than the railroad guiding system. Because there is no need to obtain accurate construction such as a railroad guiding system, the cost of total construction of this structure is less.

Because the width of the FSD is narrow enough, not only the pallet can cross the truck lane, but also regular automobiles can cross. (There is no chance for the wheel of the pallet or regular automobile to fall into the FSD).

There is a ditch on the truck lane, the width of it is narrow unlike guiding railroad, and the width of the wheels of the pallet or automobile are large, so that the wheel doesn't fall in the FSD. At the diverging or merging sections, the wheel travels from ditch to ditch, the wheel can cross the track lane.

The LDPF prevents deviation from the FSD by the side wall. The maneuverability of the LDPF in the FSD is limited. Even when it is about to deviate, the accumulated inertia is small, so that the system guarantees safety.

On the other hand, in general transportation systems such as the "U" shaped guideway which has large sized side walls on the guideway; and the protective walls such as guide rails for general roads; and the side body of the pallet or automobile, the large side walls are contacted. Therefore, especially when the pallet is traveling at high speeds, the side body may be crushed.

Also, when the pallet is prevented from deviating by the LDPF, only the LDPF may be damaged. However, the body of the pallet never gets damaged.

The automobile which has the same system as the pallet, the LDPF is attached on the bottom of the car, and inserts the LDPF in the FSD. This prevents deviation from the track lane physically and mechanically without being damaged (There is no need to attach lateral guide wheels.)

Because the mechanical stopper system LDPF-FSD is installed in the invention transportation/logistics system, even when the pallet is deviating from the track lane at a certain distance, the FSD stops the LDPF against lateral deviation. As a result, the LDPF completely prevents the pallet deviation from the track lane physically and mechanically.

The LDPF prevents deviation when it is inserted in the FSD. However, there is still the remaining possibility that the LDPF could be pulled out from the FSD. For example, when strong wind blows while the pallet is curving, the pallet can turn over.

If this problem is to be solved, the following idea prevents the remaining possibility of the LDPF being pulled out.

The rigid plate is installed on both sides of the mouth section and on the both of side wall sections of the FSD to form overhanging segments from the cross section view of the FSD. (The following, the rigid plate overhanging FSD is defined as "FSD-rail", and the section of overhanging is defined as "overhang-section".)

To match with the form of the FSD-rail, the expanded lower part of the LDPF is applied.

According to this structure, when the force to pull the LDPF out from the FSD-rail, expanded section of the LDPF and the rigid overhang-section of the FSD mechanically interfere each other. Then the LDPF is prevented from being pulled out by the FSD-rail. This is how the pallet is protected from lane deviation.

The shape of the engaging expanded section of the LDPF and the FSD-rail can be varied linearly or curved smoothly.

The following is the method to expand the lower section of the LDPF. The actuator or ball thread is installed on the lower edge of the LDPF, then the actuators are elongated to expand the lower section of the LDPF.

The expanded LDPF and FSD-rail system are basically carried out by two methods. First, the expandable LDPF is inserted in the FSD first then the lower section is expanded. Second, the already expanded LDPF is inserted in the FSD. Both can be utilized, however, they are selected by what is the maximum force level to the LDPF. Thus, the size or weight of the automobile carrying pallet, or speed of traveling must be considered to design adequate LDPF and FSD-rails to match.

The drawing down mechanism for the LDPF to insert in the FSD from the bottom of the pallet or automobile can be attached to the LDPF.

A rise and fall mechanism is attached to the LDPF to insert in the FSD. Also, for this mechanism, an actuator or ball thread mechanism is utilized.

In the hydraulic actuator mechanism, the actuator expands and contracts as the inside oil pressure changes. Actually, the LDPF supporting strut and arm, a link mechanism comprises the raise and fall mechanism which is similar to the airplane's landing gear.

In the ball thread mechanism, the LDPF rises and falls following with the movement of the strut. The strut movement is generated by the ball-nut movement which is produced by the rotation of the shaft of the ball thread. Usually, both sides of the ball-nut is supported by the shaft.

These mechanisms are performed automatically by the motor or oil pump controller. The base of the mechanisms are represented in linear motor application cases. One is beneath the pallet and the other is below the reaction plate.

Because the pallet travels only within the invention transportation/logistics system, the LDPF may be fixed on the bottom of the pallet. However, pulling out the mechanism has the following merits.

The pallet has the ability to accommodate in the following manner. The LDPF is inserted in the FSD when it is necessary, and the LDPF is pulled out when it becomes unnecessary. In this system, the pallet inserts the LDPF in usual traveling situations to prevent deviation from the lane. If some accident such as propulsion system failure and fire happens, the pallet can retrieve the LDPF to evacuate it from the accident area to a secured area such as another track lane or lane shoulder.

In the case of an pallet carrying the automobile by fixing it to travel in the system. Once the LDPF is pulled out from the FSD, the pallet is to able to transfer to the other track lane. If the track lane malfunctions, the pallet can transfer to the other available lane.

In the case of pallet carrying the automobile by fixing it to travel in the system, when an emergency comes up, the pallet must evacuate from the original track lane to the other. The pallet has a separate motor for low speeds from the main motor for this evacuation. Together with the rising and falling LDPF mechanism, the invention transportation/logistics system becomes resistance against emergencies.

For example, if there is trouble on the track lane and it malfunctions, on which the pallet is traveling, the pallet pulls the LDPF out from the FS. Then, the pallet exits the original track lane. The pallet then transfers to the other normal track lane by using the low speed motor. After the pallet settles on the other track lane, the LDPF is retrieved to insert in the FSD to begin traveling on the system again.

Also, when the pallet is pulled out from the track lane, the LDPF is pulled out from the FSD. Then, the pallet is moved to the other place. Therefore, the system becomes flexible to utilize the track lane.

In other words, the relation between pallet and track lane becomes flexible, it can be either restrained or free. The system can absorb both of the cases.

The other effect is that the thickness of the pallet decreases. Because when the pallet doesn't need the LDPF, the LDPF is stored in the body of the pallet with the rising and falling mechanism.

This aspect makes the total system more economical. The pallet storage space becomes less at the mode-interchange, because when the pallet is stored, the thickness of the pallet becomes major factor. Thus, the pallet can be stored even in a limited space. This effect contributes to reduce the construction cost of the whole system.

In this invention, the LDPF and the FSD function as a set. One set or two sets or even a plurality of set are applied to the system.

Of course the LDPF can be fixed on the pallet. In this case, the structure becomes simple. However, the pallet will not to able to be evacuated from hazardous areas such as the case for fires in tunnels. The only way to evacuate is to go along with the settled track lane. Or, the automobile evacuates from the pallet after it is released by the WFA (wheel fixing apparatus ), by turning on it's engine. When the LDPF is restrained with the FSD, the mechanism becomes simple, but the pallet cannot change it's track lane.

However, in the case of an automobile fixed on the pallet by the WFA, the automobile then can exit from the pallet. There is some negligible height difference from the floor of the pallet to the lane. Based on this system, the automobile can keep away from emergency cases such as fire accidents. Thus, the system becomes safer than the "U" shaped guideway transportation system, because there is no side wall which is typically seen in the "U" shaped guideway, so the automobile can escape the system.

The lateral movement of the pallet is restricted by the LDPF-FSD system. The inserted LDPF in the FSD can move only in the gap length between the LDPF and the side wall of the FSD, which is usually a short distance. The pallet doesn't deviate more than the gap length between the LDPF and FSD. Therefore, the pallet is prevented from deviating from the track lane mechanically.

The LDPF is retrieved from the FSD, when an emergency happens such as an pallet malfunctions or a fire occurs. When the pallet needs to be evacuated or moved away, the LDPF is pulled out. The bottom of the LDPF can be pulled out from above the track lane level, the pallet then can move freely on the track lane.

When a restricted traveling mode is necessary, the LDPF is inserted in the FSD to restrict the pallet on the lane and this mode prevents the pallet from deviating from the track lane physically and mechanically to secure the traveling mode. When this free traveling mode becomes necessary in case of an accident, the LDPF is pulled out from the FSD. This convertible system is realized by installing the rising and falling LDPF mechanism.

In the usual traveling mode, the ASA guides the pallet without allowing the LDPF and the side wall of the FSD to contact. While keeping in this mode, the pallet is not physically or mechanically fixed on the guideway. Only when the pallet deviates from the maximum gap distance between the LDPF and side wall of the FSD, the lateral movement of the LDPF/pallet is stopped physically or mechanically. When the pallet must exit the original track lane, the pallet can go to another place after the LDPF is pulled out from the FSD. Thus, this system is not a rigidly fixed transportation system such as the railroad system, but it is flexible.

The functions of the LDPF is to prevent the pallet from deviation. Usually the pallet is guided by the ASA. Thus, the LDPF doesn't contact the side wall. The other system consists of the supplemental lateral guiding roller which is installed on the side of the LDPF to prevent deviation from the lane smoothly. Especially in this case, the lateral guiding roller starts to roll when the LDPF gets too close to the side wall of the FSD-rail.

This supplemental lateral guiding roller helps the LDPF slide on the side wall of the FSD-rail and reduces the friction between them when the roller touches the wall.

The ASA guides the pallet on the track lane in this invention. In the usual traveling mode, the LDPF doesn't provide the steering directly. In this steering (guiding) system, the wheel grips the traveling road firmly. Thus, the traveling goes smoothly and rattling or vibrations will not occur.

If the ASA malfunctioned and becomes uncontrollable due to a mechanical failure or wind, the pallet then deviates from the track lane. But even in this case, the LDPF prevents it from deviating from the track lane and makes the pallet travel along the lane until normal control returns.

The following new system can also be performed. First, the magnetic field sensor is installed on the LDPF and the magnet units are installed on the side wall of FSD. These magnets are installed as to provide an opposite magnetic pole, and to present a different pattern. Then, the magnetic field sensor detects the position of these magnet units to determine the exact position of the LDPF in the ditch. Finally the ASA steers the pallet based on the information obtained from the sensor.

Furthermore, the cross induction coil is installed on the side wall of the FSD, and the antenna is installed on the LDPF. Then the cross induction coil sends the information about the position of the LDPF to the ITCC. Basically, the LDPF is the most adequate place to install the antenna and sensors to accurately detect the position of the pallet on the track lane.

As explained above, this new transportation/logistics system provides smooth traveling due to the adoption of the ASA for guiding which is supported by the wheel (tire). Also, even if the pallet deviates from the track lane, the pallet is secured not deviate from the track lane by inserting the LDPF in the FSD.

By introducing the new idea of the synergistic effect generated from the LDPF and the ASA, the system realizes perfect protection against deviation, and smooth guiding in the usual traveling mode. In existing system, the ASA attached to the vehicle is controlled to travel by the wireless control system. However, in such a system, there is a high possibility for the vehicle to deviate from the track lane. According to this new system, the pallet doesn't deviate by adopting the combination of the LDPF and the ASA system.

In this system, the LDPF's physical and mechanical stoppage of deviation functions only when the pallet is deviating from the track lane, such as in guiding, diverging or merging sections. This system provides a completely safe transportation system like the railroad system.

When an emergency occurs in this system, the pallet can exit from the track lane if necessary. The pallet can exit by pulling the LDPF out from the FSD to release the restraints between the pallet and the track lane.

However, in the case of the LDPF is simply inserted in the FSD, the pallet can be pulled from the track lane. This may happen especially in a sharp curve. In a sharp curve, the large lateral force is loaded to the pallet and the pallet may turn over. Then, the LDPF is pulled out.

To prevent this simple pulling of the pallet out from the track lane, the LDPF is improved to stop the simple pulling out mechanism once the LDPF is inserted in the ditch.

To realize the aforementioned new system, an expanding part is installed on the lower section of the LDPF. After the LDPF is inserted in the FSD, the lower section of the LDPF expands to both the right and left directions or in a fan-shape by the ball thread or actuator mechanism.

When the expanding mechanism is introduced to the LDPF, the LDPF will not be pulled out physically or mechanically. In case of an emergency, pulling out the LDPF becomes necessary. At that time, the expanded lower section of the LDPF is shrunk to return normal shape.

Other options as prevention methods from being pulled out are as follows. One option is elongating the LDPF perpendicularly and making the FSD deeper to reduce the occurrence of being pulled out. The other method is expanding the lower section of the LDPF to be larger than the strut section to be stopped by the overhanging section of the FSD. (However, this prevents only one side from deviating).

To design the LDPF (expanded lower section type) to be compact, the LDPF is fixed on the bottom of the pallet. In this case, the LDPF is inserted in the FSD-rail at the specially widened area (this should be wider than the expanded LDPF), and the rest FSD has normal width to prevent it from being pulled out. Also, the edge of the LDPF is altered to a convex shape to be hooked by the FSD-rail.

The lower edge of the LDPF is altered to a heart-shape and the LDPF is flexible but is fixed at the fulcrum which is pointed on the bottom of the pallet. In this case, when the LDPF touches the side wall of the FSD-rail, the LDPF is locked by the rail and leans toward the outer direction and results in closing the mouth area of the FSD. Finally the LDPF is prevented from the being pulled out. Also, the electronic switching system, when the LDPF touches the rail of the FSD switches is on (or off) automatically to detect the deviation from the lane, is installed.

These aforementioned methods are adequately selected when they are constructed. This selection may be decided considering the information of minimum curvature, planned traveling speed, and total weight of the pallet.

As aforementioned, the lower section of the LDPF is expanded after it is inserted in the FSD and the size of the expanded section is larger than the mouth section of the FSD. Thus, the LDPF never is pulled out physically and mechanically, unless the lower expanded section is shrunk. This is the reason this system is the most secure system in the transportation technology area.

There are two major places to install this LDPF. One is at the bottom of the pallet or automobile directly. The other place is the bottom of the reaction plate of the linear propulsion module. It is decided by what the objectives are.

In the case of installing the LDPF on the bottom of the reaction plate, the rising and falling mechanism is substituted by the rising and falling mechanism of the reaction plate. Especially in the case of the high speed transportation system performed by aerodynamic levitation, it is better that the LDPF is installed on the reaction plate. This method becomes simpler to control. The LDPF is installed on the bottom of the reaction plate, and inserting the LDPF into the FSD can be performed by utilizing the same rising and falling mechanism for the reaction plate. Furthermore, when the shape of the LDPF is cylindrical, only the one cylindrical roller can accommodate both contact side walls of the FSD. Introducing this singular cylindrical roller system makes a narrower FSD.

This now explains the diverging and merging mechanism. First, the wheel supporting system is explained. The ASA system performs usual diverging and merging. The LDPF-FSD system prevents the pallet from deviation. These two major systems divide the role of the system and perform smooth traveling and a secure transportation/logistics system.

Rapid merging and diverging system is highly deserved to accommodate a high traffic capacity. In this new system, the ASA is basically adopted to perform this rapid diverging and merging system.

Diverging and merging is performed by the steering the wheel to change the direction of the pallet. At the diverging and merging section, the following is completed.

For the steering, the ASA is adopted to complete the steering automatically.

Before the pallet enters the diverging or merging section, a signal of which way it travels: the main lane or branch lane is detected by the ITCC, and the ITCC orders the system which way to go. The signal is generated by the pallet. The ASA controls steering to follow the selected lane while regulating the motor.

The signal of the pallet is generated based on the originally registered information when the pallet starts in the system. (This is usually the number applied as the ID number for the pallet). The signal is registered as ID information and the road control center detects the pallet's signal when the pallet approaches the diverging or merging section.

The following are the basics of the diverging section of the new transportation/logistics system. To explain it easier, this basic example is applied to explain. In this paragraph, the most simple example is described. This example is comprised of a single traffic lane and the branch lane which diverges from the main lane.

Basically the diverging section is the area which contains the original lane and the second diverging lane which starts from the diverging point. As it is explained later in this new system, the weave-in line to the main lane is possible. Divergence of the lanes from each other becomes possible. However, in this paragraph, the simple diverging system similar to the regular highway system, which is comprised of a main lane and a branch lane, is explained.

This is a main lane and a diverged lane in the divergence section as the basic two major lanes. In the main lane before the diverge point, there are three divisions. The first is the preparation section, the second is the confirmation section and the last is the arranging section. On the other hand, in the branch section, there is the arranging section from the diverging starting point, and the diverging nose section.

Before the pallet or automobile enters the diverging section, the direction of the pallet is decided according to which way to go, the main lane or the branch lane.

In case the passenger wants to divert from the main lane at the diverging section, the passenger sends the signal to the branch lane to diverge. The passenger uses the communication device to send the signal to the ITCC, the device is either a transmitter or a remote controller which the passenger receives at the system entrance. The communication device sends the signal in the wireless method such as radio wave, light or electromagnetic field. (If no signal is sent to the ITCC to register which way to go from the pallet or automobile, the ITCC continues along the pre-programmed travel schedule.)

As the pallet or automobile registers it's final destination in this invention transportation/logistics system, the road traffic control regulates the diverging section as to which way the pallet or automobile should go automatically. Thus the ITCC decides the diverging section for the pallet or automobile.

If the communication device is not available, headlights can be utilized as transmitters while blinking, the light sends the travel plans to the road side sensors.

The selection of which way to go, either the main or branch lane is decided as it is described above. The pallet then enters the first divergent preparation section.

In the preparation section, the wider ditch is installed to obtain enough leeway to prepare for the LDPF to choose which way the pallet or automobile will go.

The operation of the divergence is performed by steering, utilizing the ASA. Each diverging step is as explained below.

First, the order is received by the ASA to control the angle of steering to direct the pallet toward the selected lane following the induction cable. Control is performed based on the signal from the induction cable which is installed on the road side. (The radio wave or magnetic field is utilized as the signal. For example, when a magnetic field is used, the branch magnetic field can be distinguished by the wave frequency or polarity of the magnet.) The induction cable is installed in the FSD.

In the regular traveling section, the induction cable is installed in the center of the bottom of the FSD. However, in the diverging section, the induction cable of the main lane and the induction cable of the branch lane gradually diverges as each lane diverges. Also, the steering sensor selects one cable to match with the direction along which the pallet should travel.

When the sensor selects the branch induction cable, the ASA controls the front wheel's steering angle to go along with the branch cable line.

At the same time that the front wheel is controlled by the ASA, the LDPF gradually comes along side the line of the induction cable so that the selected pallet leaves the center of the ditch.

During this period, the position of the LDPF is always determined by variety of sensors. When the LDPF goes the way selected, it is frequently calculated and inspected. If some position displacement is detected, the ASA controls the steering angle to correct this line. If the LDPF can detect ifs position accurately at anytime, an induction cable is no longer necessary.

After the pallet passes the divergence point, the LDPF proceeds into the diverged lane. This means that in this stage, the pallet already diverged safely and successfully.

As stated above, each basic step of this invention's divergence from the lane uses ASA system by controlling the front steering wheel. If a linear motor is utilized to obtain the propulsion force, the linear motor's force can also be applied to diverge the pallet when an X-Y linear induction motor is installed on the track surface.

The X-Y direction linear induction motor is operated by signals of the divergence to control the traveling direction of the pallet. This is performed by not only utilizing the traveling direction force control, but also the lateral direction force control. Thus, in the case of using a linear motor as the propulsion force, the linear motor is also utilized as a lateral control for diverging.

The lateral direction control by an X-Y coordinate linear motor guides the traveling direction of the pallet to follow the set travel lane.

Also, in the confirming section, the position of the LDPF is always detected by the sensors, and it checks whether it deviates form the center of the ditch, and if the pallet is traveling safely.

To complete the divergence, it is possible that the LDPF will touch the side wall of the FSD to confirm the direction of the pallet and whether it is in the correct lane.

In the confirmation section, it electronically confirms whether the pallet is traveling on the right lane or not. If the device detects that the pallet is traveling on the wrong lane, the direction of the pallet will be corrected at the next diverging or interchange section. In this case, the pallet might be reprogrammed to complete an U-turn, select a different route and proceed to the original destination.

The other method is shown as follows. A permanent magnet is attached on the side of the LDPF. The electromagnet is attached on the side wall of the FSD in the preparation section. The pallet goes into the preparation section. The signal of which way to go is sent to the road side. The selected side of the electromagnet unit is turned on to pull the permanent magnet to one side of the LDPF. This enforces the traveling position of the LDPF to close to the side wall and is another option for diverging.

In utilizing the LDPF case, the LDPF generates the diverging force. The LDPF contacts the side wall of the FSD. However, because the LDPF has a supplemental lateral guiding roller, the friction between the LDPF and the side wall isn't significant. Therefore, the smooth divergence can be completed. Also, this method provides absolutely reliable divergence, because the LDPF contacts the side wall in the same direction as the way pallet should go. Thus, the direction is confirmed by physically, and electronically.

The LDPF can become an electronic sensor when the contact point of the LDPF and the side wall is utilized as the electronic switch. Because, when the LDPF touches one of the side walls, the side wall can detect which wall being touched. In other words, the system can identify which way the pallet is coming.

As aforementioned, there are three major methods to complete the divergence. One is completed by steering, based on ASA system. The second is by the X-Y coordinate linear motor. The last is by the LDPF. If necessary, these three methods can be combined to make for a more effective diverging system.

As it was shown before, this invention has many of electronic fail-safe mechanisms. However, if the electronic system malfunctions, the pallet will pass the diverging section using it's inertia Even if this happened, the only point it would affect is the divergent nose point. To prevent an accident, a sliding material is installed on the nose or on the LDPF to ease the shock of the body on the pallet. Also, the nose section can be made from an elastic material which can absorb the shock effectively.

After pallet passes the nose point, the divergence is completed, the pallet then travels on the desired lane. Even after it passes the nose point, the adjusting section is needed to dampen the lateral swing movement. Causing the FSD in this section, we recommend it be wide.

The physical locking mechanism for divergence is structured by the combination of FSD-rail and the LDPF which has the rising and falling mechanism. In the diverging section, the convex section is installed under the FSD-rail facing downward. The convex part is installed on the both sides of the LDPF facing upward. When the pallet enters the diverging section, and after one of the lanes is selected for traveling on, the LDPF is raised to insert the convex part of the LDPF into the concave section which is formed by the installation of the convex section. By introducing this structure, the LDPF is locked by the convex part and the concave section of the FSD-rail so as to not deviate from the selected lane physically or mechanically. The skid section is installed on the LDPF which protrudes out and moves back. When divergence is needed, the selected side of the skid protrudes out to lock the selected lane for safety, but when it is not necessary, the protruded skid is retrieved.

There are two traveling lanes at the diverging section, one is the main lane and the other is branch lane. Which way the pallet should go is already determined when it started and sent the signal from the pallet. When the pallet approaches the diverging section, the road side sends the signal to diverge. The system confirms whether the direction is correct with the information from the passenger through the communication device. After it confirms which lane to travel on, the lane is selected to begin the operation of divergence. This includes controlling the front wheel steering angle, regulating the right/left power balance using the X-Y coordinate linear motor, and following the electromagnetic induction cable or optic cable.

At the diverging section, the ASA controls the main mechanism for diverging the pallet. In addition, in this invention system, the pallet has the LDPF to prevent deviation from the traveling lane at the diverging section, even if the ASA malfunctions.

At the diverging section there are two ditches. One is main lane ditch, the other is branch lane ditch. Thus, the pallet selects one of these two ditches. After the ditch is selected, the LDPF enters it and once the LDPF enters the ditch, the pallet is perfectly secure not to deviate from the lane.

The detailed system of the LDPF, when the diverging section is also considered, is as follows.

In the lower section of the LDPF the permanent magnet is installed. To slide the wall of the ditch smoothly, a roller or bearing can be installed on the bottom of the LDPF.

When the pallet is diverges, a diverging signal is transmitted to the LDPF at the same time. It is also transmitted to the road side by an intermediate electromagnetic wave or light. The signal then turns on the electromagnet which is installed on the wall of the FSD to interact (absorb or repel) the permanent magnet on the LDPF to assure the diverging safely.

In the case of using the linear motor as the propulsion power for the pallet, at the diverging section, the linear motor can manipulate each linear motor switch to diverge the pallet toward the direction it should be going. Thus, the linear motor is utilized as a diverging system. Therefore, this linear motor can be combined to assure uninterrupted diverging.

In this invention system, not only the ASA platys major role for diverging, but also the LDPF plays a significant role in preventing deviation from the lane.

By utilizing the LDPF, even if the ASA malfunctioned at the diverging section, the pallet is driven safely. Because, even if the ASA malfunctions at the diverging section, the LDPF goes through one of the ditches safely. The nose of the LDPF can slide into one of the ditches without any destruction.

In FIGS. 1 and 2 of Japanese patent application No. 51-6404, the typical electromagnetic diverging system in the "U" shaped guideway system is shown. In this old system, if the electromagnetic diverging control system malfunctions, the pallet or vehicle may crash into the side wall of the guideway.

According to the configuration of this invention transportation system, even if the ASA malfunctions at the diverging section, and the pallet deviates from the traveling lane, the LDPF goes through one of the ditches safely. As a result, the pallet can pass through the diverging section with complete safety.

If the ASA malfunctions at the diverging section, and the nose of the LDPF brushes against the nose of the divergent triangle point, the following mechanism can help avoid a head-on collision and damage both of the nose points.

The longitudinal angle of nose is changed. By improving the nose angle, even if the nose point contacts the divergent edge point, the LDPF can slide on the formed slope of the nose section. The pallet is then gradually and mechanically guided toward the branch lane which the pallet is originally supposed to go to.

The other method is that a shock absorber is installed on the front of the LDPF at the divergent triangle point. The shock absorber reduces the impact of the LDPF and the triangle point significantly. This shock absorber is installed on the front of the LDPF and the triangle point of diverging section. Shock absorbing material is utilized at the crash section of LDPF and the triangle point.

The front edge of the LDPF and the front edge of the triangle point of the diverging section forms a sharp angle. Even if they collide with each other, this sharp angle contributes not to crush. Thus, this system guarantees complete safety at the diverging section.

The other option is that the ball bearing, rotational belt or sliding material is installed or a lubricant is put on the front edge of the LDPF or at the triangle point of the diverging section. This option is effective to supplement the methods above.

These methods are effective enough by themselves. However, when these are combined, more safety and less damage is expected. On the other hand, when the system is driven by the linear motor system, not only the guidance, but also the diverging system is complete by the switching of the linear motor. When the pallet wants to selected the right lane at the diverging section, the right side of the road side linear induction motor (LIM) is turn on. The left side of the LIM is turned off. As the electromagnet is installed on both sides of the LDPF, this system provides divergence with high speed levitation travel.

What follows is about accessing (merging). The mechanism of access is explained as diverging is explained using the main lane and the branch lane.

The access section is the place where the pallets merge with each other from the main lane and the branch lane. Basically, the access section is comprised of the following elements.

When the pallet enters the access notification section ramp from the branch lane, the road side computer calculates the time for reaching access point.

If there is another pallet in the main lane, the road side controller regulates the mobility of the accessing pallet in the preparation section so it will not contact the pallet traveling on the main lane. In the case of a linear motor system, the output of the linear motor is controlled so they will not bump each other.

Basically, the pallet traveling in the main lane has priority to pass the access section without changing it's traveling speed. The information about the conditions in the main lane traffic is important for the pallet traveling in the branch lane accessing to the main lane. Thus, the information about the main lane traffic must be transmitted to the pallet traveling in the branch lane.

In the accessing section, the traffic of the pallet which approaches to access the main lane from the branch lane, is controlled not to interfere with the pallet in the main lane. The accessing pallet then enters the access confirmation section. This section is for final confirmation for the accessing pallet before it enters the accessing point. The system confirms the conditions based on the information from the sensors and simulation utilizing the obtained information.

In this method, the virtual space for the accessing section is formed by the ITCC. Then, the ITCC simulates all of the movements of the pallets toward the accessing point to determine the future conditions of the traffic. Whether the pallet has an accident or not is based on information such as maps or line shapes of the road. The result of the simulation study is fed-back to the ASA system to control the speed of the pallet. In the case of the linear motor driven system, the speed of each pallet is controlled in the access confirmation section because the power of the linear motor is large enough to control pallet within this section. If the movement of each of pallet is not arranged in this section, the system stops the pallet's movement. Also, the system can stop the pallet within this section. As the electronic preparation system is explained above, this system has many electronic fail safe procedures. If even these fail safe systems malfunctioned, the mechanical fail safe zone can be installed additionally. In this case, the mechanical fail safe area is added to the access confirmation section. Also, at the branch point, the nose point is installed, if necessary.

Even if all of the electronic fail safe system including the ASA and linear motor speed control system malfunction, the pallet on the branch lane approaching the main lane has the possibility of colliding with the other pallet on the main lane. Both pallet's lose their driving control ability. In such a case, even if they collide, the pallet on the branch lane can avoid crashing. Because the ditch width of the branch has a larger size ditch for the pallet to avoid a total crash, it allows the pallet to enter the collision escape ramp mechanically. The pallet on the branch lane goes to the collision escape ramp and stops on the braking lane section to avoid a complete collision with the pallet, which is on the main lane. This is the basic method to avoid collision.

Regarding the accessing procedure, the ASA supplies lateral control to guide from the accessing ramp through the main lane. The position and speed of the traveling pallet in the system is determined by the sensors which are installed on the road or the pallet. When the pallet accesses another lane, the direction of the pallet is controlled by the ASA.

Even if the ASA malfunctions, the LDPF prevents it from deviating from the lane physically or mechanically. As long as the pallet doesn't deviate from the lane, the pallet accesses to the other lane at the accessing section by force.

When there is no pallet on the main lane, the pallet on the branch lane can access the lane even if the electronic controls malfunction. For the pallet on the branch lane, this system has a mechanical fail safe system.

At the accessing point, the ball bearing or rotary belt system is installed on the side wall to alleviate the shock of over run of the LDPF at the point where the pallet enters.

As explained above, when there is no pallet on the main lane, for the pallet on the branch lane, the access to the main lane experiences no problems while merge. However, if there is another pallet on the main lane and the timing entering the access point is estimated to be the same, the pallet on the branch must avoid being present at the same time while accessing at that point. In the case of the magnetically levitated system, the basic mechanism of access is the same as the wheel support system. The magnetically levitated pallet enters the access section while its driving is controlled by the linear motor system and the pallet maintains a desirable position.

What follows is a description of the braking system. In this transportation/logistics invention, if a rear-end collision is projected, because of a system's malfunction, the system sends the signal to brake all of the movements of the related pallets. Also, when the pallet detects obstacles in front of the pallet, or other incoming pallets, the pallets autonomously determine a more desirable position. Then, the pallet send the braking signal. To brake effectively, in the case of the linear motor system, the same linear motor brakes the pallet. The direction of the magnetic field is simply changed to the opposite direction to brake the pallet's movement. In this manner, the pallet obtains the same braking power as it's propulsion power, which is large enough to stop the pallet immediately.

Furthermore, in this invention, the plate braking system is proposed. Because the pallet travel on a designated area of the road. The wheels run on a specialized road surface. The plate brake system is invented utilizing this special feature. The usual brake system is based on the mechanism of producing friction between the wheel drum and brake pads to stop rotation of the wheel. In this new brake system, the brake plate pad is drawn from the bottom of the pallet toward the road surface by the actuator dispensed link mechanism. First, the brake signal is generated from either the road side (ITCC) or the pallet control unit. The plate brake pad is then drawn from the bottom of the pallet to press the pad to the road surface to brake. The area of the pad is greater than that of the usual brake drum. Also, the pressing power is stronger than that of usual drum-pad mechanism, because when it is pressed to the road, the maximum force can be the weight of the pallet. The surface material of the road, which is pressed by the pad, is selected to have a higher coefficient of friction being a rigid material. Also, the surface functions to drain water easily. Because the area of the pad is greater than the usual brake, the friction force per unit area becomes small, the fading phenomenon can be reduced.

When the pallet is traveling with an aerodynamic body, the loading force to the road is negligible. Therefore, even though pad brake system is used, the perpendicular force of braking to the road is minimized. In such conditions, the elevator flap is utilized to generate a downward force for the brake to function effectively in conjunction with the operation of the brake pad itself.

The place to install the plate brake pad is between the bottom of the pallet body and the road to press the pad to the road surface effectively. However, the pad can be installed on the side of the LDPF to be expanded toward the side wall of the FSD by using a hydraulic actuator. This system also can generate a large amount of power to stop the pallet effectively.

When the brake pad installed on the LDPF is used, the braking power is determined not by the weight of pallet, but by the power of the hydraulic actuator. Thus, according to this braking mechanism, much greater braking power is generated. This system is utilized for emergency stops.

By applying the plate brake pad system, the braking power doesn't depend on the diameter of the wheel any more. Since the wheel doesn't have a braking apparatus, the diameter of the wheel can be minimized. (Usually, the wheel disk brake power depends on the wheel disk's diameter. In other words, the greater the diameter, the greater the braking power. Usually, there are limitations that shorten the diameter of the disk brake.) Also, once the braking system is separated, the plate brake pad system doesn't load onto the wheel. The wheel is then not worn out by braking. Thus, the wheel lasts longer.

As the plate brake pad system can have larger area for braking, this pad system can generate a significant amount of braking power. Concerning this effect, the pressing pad power can be reduced, because the area of the pad is larger. Thus, less pressing power generates an even greater braking power, and the braking apparatus is not affected nearly as much from the heat of friction.

In the case of the wheel support system, the disk brake is installed in addition to the two kinds of braking systems which are already mentioned above. As far as the braking system is concerned, the invention system has the ideal braking system and this system can be effective against any incidents. As another type of braking system, the pleats are installed in the FSD. In this system, when the brake is needed, pleats come out to the ditch from the behind the side or bottom of the ditch to slow the pallet. The braking power is controlled by the pleat actuator from the road side. By introducing this type of braking system, the pallet is stopped not only by the brake on the pallet, but also by road side brake. Also, there is another wire brake system which is similar to the pleat brake. This wire brake is similar to the method of hooking on the airplane on an aircraft carrier using this wire system.

In addition to these new braking system, we have developed a new expandable bumper mechanism for each pallet. This system is realized because the pallet travels on the lane without deviating from the lane and the pallet does not deviate laterally at all. Because the pallet lateral movement is regulated in this invention, the loading on the road is specialized to a section in a cross-section. Thus, the specialized loading section of the road can be made with a rigid material such as steel. The problems with road maintenance issues are solved by introducing a rigid material as the specialized track. To drain rain water from the road surface, the rigid surface has made many pores. Actually, these pores cause the ASA to steer more easily because these holes can contribute to having a higher friction coefficient. Overall, the total weight of the road becomes lighter because the lateral movement of the pallet is regulated and the weight loaded area is specialized. Solar panels are installed where the wheel is not traveling. The collected solar energy is utilized to operate this invented traffic/transportation system. Also, utilizing solar energy alleviates environmental pollution and becomes a more environmentally friendly road-traffic system.

THE BEST DESCRIPTION

To describe this invention in more detail, a narrative explanation is stated below according to the number of the figures.

FIG. 1 shows the conceptual diagram of the operation system of the invention, including the relationship of the automobile 100, pallet 200, road 300 and passenger 103.

The pallet 200 carries the automobile 100 while fixing it's wheel by the wheel fixing apparatus (WFA) 215. Concerning this method, as the wheel is fixed on the pallet firmly by the WFA 215, the suspension of the automobile is still active. Thus, the passenger 103 is comfortable. In this example, the pallet 200 carries the automobile 100 while fixing it's wheel by the WFA 215. Also, the linear motor propulsion system is applied to mobilize the pallet 200. The passenger 103 has a remote-controller 104 to send commands and the traveling information required from the passenger to the control center. For example, the destination of the pallet 200, the speed control of the pallet 200, passing or stopping at a service or rest area are determined by passenger. The traveling commands made by the passenger 103 are then transmitted to the integrated transportation control center (ITCC) by the road side beacon 300 through the remote-controller 104. The passengers 103 are sitting on rotary seats. As the system is driven automatically, the passenger doesn't need to drive. In the automobile 100, rotary seats 108 are installed, the front seat can turn so that all passengers may view one another.

The electricity for the automobile 100 is supplied by the non-contact electricity supply apparatus (NCES) 109 which is attached to the pallet 200. The electricity is then available for things such as air-conditioning the inside of the automobile 100 without having to turn on it's engine. The pallet 200 senses front and rear traffic conditions with the headway sensor 240. This information is then sent to the pallet-central control unit 225, at the same time, the information is sent to the road side LCX (Leaky coaxial cable) and beacon. In the side of the road 300, the road surface sensor 325, obstacle sensor 241 and camera sense the wetness condition, temperature and obstacles on the road surface. Any conditions of the road are sensed (this is called "infra-sensing"). These signals are sent to the ITCC, and to the sent to pallet-central control unit (ICCU) 225, through beacons, LCX and pallet-antennas 226. Except for the aforementioned method, there is another corresponding measure which follows. The laser transmitter and receiver is installed on the pallet and on the road side to perform optical communication.

The ITCC controls the automated driving regulator on the pallet 200 or on the road side. First, the ITCC collects all information about the position and speed of the pallet, and the passenger's requirements. Then, the ITCC analyzes traffic conditions for each pallet. Also, the ITCC projects the front traffic conditions while referring to the information data base which has been accumulated by traffic models and historical intelligent data. Then, the CPU in the ITCC judges how to control each traveling pallet. The automated driving regulator (ADR) adjusts the output of the LIM installed on the road side by regulating the inverter to control the speed of the pallet. Also, the ADR commands the ICCU to control the plate brake 239 (as the braking command) and to operate the automatic steering apparatus (ASA) (as the guidance command). The road side ADR turns on the streetlights (guiding lights), coordinates the pallet movement, and operates the road side brake (infra-stopper) to stop the pallet when necessary. The pallet 200 has a reaction plate 232 on the LIM as a secondary plate. The reaction plate is installed on the bottom side of the pallet with an actuated link mechanism to be drawn toward the road surface mechanically. The reaction plate 232 has a gap sensor 245 to measure the distance of the gap. The reaction plate close to the road surface while maintaining a minimum gap length without touching the road surface 300. This mechanism is controlled by the electronically regulated hydraulic actuator. The pallet 200 also has an pallet-ID tag to be identified as the individual pallet. The identified information is then sent out and detected by the road side antenna The detected signal is then transmitted to the ITCC through the communication control transducer and reader.

The ITCC receive and considers the conditions of the current traffic and projects traveling arrangements based on the traveling requirements from the passenger. The pallet 200 carries the automobile 100 and travels in the system adequately and safely. In the system, the pallet is driven and automatically controlled. The movement of the pallet is adequately controlled by communication between the ITCC and the pallet's ADR in both directions obtaining circumstantial information. The communication is completed through the ADR 225 the beacon, the LCX or optical communication. These communication control systems enable this traffic/transportation system to harmonize with each pallet's movement. The solar energy collection panel is installed on the road. The panel collects solar heat and light by the heat pump or solar cell, and the energy is converted to electricity. The collected electricity is used for the invented traffic/transportation system. The system then becomes more environmentally friendly. The pallet is guided automatically by the ASA 231. The commands to control the ASA are completed by the pallet-ADR 225 and the ITCC-CPU. Also, the lane deviation preventing fin (LDPF) 238 is installed on the pallet 200. The LDPF is then inserted into the ditch of the road 300. In this figure, the bottom of the ditch 307 is indicated.

The FIG. 2 shows the conceptual diagram of the operation system of the invention, including the relations of automobile 100, pallet 200, road 300 and passenger 103.

The pallet 200 carries on the automobile 100 while fixing it's wheel with the wheel fixing apparatus (WFA) 215. Concerning this method, as the wheel is fixed on the pallet firmly by the WFA 215, the suspension of automobile is still active. Thus, the passenger 103 is comfortable. In this example, the pallet 200 carries the automobile 100 while fixing it's wheel with the WFA 215. Also, the linear motor propulsion system is applied to mobilize the pallet 200. The passenger 103 has the remote-controller 104 and sends the commands concerning travel information required by the passenger to the control center. For example, the commands are the destination of the pallet 200, speed control of the pallet 200, passing and stopping at a service or rest area The traveling commands made by the passenger 103 is then transmitted to the ITCC (Integrated Traffic Control Center) by the road side beacon 300 through the remote-controller 104. The passengers 103 sit on rotary seats. As the system is driven automatically, the passenger doesn't need to drive. In the automobile 100, the rotary seat 108 is installed, the front seat can turn around to see each other passengers. The electricity for the automobile 100 is supplied by the non-contact electricity supply apparatus (NCES) 109 which is attached on the pallet 200. The electricity is then available for things such as air-conditioning inside the automobile 100 without even having to turn on it's engine. The pallet 200 senses front and rear traffic conditions with the headway sensor 240. The sensed information is then sent to the pallet-central control unit 225. At the same time, the information is also sent to road side LCX (Leaky coaxial cable) and beacon. The side of the road 300, road surface sensor 325, obstacle sensor 241, and camera, all sense the wetness conditions, temperature and obstructions on the road surface. Any condition of the road is sensed (this is called "infra-sensing"). These sensed signals are sent to the ITCC and to the pallet-central control unit (ICCU) 225, through the beacon, the LCX and the pallet-antenna 226. In addition to the aforementioned methods, there is yet another correspondence measure, as follows. The laser transmitter and receiver is installed on the pallet and road side to provide optical communications.

The ITCC controls the automated driving regulator on the pallet 200 or on the road side. First, the ITCC collects the all information about the position and speed of the pallet, and the passenger's requirements. Then, the ITCC analyzes all traffic conditions for each pallet. Also, the ITCC projects the front traffic conditions while referring to the information data base which has been accumulated by traffic models and historical intelligent data Then, the CPU in the ITCC judge how to control each traveling pallet and it's speed. Also, the ADR commands the ICCU to control the plate brake 239 (as the braking command) and to operate the ASA (as the guidance command). The road side ADR turns on the streetlights (guiding light) to correspond with the pallet's movement, and operates the road side brake (infra-stopper) to stop the pallet when necessary.

The pallet 200 has a LIM as it's primary plate. The LIM is installed on the bottom of the pallet with an actuated link mechanism to be drawn toward the road surface mechanically. The LIM has a gap sensor 245 to measure the distance of the gap. The reaction plate approaches to the road surface while maintaining a minimum gap length without touching the road surface 300. The pallet 200 obtains electricity through the non-contact electricity supply apparatus (NCES) 248 from the core-coil 322 which is installed on the road 300. This mechanism is controlled by the electronically regulated hydraulic actuator. The pallet 200 also has an pallet-ID tag to identify each individual pallet. The identified information is then sent out and detected by the road side antenna The detected signal is then transmitted to the ITCC through the communication control transducer and reader. The ITCC receives the conditions of the current traffic and projects future situations based on the travel requirements indicated by the passenger 103. The pallet 200 carries the automobile 100 and travels in the system adequately and safely. In the system, the pallet is driven as automatically controlled. The travel of the pallet is adequately controlled by communication with the ITCC and the pallet's ADR in both directions and obtains circumstantial information. The communication is completed through the ADR 225, the beacon, the LCX or by optical communication. These communication control systems enable this traffic/transportation system to harmonize each pallet's movement. The solar energy collection panel is installed on the road. The panel collects solar heat and light by the heat pump or solar cell, and the energy is converted to electricity. The collected electricity is used for the invented traffic/transportation system. The system then becomes more environmentally friendly.

The pallet is guided automatically by the ASA 231. The commands to control the ASA are completed by the pallet-ADR 225 and the ITCC-CPU. Also, the LDPF 238 is installed on the pallet 200. The LDPF is then inserted into the ditch of the road 300. In this figure, the bottom of the ditch 307 is indicated.

FIG. 3 shows the conceptual diagram of the operation system of the invention, including the relationship of the automobile 100, the pallet 200, the road 300 and the passenger 103.

The pallet 200 carries the automobile 100 while fixing it's wheel with the wheel fixing apparatus (WFA) 215. Concerning this method, as the wheel is fixed on the pallet fly by the WFA 215, the suspension of the automobile is still active. Thus, the passenger 103 is comfortable. In this example, the pallet 200 carries the automobile 100 fixed on the pallet, and travels on the road 300 driven by the high speed motor 234 installed on the pallet.

The passenger 103 has a remote-controller 104 and sends the commands concerning travel information required by the passenger to the control center. The traveling command made by the passenger 103 is then transmitted to the ITCC (Integrated Traffic Control Center) by the road 300 side beacon. The passengers 103 sit on rotary seats 108. As the system is driven automatically, the passenger doesn't need to drive. In the automobile 100, the rotary seat 108 is installed. The front seat can rotate around to see the rear passengers. The electricity for the automobile 100 is supplied by the non-contact electricity supply apparatus (NCES) 109 which is attached on the pallet 200. The electricity is then available for things such as air-conditioning inside of the automobile 100 without having to turn on it's engine. The pallet 200 senses front and rear traffic conditions with the headway sensor 240. This information is then sent to the pallet-central control unit 225, at the same time, the information is also sent to road side LCX (Leaky coaxial cable) and beacon. The side of the road 300, road surface sensor 325, obstacle sensors and cameras sense different conditions, temperature and obstacles on the road surface. Any condition of the road is sensed. These signals are sent to the ITCC, and to the pallet-central control unit (ICCU) 225, through the beacon, LCX and pallet-antenna 226.

The ITCC controls the automated driving regulator on the pallet 200 or on the road side. First, the ITCC collects all information about the position and speed of the pallet and the passenger's requirements. Then, the ITCC analyzes all traffic conditions for each pallet. Also, the ITCC projects the front traffic conditions while referring to the information data base which has been accumulated by traffic models and historical intelligent data. Then, the CPU in the ITCC judges how to control each traveling pallet 200. The automated driving regulator (ADR) adjusts output of the high speed motor 234 installed on the pallet 200. Also, the ADR commands the ICCU 225 to control the plate brake 239 (as the braking command) and to operate the ASA (as the guidance command) 231. The road side ADR turns on the streetlights (guiding lights) to match the pallet movement, and operates the road side brake (infra-stopper) to stop the pallet when necessary. The pallet 200 has a high speed motor 234. The high speed motor 234 obtains it's necessary electricity by the non-contact electricity supply apparatus (NCES) 248. The NCES 248 obtains electricity from the core-coil 322 which is installed on the road 300. The NCES 248 is controlled by the electronically regulated actuator to keep a small gap in the core coil 322, which is installed on the road 300 to collect the necessary electricity efficiently. The pallet 200 also has an pallet-ID tag to identify each individual pallet 200. The identification information is then sent out and detected by the road side antenna. The detected signal is then transmitted to the ITCC through the communication control transducer and reader.

The ITCC receives information concerning the conditions of the current traffic, and projects a travel plan based on the traveling requirements from the passenger. The pallet 200 carries the automobile 100 and travels in the system adequately and safely. In the system, the pallet is automatically controlled. The travel of the pallet is adequately controlled by communicating with the ITCC and the pallet's ADR in both directions and obtains circumstantial information. The communication is completed through the ADR 225, beacon, LCX or through optical communication. These communication control systems enable this traffic/transportation system to harmonize each pallet's movement. The solar energy collection panel is installed on the road. The panel collects solar heat and light by the heat pump or solar cell, and the energy is converted to electricity. The collected electricity is used for the invention traffic/transportation system. The system is environmentally friendly.

FIG. 4 shows the conceptual diagram of the operation system of the invention, including the automobile 100, which has the LDPF 238, the road 300 and the passenger 103.

The automobile 100 is driven by the electronically controlled module 124. The passenger 103 sends the traveling information commands to the control center through the automobile's 100 antenna The traveling commands are made by the passenger 103 and are then transmitted to the ITCC (Integrated Traffic Control Center) by the road 300 side beacon. The passengers 103 are sitting on the rotary seats 108. As the system is driven automatically, the passenger doesn't need to drive. In the automobile 100, the rotary seat 108 is installed, the front seat can turn around to face the rear passengers. The electricity for the automobile 100 is supplied by the non-contact electricity supply apparatus (NCES) 109. The automobile 100 senses front and rear traffic conditions by the headway sensor 121. This information is then sent to the central control unit 225, at the same time, the information is also sent to road side LCX (Leaky coaxial cable) and to beacon through the antenna 118. In the side of the road 300, and on the road surface with sensor 325, obstacle sensors and cameras sense wetness conditions, temperature and obstacle on the road surface. Any condition of the road is sensed. These signals are sent to ITCC, and to the central control unit (ICCU) 225, through beacon, LCX and the antenna 118.

The ITCC controls the automated driving regulator on the automobile 100 and on the road side. First, the ITCC collects all information about the position and speed of the automobile, and the passenger's requirements. Then, the ITCC analyzes all traffic condition for each automobile. Also, the ITCC projects the front traffic conditions while referring to the information data base which has been accumulated by traffic models and historical intelligent data Then, the CPU in the ITCC judges how to control each automobile 100. The automated driving regulator (ADR) adjusts the output of the electric motor 117 installed on the automobile 100. Also, the ADR commands the ICCU to control the plate brake 122 (as the braking commands) and to operate the ASA (as the guidance commands) 116 of the automobile 100. The road side ADR turns on the streetlights (guiding lights) to match the pallet movement, and operates the road side brake (infra-stopper) to stop the automobile when necessary. The automobile 100 has a high speed electric motor 117. The high speed electric motor 117 obtains the necessary electricity with the non-contact electricity supply apparatus (NCES). The NCES obtains electricity from the core-coil 322 which is installed on the road 300. The NCES is controlled by the electronically regulated actuator to maintain small gap with the core coil 322 which is installed on the road 300. The automobile 100 also has an ID tag to identify each individual automobile 100. The identified information is then sent out and detected by the road side antenna The detected signal is then transmitted to the ITCC through the communication control transducer and reader.

The ITCC receives and calculates current traffic conditions, and projects the necessary information based on the traveling requirements from the passenger. The automobile 100 travels in the system adequately and safely. In the system, the automobile is driven automatically. The travel of the automobile is adequately controlled by communication with the ITCC and the ADR in both directions and obtains circumstantial information. The communication is completed through the ADR 225, the beacon, the LCX and optical communications. This communication control system enables the traffic/transportation system to harmonize the automobile's movement.

The automobile has the LDPF 119 and it is inserted into the ditch in the road 300. The solar energy collection panel is installed on the road. The LDPF 119 always monitors the traveling conditions by the distance sensor 120. The panel collects solar heat and light with the heat pump or solar cell, and the energy is converted to electricity. The collected electricity is used for the invention traffic/transportation system. The system then becomes environmentally friendly.

FIG. 5 shows the diagram which expresses the relations between the automobile, the pallet and the road.

The automobile is equipped with the communication devises similar to the cellular phone to communicate outside of the automobile. The necessary energy for inside of the automobile is obtained from the pallet as an electricity. In this case, to identify the automobile, the determination of the automobile is completed not only by the number plate, but also by the ID-tag as a higher determination. There are traveling environment for the automobile on the pallet, and an outer environment such as traffic conditions or weather conditions and an inner environment such as passenger car's inner room condition. The passenger inputs the final destination into the system using the remote controller. The automobile is fixed on the pallet by the WFA as it fixes the automobile's wheel. Thus, the suspension of the automobile is still active on the pallet. The suspension absorbs the vibration from the road, and promises comfortable riding in the system. The passenger can turn on the air-conditioner without turning the automobile's engine. The necessary electricity is obtained from the NCES to maintain comfortable inner space inside the automobile. Each pallet has it's own ID-tag to be identified in the system. Also, each pallet has it's own antenna to communicate, and it has GPS which is one application using a satellite to detect correct position of the pallet in the system. Each pallet and automobile can detect the surrounding environment by using the sensors. The pallet analyzes the condition of fixation of the automobile, and the traveling condition in the system. With this analysis, the newly collected information is compared to the accumulated data from the data base. The data base usually processes maneuvering characteristics of each pallet and environmental information. The pallet-CPU optimizes the pallet's operation while collecting the information, then commands the final control of the system. The pallet-CPU creates the integrated requirements to harmonize with other pallets in the whole system. The commands from the pallet-CPU are then integrated to regulate driving braking and steering of the pallet.

The equipment which exchanges the information with the pallet or automobile and supplies enough energy for the pallet to travel on the system is installed on the road. Many types of sensors are installed on the road to detect the road conditions and traffic conditions. Also, this collected information is transmitted to the pallet. The necessary energy for the sensors to operate is supplied by solar energy. After the information regarding the outer conditions is collected, this information is analyzed for the automobile, the pallet and the environment. At the analysis stage, the infra-CPU analyzes all the accumulated information referring to the traffic-environment model, the traffic flow data, the natural environment conditions and all natural data. Finally, the infra-CPU sends the commands to the pallet. All traveling of the pallet is controlled from this diversified point of view. When the LIM (Linear Induction Motor) is applied as the propulsion force for the pallet, the integrated control of the pallet and the infra-control (road side control) can be performed by regulating the gap between the primary and secondary plates. As stated above, the system realizes the ideal traffic/transportation, and is able to present driving which is fully automated and perfectly safe.

FIG. 6 is a bird eye's view of the transportation system of the invention, which shows the pallet 200 carrying the automobile 100 and fixed by the WFA 215 and travels on the specialized road 300.

The WFA 215 fixes the wheel/tire 105 of the automobile 100, when the automobile enters in the mode-interchange to convert it's travel mode automatically or manually. The automobile 100 is then loaded on the pallet 200 fixed by the wheel tire 105. The pallet 200 has the LDPF 238, and the LDPF 238 inserted into the fail-safe ditch (FSD)-rail 304. Thus, the pallet 200 is prevented from deviating from the traveling lane physically or mechanically. In this figure, there are two FSDs and two LDPFs 238 are installed on the pallet 200. The pallet 200 is supported by the pallet-wheels 228. For better efficiency, a higher rigidity tire such as an urethane filled tire is applied to the pallet-wheel. The pallet 200 gains it's propulsion force not from the road surface like the regular automobile 100 does, but from the linear induction motor (LIM). The small diameter of the pallet-wheel is sufficient because the pallet-wheel doesn't need to produce any driving force. In this example, the multiple tire system for the pallet-wheel 228 is installed to reduce the effects of the loading force to the road. Also, the equalizer 229 is installed to disperse the loading force to the road and to force the wheel to contact the road as much as possible. The LIM unit system 301 is installed on the road as the propulsion system. In the LIM unit, the solar energy unit 302 is installed to collect energy from the sun. The solar panel unit 302 can be installed beside the surface of the road to avoid from destructive conditions from the wheel 208. The solar energy unit 302 in not on the road surface and doesn't support the pallet wheel 208. The pallet 200 travels on the road surface 309. A rigid and flat steel plate is installed as the road surface 309, and the plate has improved drainage characteristics. However, as long as the plate has an enough rigidity, the type of plate will not matter. The road surface for the pallet 200 to travel is flat except the ditch 304 area The width of the ditch 304 is narrower than that of the pallet-wheel 228. Thus, the pallet 200 can travel on the road smoothly.

FIG. 7 shows the operation system of the invention. The diagram is drawn separately and depicted separate from the road of the invention. (this figure continues to the FIG. 8).

Depicted is the beacon, the LCX, the inductive cable, sensors to detect the road conditions and headway and the pallet, which are related to the information and communication with the road side. The marker to detect the lane number is attached on the pallet. There are infra-sensing systems to determine the weather, traffic conditions and earthquake information. Also, pallet traveling information such as each pallet's movement information and location, the speed of each pallet, is monitored. Then, this collected information is calibrated and is sent to the host CPU of the road side through the I/O port. All the data of the geographic figures and line shape information is stored in the data base of the CPU. The relative location is always checked with this stored information to confirm the accurate location of the pallet. The infra-CPU uses this stored information. Also, the program information regarding the traffic is stored on CD-ROM (read only memory), and the infra-CPU uses this information. The historic data of the traffic is stored in the RAM. The infra-CPU judges the regulations of travel of the pallet base with this accumulated information. Then, diverging and merging is controlled.

The brake command is sent to the pallet-CPU through the beacon and pallet-antenna. The guidance command is sent to the ASA of the pallet through the beacon and pallet-CPU.

The installed LIM (primary plate, ground side) generates shifting magnetic fields for the propulsion force for the pallet utilizing the VVVF inverter. When the LIM produces the opposite direction shifting magnetic field, this actually brakes the pallet. At the diverge/merge section, the X-Y direction LIM (linear induction motor) can be utilized. Guidance of the pallet is performed by the ASA. The road surface consists of rigid pavement to support the steering force of pallet. The rigid road surface is formed by steel plates which have many holes and has a high drainage capacity. Also, the plate resists the formation of ruts on the track. Therefore, the pallet can drive smoothly. The ditch is installed for the LDPF. The ditch prevents the pallet from deviating from the traveling lane. Also, at the diverge and merge section, if the electromagnet unit is installed on the side wall of the ditch, the LDPF functions diverging and merging while contacting the side wall to assure this diverging and merging The pallet is protected from deviation from the traveling lane by the LDPF physically and mechanically. The plate brake system is adopted in this case. The brake plate is drawn from the bottom of the pallet and the plate is pushed to the braking zone of the road surface. According to this type of brake system, the area of the brake plate is large enough to stop immediately and effectively.

FIG. 8 is a continuation of FIG. 7. The automobile section and the pallet section of the operation system is shown.

The driver and the passenger are in the automobile. They have a remote controller, which is provided at the entrance of the mode-interchange. The passenger and the driver communicate with the road side traffic control system through the remote controller. If the remote controller doesn't have enough power, communication with the road side beacon is performed by the antenna of the pallet. In the automobile, the heads-up mount display or CRT is equipped to receive and display this information. By this method, even the radio can be utilized for information exchange. If the automobile is more sophisticatedly equipped, the passenger is able to obtain a higher level of information. The automobile is fixed on the pallet by the WFA. The pallet has the receiver/oscillator with the beacon. Then, the pallet can communicate at a higher level of information by bilateral communication with the road side. Also, the pallet can communicate with road side without destruction from the introduction of the leaky coaxial cable (LCX) beside the road. The pallet obtains it's location by detecting the magnetic field from the underground magnets using magnetic field sensors. The photo sensor detects the pallet's location in the lane to keep it within the track lane, and the sensor generates a signal to control the ASA. Also, the ultrasonic sensor and vision sensor detects the road conditions and the exact location of other front and rear pallet. If an obstacle is detected, at first this system tries to avoid the obstacle. But if the system cannot avoid the obstacle, the secondary system tries to brake and stop the pallet. The pallet must have it's own ID-tag such as a bar-code to be recognized. The road side control system can identify each individual pallet electronically. Also, the pallet has GPS instruments to determine the pallet's location using satellites, then the location information is sent to the pallet-CPU. Acceleration sensors are used to detect longitudinal, vertical and lateral direction acceleration. These detected accelerations are interpreted as pitching yawing and rolling movement. The direction of the wheel is detected by the steering angle sensor, and the speed of the pallet is detected by the speed sensor. The height of the pallet is detected by the vehicle's height sensor. These sensors detect all of the information needed to control the movement of the pallet. This information is sent to the pallet-CPU through the I/O port. The reaction plate (secondary plate) is installed on the pallet to obtain the propulsion force from the LIM system. The reaction plate has a gap length detection sensor to maintain constant distance between the plate and the LIM. The gap distance is controlled by the actuator. The acceleration sensors and the pallet height sensors are utilized to control the gap distance and to prevent the pallet from shaking, The pallet has wheels and are connected with the ASA to control the pallet's steering system. The number of wheels does not have to be four; but, the number can be determined by effectiveness. Occasionally, a multiple-tire system is applied to obtain more contact with the road surface. When the equalizer is installed on the wheel, the contact area of the wheel to the road surface expands. Thus, smooth traveling and stable driving can be realized. The stepping motor calculates the angle of steering, Then, the actuator controls the ASA based on the calculated error. The source of the electricity for the ASA is basically supplied by the battery. While the pallet is traveling, the electricity is supplemented by the generator, which produces electricity from the rotation of the wheel. The LDPF is installed on the bottom of the pallet. The LDPF is then raised and lowered by the screw feeding mechanism. When the LDPF needs to be raised and pulled out from the ditch for the pallet to change lanes or exit from the lane for an emergency, or for maintenance, this is how the pallet is transferred from the lane. The LDPF has a magnet unit. This magnet assures diverging/merging with absorption by the electromagnet, which is installed on the side wall of the ditch. Also, the LDPF has a razor distance measurement sensor to detect the forward line of the track of the lane and scans any obstacles in front of the pallet. The Plate brake system is installed as the pallet-braking system. The pallet pushes the plate down to the surface of the road by the actuator. The actuator of the pallet is operated by hydraulics. An oil reservoir is installed in the pallet. The pallet also has a flap to obtain lift force to reduce the weight load of the pallet and controls the pallet. This reduction of weight load of the pallet alleviates the effects of the road surface.

The pallet has it's own CPU. Whenever necessary, obtained information from the sensors is calibrated and digitized. The information is then sent to the host-CPU in the pallet (pallet-CPU) through the I/O port. This invented transportation system has a digitized data base of the road line shape and geometric figures of the road. The pallet-CPU utilizes this data base. The pallet control program is stored in the ROM (read only memory), The pallet-CPU also utilizes the ROM. Each pallet's past data is recorded on the RAM. Then, the pallet-CPU controls the movement of the pallet such as steering at the diverge/merge section. The pallet's attitude control is based on this accumulated data. The pallet-CPU judges when braking is necessary, and operates the brake by controlling the actuator. Also, the pallet-CPU commands the ASA to steer the wheel to guide the pallet along the traveling lane. These controls are actually operated by a harmonization with the infra-CPU.

FIG. 9 shows an example of the traveling diagram. This is when the pallet is driven in the invented transportation system by the automated travel control system. The ITCC (Integrated Traffic Control Center) manages the entire transportation system. The propulsion force of the pallet is the LIM is installed on the road (guideway). The reaction plate on the pallet obtains the propulsion force from the moving magnetic field, which is generated by the pallet. The pallet location detection system identifies the location of the pallet. Also, the road side antenna detects each pallet's ID-tag to recognize each pallet. The passenger of the pallet receives a remote controller at the mode-interchange entrance. The passengers then commands actual travel plans to the system when they depart. In this figure, there are three automated traveling control systems. The pallet location detecting sensor and the pallet ID-tag recognizing sensor are installed on each automated traveling control system. The beacon communication system between the pallet and road side is installed. The automated traveling control system regulates output concerning wave frequency or voltage of the inverter to control the speed of the pallet. The LIM is then switched on and off by the control system of the electricity feeding section. The LIM switch, which is attached on each LIM, is turned on and off based on the location of the pallet.

FIG. 10 shows the block diagram of each sub-system in the invention transportation system. The ITCC is the main control center for the entire transportation system. However, each pallet has it's own autonomous controllability. Thus, the entire system and each pallet's movement control system is managed holistically. Each mode-interchangeand highway section is operated by the ITCC.

FIG. 11 shows a plane upper view of the mode-interchange of the invented transportation system.

The mode-interchange contains the entrance and exit sections. In the entrance section, it is mainly comprised of the entrance gate, lane guidance section, the automated gate-in instrument, the automobile/container determination apparatus, the pallet standby system, the automated WFA (wheel fixingapparatus) and the mergingarea.

In the exit section, it is mainly comprised of the exit gate, the lane guidance section, the automated gate-out instrument, the pallet returning apparatus, the automated wheel releasingapparatus and the mergingarea.

The highway section is comprised of the main lane section and the connecting section with the mode-interchange and the main lane. The entering automobile from the regular road to the invention transportation system goes into the automated gate-in instrument. Then, the type of automobile, weight, size (when the container needs to be carried, the basic information of the container is required) are determined to select the lane to travel. Then, the automobile travels to the automated gate. During the above period of time, the pallet stand-by system selects the most adequate pallet for the automobile from the stored pallets. The pallet is supplied from the underground pass so as not to affect the original lanes. Then, the automobile is loaded onto the pallet. The loaded automobile is then fixed on the pallet by the WFA automatically. The automated wheel fixing robot has an arm to manipulate the WFA. Four robots are installed on each side of the automobile's wheel. The robot measures the diameter of each wheel, and at the same time, the arm draws out the belt from the WFA, which is installed in the floor of the pallet to fasten it. This stage of the operation is completed rapidly, then the robot's arm raises the wheel side supporting apparatus (WSSA) from the coordinating floor space. These belts and WSSA secure the wheel firmly by pressing down and supporting from the side of the wheel. With this firm fixing of the automobile to the floor of the pallet, the passenger is able to ride on the automobile, which is loaded on the pallet, safely and quickly. Also, at the exit section, the automated wheel releasingrobots are installed in the same manner as the entrance section, which is mentioned above. This is the detailed method to fix and release the automobile to the pallet quickly. In the mode-interchange, the unloaded pallet must be returned to the entrance section or stock area Thus, the pallet returning system is installed in the exit section. In order to have a larger number of pallets, a garage for the pallets is constructed. The exit section and the entrance section is connected with the pallet traveling lanes. This pallet traveling lane makes this system more efficient. This is because the pallet is able to circulate in the system continuously.

FIG. 12 shows the regular road, the mode-interchange, the highway section and the traffic flow of the pallet. The mode-interchange is composed of the entrance section and the exit section. The entrance section is comprised of the entrance gate, the lane guidance section, the automated gate-in instrument, the automated automobile/container determination system, the pallet stand-by system, the automated wheel fixingrobots and the mergingarea.

In the exit section, it is mainly comprised of the exit gate, the lane guidance section, the automated gate-out instrument, the pallet returning apparatus, the automated wheel releasingapparatus and the mergingarea.

The highway section is comprised of the main lane section and the connecting section with the mode-interchange and the main lane. The entering automobile from the regular road onto the invention transportation system goes into the automated gate-in instrument. Then, the type of automobile, weight, size (when the container needs to be carried, the basic information of the container is required) are determined to select the appropriate lane to travel. Then, the automobile travels to the automated gate. During the above period of time, the pallet stand-by system selects the most adequate pallet for the automobile from the stored pallets. The pallet is supplied from the underground pass so as not to affect the original lanes. Then, the automobile is loaded on the pallet. The loaded automobile is then fixed on the pallet by the WFA automatically. The automated wheel fixing robot has an arm to manipulate the WFA. Four robots are installed on each side of the automobile's wheel. The robot measures the diameter of each wheel, and at the same time, the arm draws out the belt from the WFA, which is installed in the floor of the pallet to fasten it. This stage of the operation is completed rapidly, then the robot's arm raises the WSSA (wheel side supporting apparatus) from the coordinating floor space. These belts and WSSA secure the wheel firmly by pressing down and supporting from the side of the wheel. With this firm fixing of the automobile to the floor of the pallet, the passenger is able to ride on the automobile, which is loaded on the pallet, safely and quickly. Also, at the exit section, the automated wheel releasing robots are installed in the same manner as the entrance section, which is mentioned above. This is the detailed method to fix and release the automobile to the pallet quickly. In the mode-interchange, the unloaded pallet must be returned to the entrance section or stock area Thus, the pallet returning system is installed in the exit section. In order to have a larger number of pallets, a garage for the pallets is constructed. The exit section and the entrance section is connected with the pallet traveling lanes. This pallet traveling lane makes this system more efficient. This is because the pallet is able to circulate in the system continuously.

FIG. 13 shows the block diagram of the subsystem which describes the invention transportation system. The highway section is composed of a main lane, the diverging section, the merging section, the mode-interchange area, the passing section and the rest area. The rest area is comprised of the service area, a parking area and an emergency parking area.

FIG. 14 shows the block diagram of the pallet traveling system. The traveling control system is comprised of three main parts. The first is the propulsion generating system. The linear induction motor (LIM) system is applied for usual situations. However, for emergency situations, the propulsion force is generated by the electric motor. The propulsion generating system is separated by the traveling mode. Thus, when the pallet needs more power to travel at higher speeds, the LIM system provide the power. If an emergency occurs, the electric motor takes over to provide the power. But, in this case, the electric motor only provides low speeds. While the pallet can travel only at low speeds with the electric motor, the pallet is able to change or traverse ifs traveling lane.

The second is the pallet guiding system. The pallet is guided on the track lane by the automatic steering apparatus (ASA) normally. When the pallet is about to deviate from the lane, the pallet is prevented from lane deviation. In order to prevent the deviation physically and mechanically, the lane deviation preventing fin (LDPF) is installed on the bottom side of the pallet and the LDPF is inserted into the ditch of the road. Deviation from the lane is completely prevented by this LDPF system. Also, the LDPF usually travels without physical contact with the side wall of the ditch. This is how to realize the smooth traveling for the passenger. The third is the braking system. There are two major methods for braking, One is changing the direction of the moving magnetic field of the LIM to oppose the original direction of the pallet. The other is the mechanical braking system. In the mechanical braking system, there are two major methods. One utilizes the plate brake system. The plate shape brake pad is drawn from the bottom side of the pallet to push towards the surface of the road to gain a direct friction force against the pallet. The other is the conventional drum or disc brake system to stop the rotation of the pallet wheels.

FIG. 15 shows the block diagram of the safety system of the traveling pallet. Maintaining the safety of the pallet contributes to retain the safety of the automobile, which is carried on the pallet. The safety and security of the pallet is basically comprised of the preventive safety system, the avoidance of an accident system, the accident reduction system and damagereduction system.

The preventive safety system prevents the accident before the accident happens. The monitoring system is performed at all times. At the same time, all kinds of sensors detect immediately if something unusual happens in the transportation system. This monitored and sensed information are sent to the passenger side to alert through the CRT which is attached in the interior of the automobile. The CRT, is connected to the passenger's remote controller and beacon.

The accident avoidance system is actually the LDPF system. This system prevents deviation by utilizing the LDPF system and the highly integrated ASA (automatic steering apparatus), which is supported by simulated information based on all the detected traveling conditions collected by the sensors.

The accident reduction system functions when an accident is predicted and alleviates the damage as much as possible. When the simulation predict that the pallet will crash into another pallet, the simulation also predicts the speed of each pallet and the time of the crash. Then, the accident avoidance system operates to inflate the airbag which are installed on the pallet. Introducing this system, the accident will be alleviated or minimized with the air-bags significantly. Also, the expandable bumper expands if the system detects an imminent accident with another pallet. The bumper expands before the crash. The expandable bumper is just like the cylinder of a piston, and the damper section itself is exchangeable. It is to assembled to absorb most of the crash impact.

The damage reduction system is basically comprised of the wheel releasing apparatus system and the evacuation system from the lane. The wheel releasing apparatus system is for emergency pallet braking and automobile evacuation from the lane. In case fire in a tunnel or sudden malfunctions of the LIM system happens, this transportation system allows the pallet to release the automobile. During the emergency, because there is no time to release the fixed automobile manually, an automated releasing system is necessary. The more fine required to release the automobile, the more chances there are for secondary accidents to occur. In this transportation system, the automobile is able to exit the floor of the pallet, because the height of the pallet is minimal. The released automobile is driven by the passenger or driver. However, the driver controls the automobile using the remote controller.

Evacuation from the lane is performed by raising the LDPF, which enables the pallet to obtain maneuverability to change from lane to lane. This system is utilized in case of malfunctions on the traveling lane and while the other lane is still in functioning This system is for just such cases.

FIG. 16 shows the basic route of the confirmation system for the fixing condition of the wheel using a flow chart diagram. This figure shows that if the fixed wheel is unfixed suddenly for an unknown reason, the system functions for the pallet to slow down or brake safely.

When the pallet travels at high speeds, the aerodynamic resisting power becomes stronger. So, if the fixed wheel is unfixed accidentally, this could cause a major disaster. Thus, this transportation system adopts the confirmation system for the fixing condition of the wheel to stop the movement of the pallet immediately. This braking functions to protect the entire system from a major accident. The routine is a regular interval monitoring work. First of all, the routine obtains information about the weight of the automobile. The weight sensors are installed at the place where the wheel is fixed. If something unusual happens, an emergency signal is sent to the routine to stop the pallet immediately. This emergency call is made even outside the regular routine cycle. The braking procedure is performed with following the block diagram in the figure. The reversed magnetic field braking system and the plate brake system are operated.

FIG. 17 shows the side view of the pallet 200 which is traveling on the road 300 while carrying the automobile (passenger vehicle) 100.

The wheel 105 of the automobile (for passenger vehicle) 100 is fixed by the WFA 215. The front nose section 206 forms the front edge of the pallet, and is aerodynamically designed. The tire 228 of the pallet 200 is made from rubber, which is filled with urethane foam. The tires 228 are equipped with the equalizer 229 to disperse the weight of the loading force. The ditch 304 is installed in the road 300. The LDPF 238 is inserted in the ditch 304. The WFA 215 is comprised of WSSA 216, the retractor 219, the belt section 217, the hinge 222, the electronic locking buckle 220 and the bellows-airbag 223. Then, the WFA fixes the wheel 105 of the automobile 100. One edge of the WSSA 216 is raised at the point on the hinge 222 as a fulcrum to prevent lateral sliding of the wheel 105. The bellows-airbag 223 makes the WSSA 216 stand up with the inflation of the airbag Also, the WSSA 216 is equipped with the retractor 219, and the retractor stores the belt 217 in it. The belt 217, pulled out from the retractor 219, pushes the wheel 105 of the automobile 100 down, and is locked to the buckle 220 with electronic locking system. This is how the wheel 105 of the automobile 100 is fixed on the pallet 200. Since the wheel 105 is pushed down by the belt and it's side is supported by the WSSA, the wheel is firmly fixed on the pallet 200. Even when the pallet 200 travels at high speeds, the wheel is fixed firmly. Thus, this system provides a high level of safety and security. In addition, the suspension of the automobile 100 functions while the wheel is fixed. This results in less suspension force needed for the pallet 200 to provide enough comfort to the passenger or driver of the automobile 100. In this example, the pallet 200 gains it's propulsion power from the LIM (linear induction motor). Also, in this case, the primary induction plate is installed on the road surface. Thus, the reaction plate 232 is installed on the electronically controlled actuator 232, which is on the bottom of the pallet 200. Also, the reaction plate 232 is stored in the reaction plate storage box 233 providing a thinner pallet. The ditch 304 prevents the LDPF 238 from deviation. The LDPF 238 is installed on the bottom side of the pallet 200, and is inserted in the ditch 304. Therefore, if the pallet 200 is about to deviate from the lane, the ditch and the LDPF lock with each other so as not to deviate further. In this case, two of the LDPFs 238 are installed on the pallet. One is in the front and the other is in the rear of the pallet. These two LDPF systems prevent yawing movement of the pallet 200. The wheels 222 support the pallet 200. In addition, the equalizer 229 disperses the weight of the pallet and is attached to the wheel 228. The ditch 304 is comprised of the bottom section and the overhang section 308. The overhang section 308 prevents the LDPF 238 pulled out from the ditch.

FIG. 18 shows the relation between the automobile (passenger car) 100, the pallet 200 and the road 300.

The automobile (passenger car) 100 is fixed by the WFA 215. The pallet 200 is supported by the wheel 228, and is traveling on the wheel track surface 309. The LDPF is supported by the fin strut 503. The lower section of the LDPF 238 is the expandable section 510. The overhang section 308 of the ditch 304 is interference stopper of the expanded section 510 to prevent pulling out. The air flow guiding 405 is attached on the pallet to reduce it's weight while it travels at high speeds, or even levitate the pallet above the road surface. The wheel track surface 309 is supported by the road bed 315, this can also drain rapidly. The fin strut 503 slides up and down by the electronically controlled actuator 250. The LIM (primary induction plate) unit 301 is installed on the road 300, and the reaction plate 401 is installed on the bottom side of the pallet 200. The reaction plate 401 is supported by the LIM support frame 402, and the LIM support frame 402 is supported by the propulsion module support arm 403 which is installed on the bottom side of the pallet 200. The road 300 is mainly composed of wheel track surface 309 on which the wheel 228 of the pallet 200 is rolling on the rapid drainage road bed 315. The electromagnet units 338 are installed on the side walls of the ditch 304. These electromagnet units function to absorb the LDPF 238 for the pallet to complete the divergenceat the diverging (branching) section.

FIG. 19 shows the scene which the pallet 200 is traveling on the road 300 while carrying the truck 10, and the truck is fixed on the pallet by the WFA 215.

The truck is fixed on the floor of the pallet by the belt 217 of the WFA 215, also the sides of the wheels are supported by the WSSA 216 to assure fixing on the pallet firmly. The wheels of the pallet 228 disperse the weight of the pallet by introducing the multiple wheel system. The length of the pallet for large vehicles 201 is adjustable by installing the flexible ball screw system 205 to match with the length of the vehicle. The pallet for large vehicles 201 obtains it's propulsion force from the propulsion module 400. The propulsion module is comprised of the LIM (linear induction motor), and the primary induction motor is installed on the road. The pallet for large vehicle 201 has the LDPF 238, and the LDPF inserted in the ditch 304 to prevent the pallet 201 from deviating from the lane. Because the LDPF may have an impact force, the section shape of the LDPF is settled as an acute polygon. The fin nose 508 is installed on the front edge of the LDPF to alleviate the impact by sliding on the wall. The nose is for just in case of the LDPF impacts with the side wall of the ditch around the diverging or merging sections. The LDPF 238 is supported by the fin strut 503 and is linked with the pallet 201. The pallet wheel 208 rolls on the traveling road surface 309 of the road 300.

FIG. 20 shows the outlook of the propulsion module, which is supported by the pallet 200. The gap between the module and the road surface is electronically controlled.

As the weight of the pallet is supported by the wheels, the propulsion module 400 does not load the weight directly. The propulsion module is balanced with the counter 419 through the main shaft 428 and hinged by the main hinge 420. Thus, as the module forms the link mechanism then it is shifted only with a small amount of power to move it up and down. The counter 419 is balanced out with the propulsion module 400 as the main hinge 420 is placed at the center. On the side of the counter 419, the main electronically controlled actuator 425 is installed, and the actuator moves the sliding hinge 428 to shift the propulsion module 400 up and down with the cylinder 426, according to the principle of the lever. On the bottom side of the propulsion module 400, the reaction plate 401 is installed. The main sliding hinge 428 slides with the sliding mechanism 423 and rotates. The propulsion module 400 is attached with horizontal hinge 423, to maintain the level by changing the level angle of the propulsion module 400. The module is made from the combination of aluminum and steel. Also, the supplemental roller 412 is installed on the bottom side of the propulsion module 400. Thus, the roller is able to slide smoothly on the side wall of the ditch, even if a sufficient gap with the wall is not maintained. Therefore, the supplemental roller 412 is only protruding a few millimeters from the reaction plate 401. The gap sensors 422 are attached on both the front and rear sides of the propulsion module 400. The gap sensor detects the distance between the module and the surface of the road and calculates the horizon of the module. Also, the acceleration sensors are attached on both the front and rear sides of the propulsion module 400 to detect the movement of the module. To control the attitude of the propulsion module 400, the attitude control actuator 424 is installed on the front edge of the pallet 200, and the module's attitude is controlled by pushing the attitude hinge 433 from the cylinder 426. Also, the acceleration sensor 434 and gap sensor 435, which detects the distance to the road surface, are attached on the pallet 200 to measure the movement of the pallet 200. Then, the relative distance is measured and the information of the distance is fed back to the pallet's 200 CPU to optimize control. Finally the main actuator 425 and the attitude control actuator 424 maintain the expected gap length between the road surface and the reaction plate 401. Also, the front end of the module 400 is aerodynamically designed as the aerodynamic front nose 436.

FIG. 21 shows the outlook of the propulsion module, which is supported by the pallet 200. The gap between the module and the road surface is electronically controlled.

As the weight of the pallet 200 is supported by the wheels, the propulsion module 400 does not load the weight directly. The propulsion module is balanced with the counter 419 through the main shaft 428 and hinged by the main hinge 420. Thus, as the module forms the link mechanism then it is shifted only with a small amount of power to move it up and down. The counter 419 is balanced out with the propulsion module 400 as the main hinge 420 is placed at the center. On the side of the counter 419, the main electronically controlled actuator 425 is installed, and the actuator moves the sliding hinge 428 to shift the propulsion module 400 up and down with the cylinder 426, according to the principle of the lever. On the bottom side of the propulsion module 400, the LIM (primary plate) 301 is installed. The main sliding hinge 428 slides with the sliding mechanism 423 and rotates. The propulsion module 400 is attached with horizontal hinge 423 to maintain the level by changing the level angle of the propulsion module 400. The LIM (primary plate) 301 is actually the stator, which generates the moving magnetic field. Also, the supplemental roller 412 is installed on the bottom side of the propulsion module 400. Thus, the roller is able to slide smoothly on the side wall of the ditch, even if a sufficient gap with the wall is not maintained. Therefore, the supplemental roller 412 is only protruding a few millimeters from the reaction plate 401. The gap sensors 422 are attached on both the front and rear sides of the propulsion module 400. The gap sensor detects the distance between the module and the surface of the road and calculates the horizon of the module. Also, the acceleration sensors are attached on both the front and rear sides of the propulsion module 400 to detect the movement of the module. To control the attitude of the propulsion module 400, the attitude control actuator 424 is installed on the front edge of the pallet 200, and the module's attitude is controlled by pushing the attitude hinge 433 from the cylinder 426. Also, the acceleration sensor 434 and gap sensor 435, which detects the distance to the road surface are attached on the pallet 200 to measure the movement of the pallet 200. Then, the relative distance is measured and the information of the distance is fed back to the pallet's 200 CPU to optimize control. Finally the main actuator 425 and the attitude control actuator 424 maintain the expected gap length between the road surface and the LIM (primary plate) 301. The propulsion force is generated by the moving magnetic field. The moving magnetic field is produced by the LIM (primary plate) 301, which is installed on the propulsion module 400 and the inductive magnetic field is generated on the reaction plate 346. Also, the front end of the module 400 is the aerodynamically designed as aerodynamic front nose 436. The LIM (primary plate) 301 is installed on the surface of the road 314.

FIG. 22 shows the overview of the radiator which is installed on the reaction plate.

The radiator 713 is the section that radiates the heat from the of coolant which is heated at the reaction plate. Then, the radiated coolant is sent to the water-jacket 715, which is set next to reaction plate, and passes through the front end of the propulsion module, the bellows 718 and the inner piping of the propulsion module 400. The bellows 718 are installed to adjust the propulsion module when it moves up and down. When the coolant passes through the water-jacket 715 installed next to the reaction plate, the coolant absorbs the heat of the reaction plate to cool the reaction plate 401. The heat absorbed coolant then comes back to the reserve tank 716 and passes to the bellows 178, which are installed on the back side of the propulsion module, and the piping on the pallet 200. The water pump 717 sends the coolant, which is in the reserve tank 716, to the radiator 713. The reaction plate is cooled by circulating the coolant, as the system is described above.

FIG. 23 is the side cross-section view of the propulsion module.

The aerodynamic front nose 436 forms an aerodynamic wing 404 that functions to lift up the propulsion module 400 with the aerodynamic force against the absorbing power by the LIM (linear induction motor). At the same time, the wing forms because of the flow of air under the reaction plate 401. The compressed air flow is formed by the air-guidance 405 to prevent the reaction plate from contacting the road surface.

FIG. 24 is the side view of the longitudinal cross-section of the propulsion module, which has outlets for the compressed air system.

The air intake inlet is installed on the front end of the pallet, then the compressed air 407 is sent inside of the propulsion module 400, through the compressed air transferring pipe 408. The exiting air flow 410 is forced from the outlet of the compressed air 409 to prevent the reaction plate 410 from contacting the surface of the road 314. The reaction plate 401 is supported by the LIM supporting frame 402, and the propulsion module 400 is supported by the supporting arm 403.

FIG. 25 shows the diagram of the cylinder type LDPF.

When the cylinder type LDPF contacts the side wall of the ditch, the rotational cylinder 533 rotates to slide on the side wall to avoid friction. By adopting the rotational cylinder, when the LDPF contacts either the right or left side, the LDPF is able to slide except in the direction in which the rotation is different. The rotation sensor 534 is installed on the cylinder type LDPF to detect contact with the side wall. Also, the laser gap sensor 535, which measures the distance between the side wall and the LDPF, is able to guide the pallet in the lane accurately.

The fin strut 503 is installed on the bottom of the pallet 207, and the rotational cylinder 533 is installed on the lower part of the strut 503 for the cylinder 533 to rotate around the cylinder with a rotational bearing mechanism. A gear wheel structure 541 is installed on the upper part of the rotational cylinder 533 for the rotation sensor 534 to rotate on the fin strut with it's gear wheel structure 541. When the rotational cylinder 533 rotates, the rotational conditions are detected by the rotation sensor 534. The rotational cylinder 533 has a step structure to mesh with the overhang section of the ditch so as not to be pulled out from the ditch.

The obstacle detecting sensor 536 is installed on the lower part of the fin strut 503 to grasp any obstacles ahead. The perpendicular gap sensor 527 is installed on the bottom of the fin strut 503 to measure the distance between the bottom of the strut and the bottom of the ditch. Also, the perpendicular position of the fin strut 503 is controlled by the electronically controlled actuator 542. The laser gap sensor 535 is sandwiched by the washer 537 which is equipped on the fin strut 503, and the sensor is installed on the sensor supporter 538, which is able to move along the angled sliding gutter 539. This sensor supporter 538 has a gear mechanism to be movable in the angled sliding gutter 539, and the supporter has a system to control the on and off angle of each laser gap sensor. This system is enabled to convert the extension of the measurement of distance between the gap sensor and the ditch.

FIGS. 26, 27 and 28 show the mechanical movement procedure of how the fin strut 503 of the LDPF 238 operates when the strut leans laterally. It explains three different steps.

FIG. 26 shows the outlook of the LDPF 238 as a cross section in the 90 degree longitudinal direction. The rotational cylinder 533 is installed on the lower part of the fin strut 503. The cylinder type LDPF 502 is inserted in the ditch 304 by the perpendicular actuator 542. The surface of the overhang section plane 308 is in the ditch 304 to prevent the LDPF from being pulled out. The perpendicular motion actuator 542 is installed on the bottom side of the pallet 207. The perpendicular motion actuator 542 moves the strut supporting cylinder 545 up and down. The strut supporting cylinder 545 supports the fin strut 503. The fin strut 503 can slide laterally with the mechanism of the lateral leaning hinge 543. Also, the side spring 544 is attached to both the right and left side of the strut to keep the middle position when no force is loaded.

On both the right and left side of the fin strut 503, the contact point of the switch is installed. Also, the same switch is installed on the both right and left side of the strut supporting cylinder 545.

In FIG. 27, the fin strut 503 is not loaded by any force. Thus, the fin strut is not in contact. Therefore, lines A and B are not connected.

In FIG. 26, when the pallet moves laterally, the fin moves laterally at the same time. Consequently, the rotational cylinder 533, which is installed on the cylindrical LDPF 502, contacts the side wall 337 of the ditch 304. Then, the rotational cylinder slides on the side wall while rotating in the ditch 304. Thus, the LDPF prevents the pallet from deviating from the lane with rotation in the ditch. In this case, the fin strut is loaded with a slight lateral force. However, the spring is not shrunk completely. The fin strut 503 keeps it's middle position in the strut supporting cylinder 545. Thus, lines A and B are not connected yet to brake.

In the FIG. 28, when the pallet moves more laterally, the fin finally leans. At that time, the contact point 546, which in installed on both the right and left side of the fin strut 503, contacts with the contact point 546, which is installed on the strut supporting cylinder 545. Then, lines A and B are connected to brake.

FIG. 29 is a bird's eye view of the expanding lower part of the LDPF 238. The LDPF 238 is composed of the main body of the LDPF 504 and the expanding section 510. The expanding section slides out the expanding plate 515 with the expanding ball screw mechanism 514. The expanding section 515 has both a right and left side guidance roller 511 to reduce the friction with the surface of the overhang section.

FIG. 30 shows a bird's eye view of the expanding section of the LDPF 238 with the actuator. The LDPF 238 is composed of the main body of the LDPF 504 and the fin expanding section 510. The fin expanding section 510 slides out the expanding plate 515 with the expanding actuator 513. The expanding section 515 has both a right and left side guidance roller 511 to reduce the friction with the surface of the overhang section.

FIG. 31 shows an upper view of the expanding section of the LDPF 238 by the actuator. The LDPF is composed of the main body of the LDPF 504 and the fin expanding section 510. The fin expanding section 510 rolls out the expanding plate 515 by the expanding actuator 513 and the link mechanism 530 with rotation at the expanding hinge 516. The expanding section 515 has both a right and left side guidance roller 511 to reduce the friction with the surface of the overhang section. In this case, the side wall of the ditch 337 is installed under the lower part of the surface of the overhang section 308 as this part is wider than the surface of the overhang section, for the expanding section to fit the size of the ditch. The lower figure shows when the fin expanding section 510 is expanded by the expanding actuator 513.

FIG. 32 shows the front view of the expanding section of the LDPF 238 by the actuator.

The LDPF 238 is composed of the main body of the LDPF 504 and the fin expanding section 510. The fin expanding section 510 rolls out the expanding plate 515 by the expanding the actuator 513 and the link mechanism 530 with rotation at the expanding hinge 516. The expanding section 515 has both a right and left side guidance roller 511 to reduce the friction with the surface of the overhang section. In this case, the lower figure shows the fin expanding section 510 expanded by the expanding actuator 513.

FIG. 33 shows the side view of the arrowhead type LDPF. The fin nose 508 is installed on the front end of this LDPF. The main body of the LDPF 504 is supported by the fin strut 503. The shock absorber 531 and the traveling direction flap actuator 509 are attached on the fin nose 508. Also, the permanent magnet unit 519 is installed on the main body of the LDPF 504, and the magnet is absorbed by the electromagnet which is installed on the side wall of the ditch, when the pallet passes the diverging/merging section. The right and left side guidance roller 517 is installed on the fin nose 508 and on the main body of the LDPF 504 to reduce the friction with the side wall of the ditch.

FIG. 34 shows the bird's eye view of the arrowhead type LDPF. The fin nose 508 is installed on the front end of this LDPF. The main body of the LDPF 504 is supported by the fin strut 503. The shock absorber and the traveling direction flap actuator are attached on the fin nose 508 and the nose has the ability to put the angle of the nose around the directing hinge 532. The right and left side guidance roller 517 is installed on the fin nose 508 and on the main body of the LDPF 504 to reduce the friction with the side wall of the ditch.

FIG. 35 shows an upper view of the arrowhead type LDPF. The fin nose 508 is installed on the front end of this LDPF. The main body of the LDPF 504 is supported by the fin strut 503. The shock absorber 531 and the traveling direction flap actuator 509 are attached on the fin nose 508. The right and left side guidance roller 517 is installed on the fin nose 508 and on the main body of the LDPF 504 to reduce the friction with the side wall of the ditch. The expanding plate 515 is installed on both sides of the main body of the LDPF 504 and is expanded by the expanding ball screw mechanism 514.

FIG. 36 shows the front view of the integrated LDPF and the propulsion module.

In this figure, the actuator is integrated to control the gap between the reaction plate and induction plate, and to move the LDPF up and down by inserting it in or pulling it from the ditch. The perpendicular position of the propulsion module 400 is controlled by the main actuator 425 which is installed on the bottom side of the pallet 207. The propulsion supporting module protrudes from both the right and left side of the main actuator 425 to support the propulsion module 400. The supplemental roller 412 is installed on both sides of the propulsion module 400 for the propulsion module 400 to travel on the road surface 314.

The front end section of the propulsion module 400 forms an aerodynamic front nose 436. The nose generates the lifting force for the module, and rectifies the air flow. Also, the nose produces compressed air to flow in the compressed air pipe 408 at high speeds guided by the air guide 405 to flow on the bottom side of the propulsion module 400. With this mechanism, especially in high speed traveling the high speed compressed air flow is always generated at the bottom side of the propulsion module 400. This produces an aircushion effect to keep a constant gap length between the road surface and the pallet.

The reaction plate 401 is installed on the bottom side of the propulsion module 400. The ditch 304 is installed on the road 300 surface to insert the LDPF 238. The LIM 301 is installed on both the right and left side of the ditch 304. Moreover, the special road surface for the supplemental roller is installed on the outer side of the rim of the ditch.

FIG. 37 shows an upper view of the diverging (branching) section.

The diverging (branching) section is basically comprised of three section which are the diverging preparation section, the diverging confirmation sections and the diverging arrangement section. The edge of the diverging arrangement section forms a diverging point. In the diverging (branching) section, the X-Y direction LIM unit is installed on the road 300, and the diverging electromagnet unit 616 is installed on the side wall of the ditch. The edge of the diverging is formed by the front nose section 601, and the front nose is supported by the shock absorbing spring cylinder 605. The shock absorbing spring cylinder 605 is fixed on the guiding zone 613. Just in front of the front nose section 601 is the diverging point. The width of the ditch of the diverging (branching) 600 section is usually wider than that of the normal traveling section.

In the diverging preparation section, a wider width ditch is installed to have leeway for the LDPF to be able to take whichever direction for the pallet. The diverging (branching) conduct is completed by the automatic steering apparatus. However, the LIM (linear induction motor) system which have the ability to control not only the traveling direction, but also the lateral direction, or the electromagnet on the side wall, as a supplemental function.

The diverging preparation section is the section to prepare the system for divergence. Therefore, in this stage, the ASA being the function of selecting which direction the pallet will travel, the main lane or the branch ramp. When the pallet selects the induction cable of the branch ramp, the ASA steers the pallet along the induction cable of the branch ramp. At the same time, the position in the ditch of the LDPF, which is attached on the pallet, is shifting toward the direction of the side of the divergence from the center of the wide ditch section gradually. At that time, the position of the LDPF in the ditch is sensed at all times to confirm if the position of the LDPF in the ditch is shifting towards the side of the divergence from the center of the ditch. If this shift is not adequate, the angle of the steering is controlled to adjust.

Thus, the divergence (branching) is completed by the control of the angle of the steering of the wheel (tire) with automatic steering system. However, in case the linear motor is utilized as the propulsion force, the divergence (branching) is completed by adopting the X-Y direction LIM unit which is installed in the divergence section. The linear motor system is utilized as not only the propulsion force, but also as the divergent (branch) force. The X-Y direction linear induction motor is switched on based on the signal of the divergence (branching) for the pallet to diverge towards the pre-planned direction of pallet. This divergence is completed by not only by controlling the longitudinal direction of the traveling, but also the rectangular direction of the traveling to generate the divergent (branching) force.

In the diverging (branching) section, the position of the LDPF is sensed by the distance sensor to detect whether the pallet is traveling in the right position for the pallet to select the right direction which matches the original order, and the pallet is traveling in stable conditions. In certain cases, it is possible that the confirmation is completed by the LDPF while in contact with the side wall of the diverging (branching) section, in order to make sure the pallet is selecting the right track. Moreover, a permanent magnet is attached on the LDPF. The electromagnet is attached on the side wall of the ditch of the diverging (branching) section for the pallet to be able to diverge (branch) toward the expected direction by the electromagnet which pulls the LDPF toward the side wall of the preparation section of the diverging (branching) ditch while turning on the electromagnet.

The LDPF itself functions to diverge (branch) to draw nearer to the direction of the side wall in the same direction of the divergence. In this case, the LDPF has supplemental side roller to slide on the surface of the side wall of the ditch smoothly, even when the LDPF makes contact with the side wall. Before the pallet comes to the diverging (branching) nose section, the LDPF draws nearer to the side of the diverging direction in the ditch to start diverging while confirming the direction electronically. Also, contact between the LDPF and the side wall is utilized as a switch. The pallet can recognize which direction the pallet is going. Therefore, the LDPF is applied as the diverging sensor. In this figure, three types of diverging (branching) forces are shown such as the steering method, the linear motor method, and by the LDPF. Thus, these three or a combination of the three methods are available for divergence.

When the pallet passes through the divergent point, and passes over the point, the LDPF eventually goes through one of the ditches to complete the divergence. If the pallet went into a different lane from the expected lane, the pallet can make a U-turn at the next interchange or the pallet can select another optional route to go on with the same final destination by automatically reprogramming the system.

If all of the electronic control systems fail, the pallet passes through the diverging section with it's inertia. In such a case, at the diverging (branching) point, there is the possibility of contact with the front nose 605 of the LDPF and the side wall. However, even if the LDPF contacts with the wall, the diverging is completed. Because the front nose has the ability to slide on the wall with a sliding material on the front nose 605 of the LDPF. After the pallet passes over the diverging (branching) point, the pallet goes along it's preset route. In this case, after passing the divergent point, there is a widened width area for accepting the lateral sway of the LDPF. After the LDPF passes the diverging adjusting section, and the branching ramp, the main lane becomes a usual traveling section.

FIG. 38 shows the routine flow chart of divergence. Regarding the divergence, sensors which are in the routine flow chart are put on left side of the chart. First of all, the position of the pallet is sensed when the pallet proceeds into the divergent preparation section. The pallet arrives in the divergent preparation section, the system checks whether the pallet wants to branch out from the main lane or not. When the pallet wants to branch out from the main lane, the sensing is completed by the infrastructure and the pallet for the pallet to travel on the branch lane. If the pallet wants to remain in the main lane, the sensing is completed by the infrastructure and the pallet for the pallet to remain the lane. Also, the CPU of the infrastructure and the pallet control the out of the power of the LIM (linear induction motor) and the angle of the pallet's steering Then, the X-Y direction linear motor begins to function, next is the automatic steering system, finally the electromagnetic LDPF system begins to function. The X-Y direction linear motor not only produces longitudinal direction force on the track lane, but also in the lateral direction. Also, the electromagnetic LDPF system is the mechanism, that, when the LDPF is connected to the permanent magnet, absorbs by the electromagnet on the side wall of the ditch around the divergent section. This system changes the traveling direction of the pallet. However, the main diverging (branching) mechanism for the system is the automatic steering apparatus. The control of the traveling of the pallet is completed by feed-back information from the pallet speed sensors, distance sensors, position sensors and contact sensors. When the pallet proceeds into the divergence confirmation section, the pallet is still fully controlled automatically. However, even if the result is different from the original schedule, the pallet travels along the direction as it passes over the diverging point, unless an emergency occurs. When the diverging is succeeded, after the pallet passes over the diverging adjusting section, the routing of the divergence is finally completed. However, if the diverging is not completed as original scheduled, the cause is inspected and eventually a substitute rout is proposed. Then, all records are recorded and the next substitute traveling schedule is programmed.

FIG. 39 shows the bird's eye view of the diverging (branching) section. There is the divergent (branching) ditch 600. The front nose 601 is supported by the main supporting plate 606, and has the ability to move the head part of the front nose laterally by the plate hinge 607. Also, the nose possesses a mechanism for shock absorption with the installation of the shock absorbing spring cylinder 605. The side roller 609 is installed on the side wall of the front nose to slide the LDPF, when the LDPF contacts with the side wall of the nose section. The front nose 601 is tensioned by the nose strut 602 to face the front direction. The strut spring 603 is installed on the nose strut 602. The strut tread 604 is installed for the front nose 601 to move laterally. This provides the mechanism for the front nose 601 to face the front at all times even if the front nose is swayed laterally. The side roller is installed on the side wall of the divergent zone 613. Also, the X-Y direction LIM is installed on the road surface. In this figure, the divergent electromagnet unit 616 is installed on the side wall of the branching out ramp 611. The diagonally shaded area is the side wall of the main lane 621.

FIG. 39 shows the bird's eye view of the diverging (branching) section. Here is the divergent (branching) ditch 600. The front nose 601 is supported by the main supporting plate 606, and has the ability to move the head part of the front nose laterally with the plate hinge 607. Also, the nose has a mechanism of shock absorption utilized with the installation of the shock absorbing spring cylinder 605. The side roller 609 is installed on the side wall of the front nose to slide the LDPF, when the LDPF contacts with the side wall of the nose section. The front nose 601 is tensioned by the nose strut 602 to face the front direction. The strut spring 603 is installed on the nose strut 602. The strut tread 604 is installed for the front nose 601 to move laterally. This provides the mechanism for the front nose 601 to face the front at all times even if the front nose is swayed laterally. The side roller is installed on the side wall of the divergent zone 613. Also, the X-Y direction LIM is installed on the road surface. In this figure, the divergent electromagnet unit 616 is installed on the side wall of the branching out ramp 611. The diagonally shaded area is the side wall of the main lane 621.

FIG. 40 shows the bird's eye view of the diverging (branching) section. This is the divergent (branching) ditch 600. The front nose 601 is supported by the main supporting plate 606, and has the ability to move the head part of the front nose laterally with the plate hinge 607. Also, the nose has a mechanism of shock absorption with the installation of the shock absorbing spring cylinder 605. The rolling belt 620 is installed on the front nose 601 to slide the LDPF, also the roller 619 is installed for the rolling belt 620 to rotate and for the LDPF to slide smoothly. The front nose 601 is tensioned by the nose strut 602 to face the front direction. The strut spring 603 is installed on the nose strut 602. The strut tread 604 is installed for the front nose 601 to move laterally. This provides the mechanism of the front nose 601 to face the front at all times even if the front nose is swayed laterally.

FIG. 41 shows the bird's eye view of the diverging (branching) section. This is the divergent (branching) ditch 600. In the ditch section, the bottom expanded area 622 is installed where as it is seen as the cross section of this area to match with the expanded section of the LDPF. The front nose 601 is supported by the main supporting plate 606, and has the ability to move the head part of the front nose laterally with the plate hinge 607. Also, the nose has a mechanism of shock absorption with the installation of the shock absorbing spring cylinder 605. The rolling belt 620 is installed on the front nose 601 to slide the LDPF. The roller 619 is installed for the rolling belt 620 to rotate and for the LDPF to slide smoothly.

FIG. 42 shows the bird's eye view of the diverging (branching) section. This is the divergent (branching) ditch 600. In the ditch section, the bottom expanded area 622 is installed as it is seen as the cross section of this area to match with the expanded section of the LDPF. The front nose 623 is composed of an elastic material and is supported by the main supporting plate 606, and has the ability to move the head part of the front nose laterally with the plate hinge 607. Also, the nose has a mechanism for shock absorption with the installation of the shock absorbing spring cylinder 605.

FIG. 43 shows the upper view of the mergingsection.
The merging section is the section which the pallet merges from the merging ramp to the main lane. This section is comprised of the simulation section, which is installed in the merging ramp, the merging confirmation section, the affected section of the main lane and the merging completion section in both of the sections. The expected time and point at which the pallet enters the merging section, are simulated by the pallet's CPU and the road side computer when the pallet is in the simulation section.

When many pallets are traveling in the region of the affecting section from the main lane, the speed of the pallet in the merging ramp is adjusted so as not to collide with the pallet in the main lane at the merging point when the pallet is in the merging ramp and passes through the merging confirmation section. In the case of using the linear motor as the propulsion force, the speed of the pallet is adjusted by controlling the output of the linear motor.

The pallet travels on the main lane without interference. The pallet on the main lane travels without changing it's speed. However, the traffic conditions of the main lane are the most critical issues for the other pallets merging into the main lane. Therefore, the information about the pallet on the main lane entering the area where the pallet may affect traffic conditions is important. Information from the affecting section is always sensed by the sensor installed in the road side or pallet. Then, the sensed information is sent to the other pallet's CPU and the road side CPU.

The pallet traveling on the merging ramp, merging into the main lane, starts controlling it's headway distance in the simulation section. If there is an other pallet on the main lane, simulating the merging is impossible. The mode for the pallet on the merging ramp turns into the waiting mode and the pallet is enforced to wait until the other pallet passes. If headway distance is needed by the simulation, the mode turns to the traffic regulation mode. The pallet may continue toward merging point while confirming the secured headway distance in the confirmation section. The confirmation section is the final decision section for the pallet whether it may continue or not. The confirmation is performed based on the sensed information and the results of the simulation.

In this detailed description, the simulation is performed based on the information of the position of the pallet on the road, the line shape of the lane in proximity to the point of the pallet, by the road side computer. Then the speed of the pallet is controlled so as not to collide at the merging point with the other pallet which is traveling on the main lane. The result of the simulation by the road side computer is fed back to control the speed of the pallet on the ramp. In the case of when the linear motor is used as the propulsion force, the acceleration and deceleration power of the linear motor is strong enough to control the speed of the pallet on the ramp within the merging confirmation section. If the pallet does not have enough headway against the main lane pallet. Or if the electronic fail safe system such as the emergency stoppage system or the collision avoidance lane does not function, the infrastructure stopper, which stops pallet forcibly by the side of the infrastructure, is installed at the end of the merging confirmation section. Therefore, if the pallet on the merging ramp is not adjusted to have enough headway in the merging confirmation section, it will be stopped by the infrastructure stopper immediately. Thus, when the headway of the merging pallet from the merging ramp cannot be adjusted in the simulation, the pallet is introduced to the stoppage line mechanically. As a result, a collision of the merging pallet and the pallet on the main lane is avoided.

The adjustment of the headway and the relation of two pallets in the affecting section is complete, the pallet on the merging ramp then merges into the main lane. Then, the result of the information concerning the merging is transmitted to the infrastructure computer. All of the procedures of merging is then complete when the pallet passes through the mergingconfirmation section.

FIG. 44 shows the flowchart of the mergingroutine.
The merging section is the section that the pallet produces into the main lane from the merging ramp. The merging section is comprised of the simulation section, the merging confirmation section, the affecting to the main lane section and the merging adjusting section.

First of all, the timing of the merging of the pallet, which enters the merging ramp is simulated in the simulation section by the road side computer. If the other pallet is traveling in the affecting section on the main lane, the speed of the pallet on the merging ramp is controlled so as not to collide with the other pallet on the main lane until the pallet passes through the merging confirmation section. In the case of when the linear motor is used as the propulsion force, the speed is controlled by the output of the road side linear motor.

The pallet on the main lane has the right-of-way. Thus, the pallet continues to travel on the lane without reducing it's speed. However, the traffic condition of the main lane is important information for the other pallets on the merging ramp, according to whether it can merge or not. Therefore, the information such as if the pallet on the main lane is traveling in the section of the affecting section is always sent to the pallet's CPU and the road side CPU. This information is collected by sensing with the pallet sensor or the road side sensor.

The pallet on the merging ramp, which is attempting to enter the main lane, starts adjusting the headway with the other pallet in the simulation section. When there is another pallet in the affecting section in the main lane and the merging without adjusting simulated is negative, the traveling mode is turned to the as waiting mode. Then, the pallet on the merging ramp must wait until the pallet on the main lane passes through. If the simulation results show the pallet on the merging ramp needs more headway, the mode is turned to the traffic control mode. Then, the traveling of the pallet on the ramp is regulated to enter the merging point while the pallet is traveling in the confirmation section with confirming the headway. The confirmation section while the final section to decide if the pallet is to enter the main lane. Thus, the merging is simulated once more by the electronic signal and this information based on these simulations.

In this detailed description, the virtual reality simulation is performed based on the information of the position of the pallet on the road, the line shape of the lane in proximity to the point of the pallet by the road side computer. Then, the speed of the pallet is controlled so as not to collide at the merging point with the other pallet, which is traveling on the main lane. The results of the simulation by the road side computer are fed back to control the speed of the pallet on the ramp. In the case of when the linear motor is used as the propulsion force, the acceleration and deceleration power of the linear motor is strong enough to control the speed of the pallet on the ramp within the merging confirmation section. Even if the pallet cannot have enough headway against the main lane pallet, the distance of the confirmation is great enough to decelerate the pallet.

Even if the electronic fail safe system becomes necessary to use; the infrastructure stopper, which stops the pallet forcibly using the infrastructure, is installed at the end of the merging confirmation section. Therefore, if the pallet on the merging ramp is not adjusted to have enough headway in the merging confirmation section, it will be stopped by the infrastructure stopper immediately.

Thus, when the headway of the merging pallet from the merging ramp cannot be adjusted according to the results of the simulation, the pallet is introduced to the stoppage line mechanically. As a result, provability of the merging pallet and the pallet on the main lane is avoided.

The adjustment of the headway and the relation of two pallets in the affecting section is final. The pallet on the merging ramp then merges into the main lane. The results of the information concerning the merging is transmitted to the infrastructure computer. All of the procedures of merging is then finalized when the pallet passes through the merging-confirmation section.

FIGS. 45 and 46 shows the step wise figure of diverging. In the upper portion of FIG. 45 there is an automobile 100 which is fixed on the pallet 200 by the WFA 215. It travels on the road surface 309 which is installed on the road 300. In the lower portion of the figure, said pallet 200 is entering the divergent section. The divergent front nose 601 appears in the ditch 304 on the side of the LDPF 238 installed on the pallet 200. The pallet 200 selects the right side of the branching ramp 600 from the main lane.

The upper portion of FIG. 46 shows the pallet just after diverging The LDPF 238 has selected the right side branching ramp 600. The other branching side, which is the left side, is still under the wheel 228 of the pallet. In this situation, diverging is already finished. The pallet is no longer able to select the left side of the branching ramp. The lower portion of the figure shows the pallet 200 travels furthermore, the left side of the branching ramp 600 is far from the pallet. At this point, the right side of the branching ramp becomes the main lane.

FIG. 47 shows the bottom view of the pallet 200.
The LDPF 238 is installed on both the front and rear on the bottom side of the pallet 200. The supporting wheel for the pallet is a multiple-tire 230. As with the automatic steering apparatus, there is a steering actuator 230. Also, there is a steering rod 568 to receive the steering power from the steering actuator 569 to transmit the steering quantity. The steering actuator moves the steering rod an optimal amount based on the order from the electronic control unit ECU. The LDPF 238 is traveling in the ditch without contact to the wall. However, it prevents the pallet 200 from deviating from the lane. The supplemental side roller is installed on the LDPF to reduce friction. When the pallet is deviating from the lane, the LDPF touches the side wall of the ditch. Also, the pallet 200 travels using the linear induction motor, and the reaction plate is installed on the pallet 200. In this figure, the pallet 200 reduces it's speed by using the plate brake, and the brake pad is installed on the pallet.

FIG. 48 shows the block diagram of the mechanism of the automatic steering apparatus.

Two LDPFs 238 are installed on the bottom side of the pallet 200. The LDPF 238 is traveling in the ditch. Also, the side way distance sensors 524 are installed on the LDPF 238, which detect the gap between the side wall and the LDPF. The attitude and whether or not the pallet is traveling along the lane is detected by these sensors 524. The following explanation is the procedure to operate the automatic steering apparatus. First of all, the side way distance sensor 524 detects the gap between the side wall and the LDPF in both of the longitudinal direction and the lateral direction. The pallet speed sensor are installed on the wheels of the pallet. (Basically this is same as the speed sensor which is installed on the ordinary automobile) Each pallet's position in the transportation system is detected by the side of the infrastructure and the speed of each pallet is determined. The general information such as the aforementioned sensed information is first collected for the automatic steering apparatus. Next is electronic control unit. The target steering angle is calculated by the ECU (Electronic Control Unit). When it is calculated, the CPU's calculations are based on the information data base such as the ROM which holds the programs; the RAM, which holds the traveling records and the intelligent information data base which stores the behavior of each pallet. After the stroke of the steering angle and the target final angle of the wheel are determined, the electric output to operate the steering actuator is adjusted to complete the steering When the steering is operated, the pallet responds and follows the lane. Also, the results of the following lane are detected. The ECU calculates the steering angle and the final target angle of the wheel transmits the order electronically to operate the steering actuator. As explained above, the steering of the pallet is automatically controlled by the continuous feed back control system. The feed forward control system is made possible by predicting the pallet's movement, if it programmed properly.

FIG. 49 shows the distance measuring system of the distance sensor which is installed on the LDPF.
In the lower part of the LDPF 238, two laser distance sensors are installed on the front face and two sensors are on each side. The sensors on the front are set at both the right and left equidistant from the center 277 of the LDPF at a right angle line of the traveling direction. One is a right front distance sensor 254, the other is a left front distance sensor 255. These front laser distance sensors radiate the laser to the longitudinal direction of the pallet 200 and they measure the front distance by detecting the reflection. They detect the distance between the sensor 253 and the side wall of the ditch 337 in front of the pallet. While the pallet is traveling along a straight line of the main lane, there is no reflection. Thus, the result of the detection can indicate whether the pallet is traveling in a straight line of the lane or in a curved lane. In this figure, the distance between these right and left front distance sensors and the side wall of the ditch 337 in front of the pallet is defined as x1: 256, x2: 257, respectively.

On the other hand, on both sides of the LDPF, located on the point equidistant from the center 277 of the LDPF and the point, at the 90 degrees of the longitudinal line, two sensors are installed. One is the left side distance sensor 278, and the other is right side distance sensor 279. These sensors radiate a laser light to the direction of 90 degrees of longitudinal direction of the pallet toward the side wall of the ditch, respectively, to detect the distance between the sensor and both side walls 377. Then, the detected distance is defined as follows. Y1:258, y2: 259.

FIG. 50 shows the distance detecting system which is installed on the LDPF 238 in the curving section of the road 300.

This figure actually shows step wise how the to measure the result of the distance with the distance sensor installed on the LDPF as the pallet moves toward the curving section. The pallet 200 is traveling from the bottom section to the upper section along the ditch 305, which is located at the curved road 300 in this figure. Two of the laser distance measuring sensors 260 are installed on both the right and left side of the lower part of the LDPF. Also, these sensors 260 are installed at the point which is equidistant from the center of the LDPF 238 and the point which is 90 degrees of the longitudinal line. These sensors 260 are mounted as one body which combines the front distance measuring sensor and the side distance measuring sensor. The one bodied distance sensor 260 is able to detect both the longitudinal and lateral direction of the pallet while radiating the laser in both directions. The one bodied sensor 260 detects the distance between the sensor and the side wall of the ditch 337 in the front direction, and the distance between the sensor and the side wall of the ditch 337 in the lateral direction. Usually, while the pallet travels in a straight lane, there is no reflection, due to there being no obstacles. Therefore, the sensor can recognize whether the lane is straight or curved. In this case, the distances are defined as follows.

x1: 256, x2: 257 is measured as the distance between both the right and left sensors installed on the LDPF and the front side wall of the ditch 337 using the sensors.

y1: 256, y2: 257 is measured as the distance between both the right and left sensors installed on the LDPF and the lateral side wall of the ditch 337 using the sensors.

Then, the following errors are calculated.

Error 1=x1/x2
Error 2=y1/y2

For example, when the error 1 becomes larger than error 2, the pallet is steered left. Reversibly, when the error 1 becomes smaller than the error 2, the pallet is steered right. Also, when the error 1 equal to error 2, the pallet travels straight, as it has been traveling.

The steering angle o right or left, which the pallet steers, is determined based on the ratio or size of the error which is calculated above. Driving along the lane becomes possible even when the lane is curved. Also, the operation of the steering is fully automated in this invention.

In this figure, the pallet moves as time passes. At this point, the relation of time and position is expressed as follows.

Po: the first position 261 of the pallet
P1: the next position 262, t1 seconds after the first position
P2: the LDPF's position 263, t2 second after the first position. The position is assumed because the pallet has been deviated from the center of the lane because the angle of the pallet's steering has not matched correctly (virtual position).
P3: the LDPF's position 264, t3 second after the first position.

When the pallet is traveling on the lane, the distance sensor detects the following distances.

x1: front left distance (distance between the side wall and the sensor) 256 x2: front right distance (distance between the side wall and the sensor) 257 y1: left side distance (distance between the side wall and the sensor) 258 y2: right side distance (distance between the side wall and the sensor) 259 x'1: front left distance (distance between the side wall and the sensor) 265 x'2: front right distance (distance between the side wall and the sensor) 266 y'1: left side distance (distance between the side wall and the sensor) 267 y'2: right side distance (distance between the side wall and the sensor) 268

X1: front left distance (distance between the side wall and the sensor) 269

X2: front right distance (distance between the side wall and the sensor) 270

Y1: left side distance (distance between the side wall and the sensor) 271

Y2: right side distance (distance between the side wall and the sensor) 272 x"1: front left distance (distance between the side wall and the sensor) 273 x"2: front right distance (distance between the side wall and the sensor) 274 y"1: left side distance (distance between the side wall and the sensor) 275 y"2: right side distance (distance between the side wall and the sensor) 276

At this stage, the angle of steering is determined based on the error ratio during operation of the steering. For example, the front left distance is calculated as follows.

error 1=(x1−x'1)/t1
error 2=(x'1−X1)/(t2−t1)
error 3=(X1−x"1)/(t3−t2−t1)

The direction of steering and the curve are simulated based on the error data which is obtained from such above calculations. Thus, the pallet is able to keep traveling along the line of the lane, even when the lane is curved and the pallet does not recognize it's curvature.

FIG. 51 shows the front view of the relation between the road structure of the road 300, the LDPF which is installed on the automobile (car) 100, and the propulsion module 400.

The LDPF 238 is attached on the automobile (car) 100 directly, and the LIM (primary side) unit 301 is installed in the road 300. The automobile (car) 100 is supported by the tire 105, and the automobile is guided by the tire 105. Also, the tire 105 is rolling on the traveling road surface 309. On ordinary roads, the automobile (car) 100 is driven by the automobile's (car's) internal engine or by an electric motor. However, in this system on the road 300, the automobile (car) 100 is driven by the LIM (linear induction motor). The propulsion module 400 is comprised of the LIM (primary side) unit 301, which is installed on the road 300, and the reaction plate 401, which is installed on the bottom side of the automobile (car) 100. The reaction plate 401 is supported by the LIM supporting frame 402. The LIM supporting frame 402 is installed on the propulsion module supporting arm 403, which is installed on the bottom side of the automobile (car) 100.

FIG. 52 shows the front view.

Figure 1:
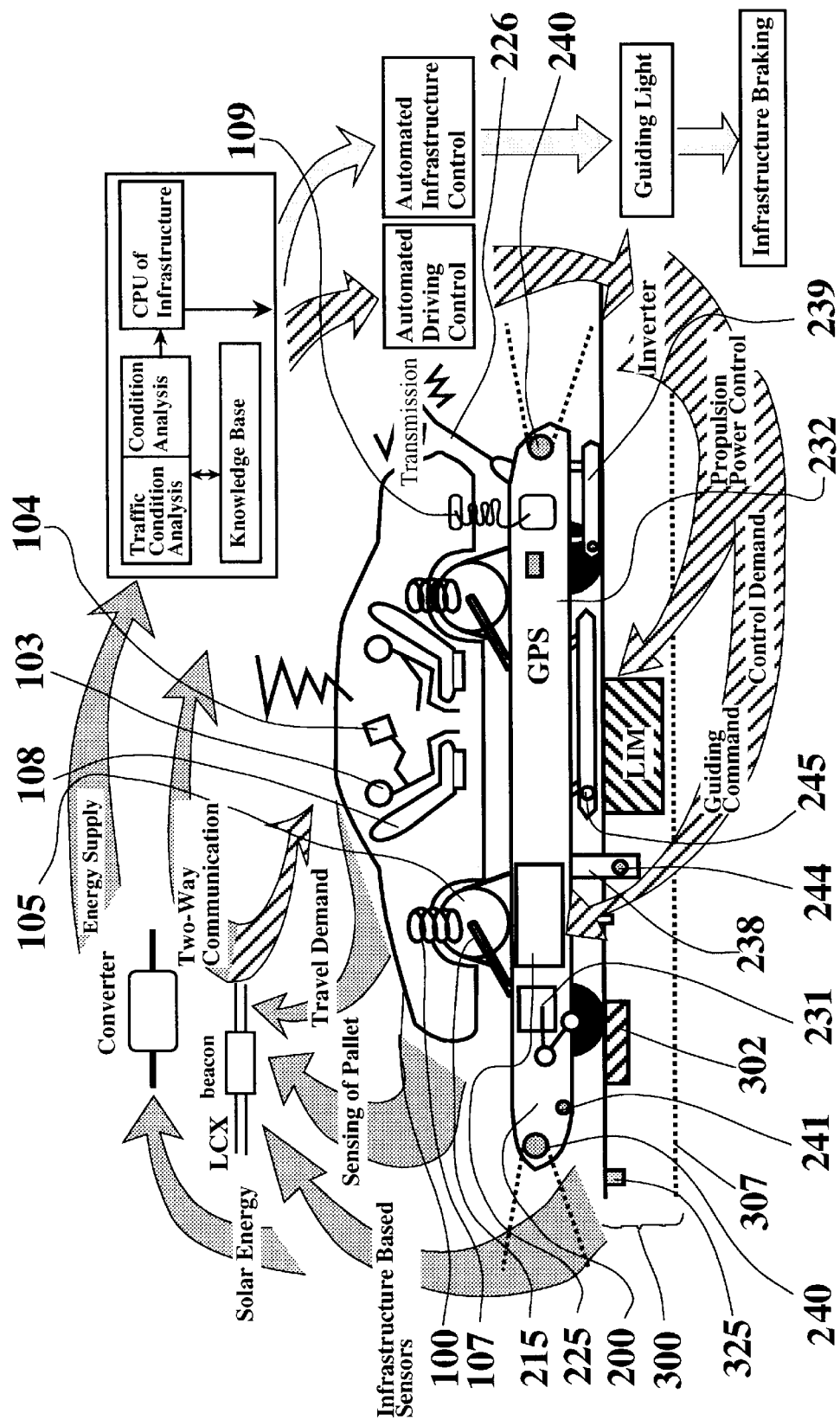
Figure 2:
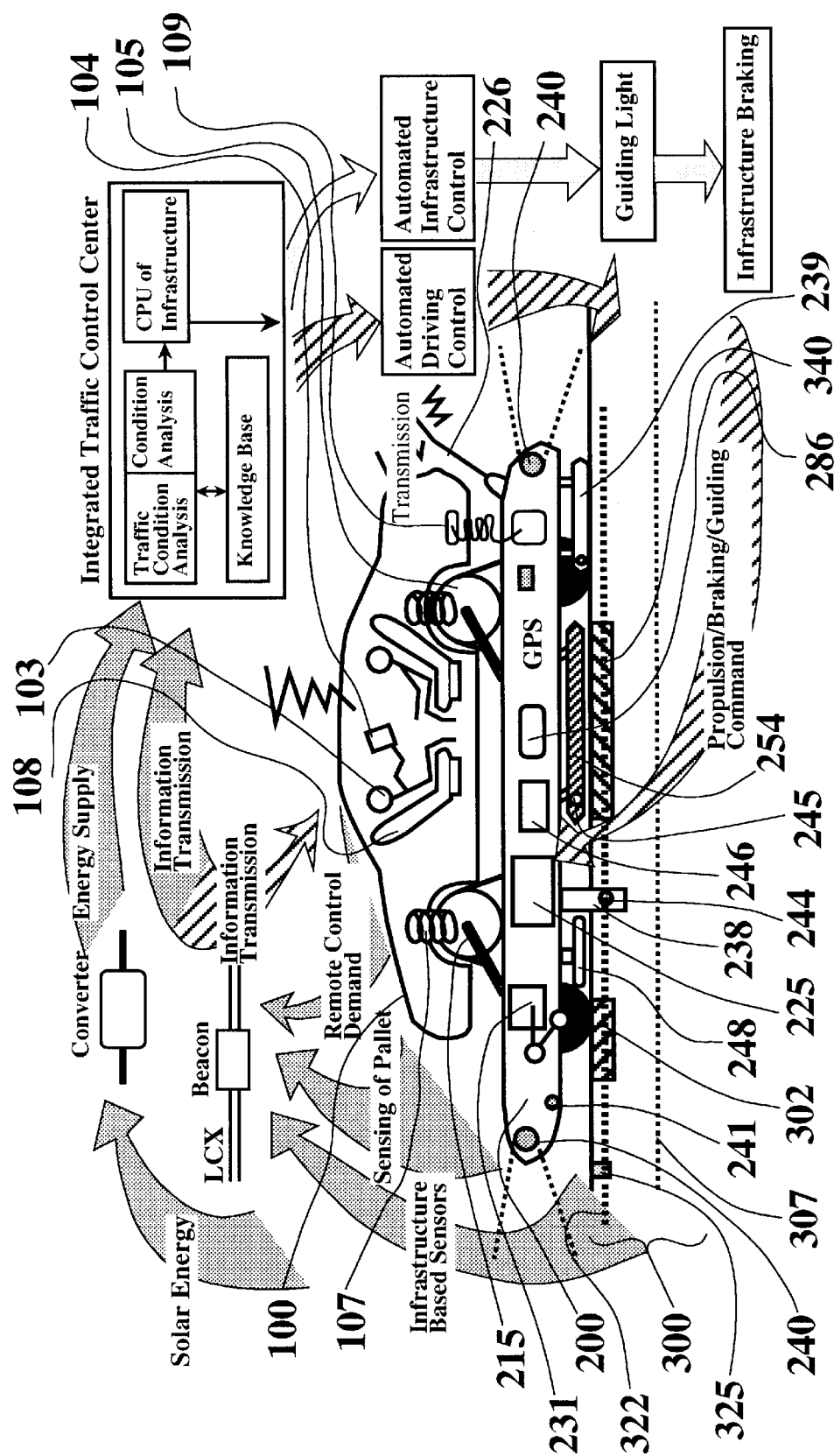
Figure 3:
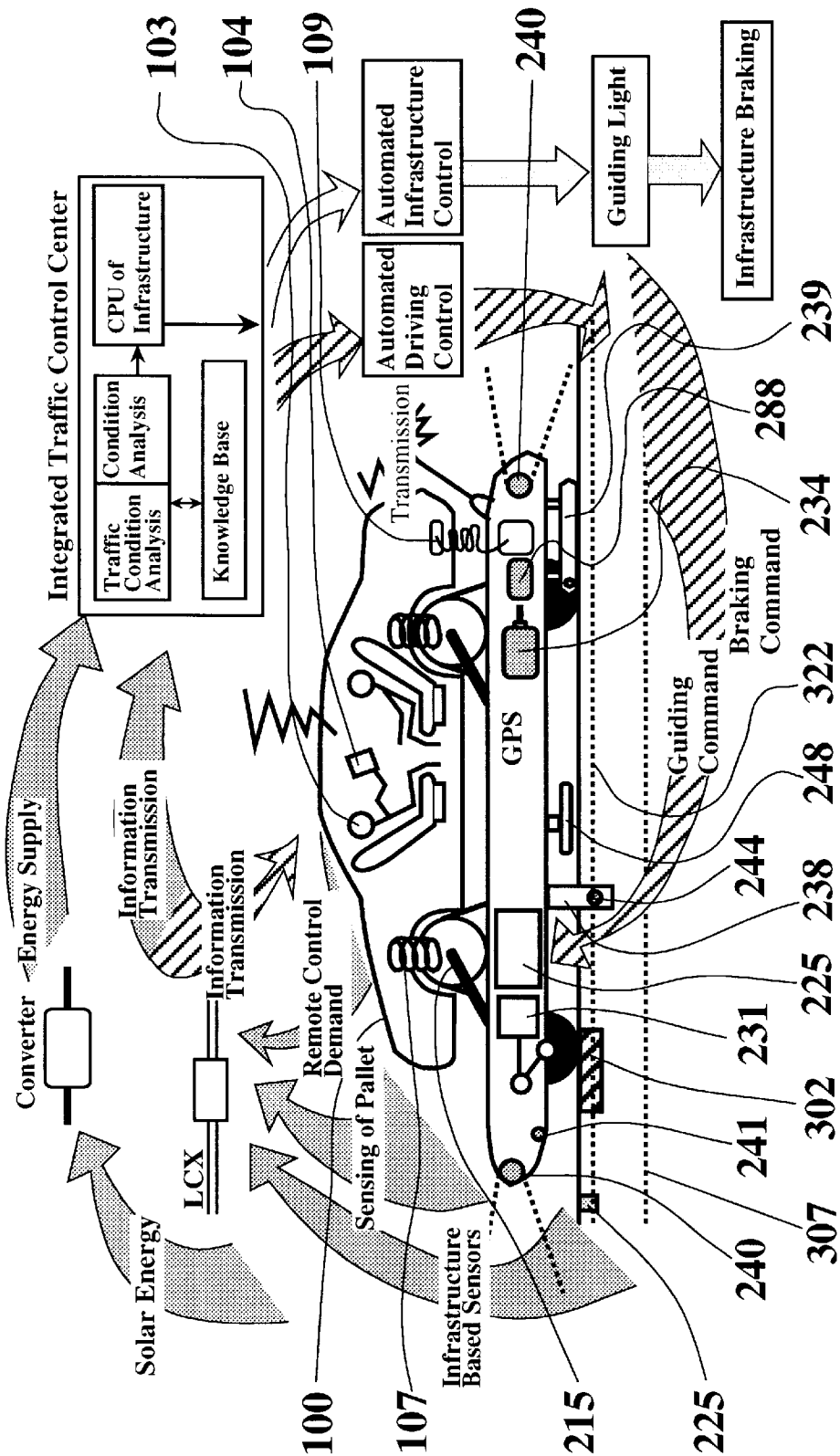
Figure 4:
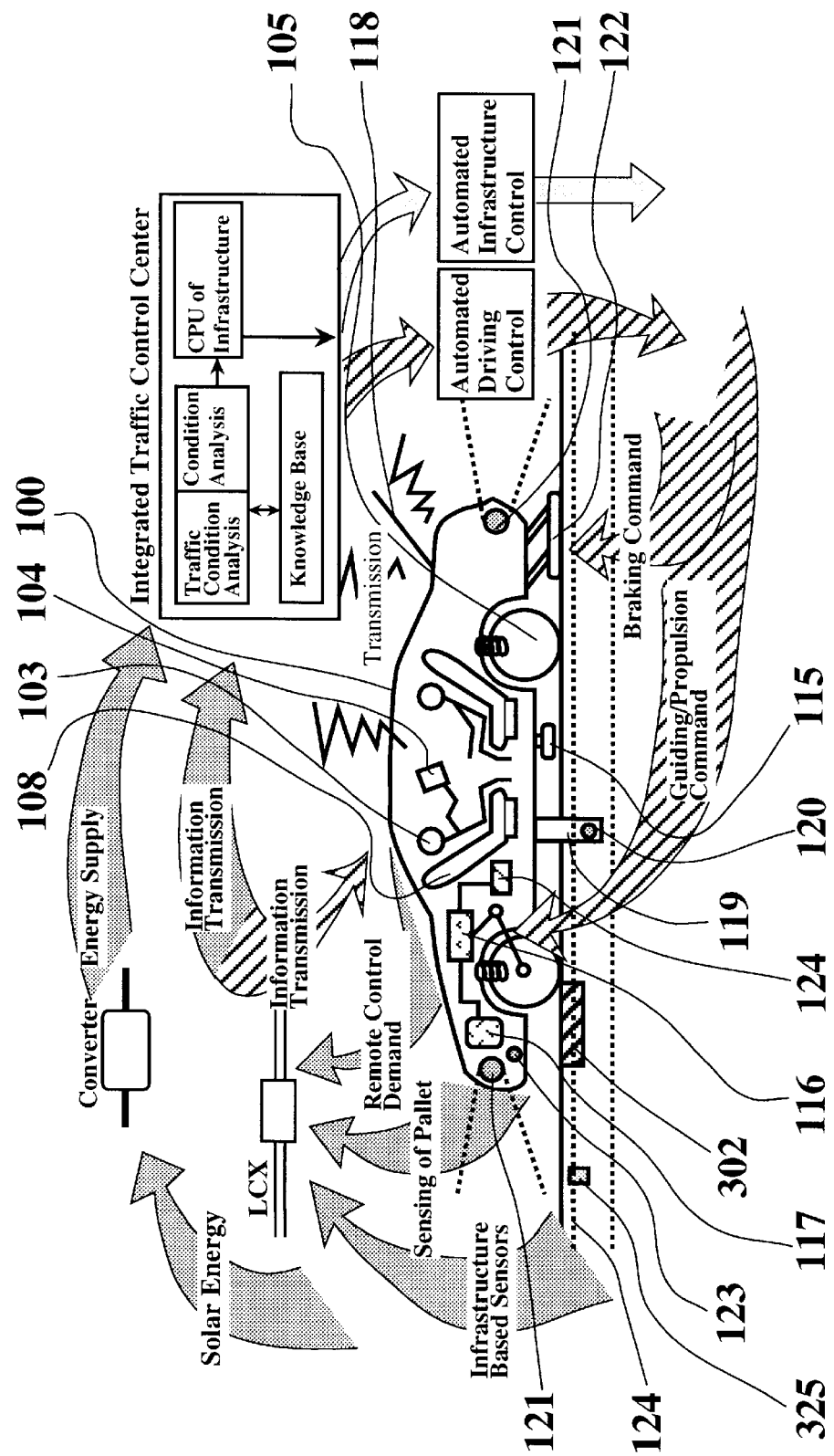
Figure 5:
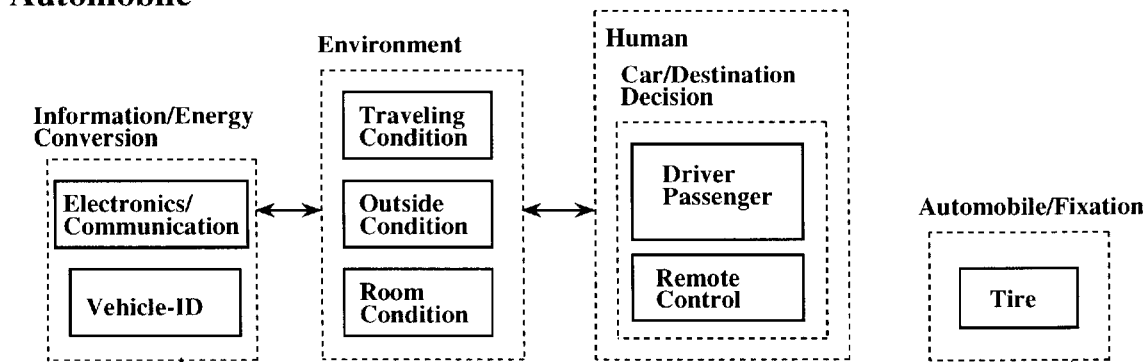
Figure 5:
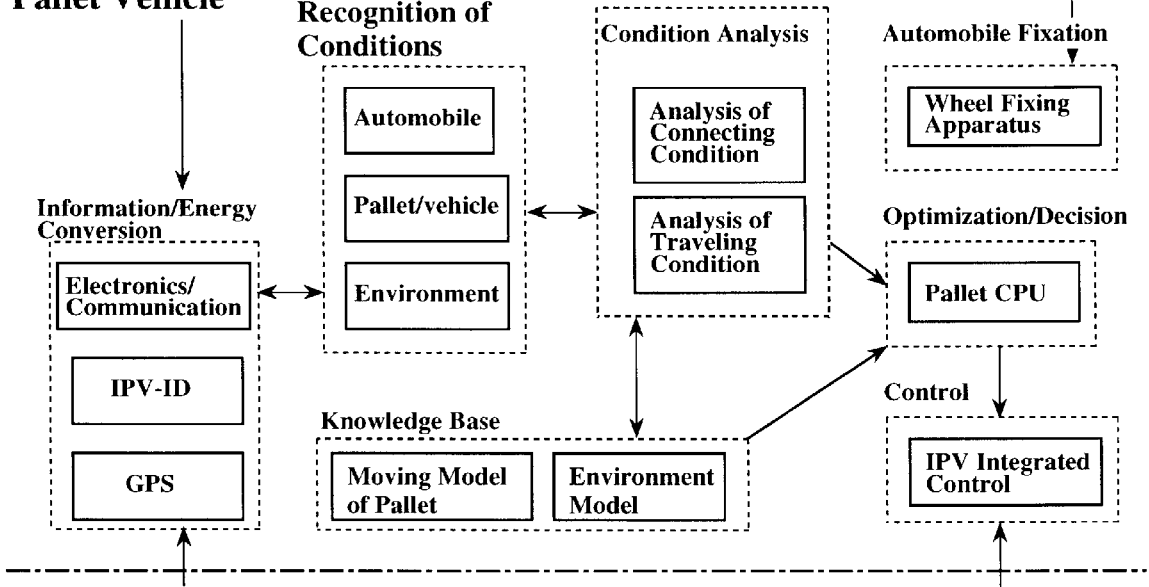
Figure 5:
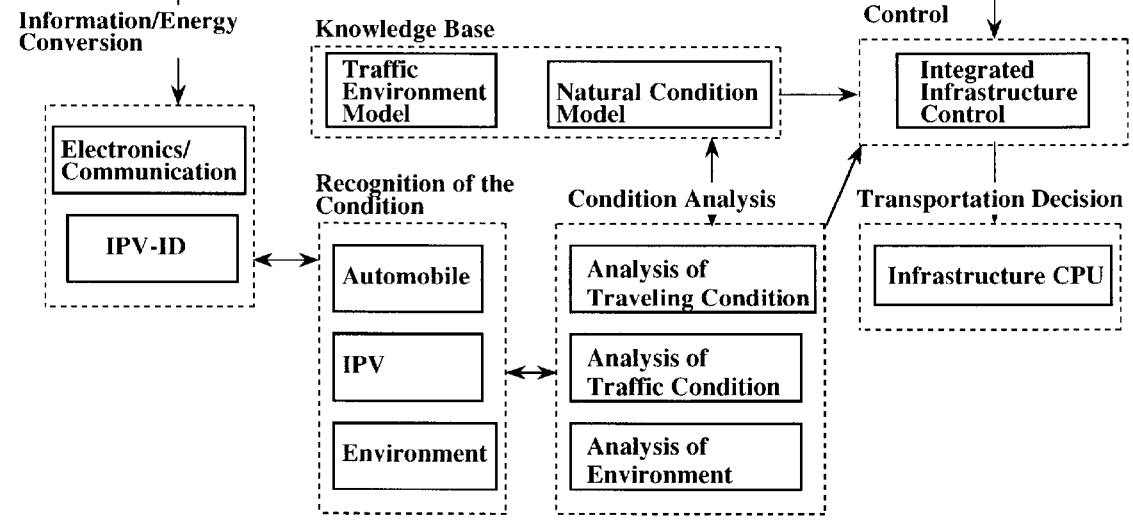
Figure 6:
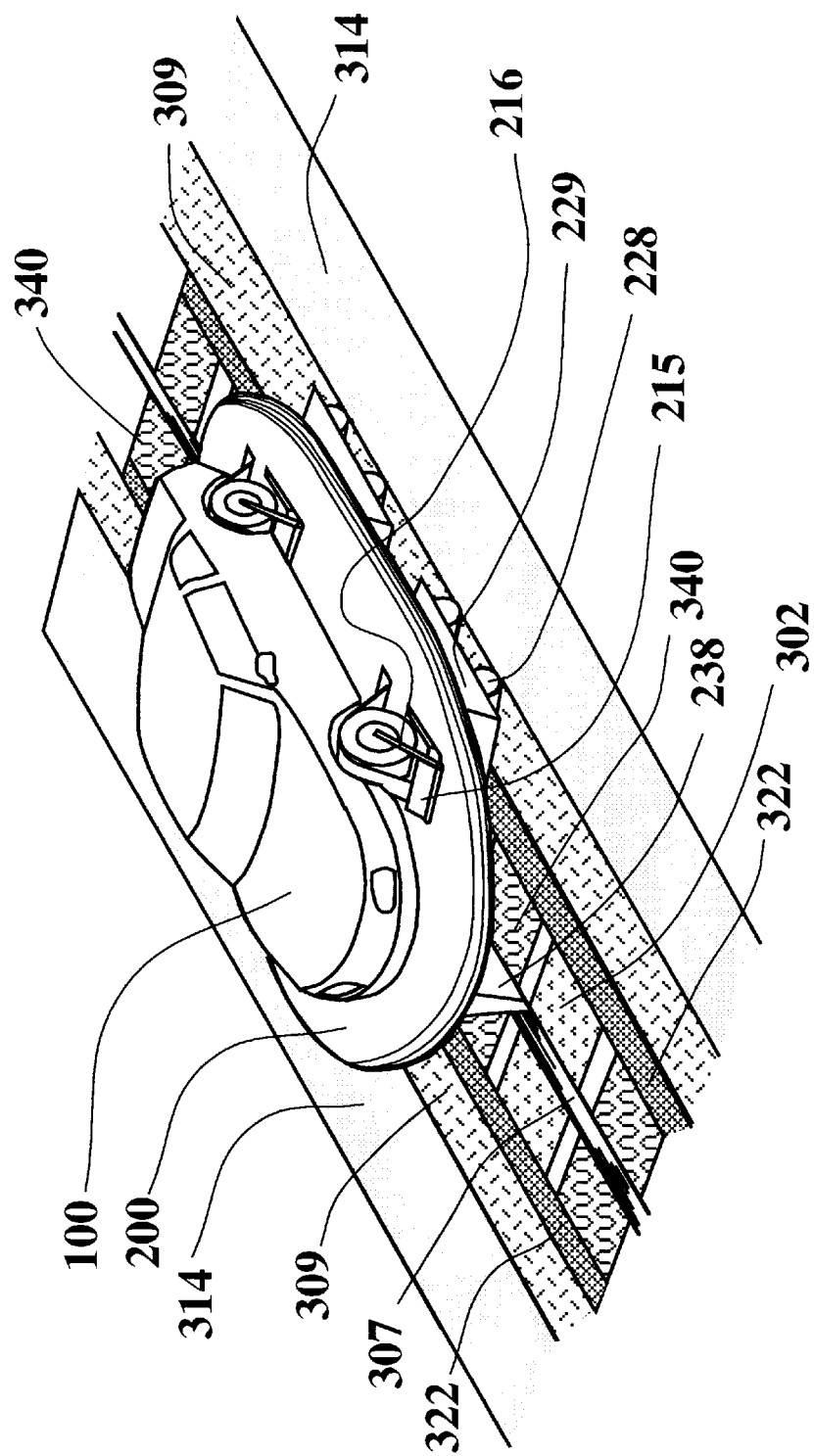
Figure 7:
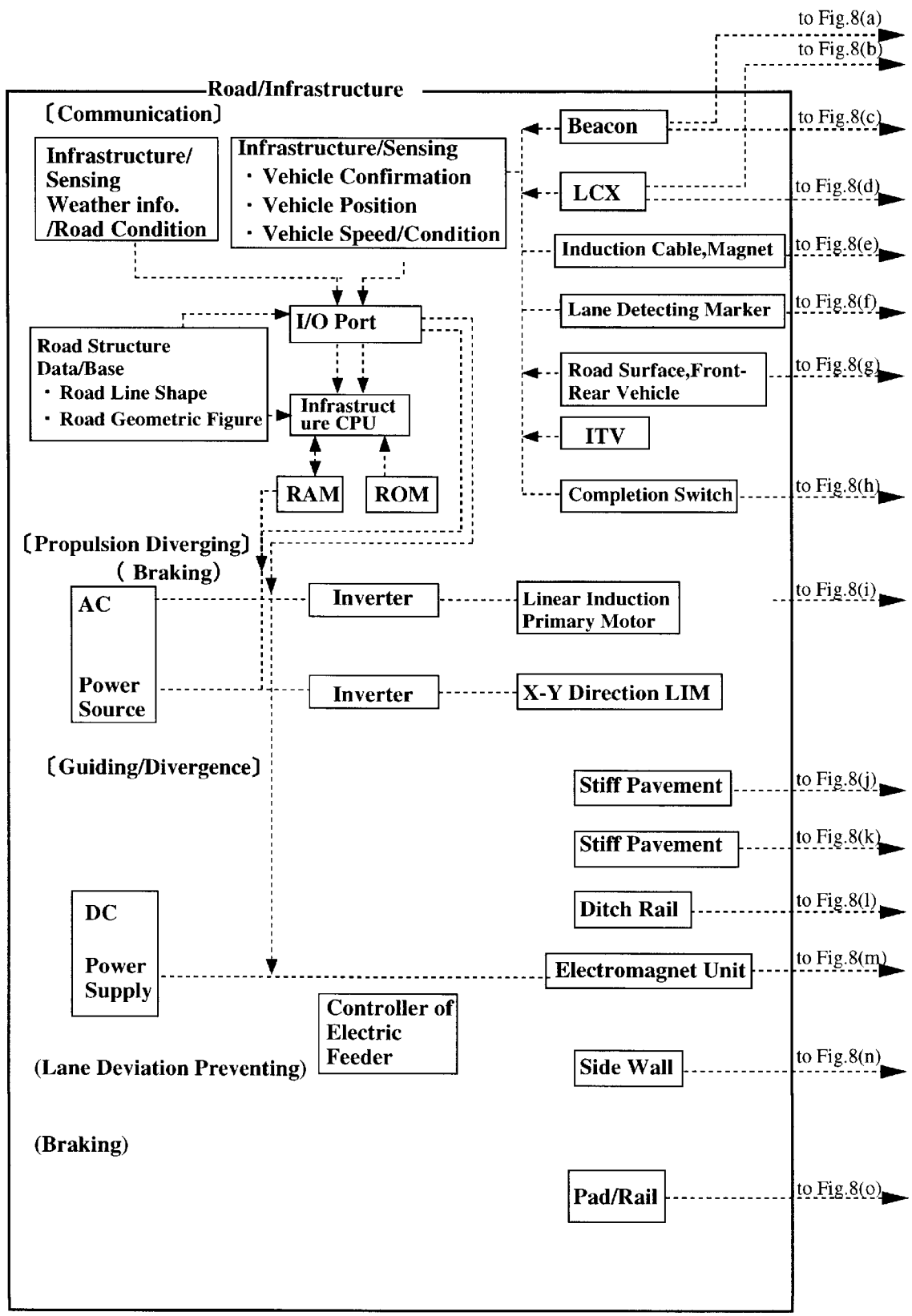
Figure 8:
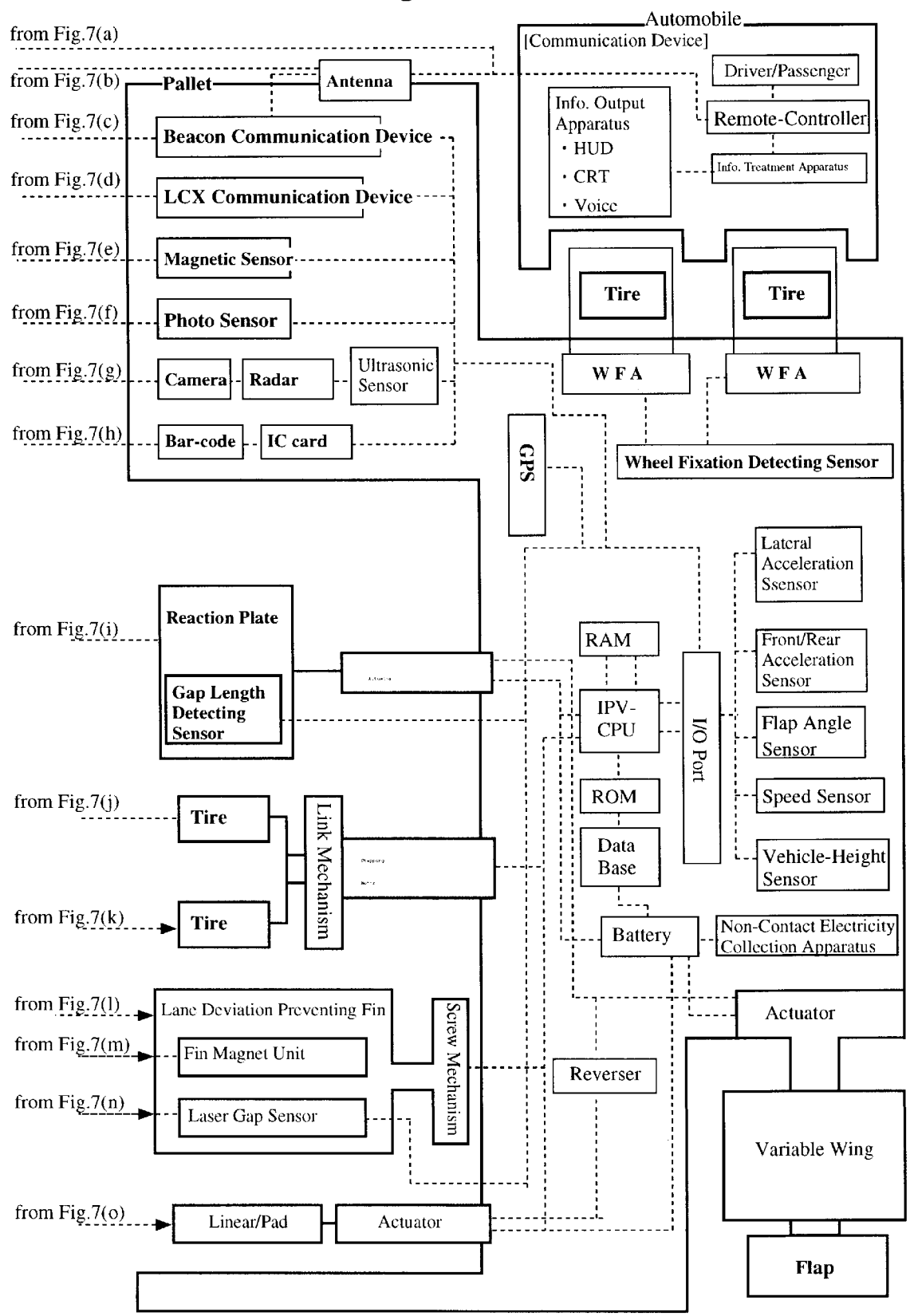
Figure 9:
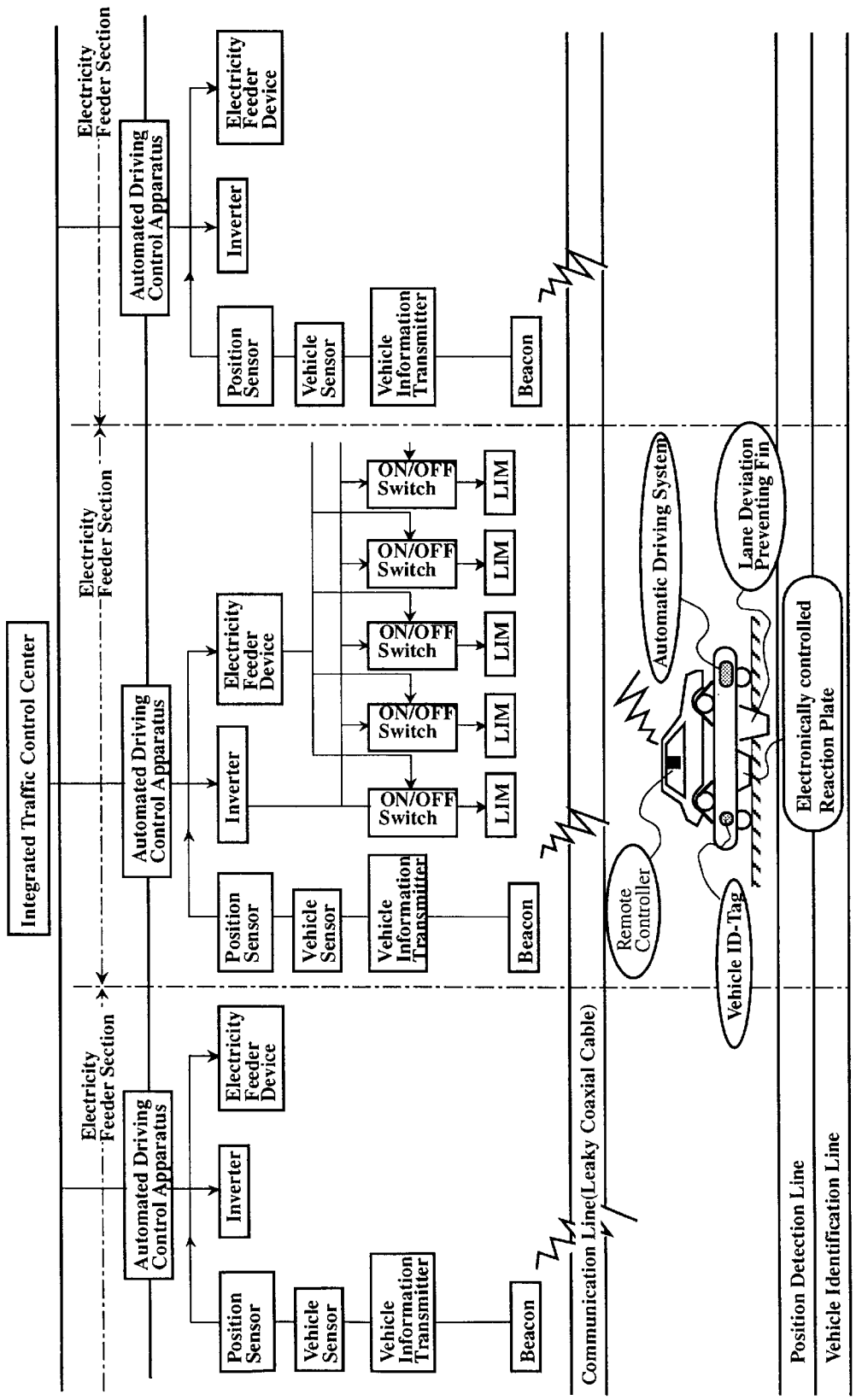
Figure 10:
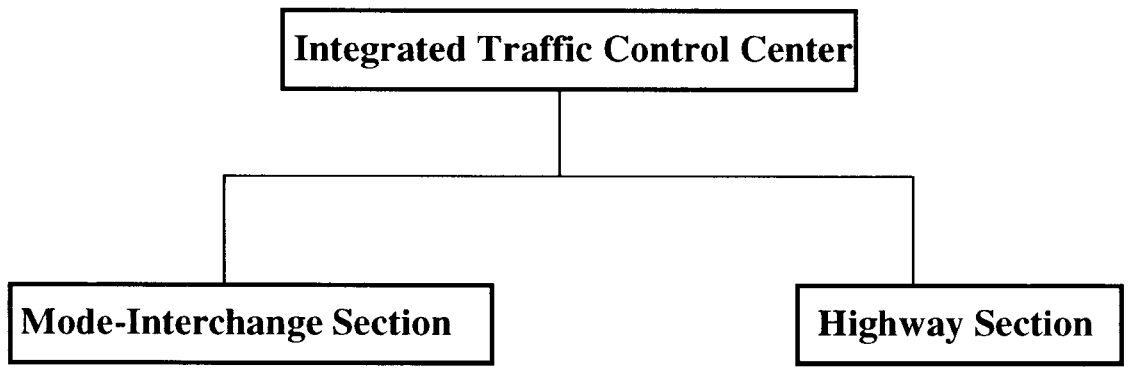
Figure 11:
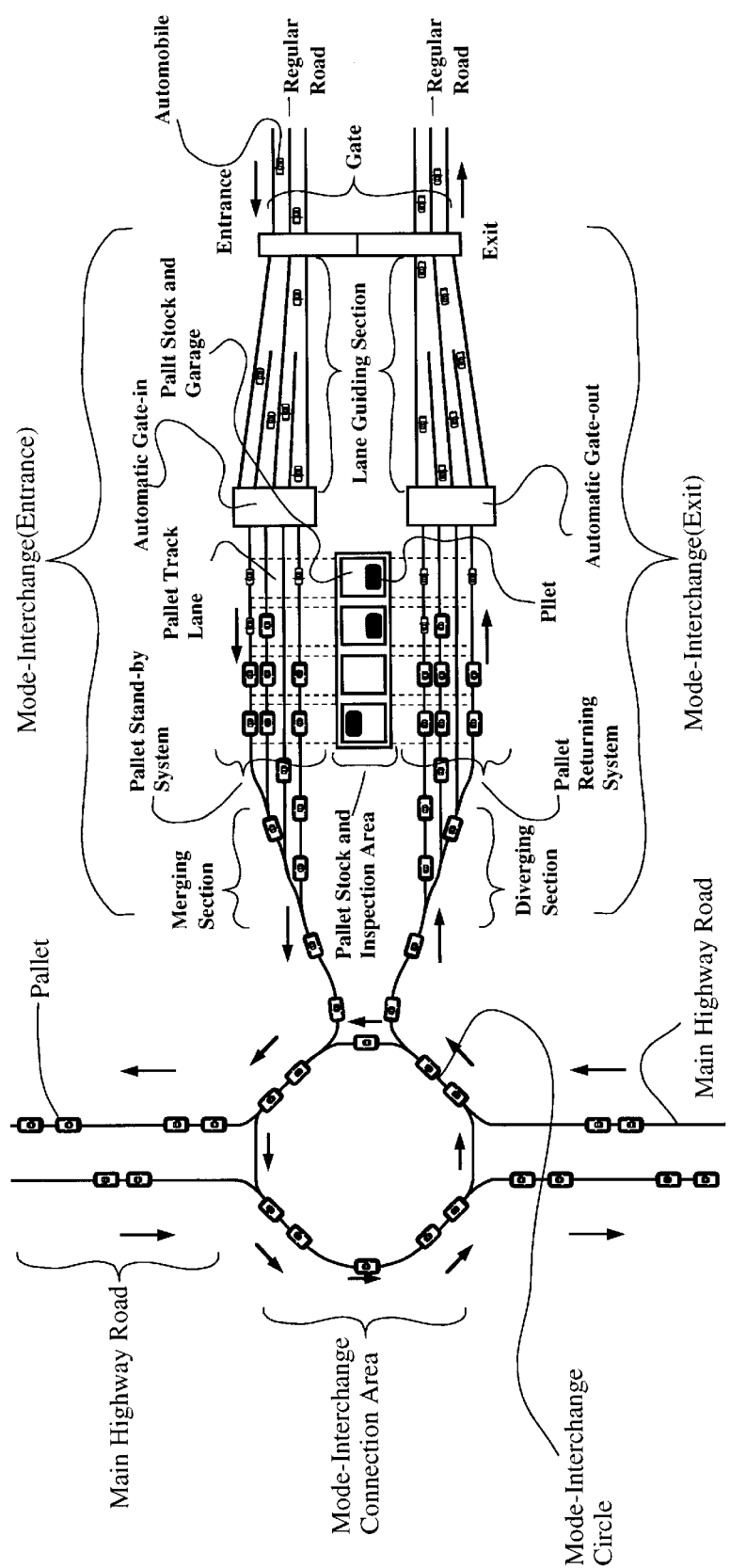
Figure 12:
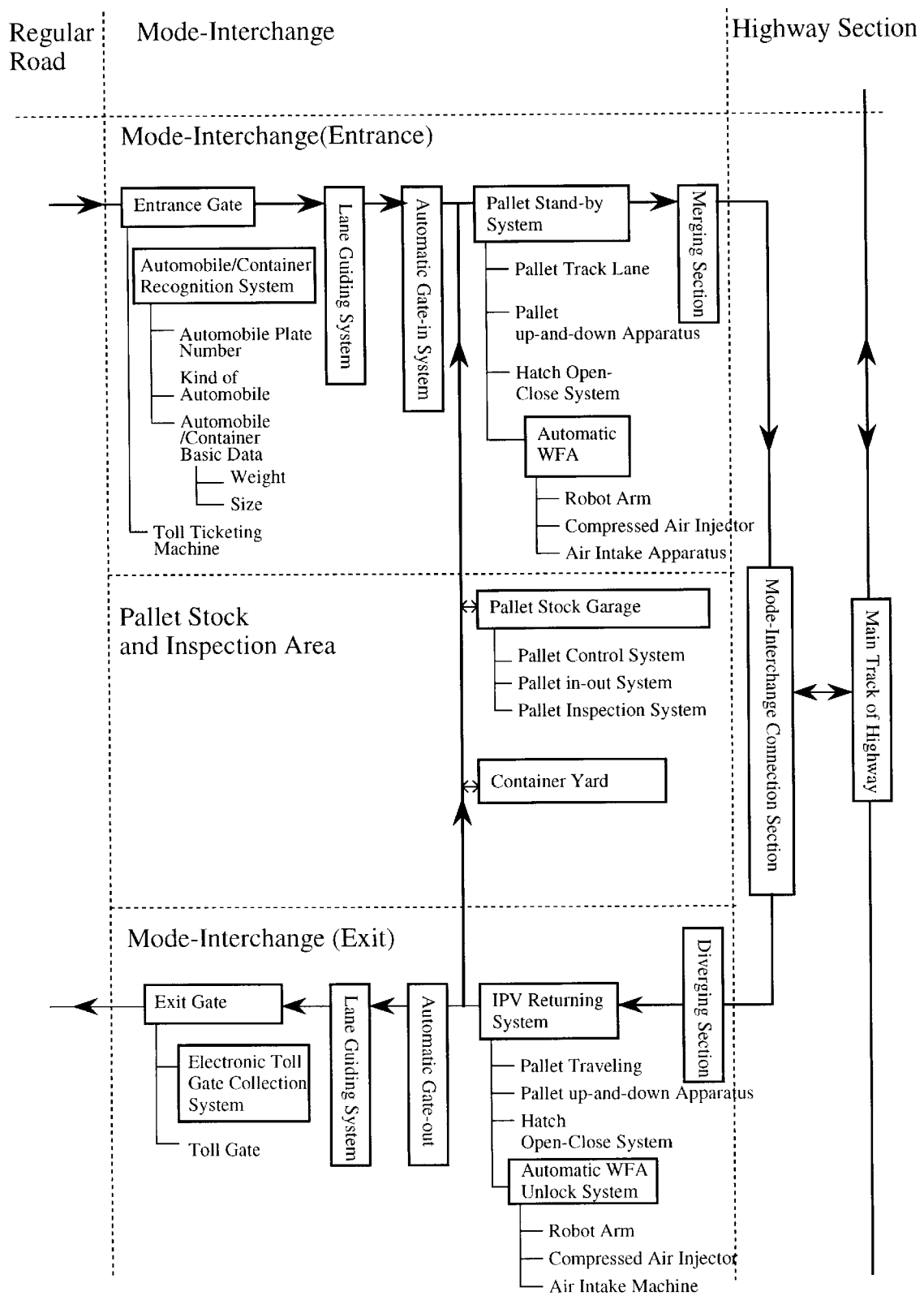
Figure 13:
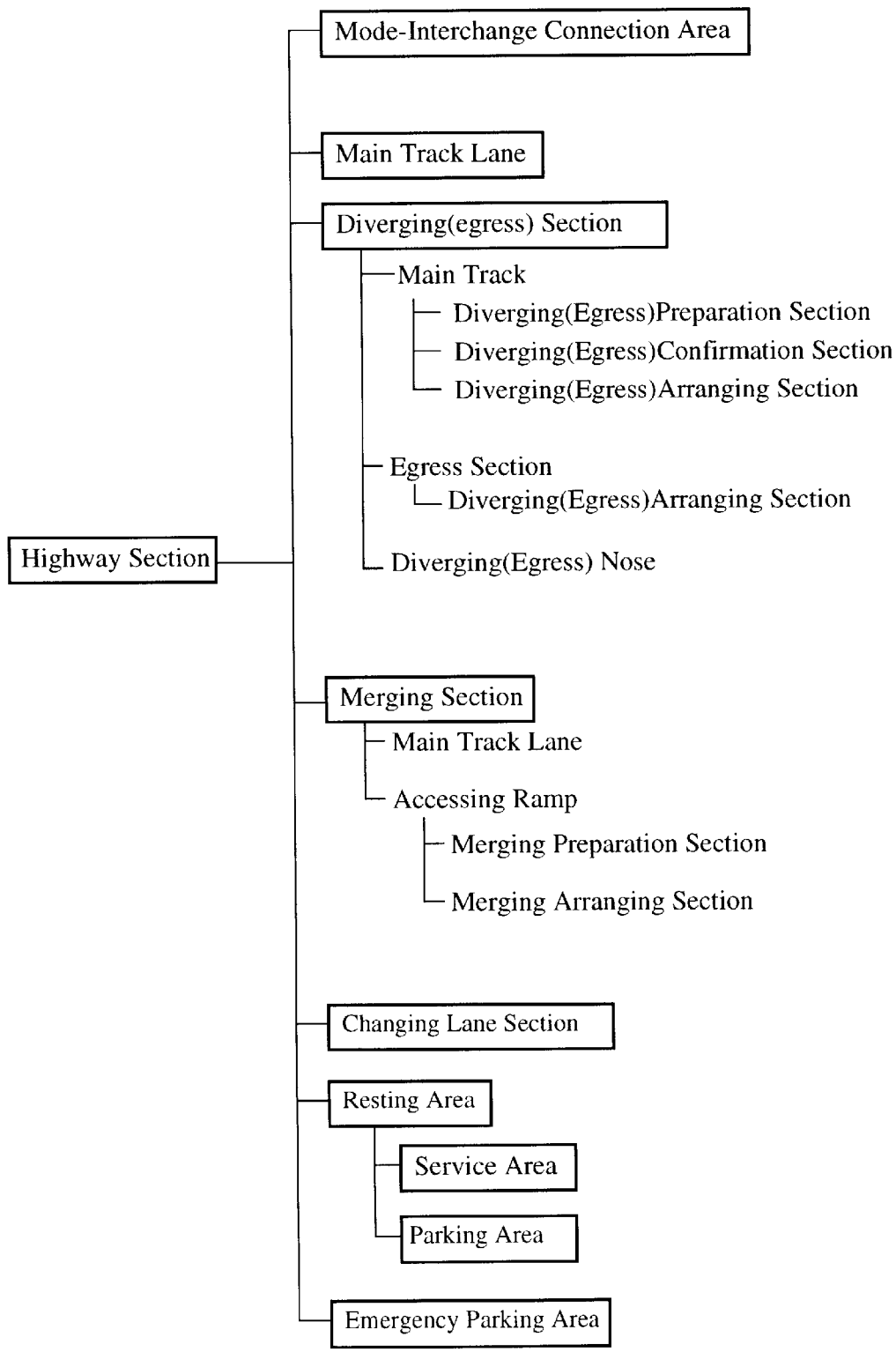
Figure 14:
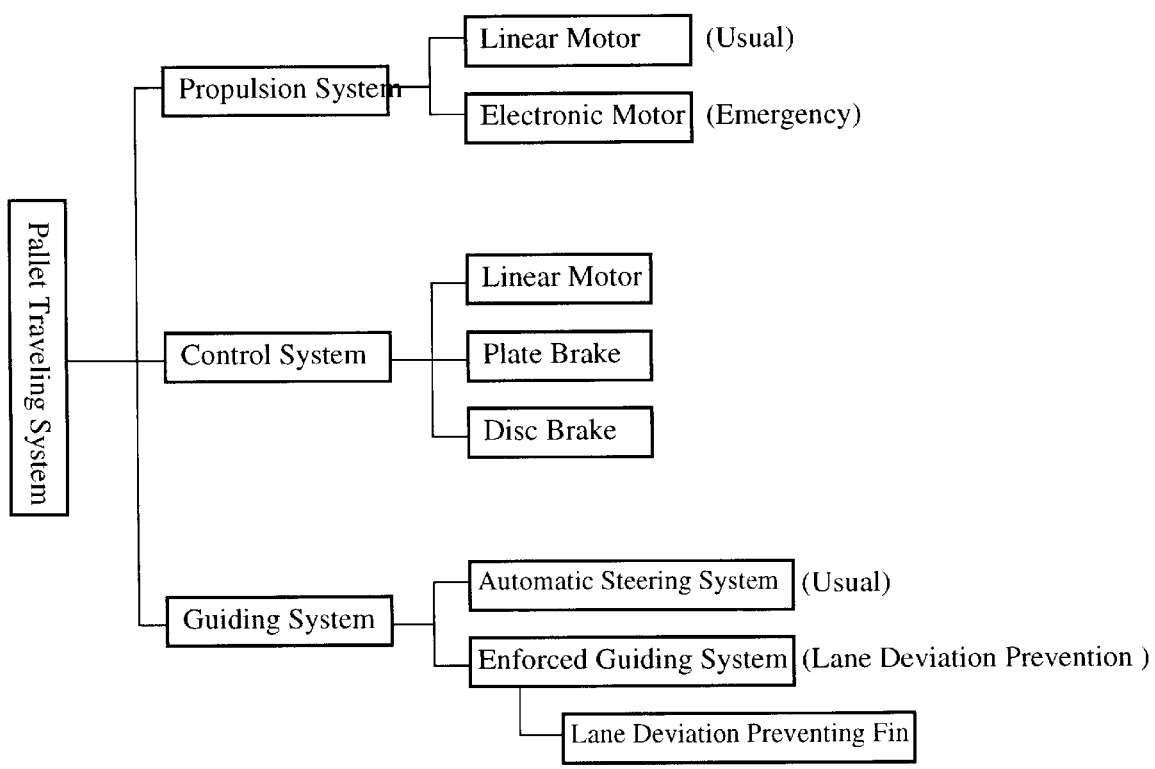
Figure 15:
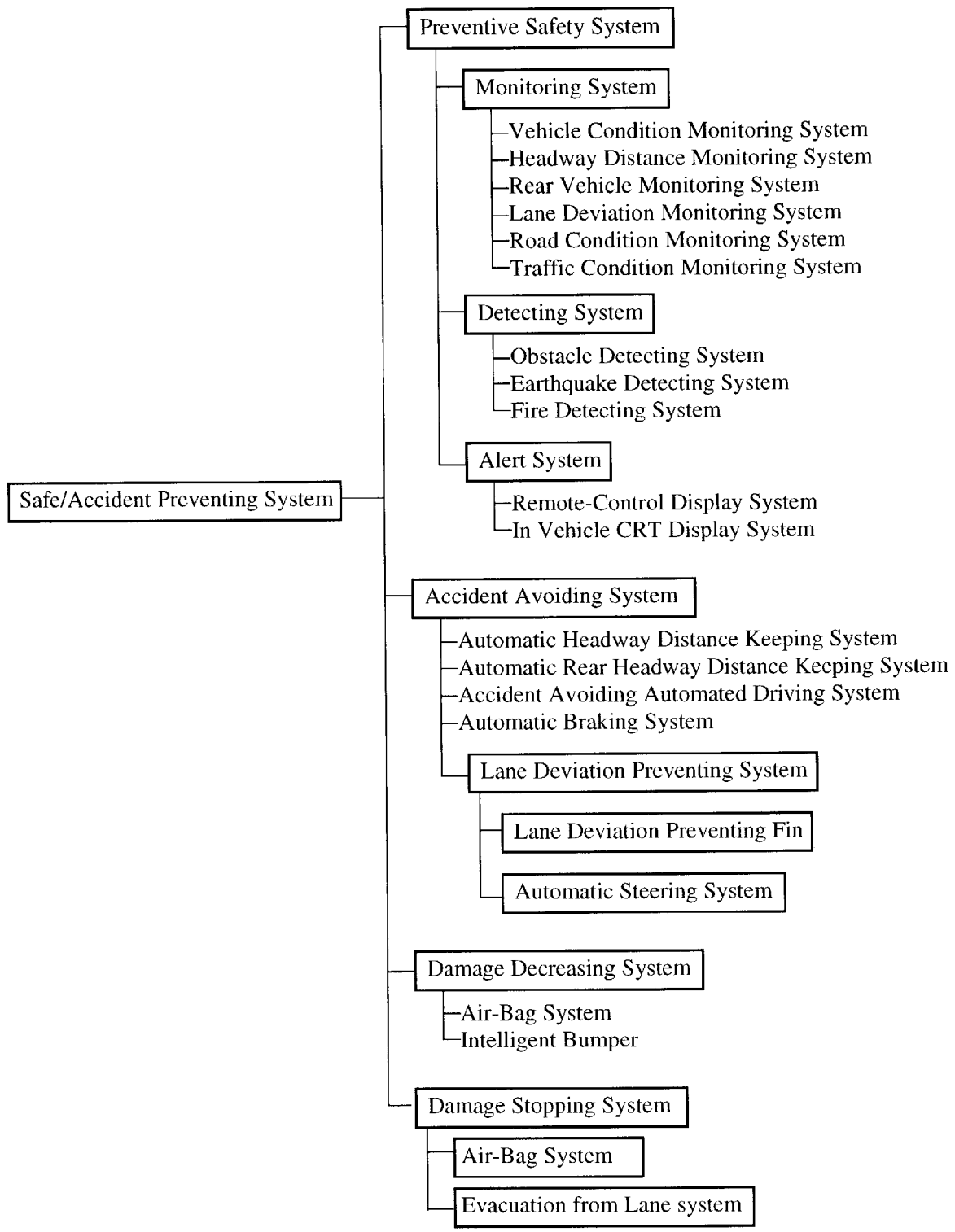
Figure 16:
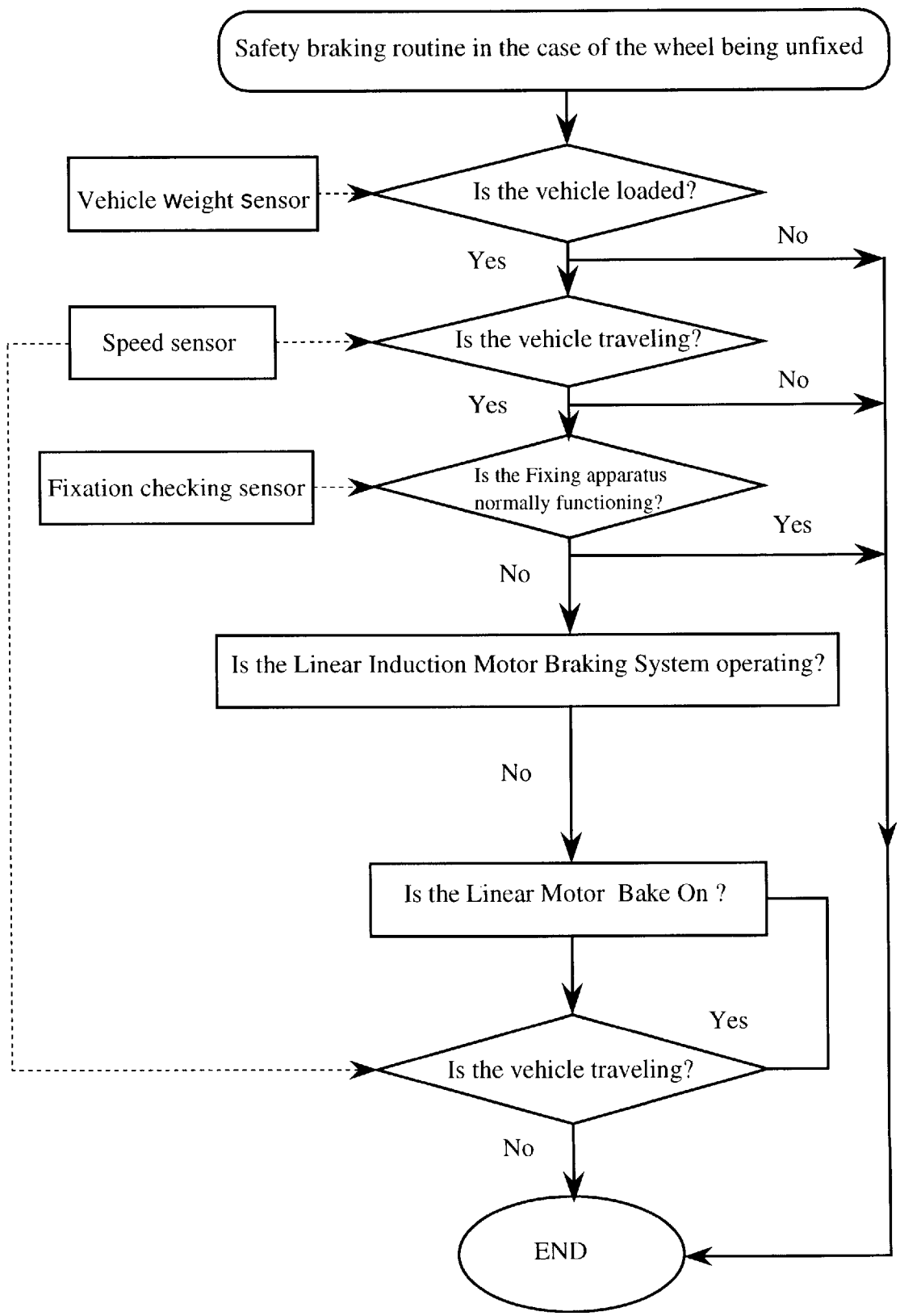
Figure 17:
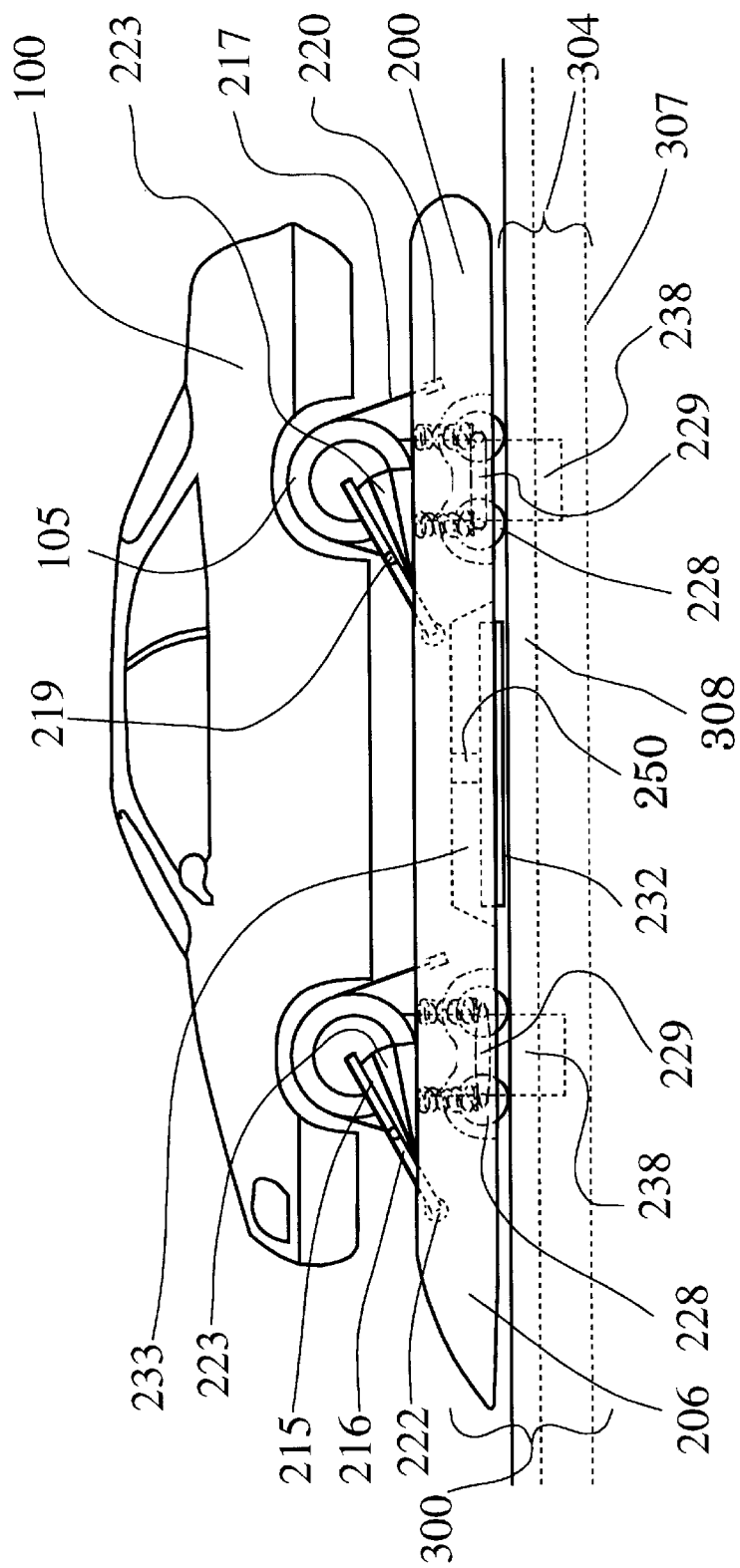
Figure 18:
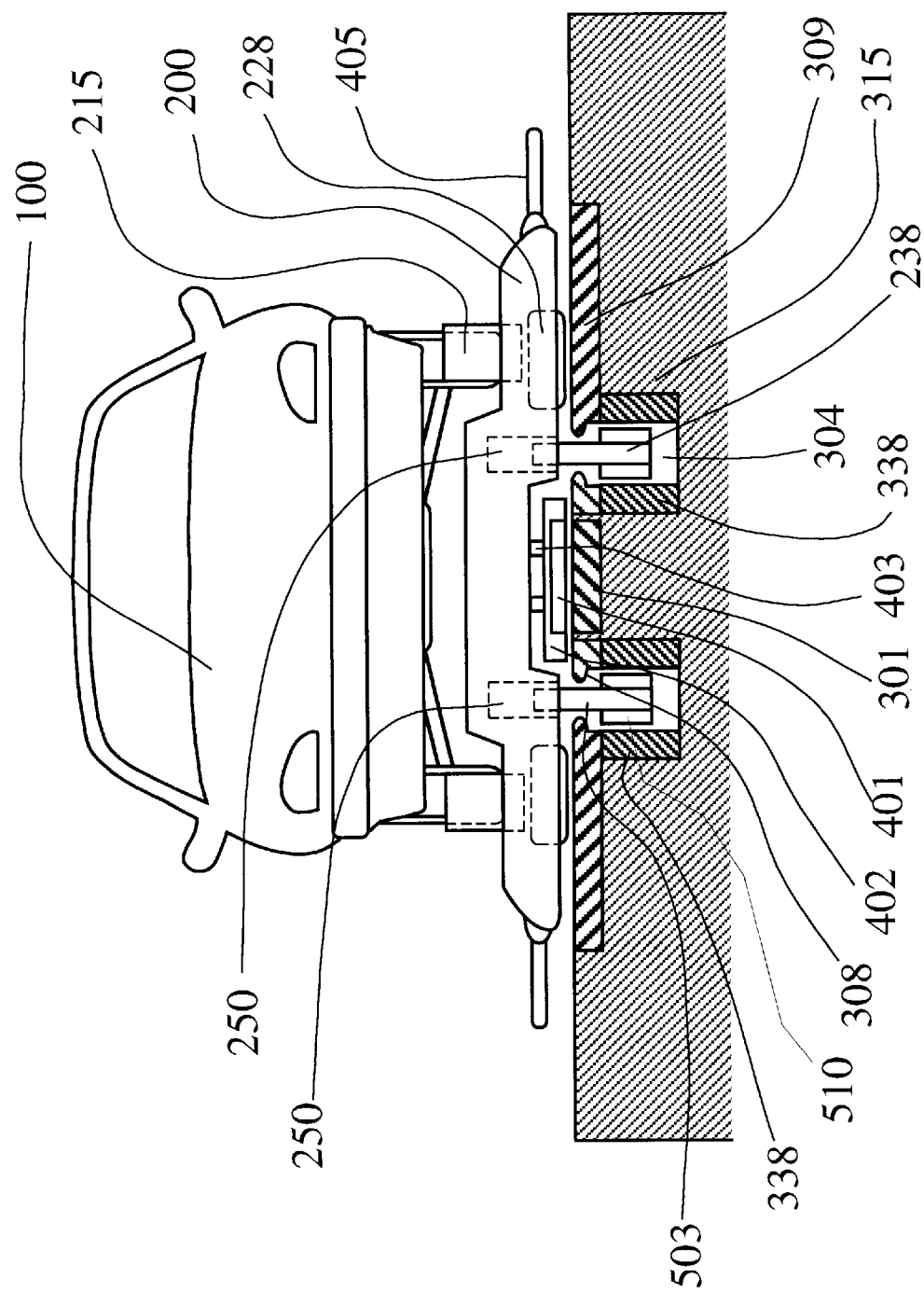
Figure 19:
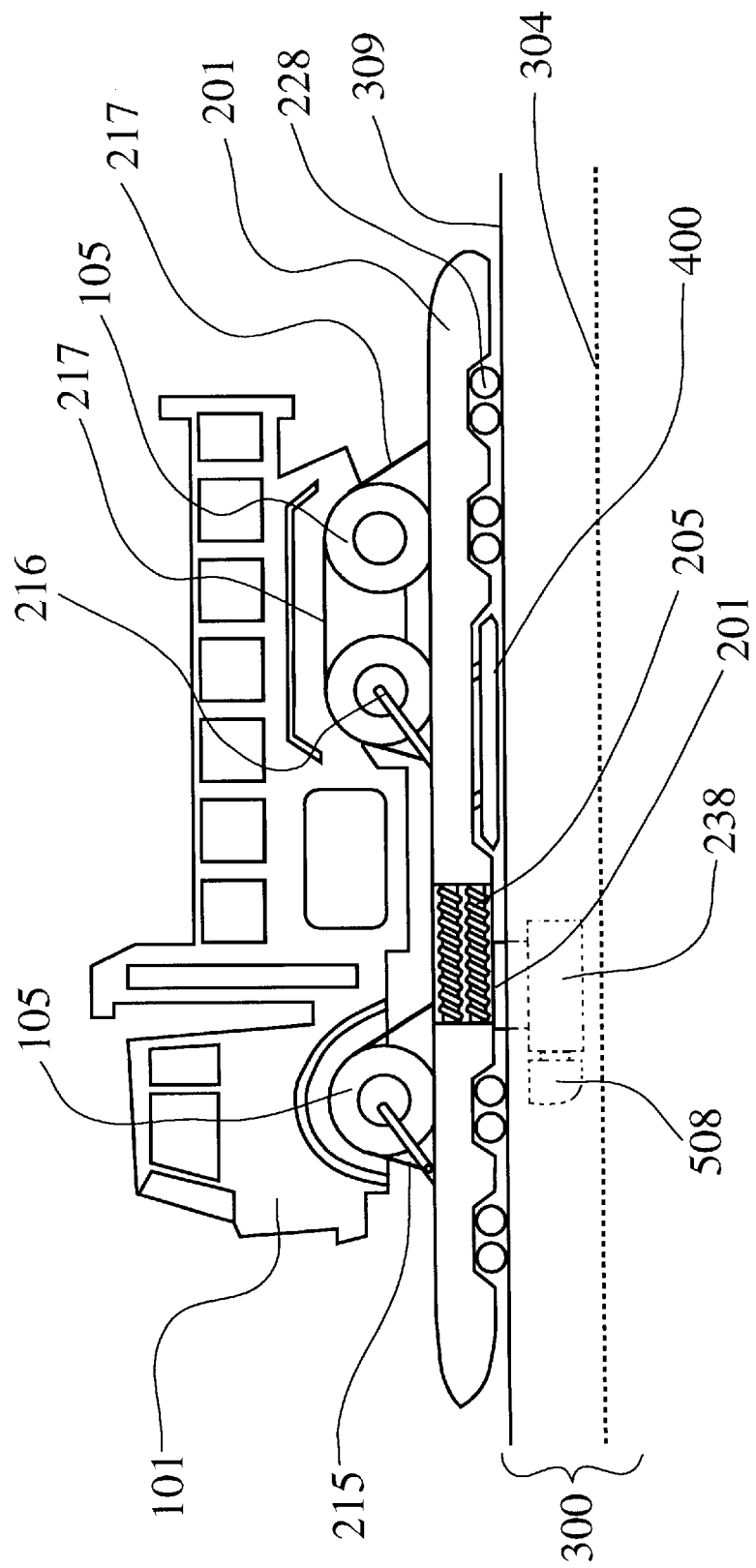
Figure 20:
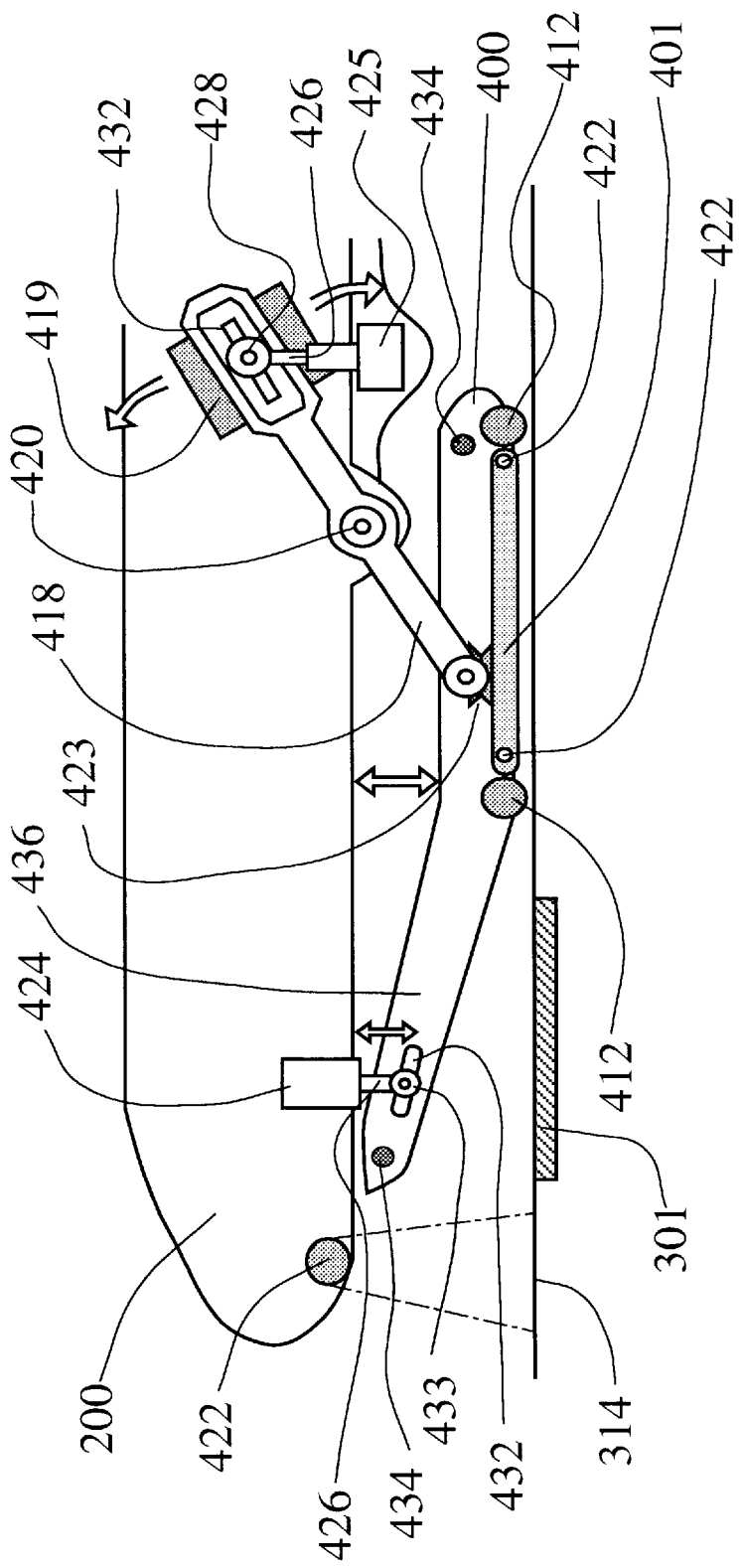
Figure 21:
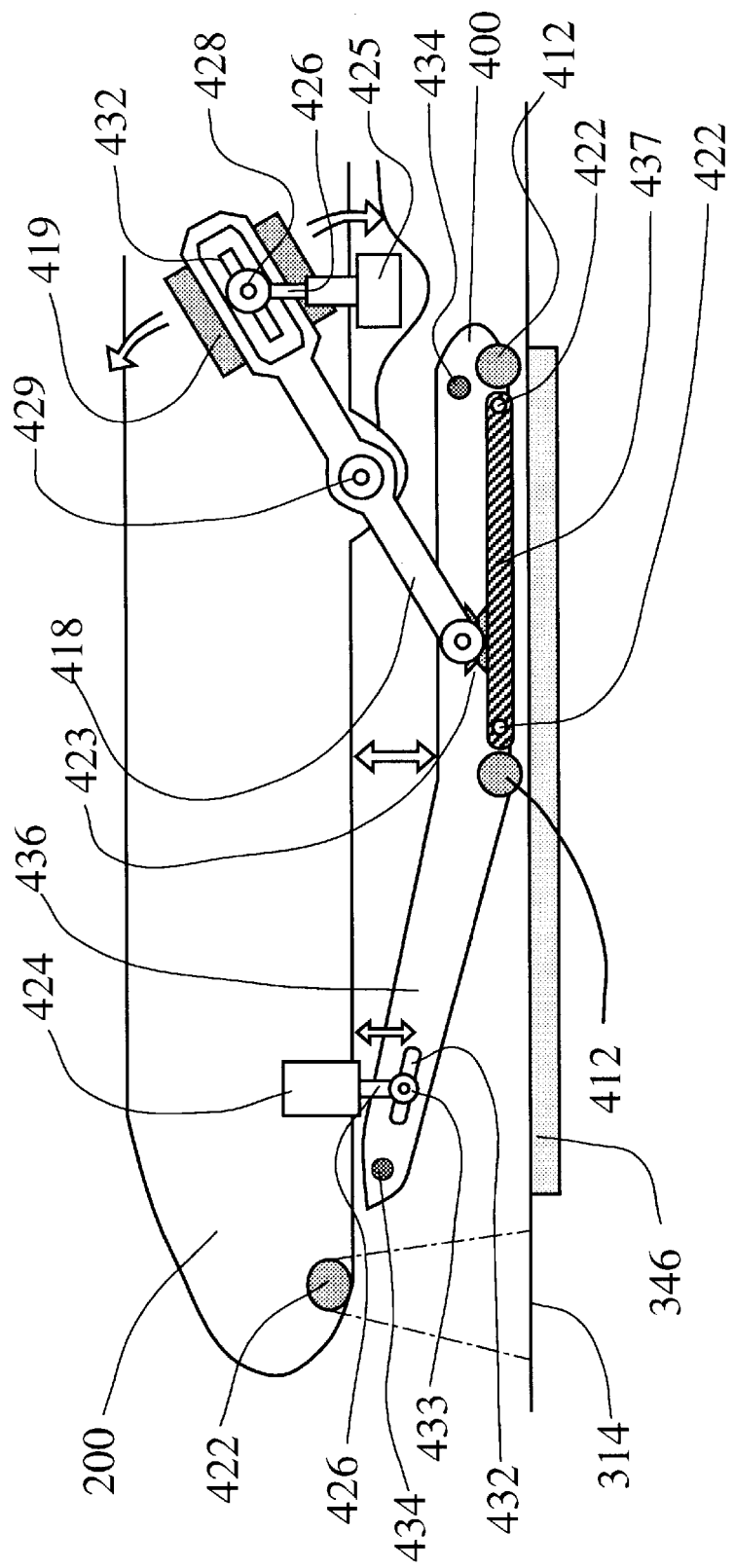
Figure 22:
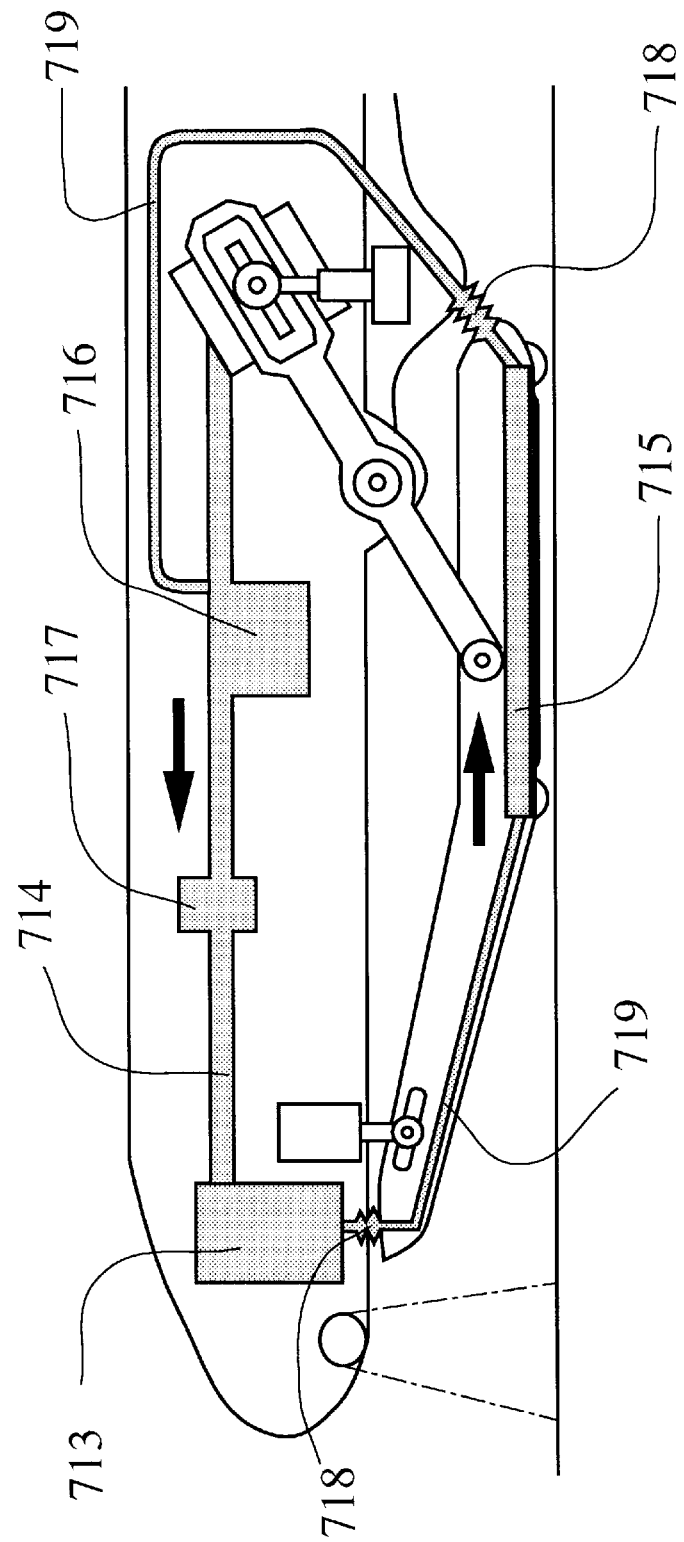
Figure 23:
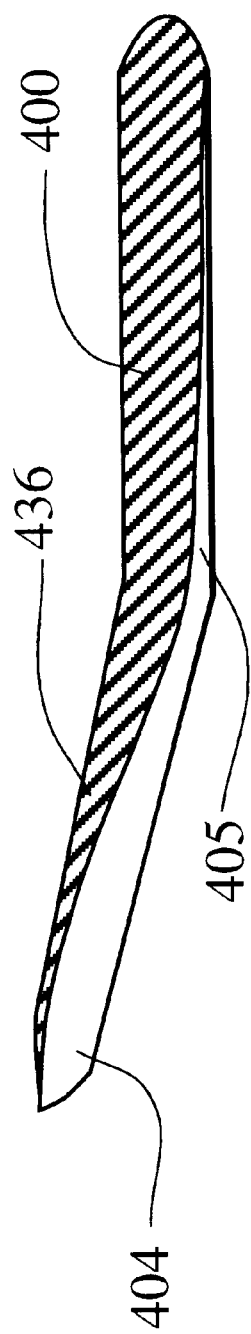
Figure 24:
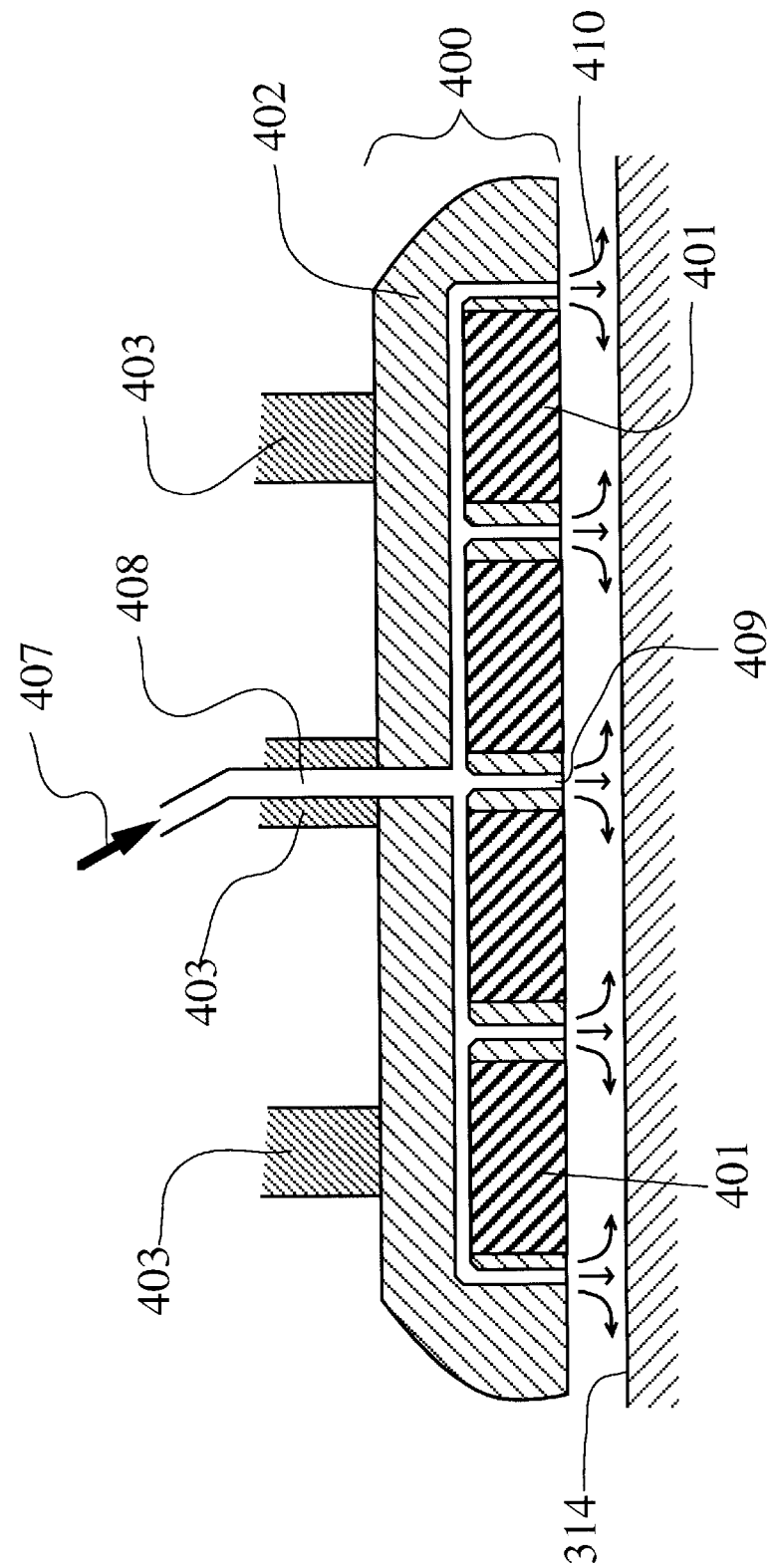
Figure 25:
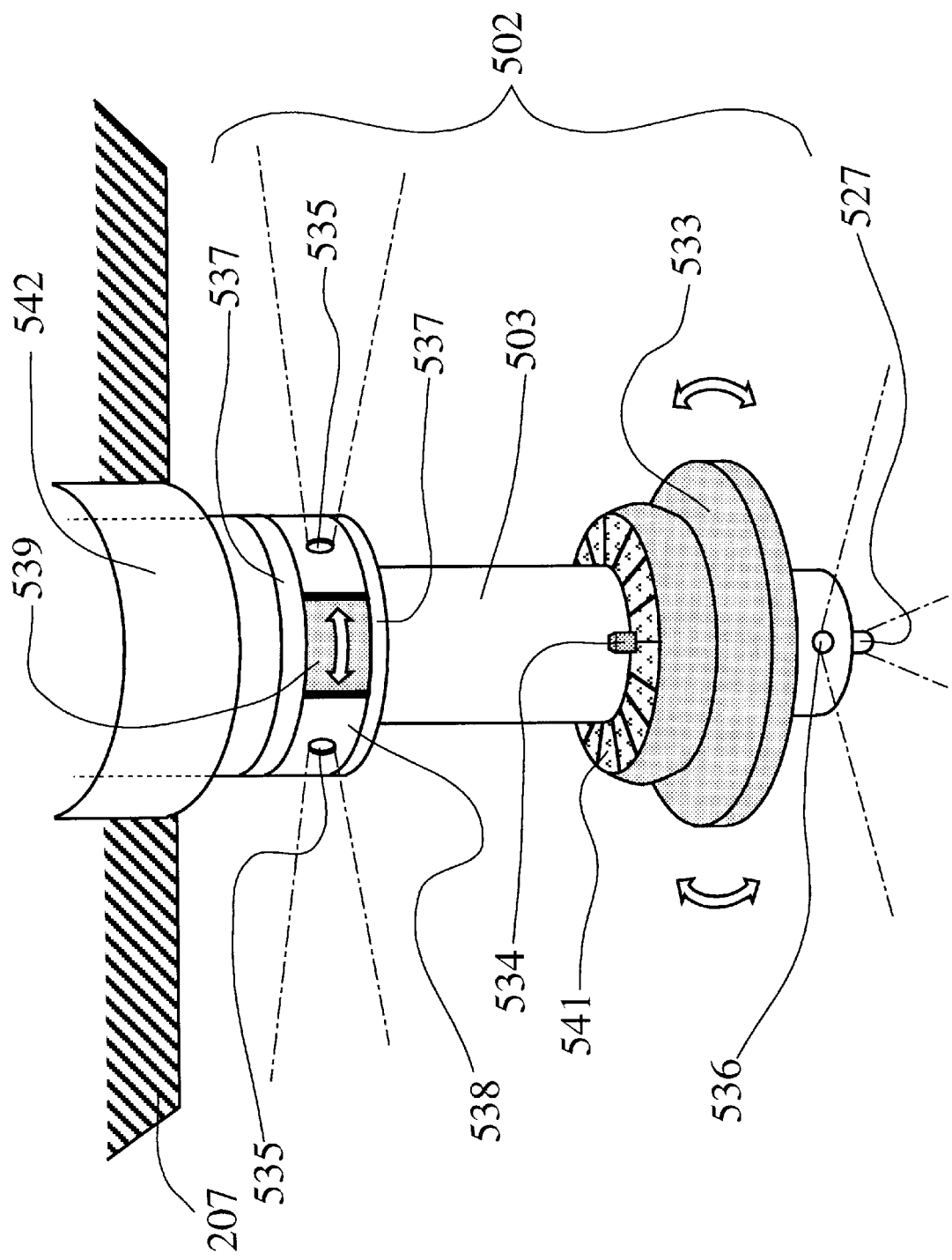
Figure 26:
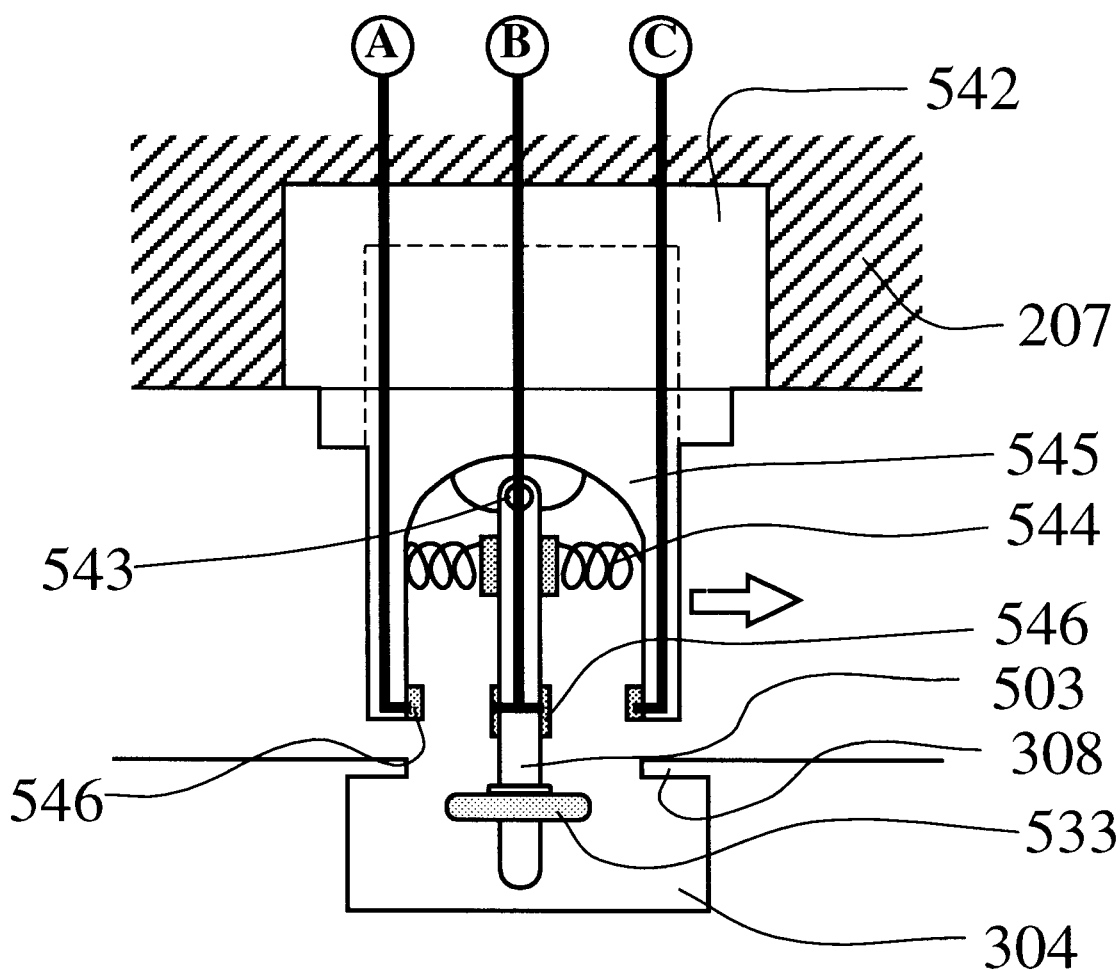
Figure 27:
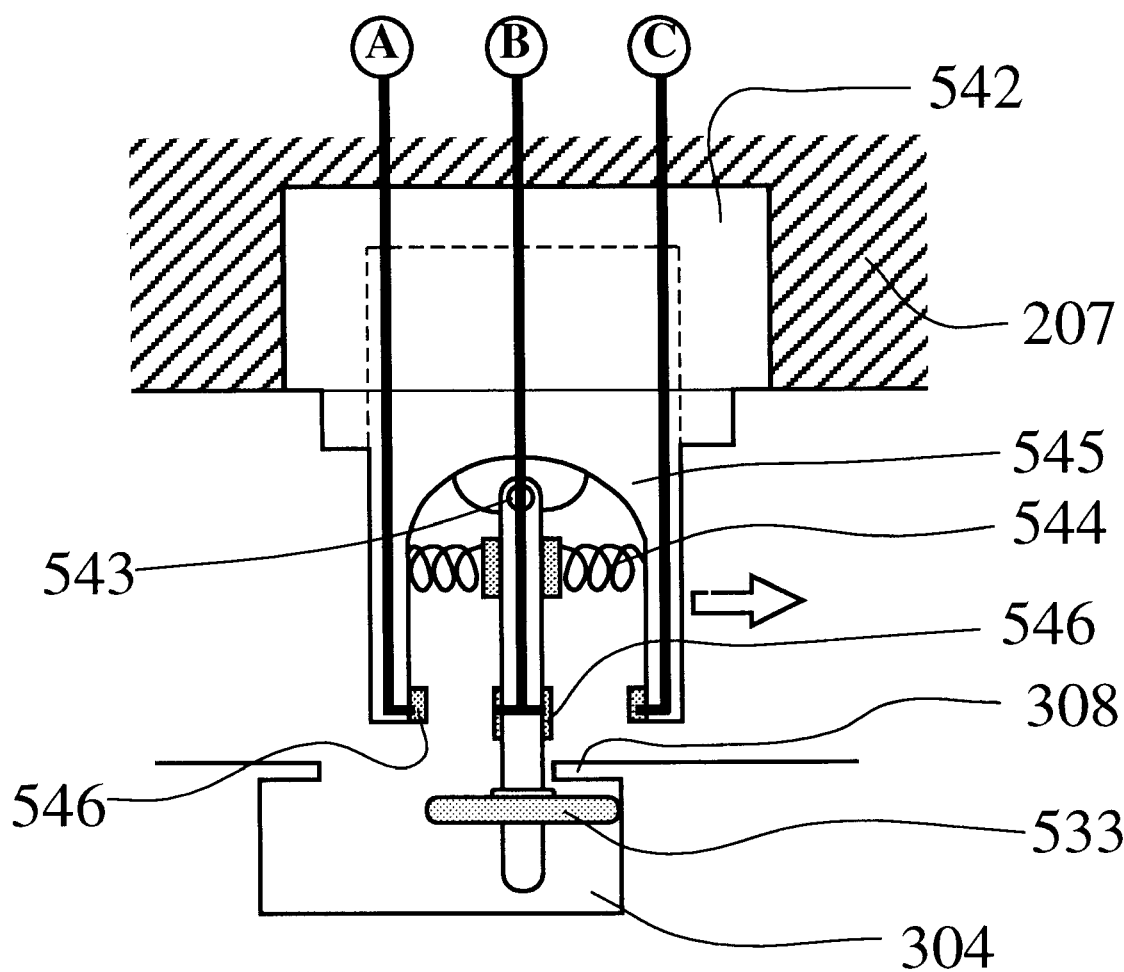
Figure 28:
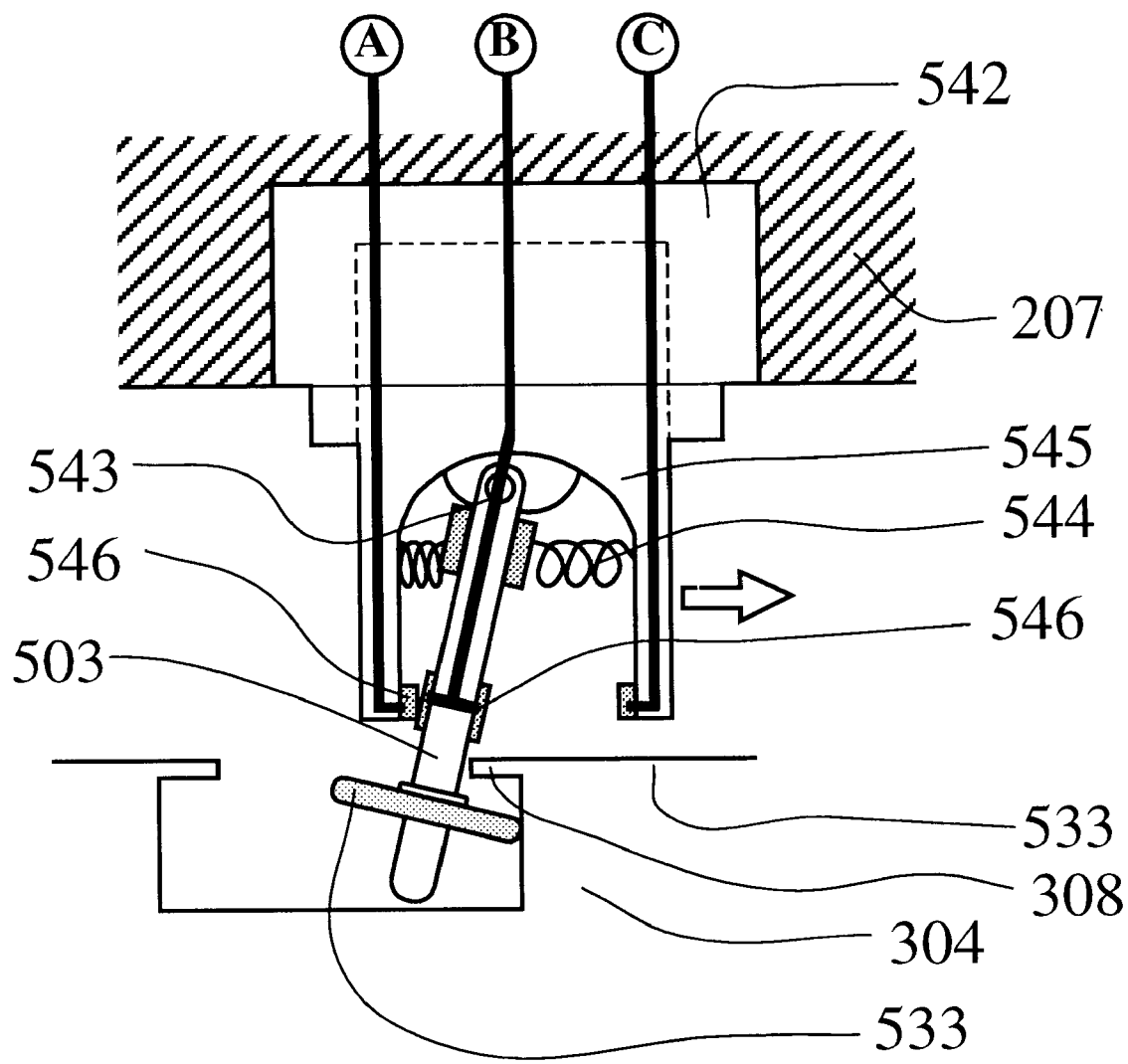
Figure 29:
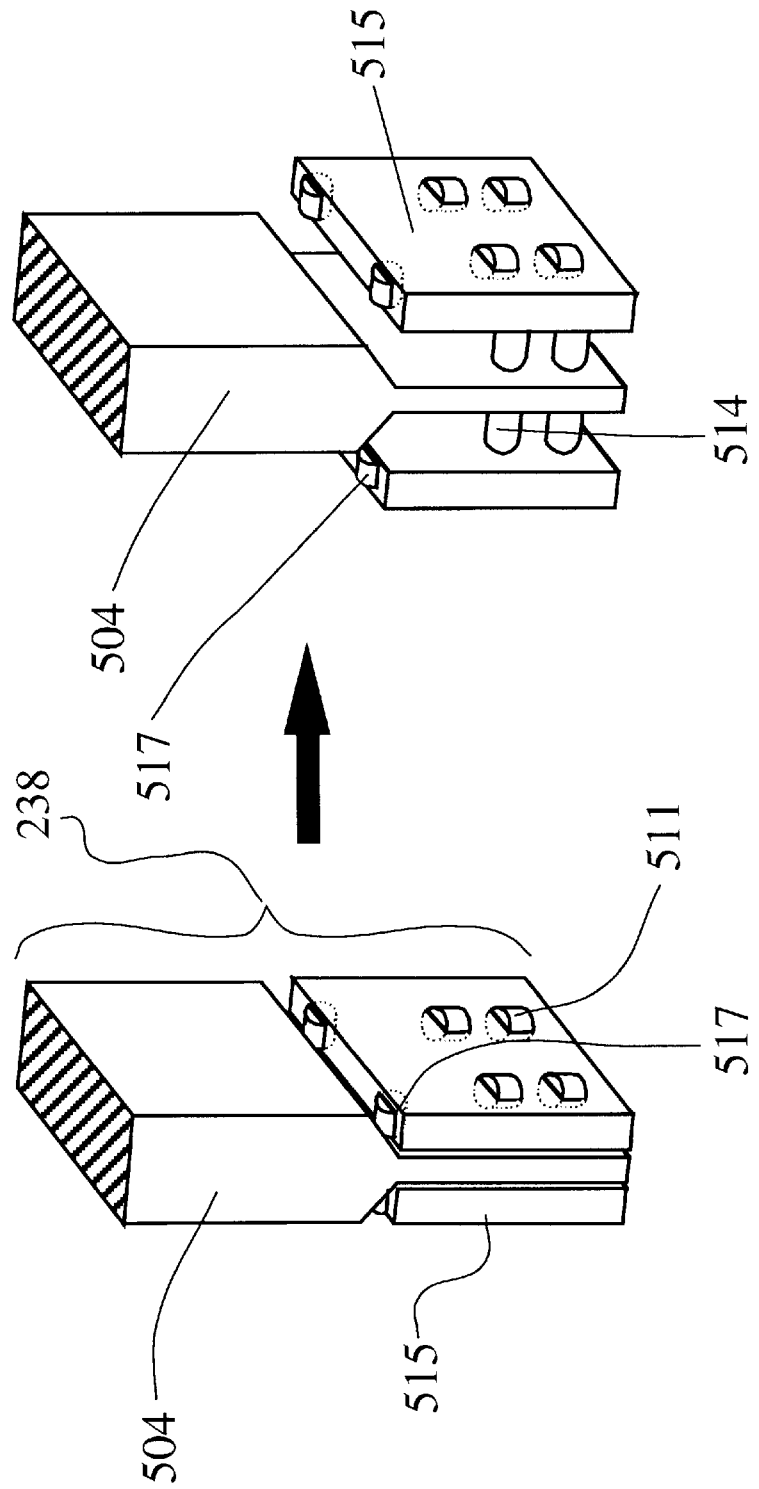
Figure 30:
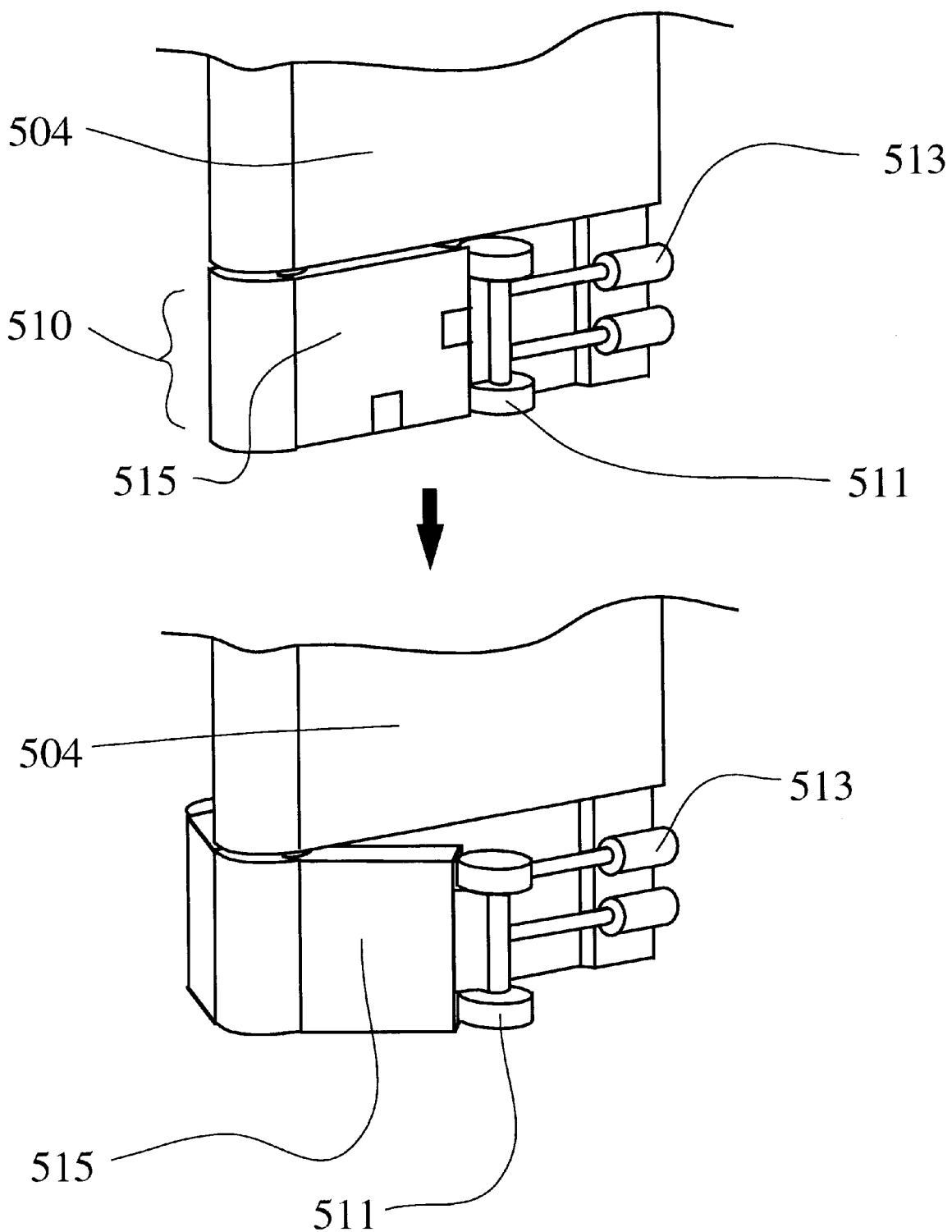
Figure 31:
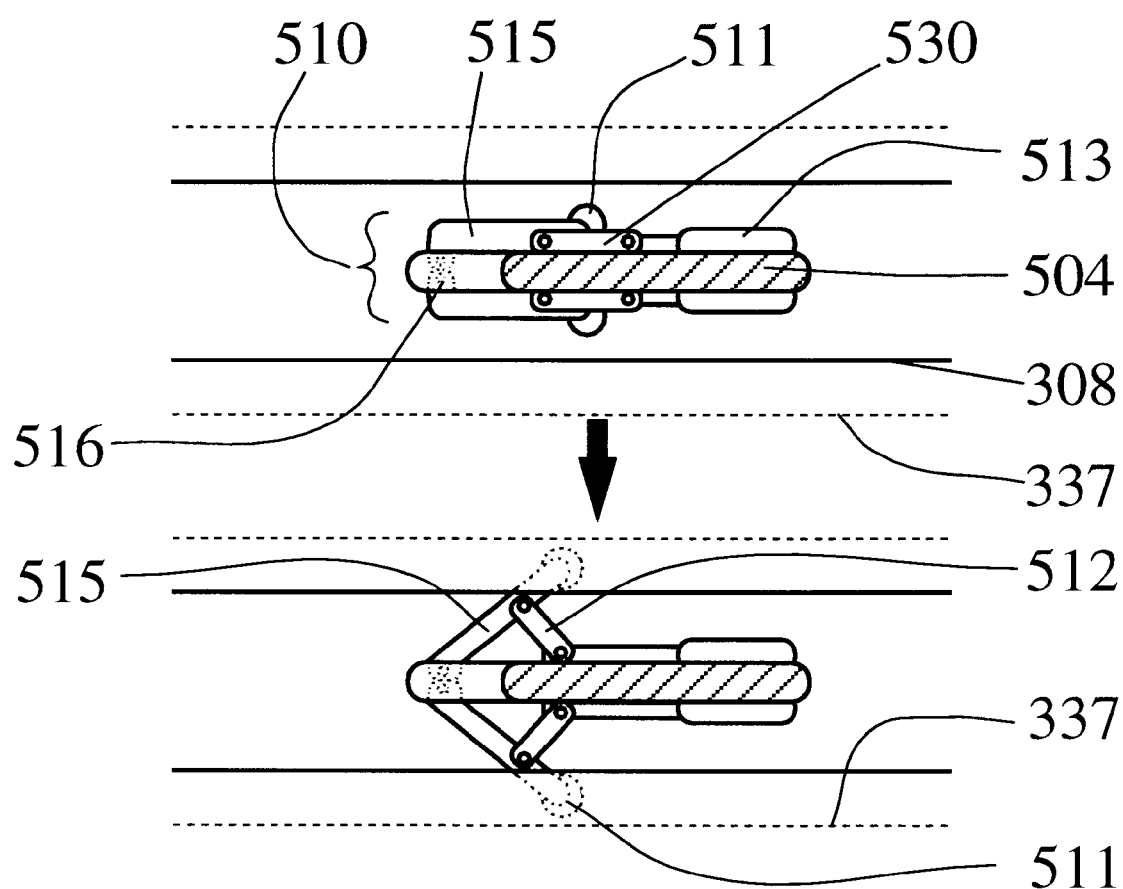
Figure 32:
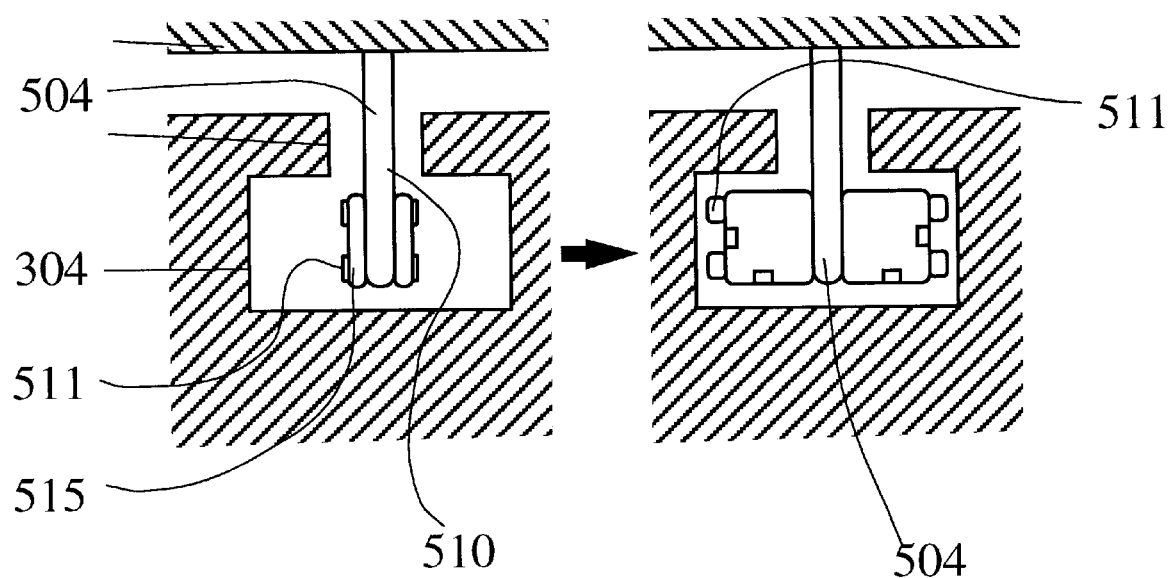
Figure 33:
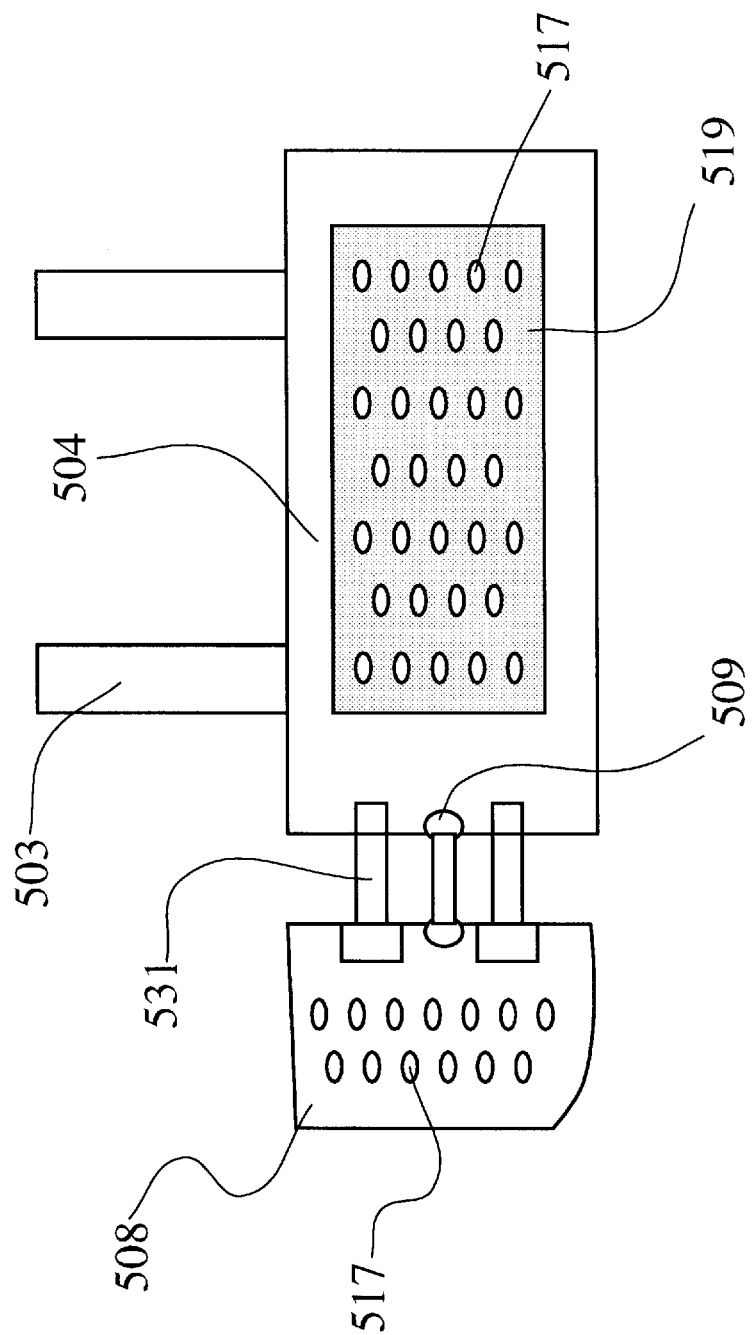
Figure 34:
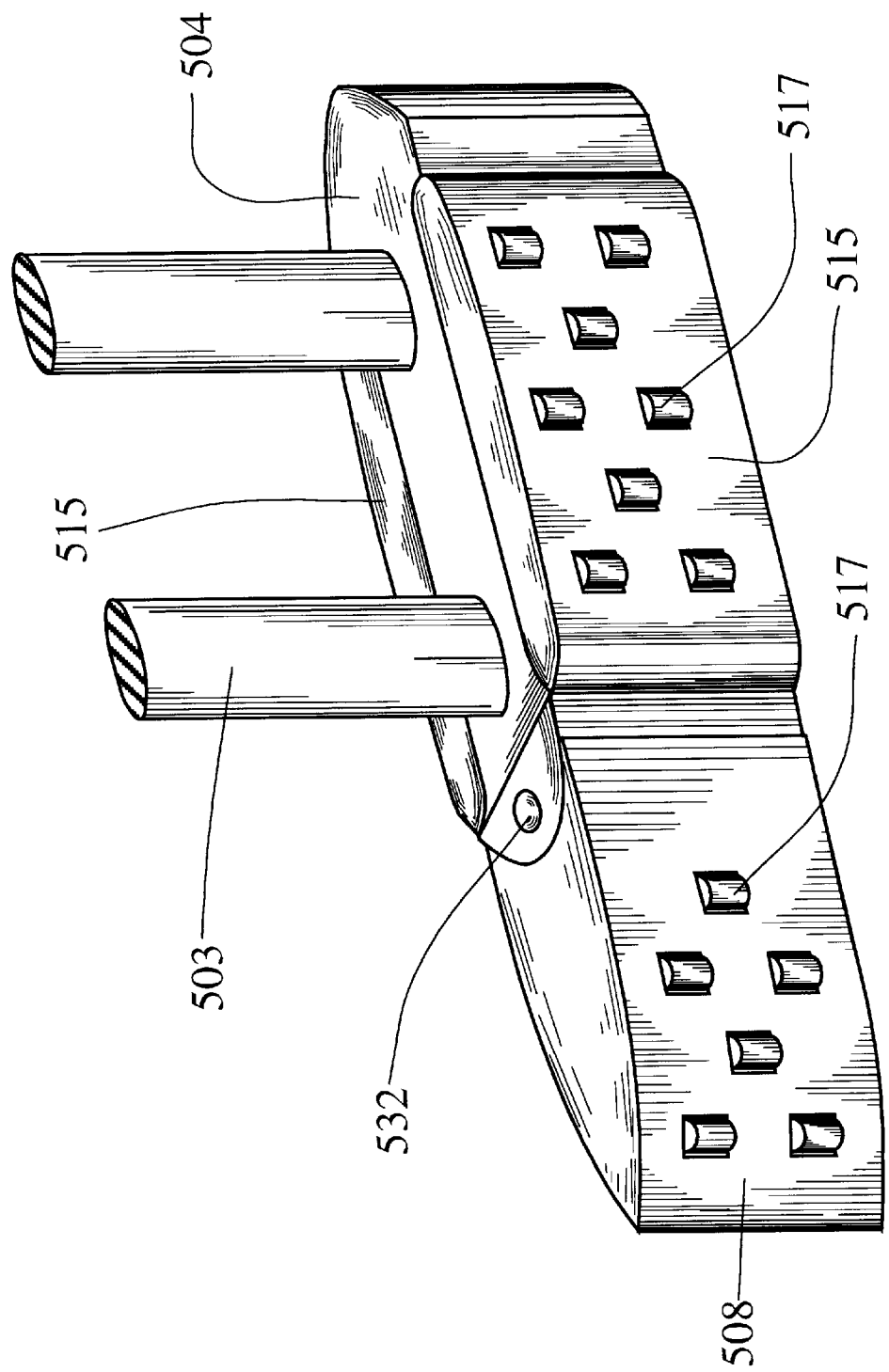
Figure 35:
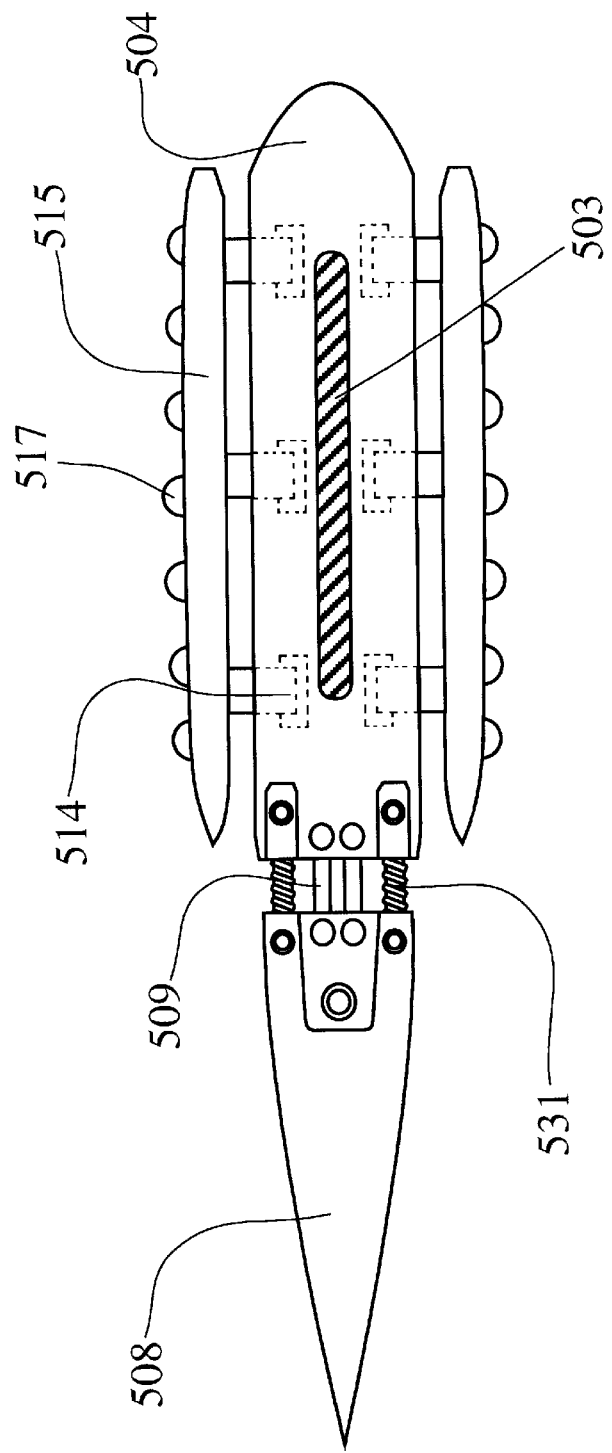
Figure 36:
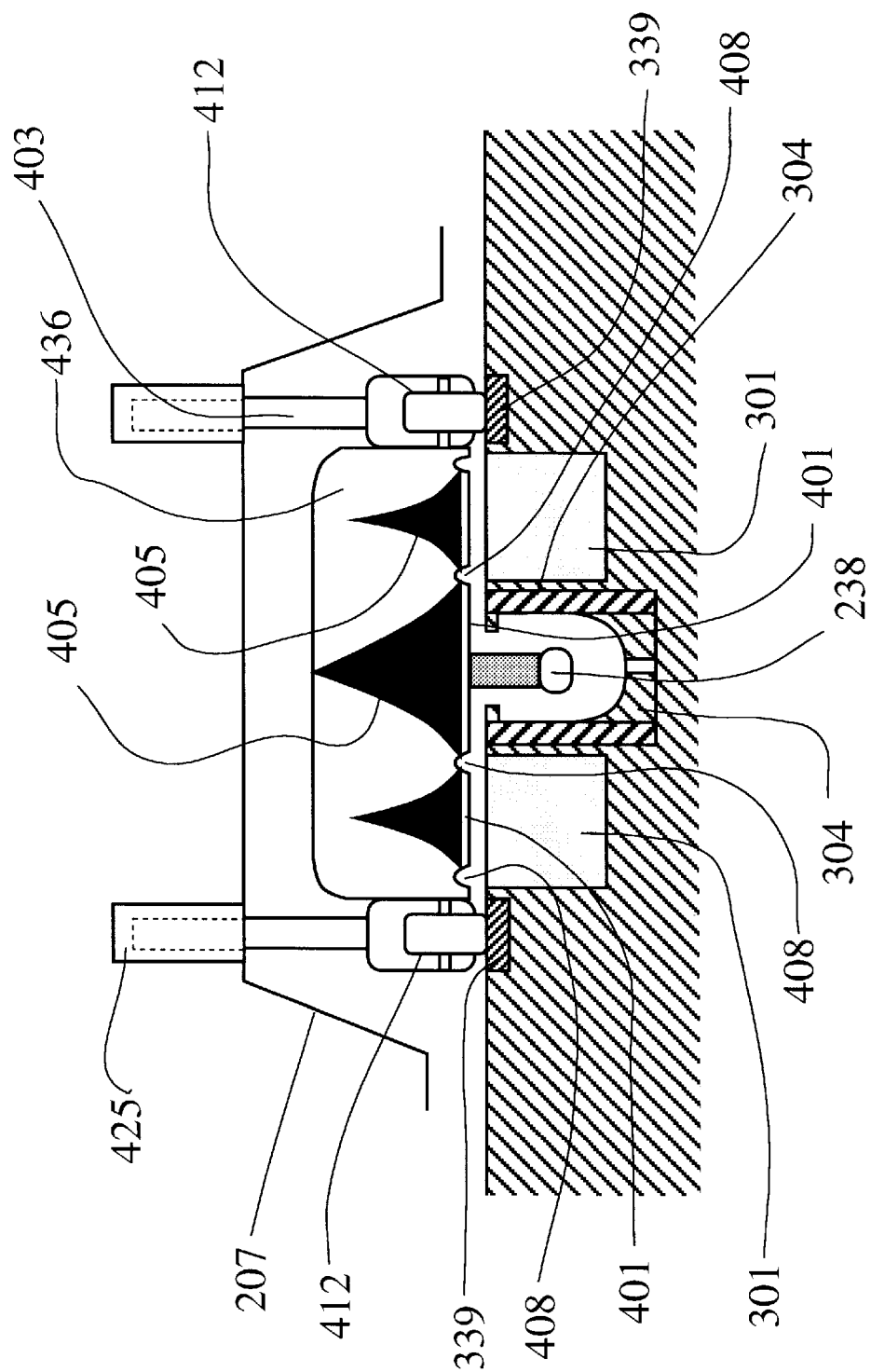
Figure 37:
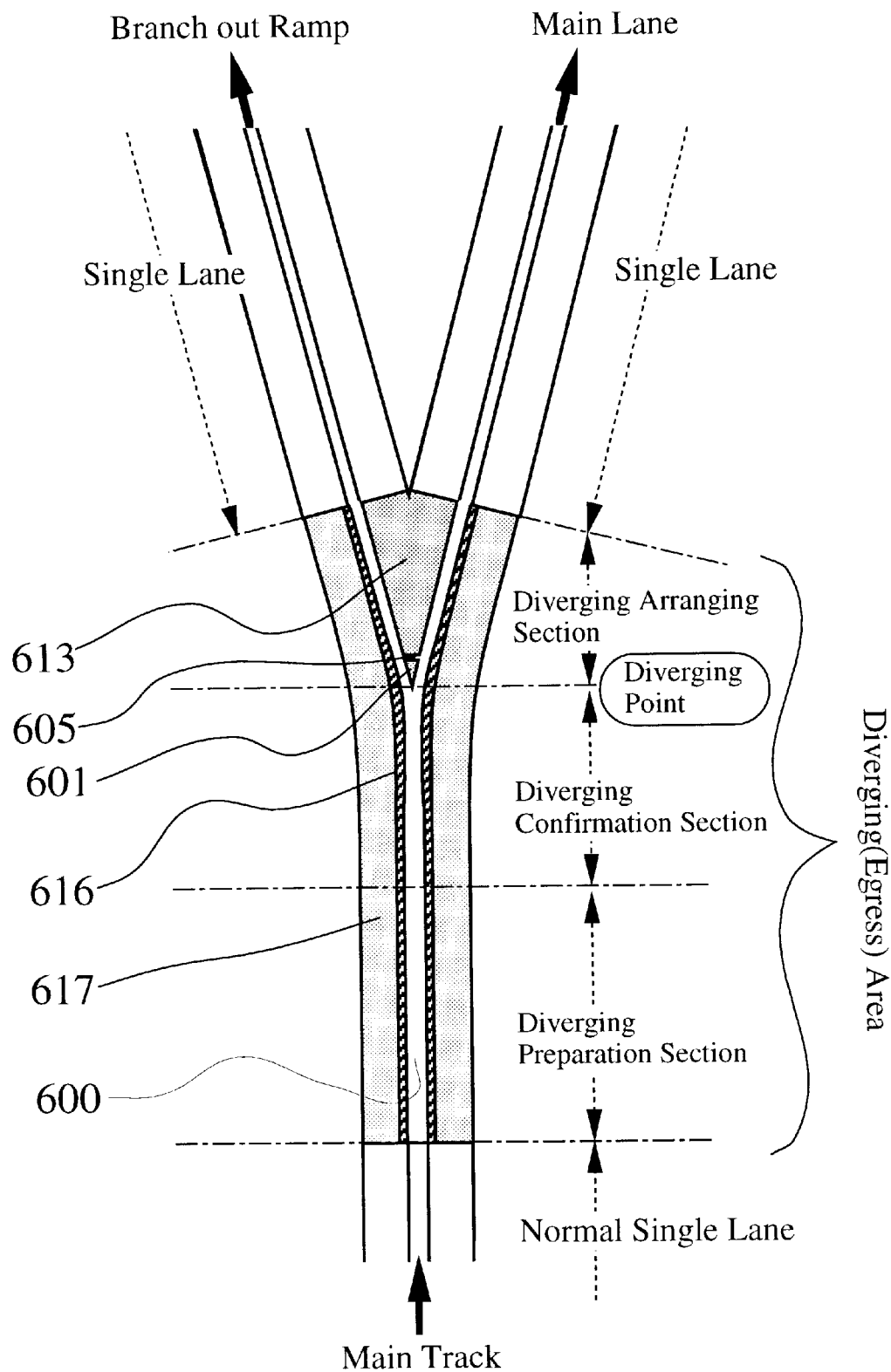
Figure 38:
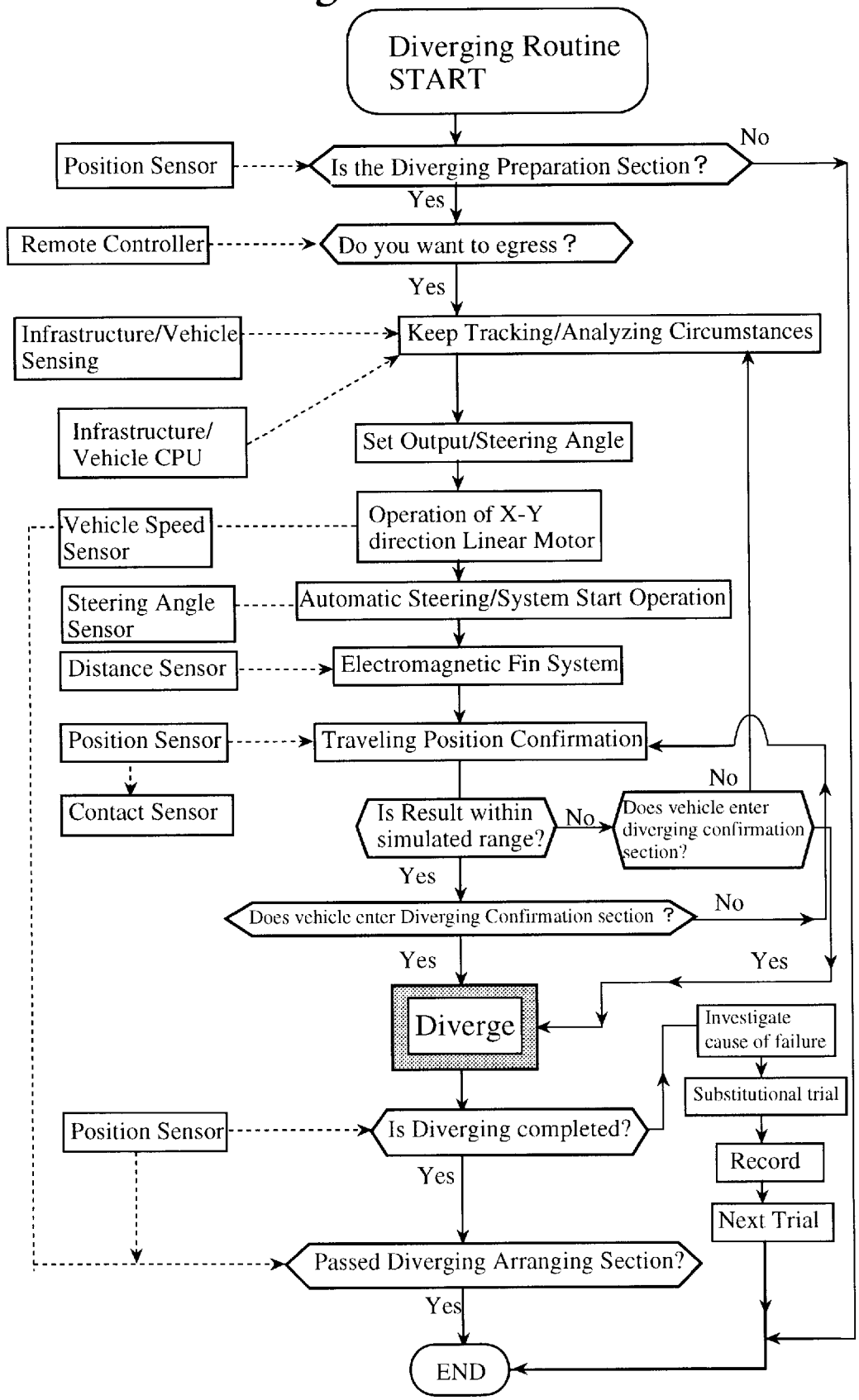
Figure 39:
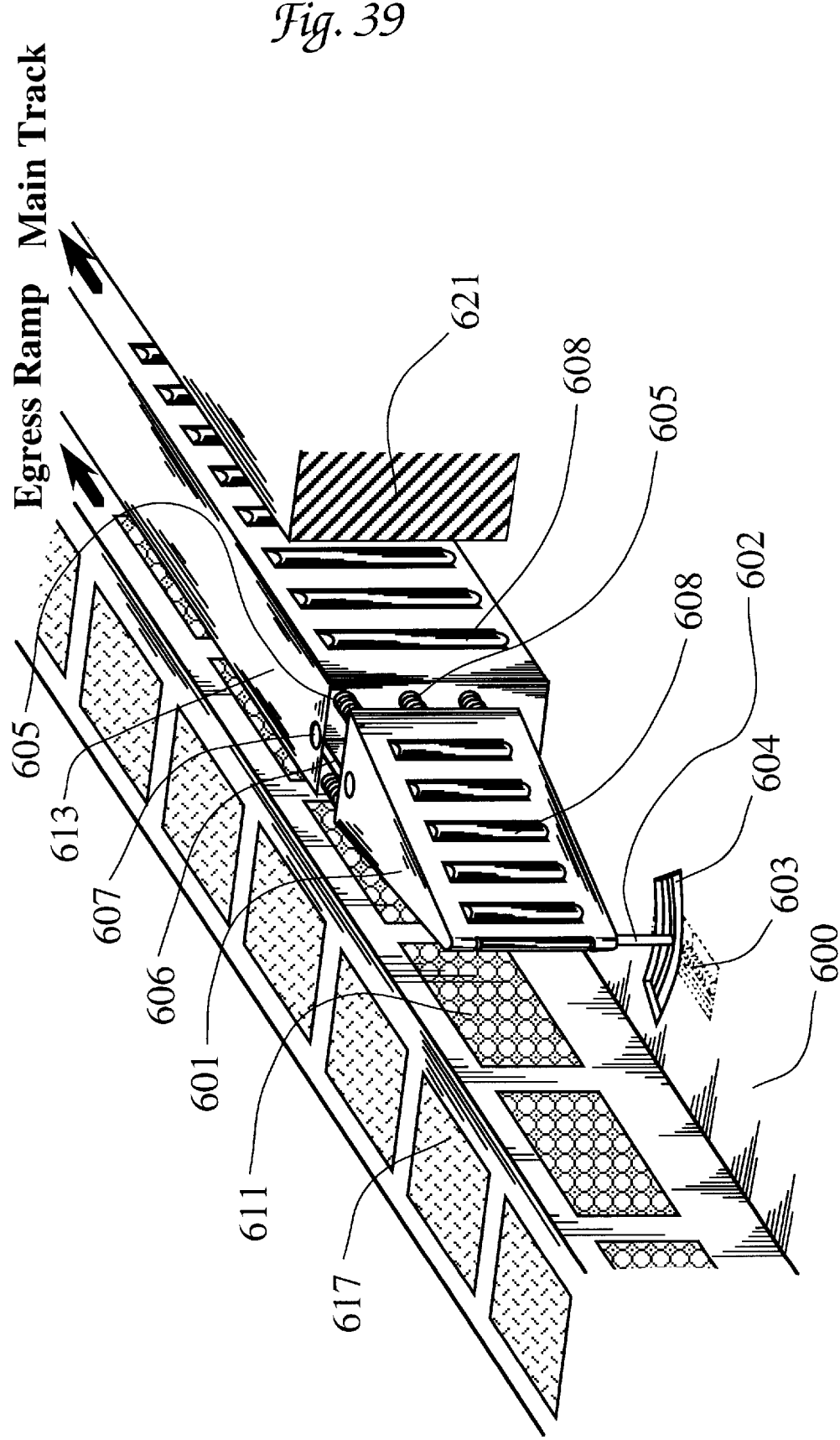
Figure 40:
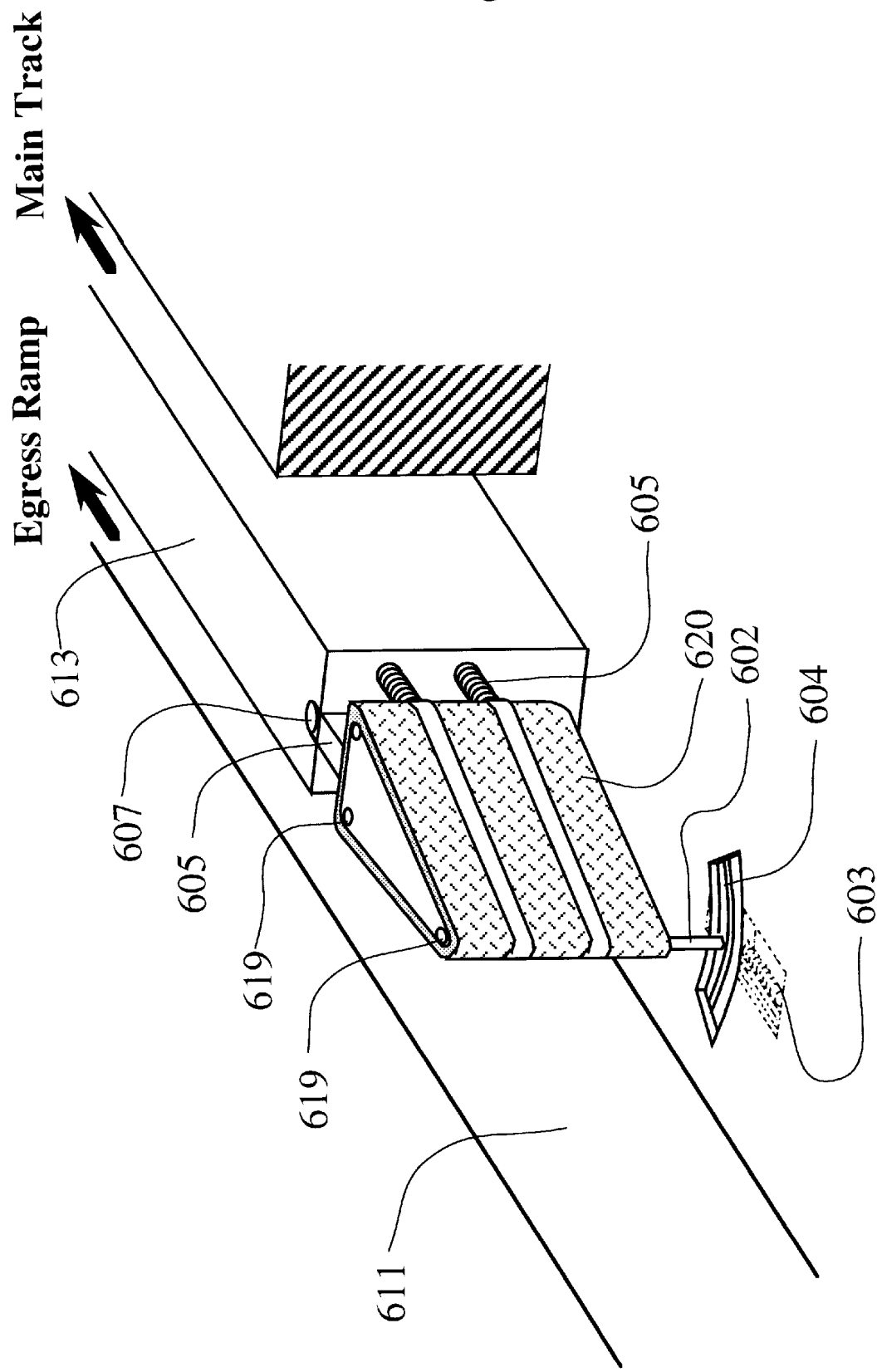
Figure 41:
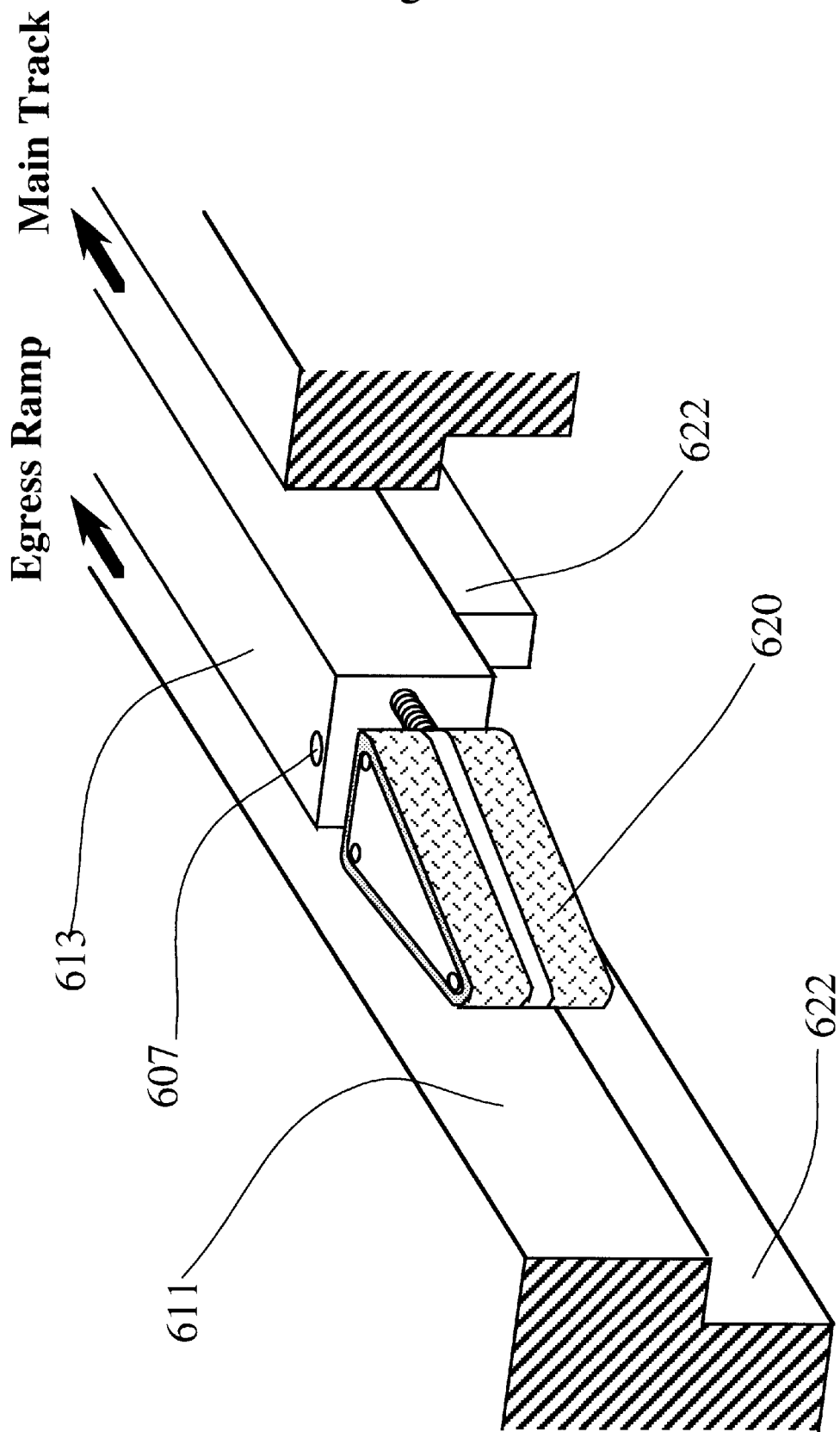
Figure 42:
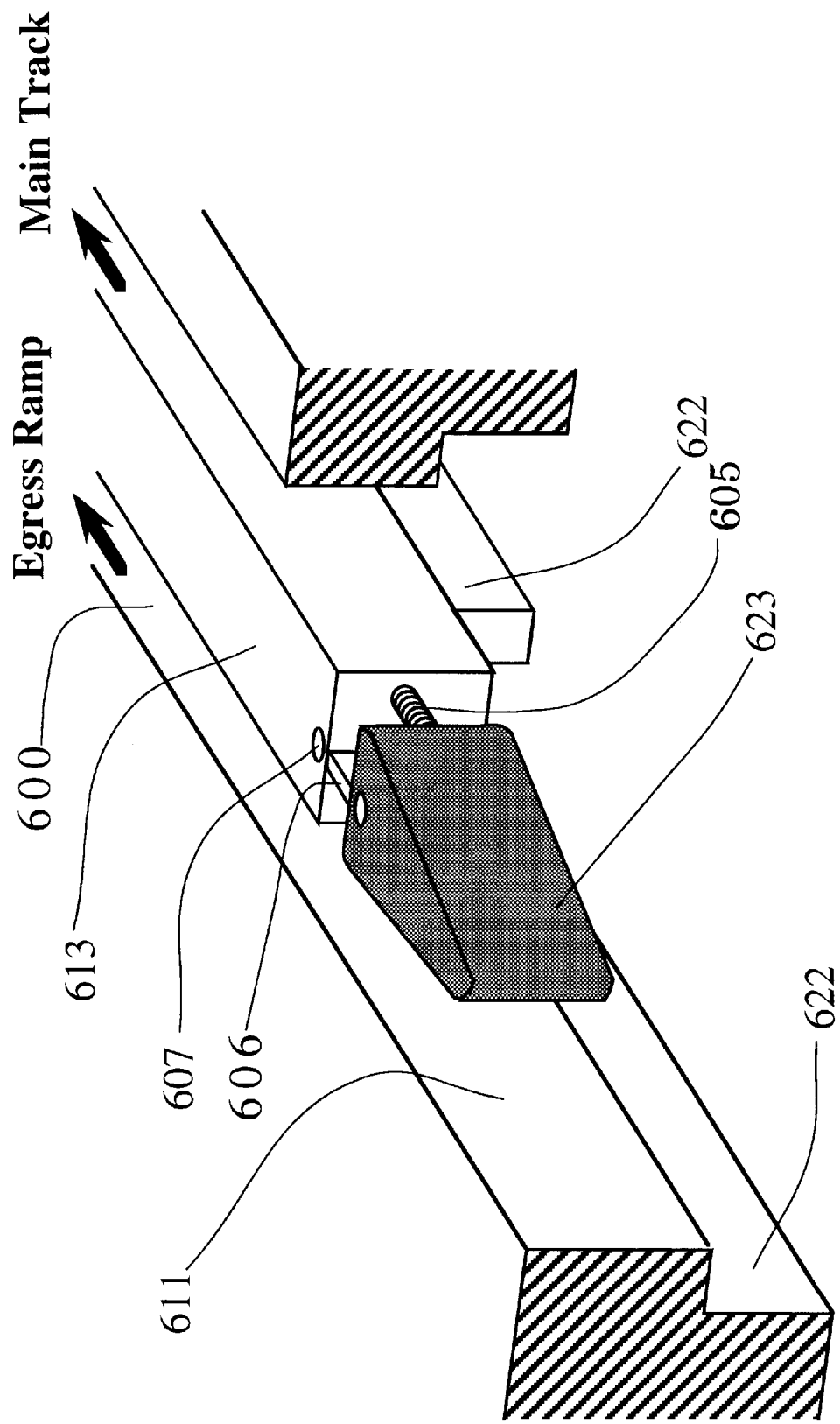
Figure 43:
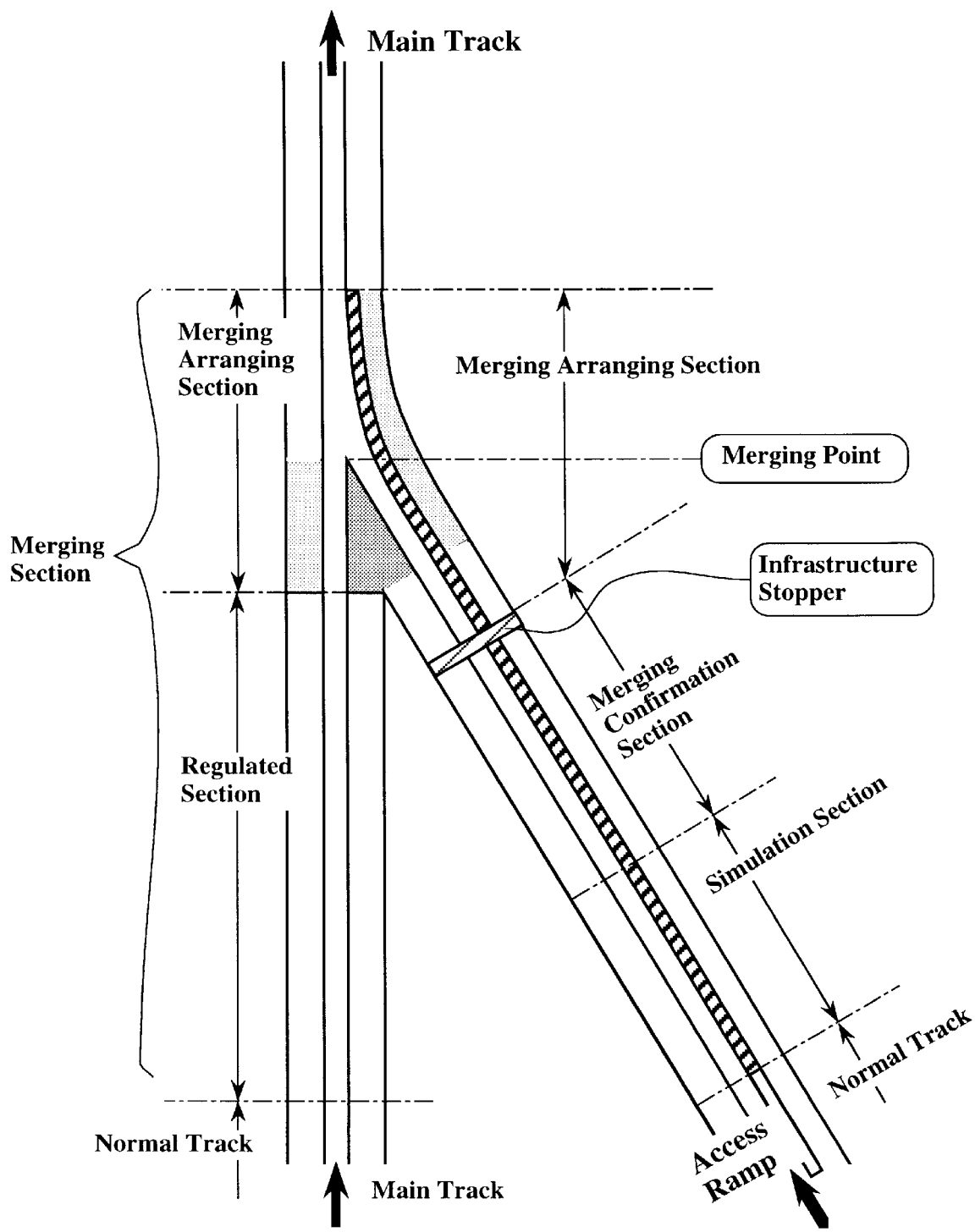
Figure 44:
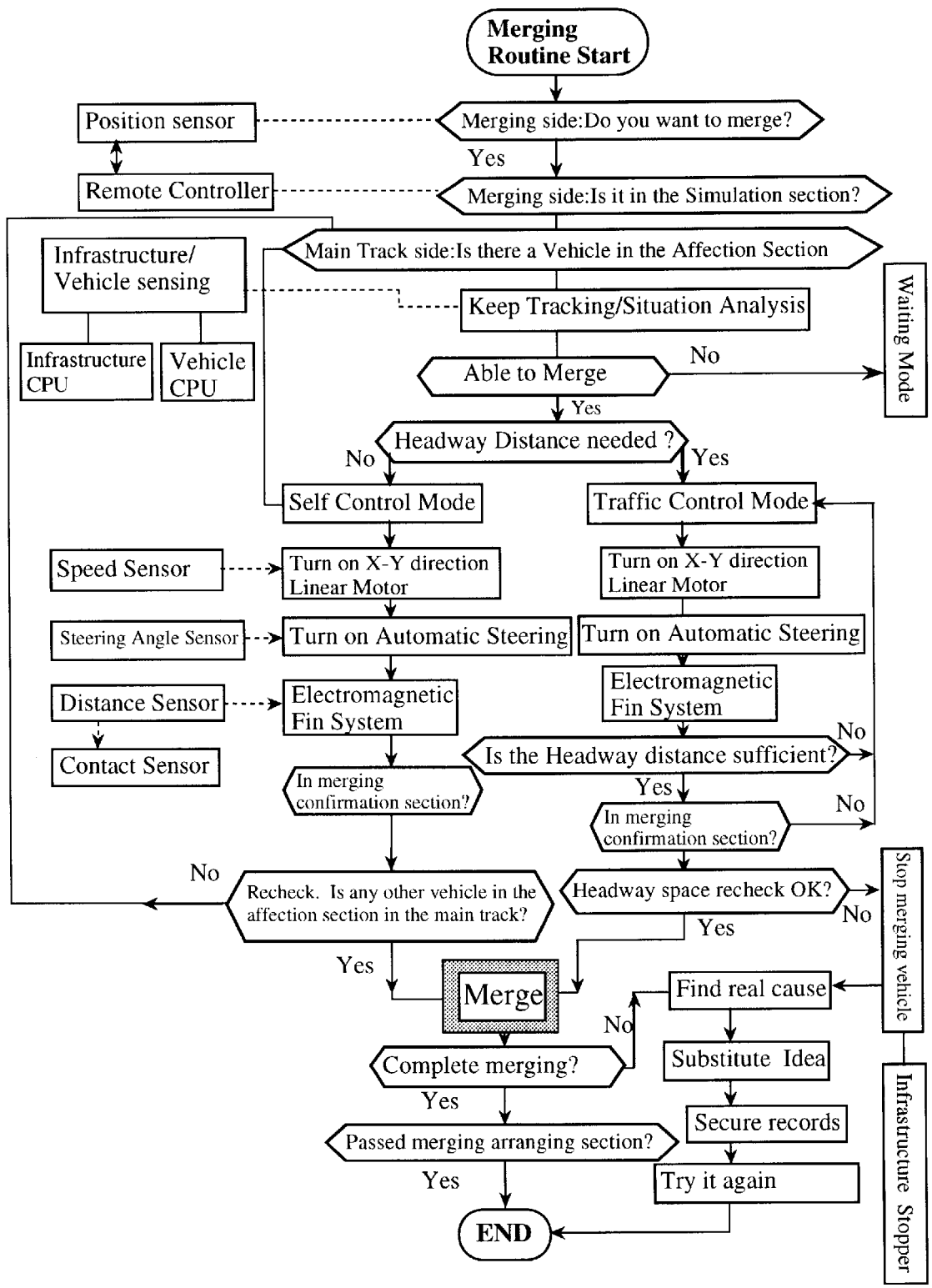
Figure 45:
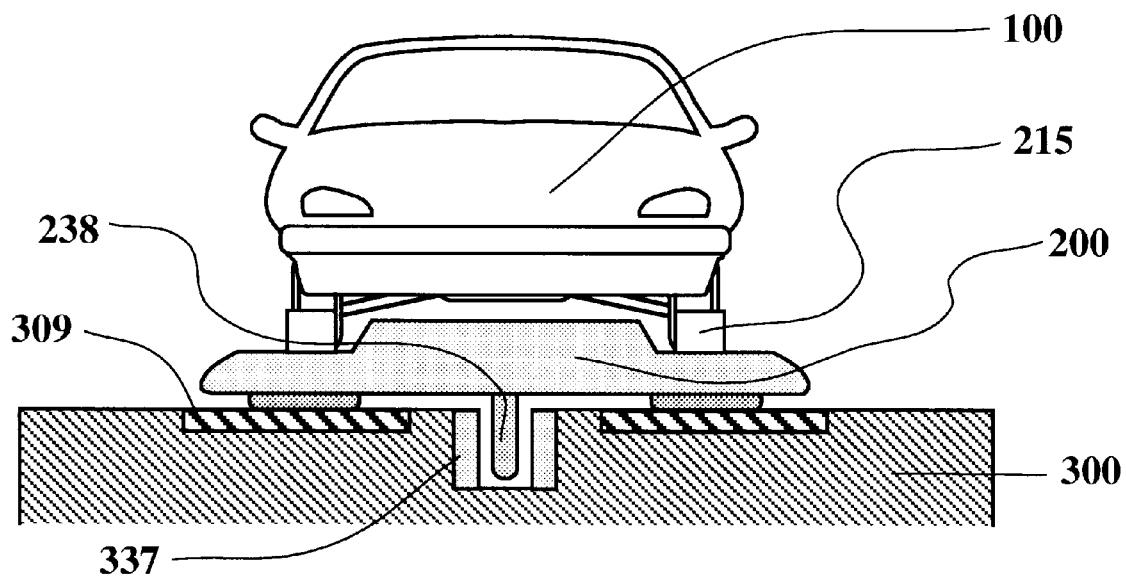
Figure 45:
Figure 45:
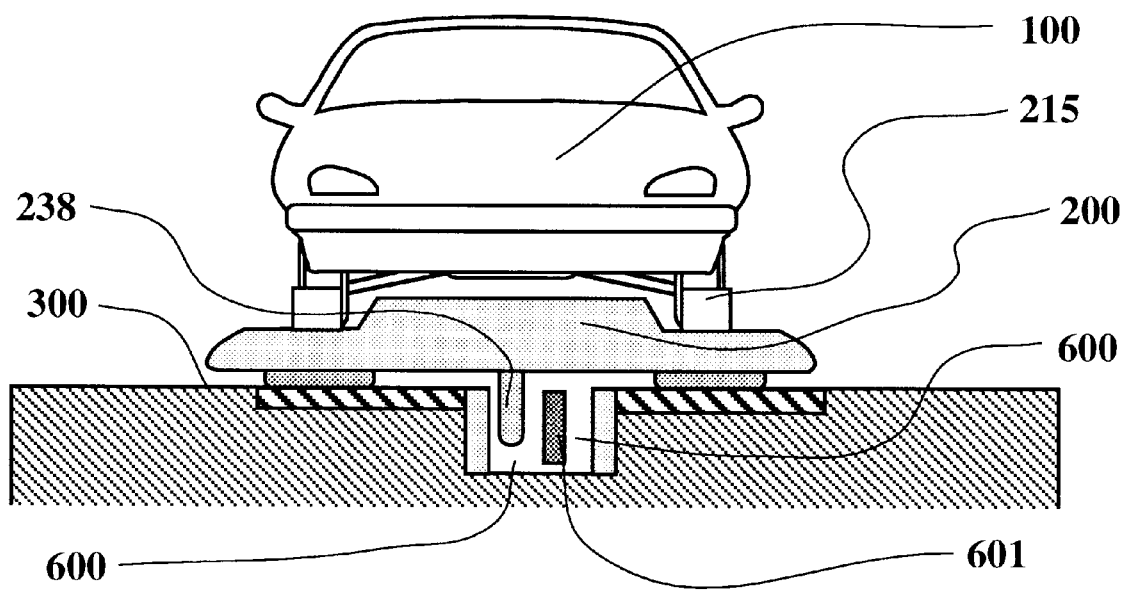
Figure 46:
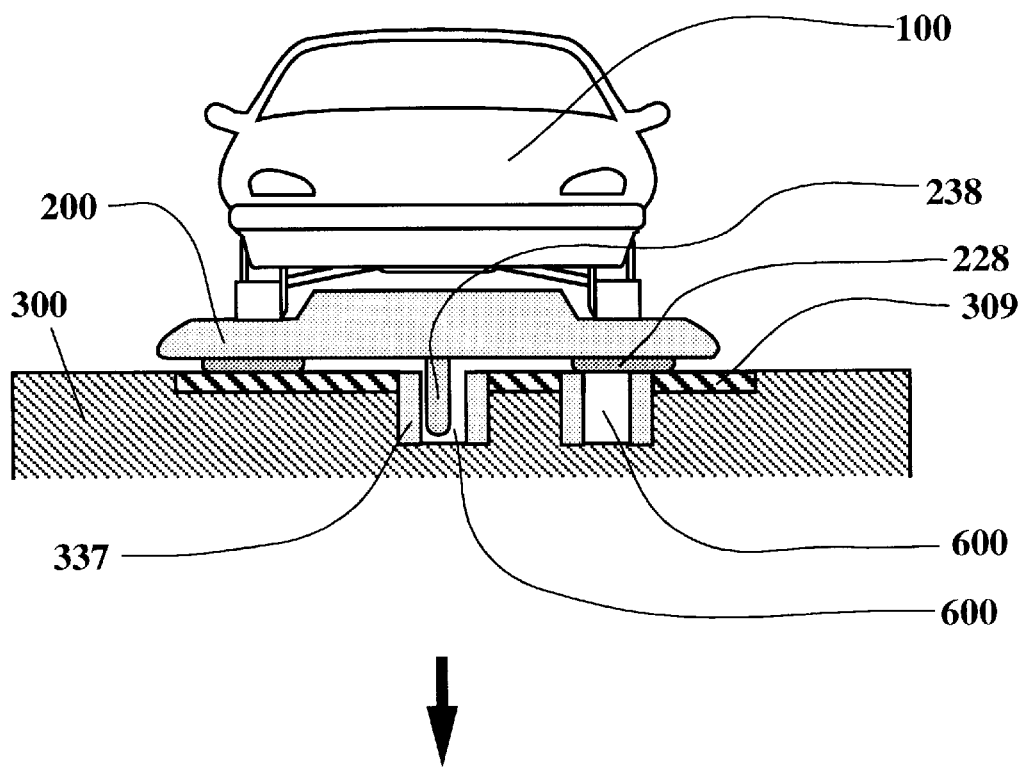
Figure 46:
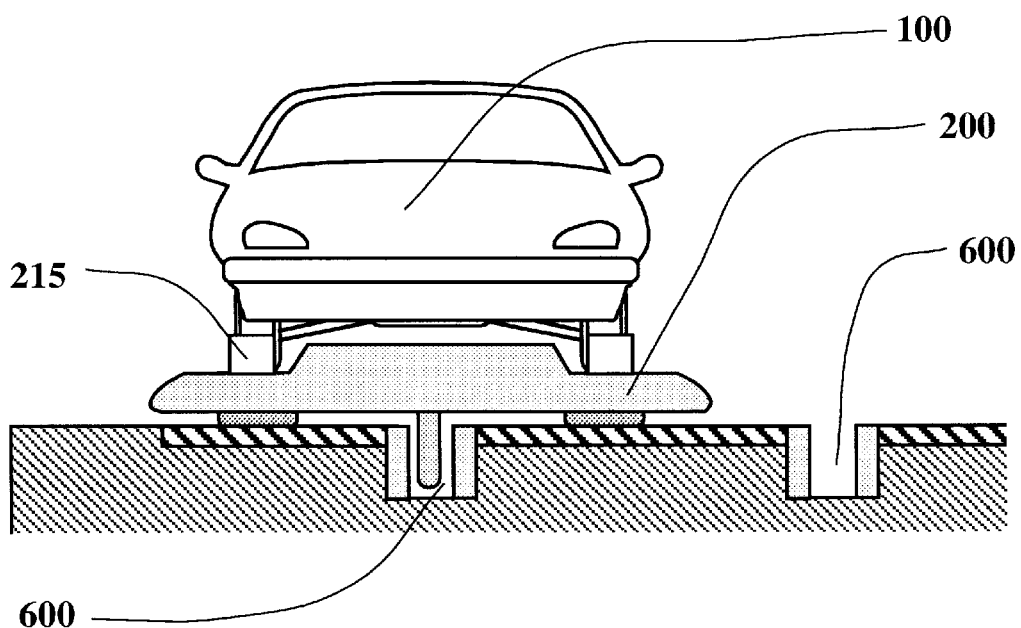
Figure 47:
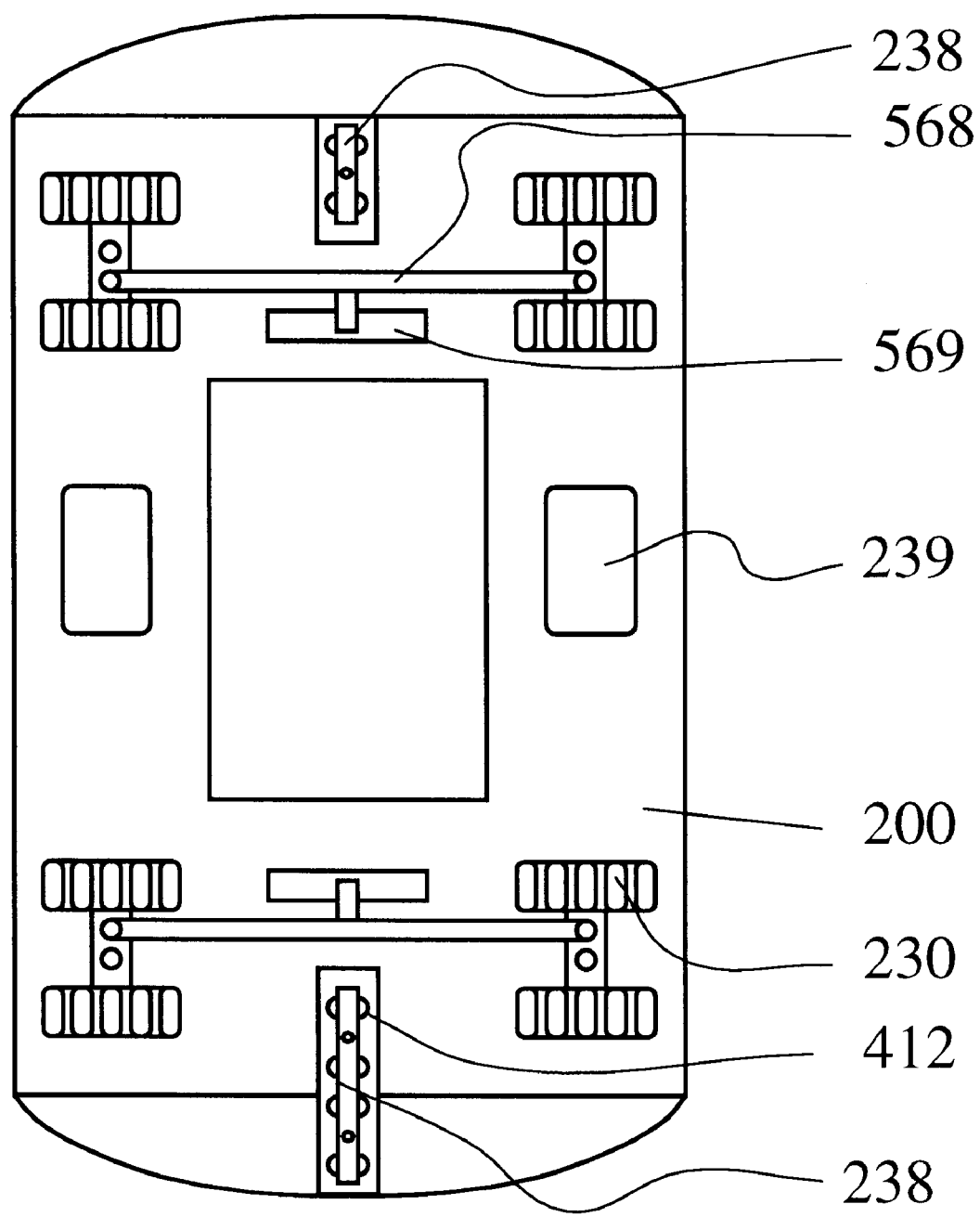
Figure 48:
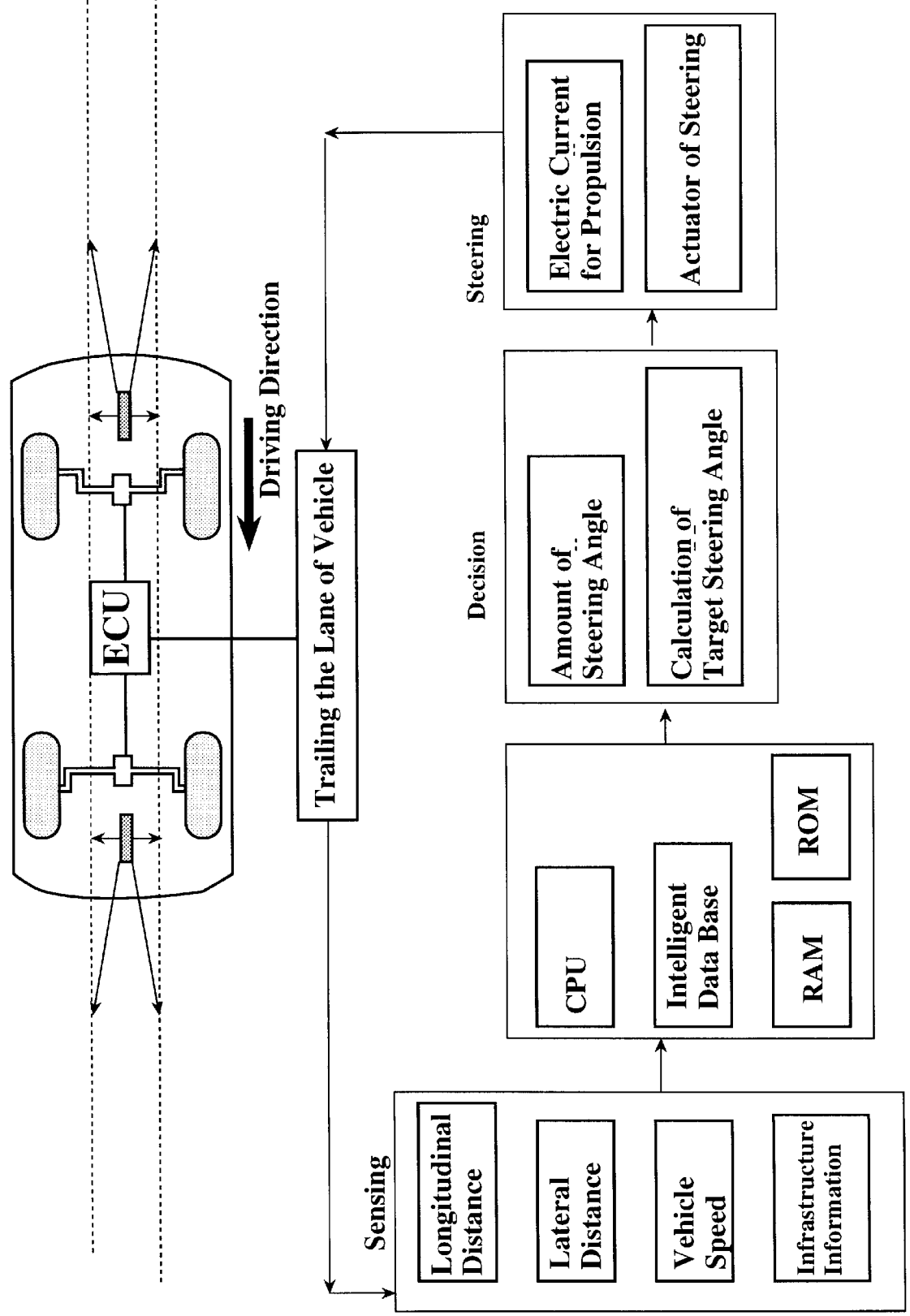
Figure 49:
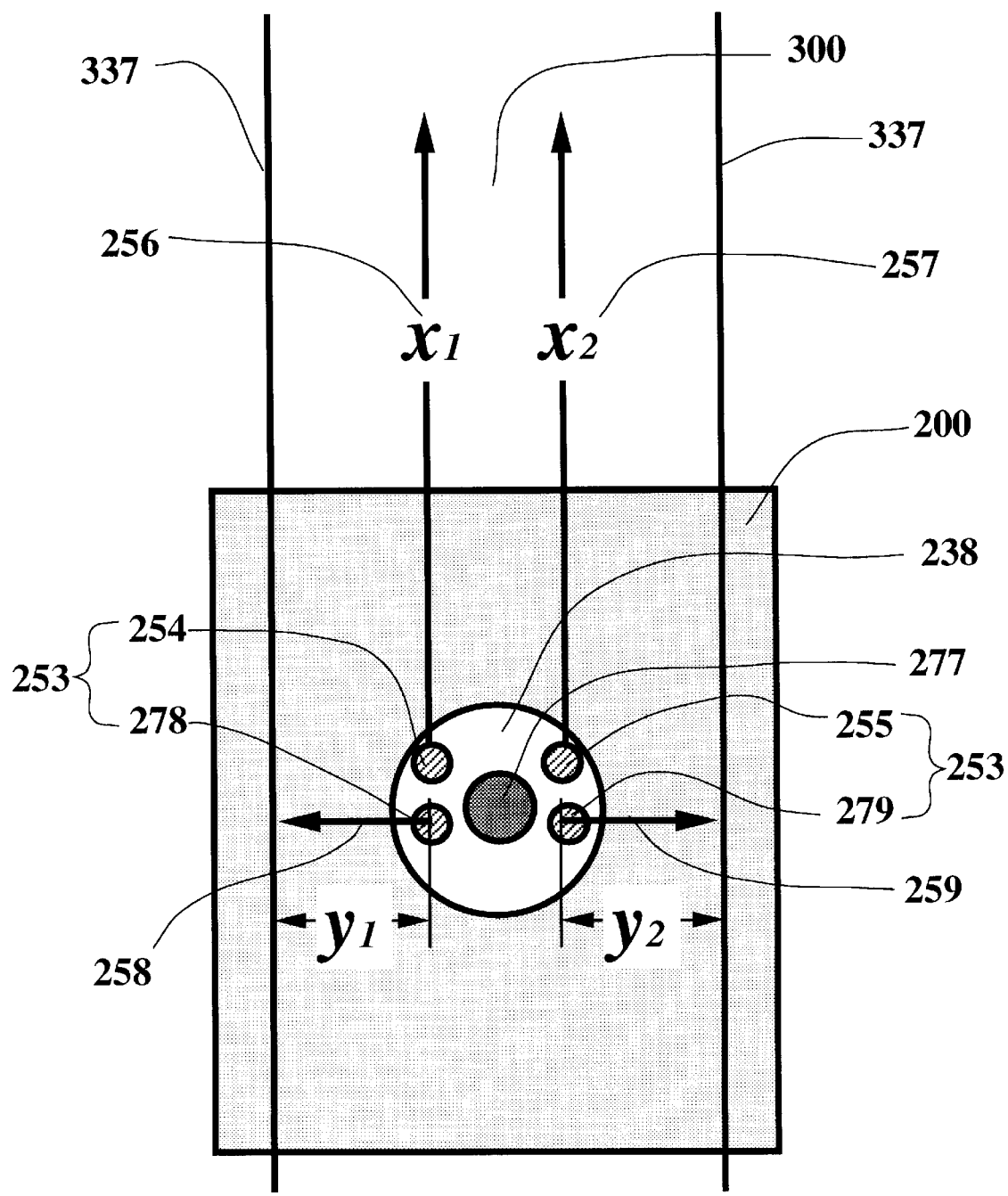
Figure 50:
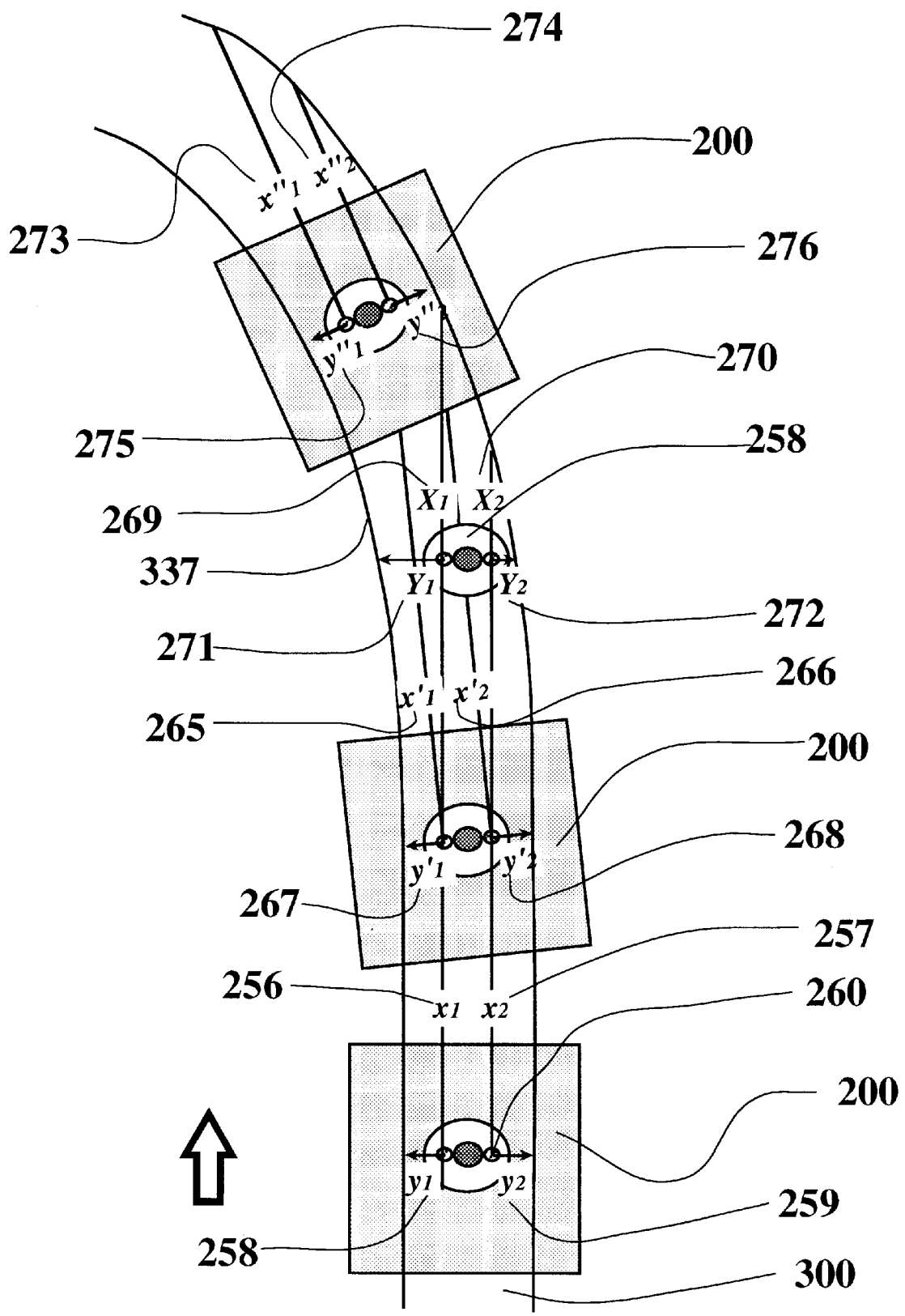
Figure 51:
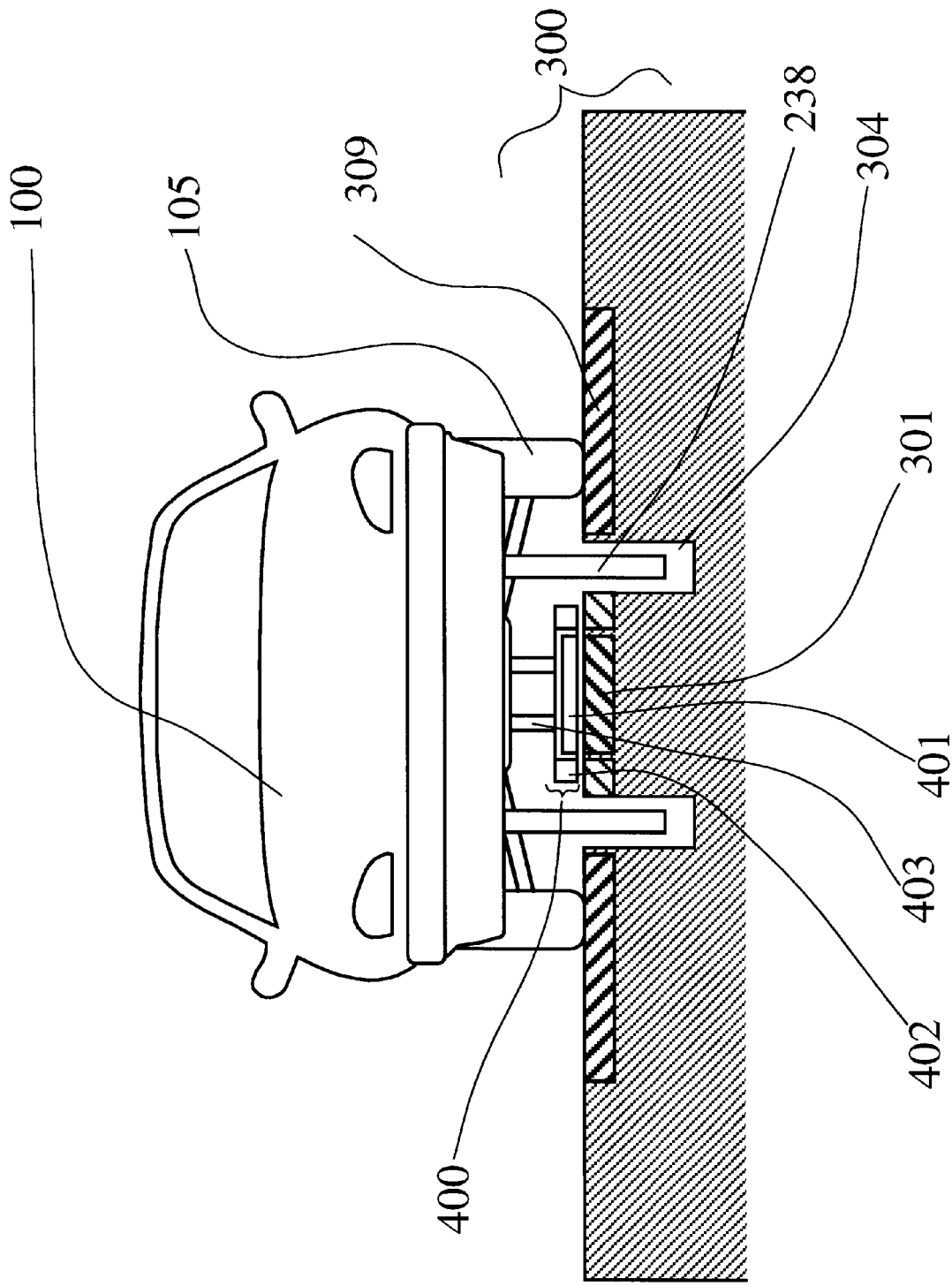
Figure 53:
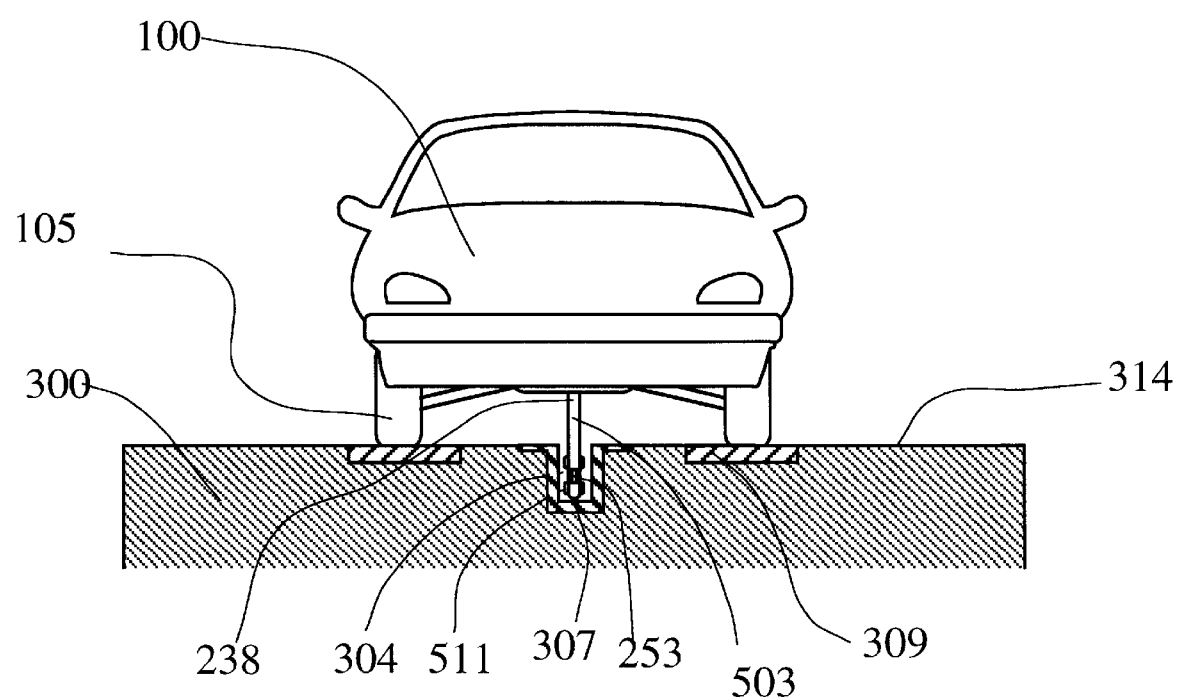
FIG. 53 shows the front view of the relation between the road 300 and the LDPF 238 which is installed on the automobile (car) 100.

In the ordinary road, the LDPF 238 is put in the settling box 505 which is installed in the automobile (car) 100. The automobile (car) 100 is supported by the tire 105, and is guided by the tire 105. The tire 105 rolls on the road surface 309. The draining road floor plate 315 is installed on the road 300. On the ordinary road, the automobile (car) 100 is driven by the automobile's (car's) 100 internal engine or electric motor. When the automobile (car) is traveling in this invention system, the LDPF is drawn downward from the fin settling box 505 by the pulling the actuator 506 up and down. Then the LDPF 238 is inserted in the ditch 304 for the automobile (car) 100 to be guide utilizing such a side wall distance sensor 524 and the automatic steering apparatus.

Figure 54:
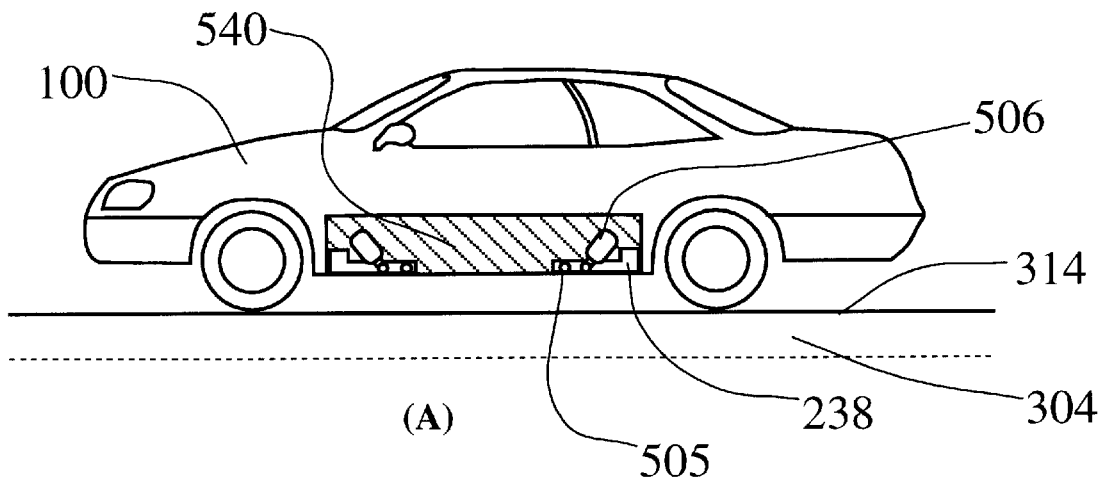
Figure 54:
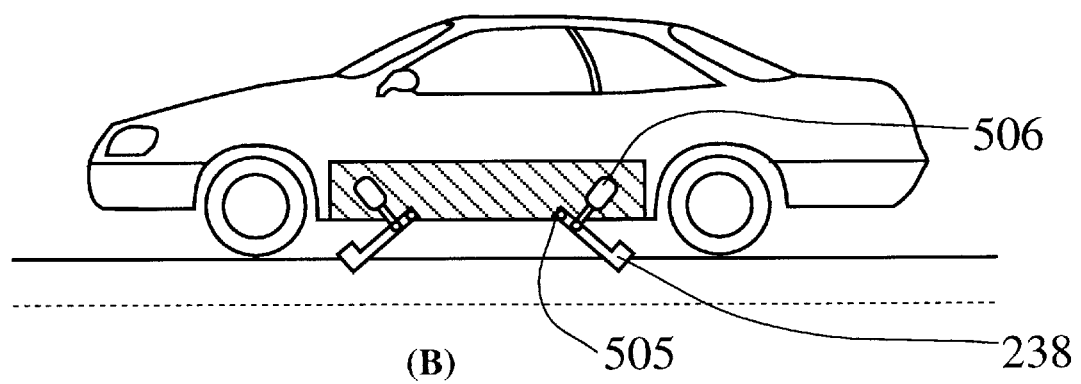
Figure 54:
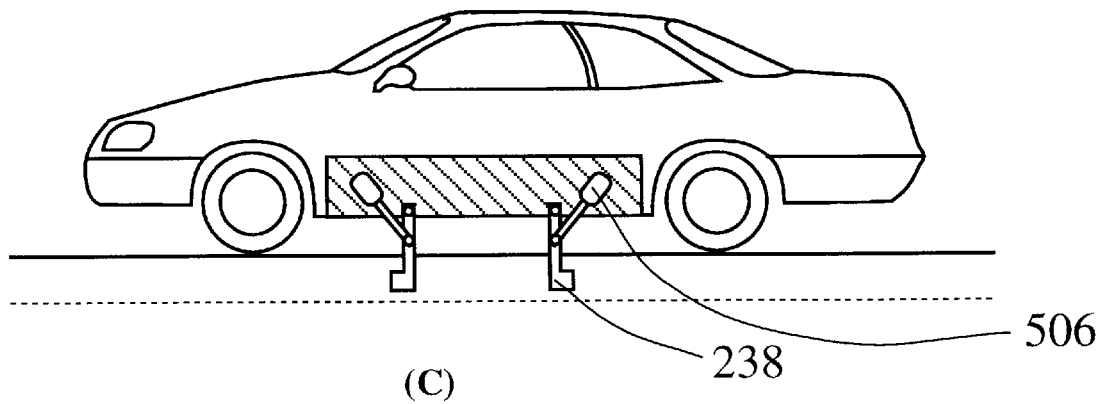

FIG. 54 shows the side view of the LDPF which is inserted in the ditch by being drawn downward from the automobile (car) 100, in this step wise figure. The following is the detailed explanation.

A: in the ordinary road, the LDPF 238 is settled in the box for the fin 505, which is installed in the automobile (car) 100. The automobile (car) 100 is supported by the tire 105, and it is guided by the tire 105. The tire 105 rolls on the road surface 309. Also, the road 300 is made with a draining road floor plate 315. On the ordinary road, the automobile (car) 100 is driven by the automobile's (car's) 100 internal engine or an electric motor.

B: When the automobile (car) 100 enters the invention transportation system, the LDPF 238 is drawn from the box for the fin 505 which is installed in the bottom of the automobile (car) 100, by the pulling the actuator 506 up and down (in the middle of the figure). The LDPF 238 is inserted in the ditch 304 (in the lower section of the figure).

C: The automatic steering system is installed on the automobile (car) 100, and the automobile is guided by sensors which is completed by the side wall distance sensor 524 attached on the LDPF 238.

Figure 55:
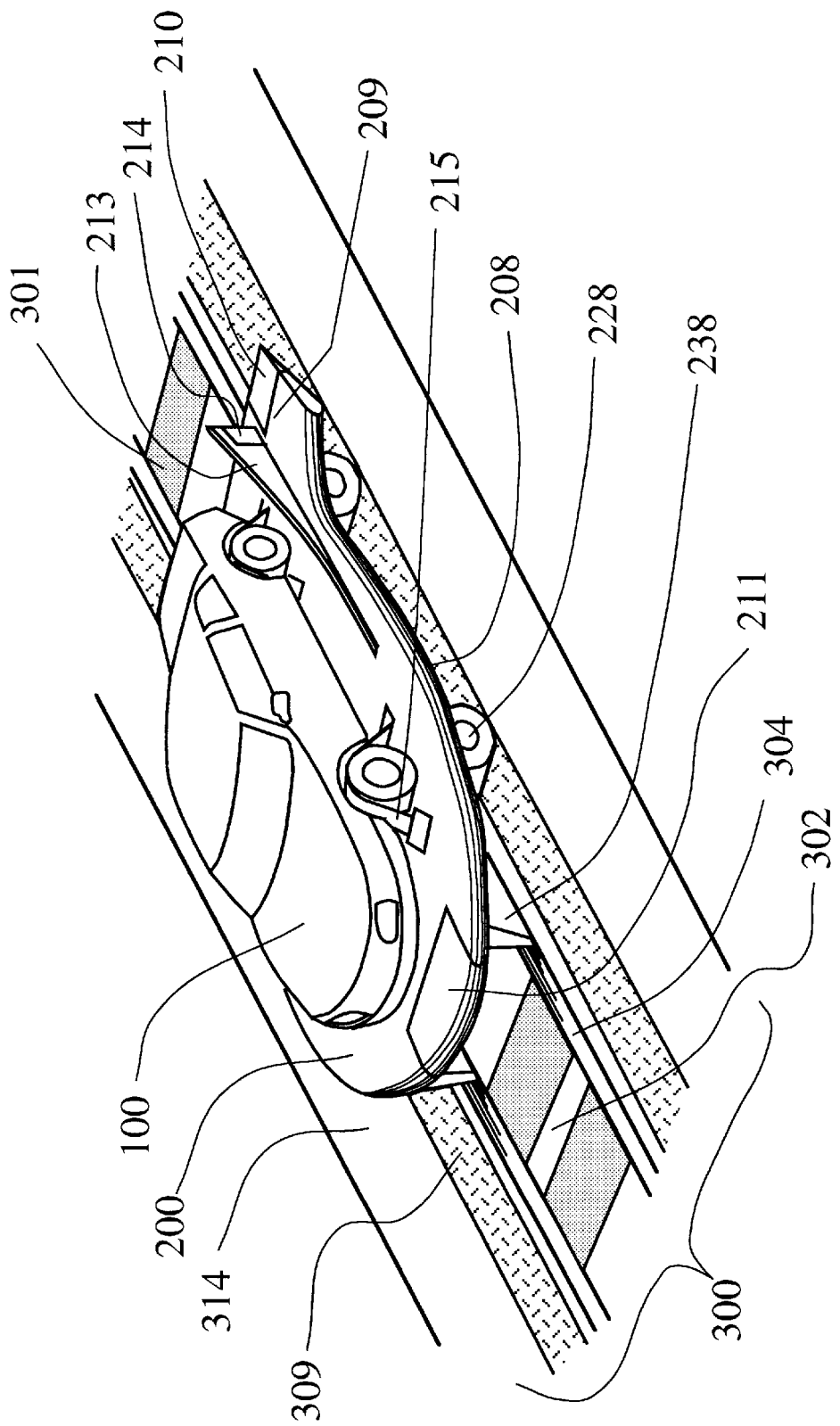

FIG. 55 shows the aerodynamic pallet which utilizes the air stream force. The automobile (car) is carried on the pallet 200, and it is fixed on the floor of the pallet 200 by the wheel fixing apparatus 215. Also, the shape of the pallet 200 forms the aerodynamic body 208, and the aerodynamic wing 209 is combined with the main body of the pallet. The flap 210 is attached on the aerodynamic wing 209. It controls the lifting air stream force on the pallet 200. Also, the vertical tail plane 213 is installed on the rear side of the pallet 200, and it is utilized to stabilize the high speed traveling pallet 200. The vertical rudder 214 is attached on this vertical tail plane 213. The rudder contributes to the pallet to control stability at high speeds. The LDPF 238 is attached on the pallet 200, and the fin is inserted in the ditch 304 to prevent deviation from the lane. The pallet travels on the road surface 309 as the tire 228 contacts to the road surface. However, when the pallet travels at high speeds, the pallet levitates from the road surface. The front air flow rectifier 211 is installed on the front section of the pallet 200 to control the aerodynamic force which is loading on the bottom of the pallet 200. Two LDPFs 238 are installed on the pallet 200, and the LIM (primary side) unit 302 is installed at the center of the pallet 200. Also, the light and heat collecting unit 302 is installed in between these light and heat collecting units. The road surface 314 forms the outer rim of the road 300. Also, the width of the lane does not present a problem, even if the tire 228 is deviates from the traveling surface 309.

Figure 56:
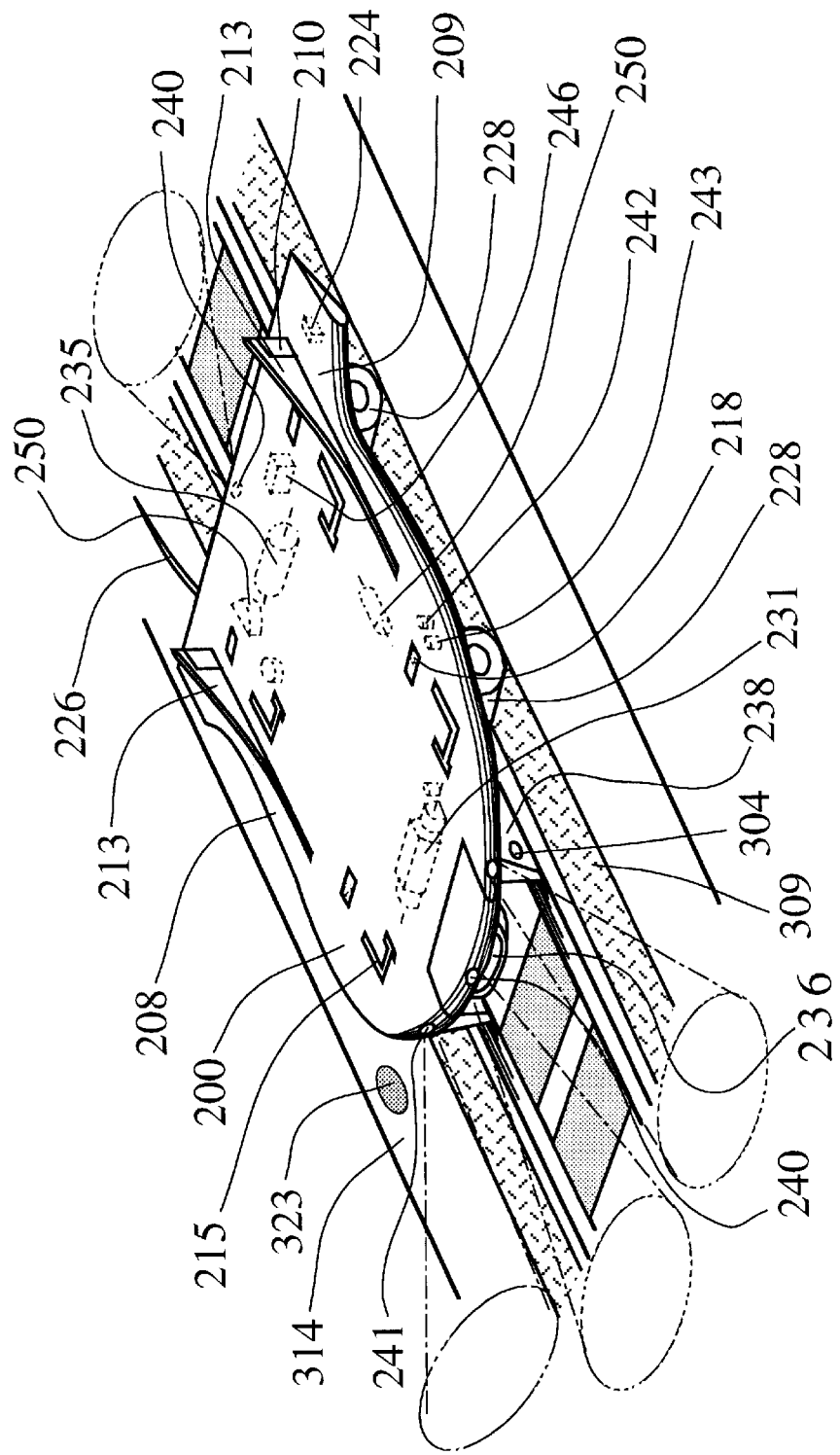

FIG. 56 shows all attached equipment on the pallet 200 which embodies the aerodynamic body 208.

Totally, four wheel fixing apparatuses 214 are installed, and the communication antenna 226 is installed on the rear side of the pallet. Two vertical tail wings 213 are installed on the rear side of the pallet to stabilize the travelling of the pallet. The rudder 210 is installed on each vertical tail wing 213, and functions when the pallet needs to change it's driving direction. In the front and back sides of the pallet, the headway distance sensor 240 is installed to measure the distance of the headway from the other pallets. The obstacle detecting sensor 241 is installed on the front side of the pallet to detect obstacles in front of the pallet. The LDPF 238 is installed on the bottom side of the pallet 200, and the LDPF 238 is inserted in the ditch 304 to prevent deviation from the lane. The detecting sensor of the wheel fixing 218 is installed on the wheel fixing apparatus 215 whether the wheel is securely fixed or not. The pallet 200 is supported and guided by the tire 228. The operation of guidance is completed by the automatic steering apparatus 321. The acceleration sensor 243 and speed sensor 242 are installed on the pallet 200. Then, the movement of the pallet 200 is monitored. Also, the pallet has the aerodynamic body 208 and the aerodynamic wing 209 to travel at high speeds. In this case, the traveling direction of the pallet is controlled by the operation of the rudder 210 and the rudder is controlled by the actuator for the rudder 250. The pallet 200 carries the battery 246 to provide electricity for the electronic control devices. The pallet recognition ID tag 224 is given to each pallet 200. The pallet is driven by the LIM (linear induction motor) usually. However, if a sudden power failure occurs, the pallet is driven by the low speed motor which is operated by the battery. The beacon 323 is installed to communicate between the road 300 and the pallet 200. Also the pallet has a traveling recorder 250 to record all the conditions of it's trip. The distance sensor 244 is installed on the LDPF 238. It measures the distance between the sensor and the side wall of the ditch 304. The results of the measurement are utilized for control of steering. The traveling road 228 of the pallet is the rolling surface of the tire 309. The surface of the road is made with rigid materials.

Figure 57:
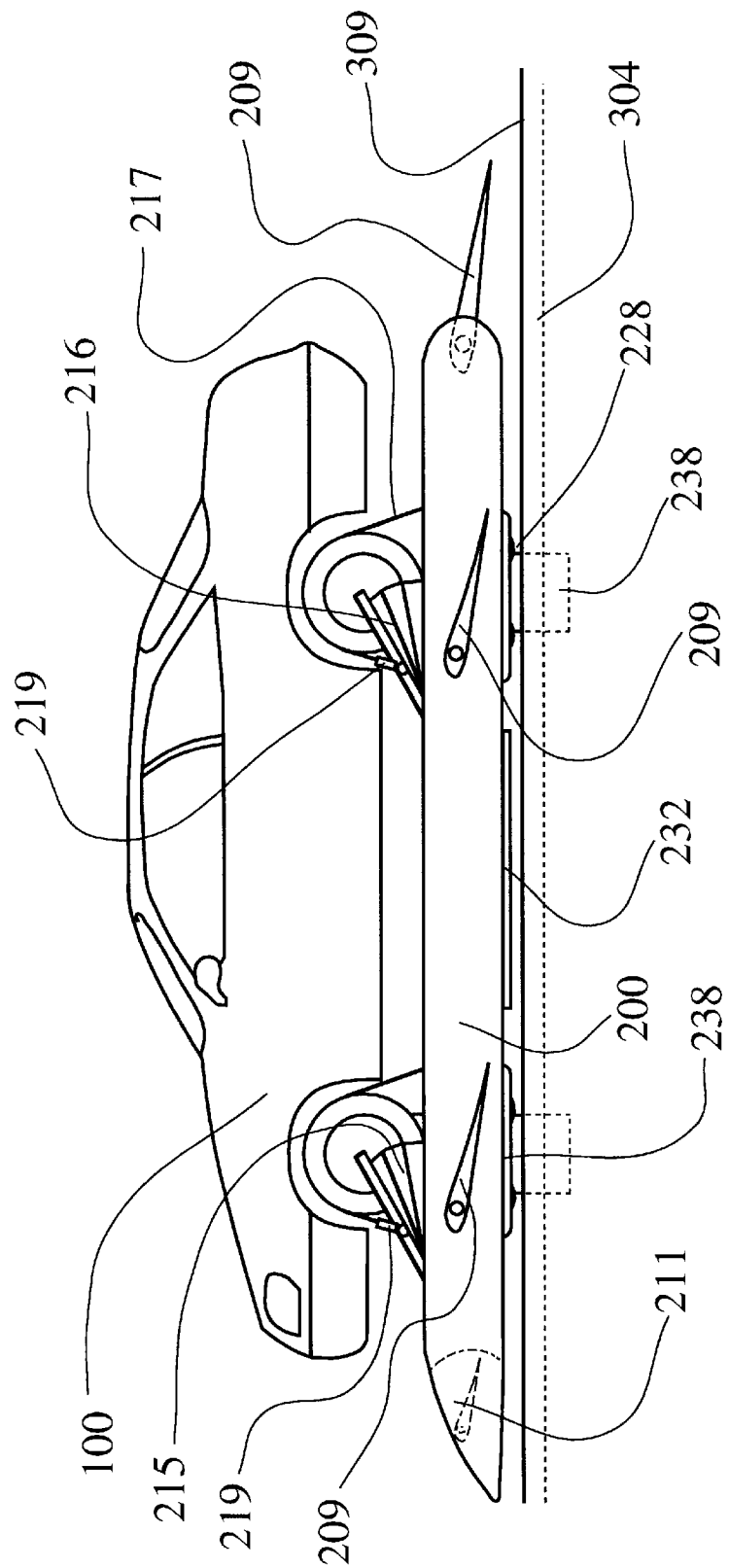

FIG. 57 shows the traveling outlook of the pallet 200, which carries the automobile (car) 100 and has the aerodynamic body to levitate.

The automobile (car) 100 is fixed on the floor of the pallet 200 with the wheel fixing apparatus 215. The wheel fixing apparatus 215 pulls the belt 217 from the retractor 219 to push the tire 105 down. Also, at the same time, the wheel is fixed by the wheel side support apparatus 216 laterally. The front and rear LDPF 238 are pulled down from the bottom of the pallet 200. Then, these LDPFs are inserted in the ditch 304. The reaction plate 232 is installed on the center bottom of the pallet 200. During low speed traveling the pallet 200 is driving on the road surface 309 while contacting it's tire 228. However, during high speed traveling, the pallet is traveling while levitating above the road surface by controlling the aerodynamic rudder 209. The front rectifier rudder 211 is installed on the front section of the pallet 200 to control air flow.

Figure 58:
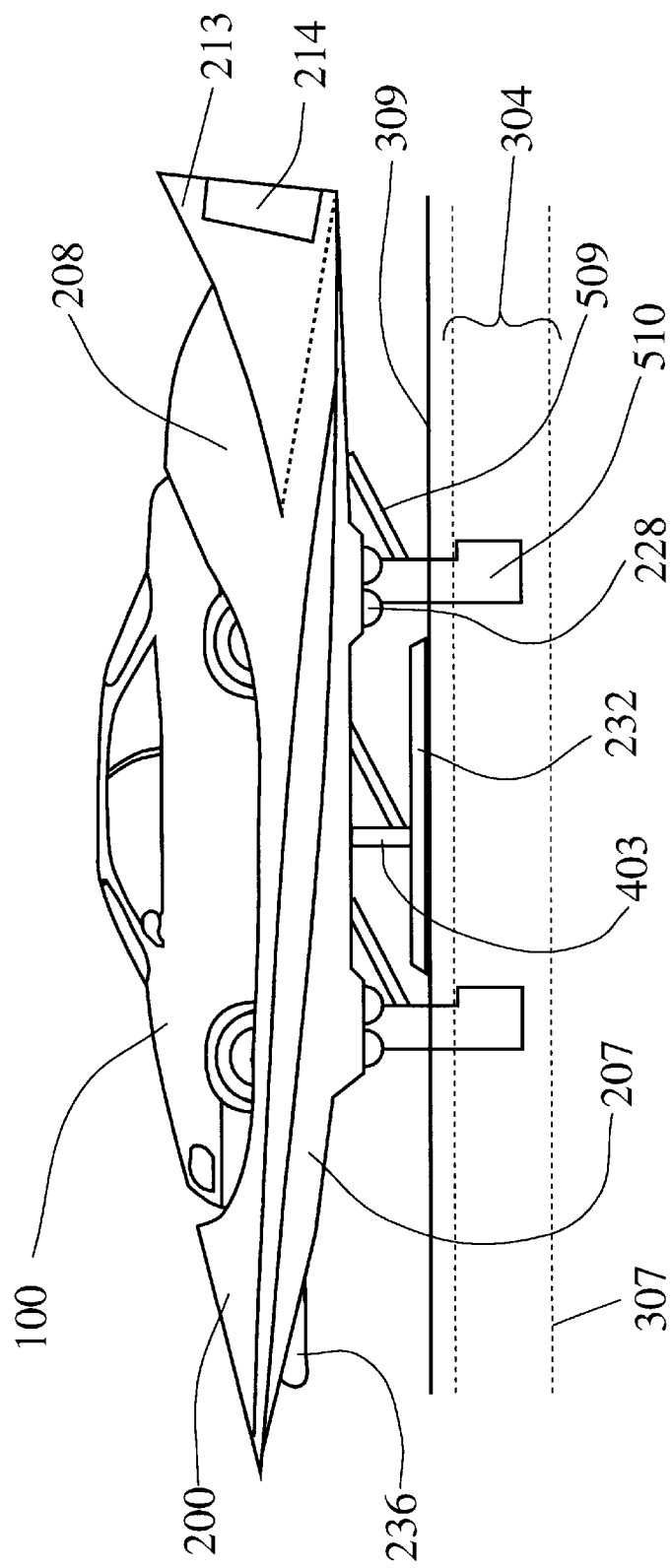

FIG. 58 shows the side view of the pallet which carries the automobile (car) 100 and levitates off the road more than 10 centimeters. The pallet 200 is made with the aerodynamic body 208. The lower part of the pallet 207 is made in an aerodynamic style to generate the lifting force. Also, the ditch 304 is composed of the overhang section 308 and bottom section 307. The fin expansion section 510 of the LDPF 238 protects the pallet 200 from the being pulled out from the ditch when the pallet deviates from the lane by the overhang section.

This pallet 200 has the ability to travel at high speeds by introducing the LIM (linear induction motor). The propulsion module 400, which is equipped with the reaction plate 232 in the center of the module, is drag down toward the road surface while maintaining minimum gap length without touching the road and is controlled by the electronically regulated device. The module is basically supported by the propulsion module supporting arm 403. The tire 228 is equipped for the pallet at the low speed traveling mode to accommodate the contacting roll with the surface of the road 309. In front of the pallet, the radiator cooling equipment which has an air inlet 236 to utilize the air to lower the coolant temperature and circulate it. Then, the coolant lowers the temperature of the reaction plate 232 to prevent lowering efficiency of the plate. The vertical tail wing which is equipped with the lateral rudder 214, is installed on the pallet 200 to stabilize the attitude of the pallet during high speed traveling The raising up and drag down actuator 509 is installed on the LDPF 238 to be able to raise up and drag down the LDPF 238.

Figure 59:
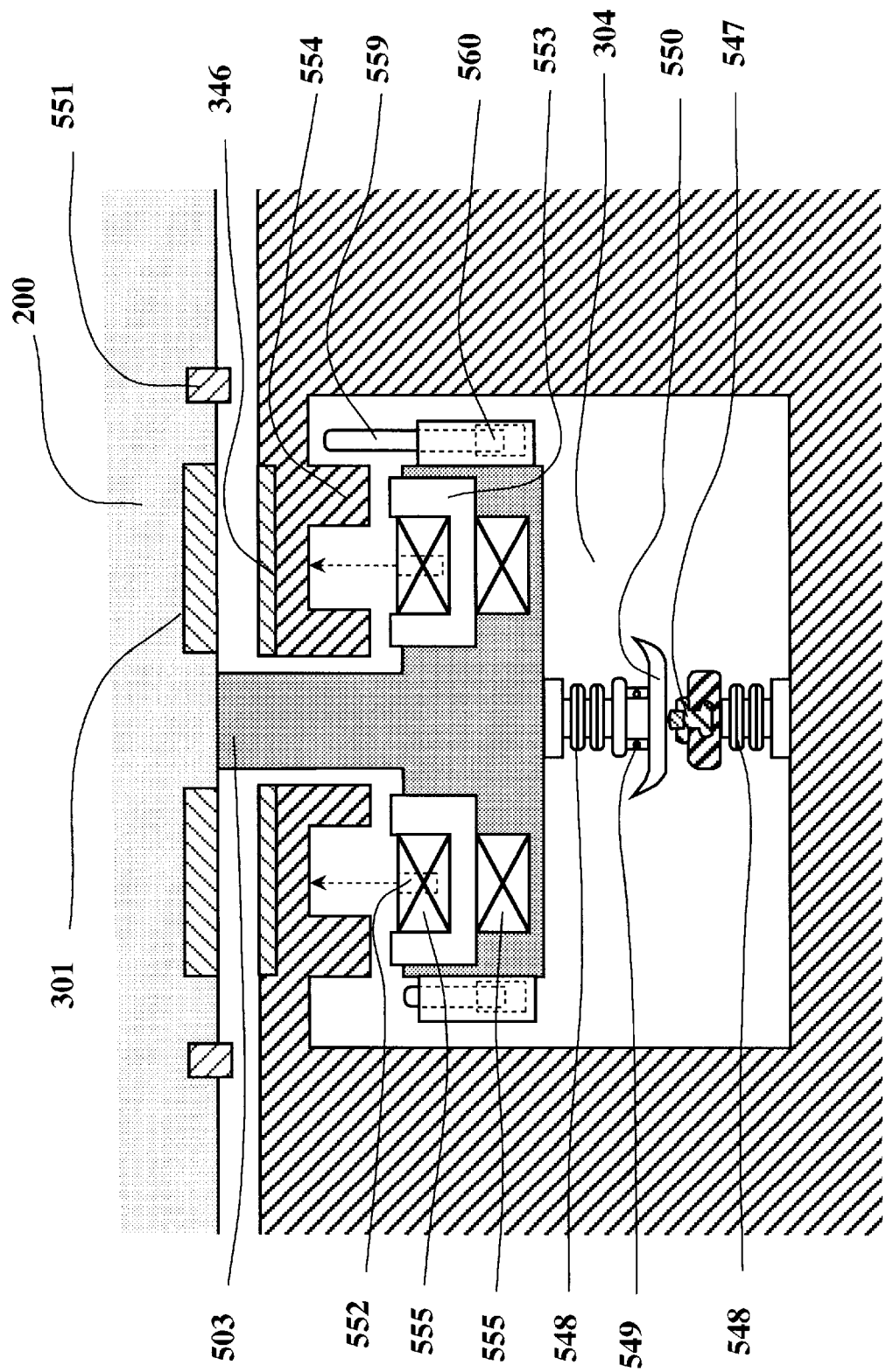

FIG. 59 shows the front view of the fin for magnetic levitation. The skid 551 and the LIM (primary side) 301 are installed on the bottom side of the pallet 200. In the case of magnetic levitation, both sides of the pallet are equipped with the LDPF for magnetic levitation. The fin strut 503 is also installed on the bottom side of the pallet 200. On both sides of the fin, the electromagnets 553 are installed independently. Both sides of the fin are equipped with the electromagnet 553. The electromagnet 553 is magnetized by the electromagnet coil 555. The electromagnet is absorbed by the magnetic material which is installed on the upper side of the ditch 304, because the overhang reversed U-shape ditch rail 554 is made of magnetic material. When the electromagnet 553 is electronically magnetized, it is absorbed by the reversed U-shape ditch rail. Then, the upper direction lifting force is generated to push the pallet 200 up. Thus, the weight of the pallet is supported by the magnetic field, and the propulsion force of the magnetically levitated pallet 200 is generated by the interactive force between the pallet LIM (primary side) unit 301 and the reaction plate 346, which is installed on the road. The gap distance sensor 552 is installed on the wing of the fin to measure the distance to the reversed U-shape rail 554. Then, the electromagnetic force is controlled based on the data of the gap distance to maintain a certain distance. This control of the gap distance method is not only used for the magnetic levitation, but also for maintaining a certain distance of the gap distance of the linear induction motor. There is also the electricity collecting apparatus under the fin. The electricity insulator 548 is installed on the bottom of the fin, the framework 549, and electricity collecting pantagraph 550, to collect the electricity. The solid electricity wire 547 and electricity insulator 548 provide the electricity for the pallet 200. With this electricity collecting system, even if the fin moves in the lateral direction, the electricity is securely collected. Also, at the outer end of the wing of the fin, the guiding skid 559 is installed on the guiding actuator 560. With this guiding skid 559, during diverging, the mechanical fail safe mechanism is ensured.

Figure 60:
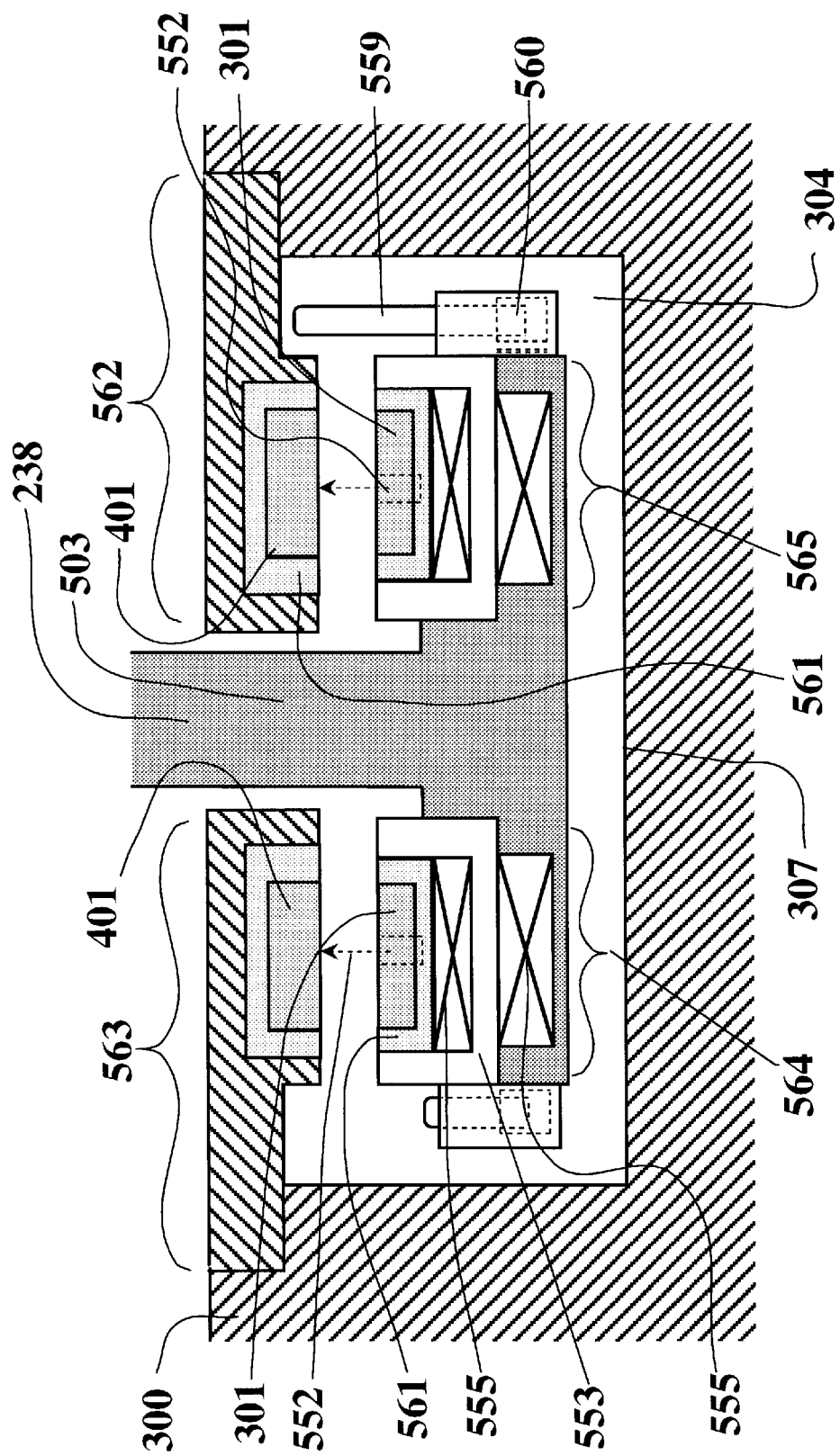

FIG. 60 shows the cross section figure of the LDPF 238 on which the LIM (primary side) is installed. The fin strut 503 is located on the center of the LDPF 238. At the both outer ends of the fin, here are the left fin wing 564 and the right fin wing 565 respectively. The electromagnet 553 and the electromagnetic coil 555 are installed on each of the wings to generate the electromagnetic field for the magnetic levitation. Also, the electromagnet 553 is installed on both sides of the wing independently through the magnetic field shield 561. There is one pair of electromagnets installed on each side of the wing on the fin. Also, the reversed U-shape rail 563 is installed on each of the upper parts of the ditch 304 to correspond with each electromagnet 553. The electromagnet 553 is magnetized by the electromagnetic coil 555. The reversed U-shape, which is installed at the upper section of the ditch 304, is made from the magnetized material. Thus, when the electromagnet is magnetized, the electromagnet 553 is absorbed toward the reversed U-shape rail. As a result, the upper force is generated to the fin to lift the pallet. The propulsion force for the pallet is generated by the LIM (primary side) unit 301 on the wing of the fin and the reaction plate 401 on the reversed U-shape rail. The gap distance sensor 552 is installed on the wing of the fin to measure the distance to the reversed U-shape rail. Then, the output of the electromagnetic field is controlled based on the information of the distance to maintain a certain distance. This control of the gap distance method is not only used for the magnetic levitation, but also for maintaining a certain gap distance for the linear induction motor. Also, at the outer ends of the wing of the fin, the guiding skid 559 is installed on the guiding actuator. By this guiding skid 559, during diverging, the mechanical fail safe mechanism is ensured.

Figure 61:
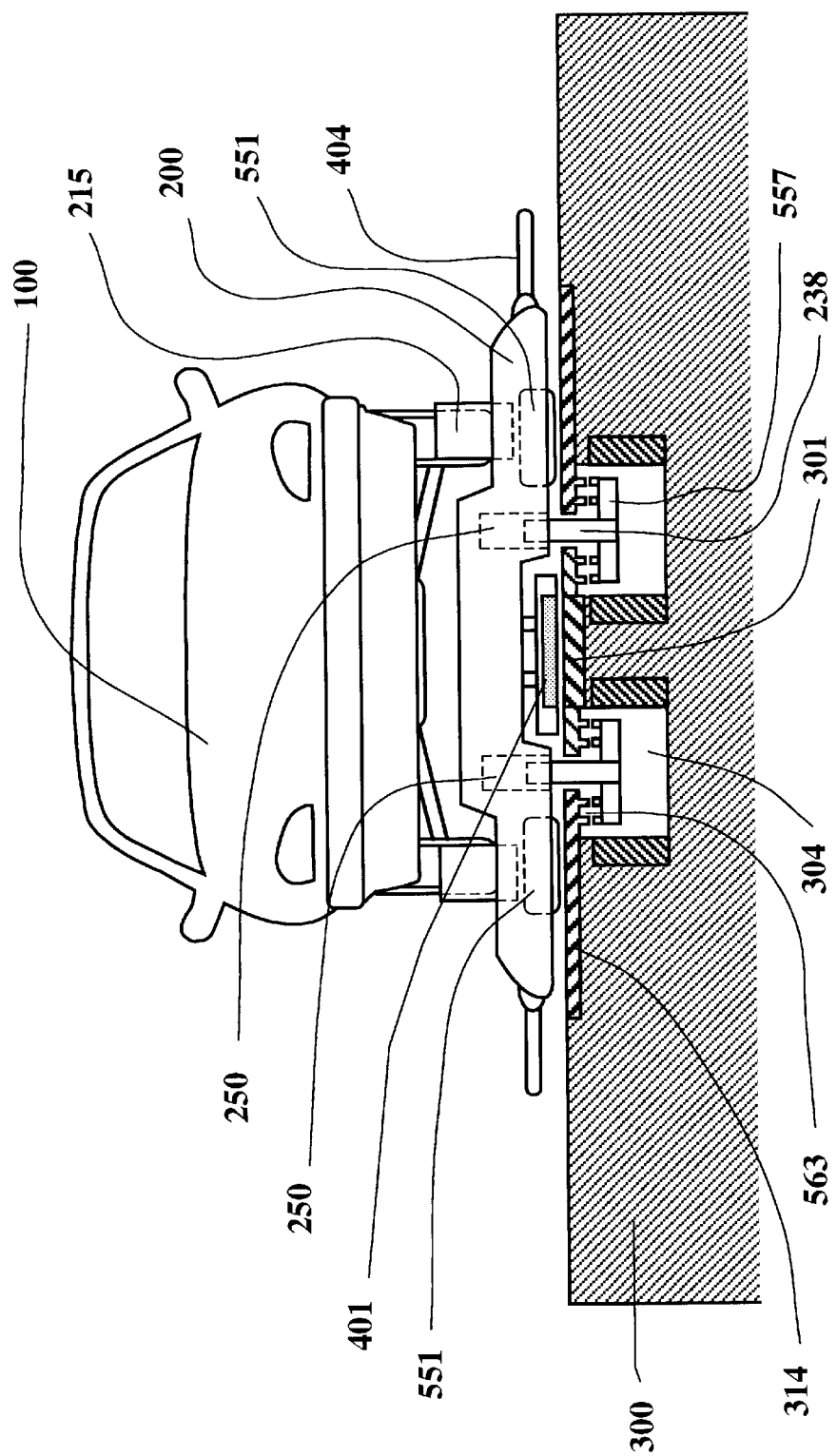

FIG. 61 shows the front cross section figure of the magnetically levitated pallet. The automobile is fixed on the pallet 200 with the wheel fixing apparatus 215. The LDPF 238 is installed on the bottom side of the pallet 200, and the LDPF 238 is inserted in the ditch 304. The vertical length of the LDPF 238 is variable and the length is controlled by the actuator 250. The LDPF 238 supports the body of the pallet magnetically with the levitating/guiding electromagnet 557. The reaction plate 401 is installed on the pallet 200. Also, the LIM (primary side) 301 is installed on the road 300. The reversed U-shape rail is installed on both sides of the ditch 304 at the road surface 314 area to match with each side of the LDPF 238 respectively. The left side of the reversed U-shape rail 563 and so on, totaling four rails are installed. In addition, The skid 551 and the aerodynamic wing 404 are installed on the pallet 200.

Figure 62:
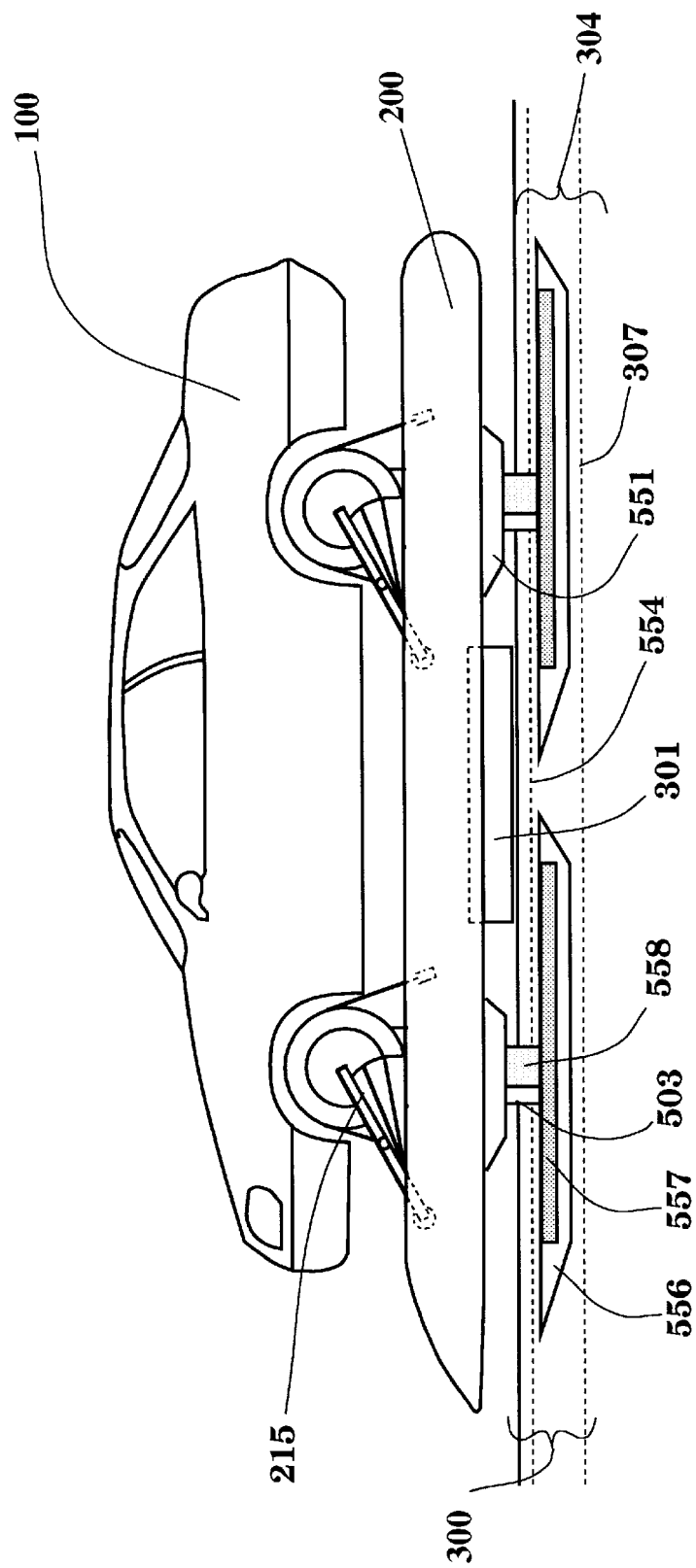

FIG. 62 shows the front cross section figure of the magnetically levitated pallet. The automobile is fixed on the pallet 200 by the wheel fixing apparatus 215. The LIM (primary side) 301 is installed on the bottom side of the pallet. Four of the LDPFs with magnetic levitation are installed on the pallet 200. The magnetic levitation runner 556 is installed on the bottom side of the fin, supported by the fin strut 503 as a strut and the pallet levitates to glide on the road. The levitation/guidance electromagnet 557 is installed on the magnetic levitation runner 556. The reversed U-shaped rail 554 is installed on the ditch 304. The gap distance is electronically controlled to maintain a certain distance for the pallet 200 to levitate magnetically. The broken line at the bottom section of the figure indicates the very bottom of the ditch 307. The skid 551 is installed on the pallet 200. Also, the fan-tailed shape brake system 558 is installed on the fin strut 503 as the band is expanded like a fan-tail and pushes downward to the bottom of the ditch.

Figure 63:
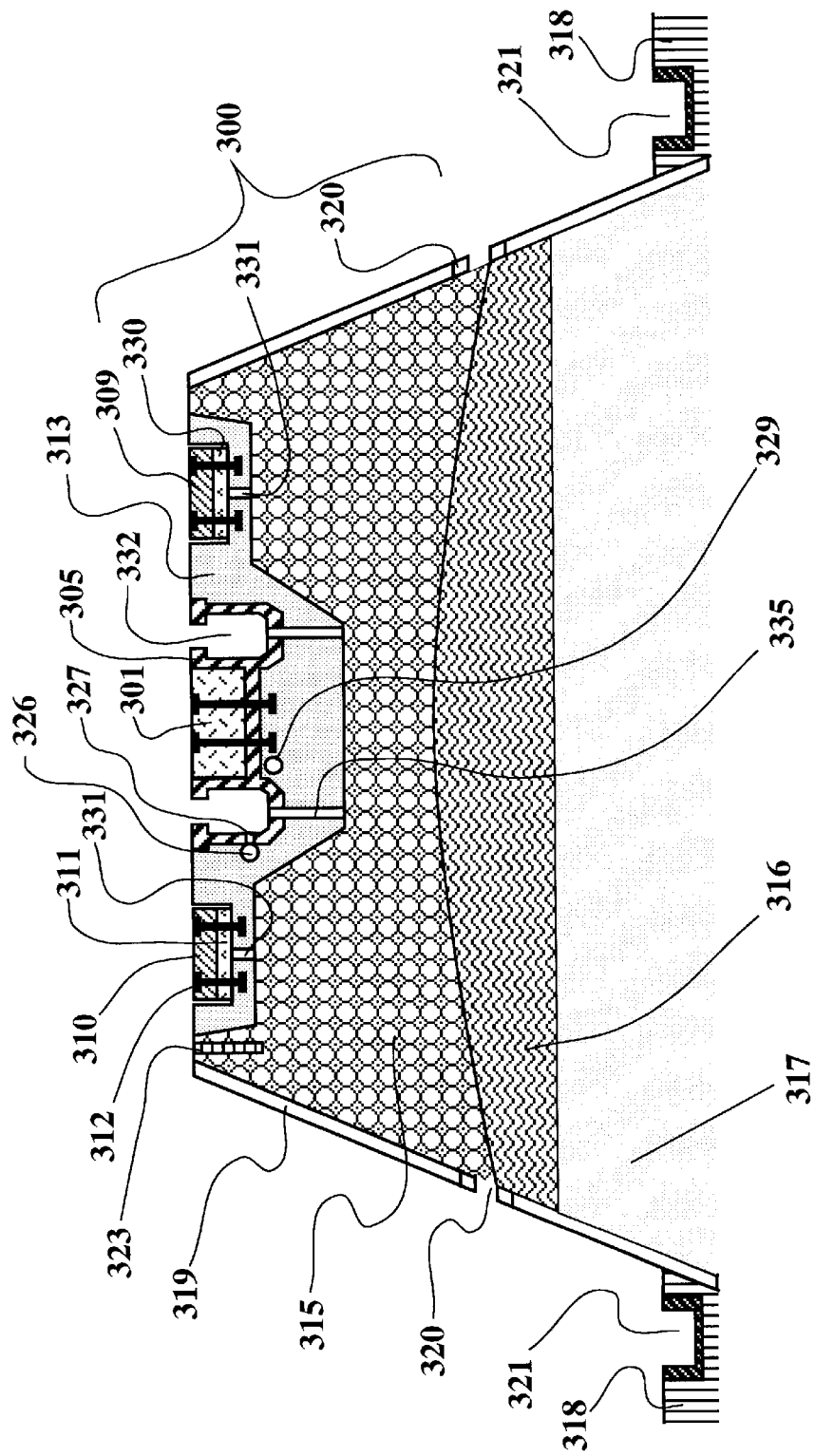

FIG. 63 shows the cross section of the paved road 300. This invention's structure of the road functions not only as the ordinary road, but has the guiding function. This type of road is constructed as unit structure while maintaining fine accuracy. Thus, the main structure is established on the concrete slab unit 313. In this figure, the drawing shows the cross section of this road 300. The figure shows the case of one lane to be understood easily. The subgrade 317 is constructed on the natural roadbed 318. The non water permeable roadbed 316 is constructed on the subgrade. The water permeable subgrade 315 is put above the roadbed. The slab unit 313 is put on the water permeable subgrade 315. The side slope 319 is compacting the side of the invention road, and drip holes 320 are installed in the side slope 319 to drain the waste water to the side gutter 321. The water permeable subgrade 315 drains the water. The beacon 323, which communicates with the vehicle and the integrated transportation control center (ITCC) in both directions, is installed in the water permeable subgrade 315. The wheel rolling road surface 309, on which the wheel of the pallet is rolling, is installed on both side of the slab unit 313. The road surface 309 is made from the perforated steel plate 310. The steel plate is set on the slab unit 313 by the bolt 312 through the buffer pad 311. The perforated steel plate 310 has plural holes to drain the water. Also, the buffer pad has plural holes. Thus, rain water can run to the bottom of the wheel rolling road surface side gutter 330. Water then approaches to the water permeable subgrade 315 through the wheel rolling road surface drain mouth 331. Around the center of the road surface, there are two lane deviation preventing ditches 332 formed as a one-bodied pair on the double sided ditch 305. In the middle of the one-bodied pair on the double sided ditch 305, the ditch for the linear motor 333 is formed, and the LIM (primary side) unit 301 is installed by the bolt 312. The electricity supplying cable 329 is installed in the slab unit 313. Also, the slit for the leaky coaxial cable (LCX) 327 is installed on the side wall of the one-bodied pair on the double sided ditch 305 to radiate the electromagnetic field from the leaky coaxial cable (LCX) 326. The drain side gutter 335 is installed in the bottom of the ditch to drain the water.

Figure 64:
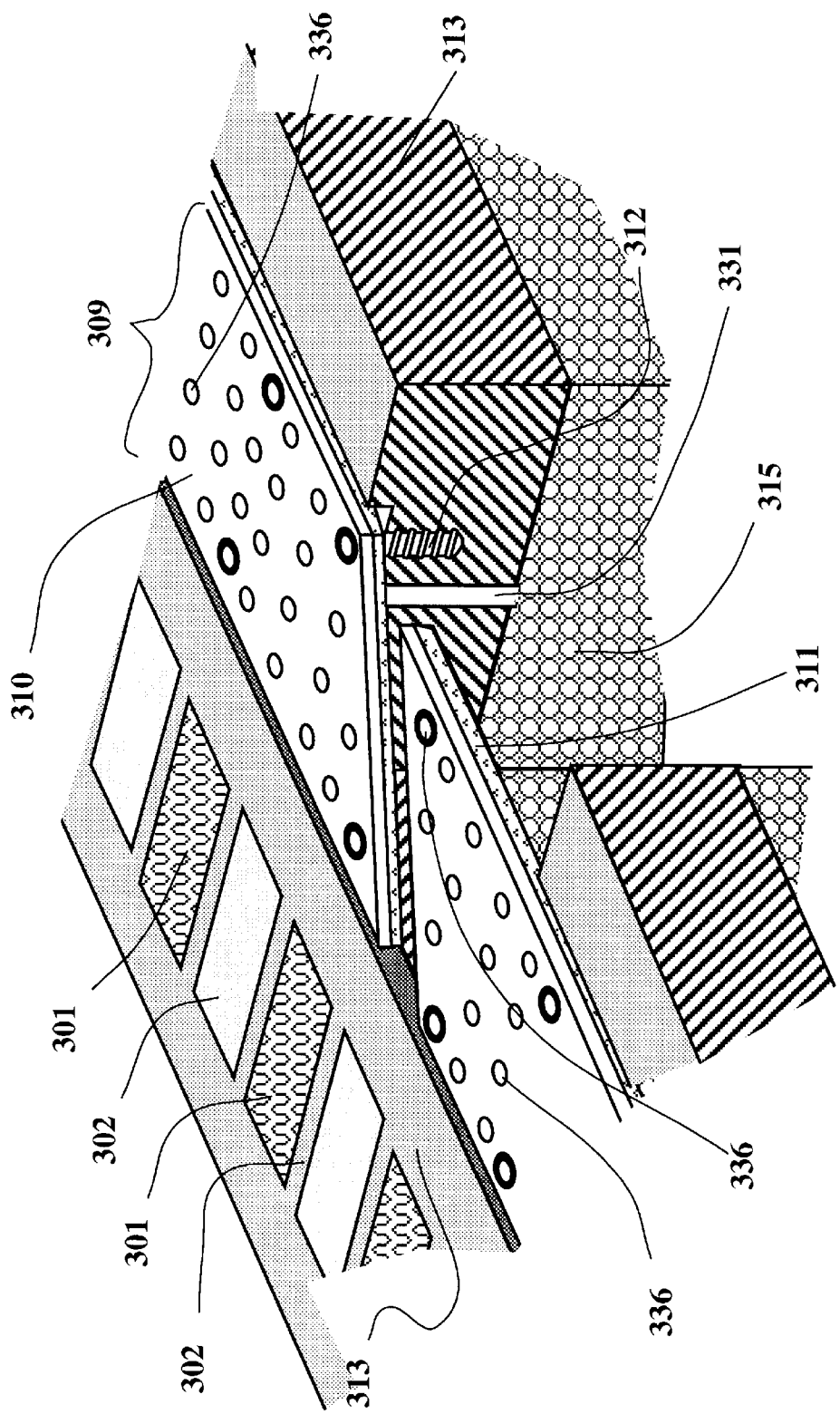

FIG. 64 shows the bird eye's view of the cross section of the paved road 300 of the invention, especially the wheel rolling area. The slab unit 313 is installed on the water permeable subgrade 315. The water permeable subgrade 315 is the subgrade to drain water. The beacon is also installed in the water permeable subgrade 315. The wheel rolling road surface 309 is formed on both sides of the slab unit 313 for the wheel to roll on the road surface. The wheel rolling road surface 309 is made from the water permeable perforated steel plate 310. The plate is fixed to the slab unit 313 by the bolt 312 through the buffer pad 311. On the surface of the perforated steel plate 310, there are plural drain holes 336 for draining water. Also, the buffer pad 311 has plural holes. Thus, rain water is run to the bottom of the wheel rolling road surface side gutter 330. Water then approaches to the water permeable subgrade 315 through the wheel rolling road surface drain mouth 331. Furthermore, around the center of the road surface, there are two lane deviation preventing ditches 332 formed by a one-bodied pair double sided ditches 305. The LIM (primary side) unit 301 and the solar energy light/heat collecting unit is installed alternately on the center of the one-bodied pair double sided ditches 305.

Figure 65:
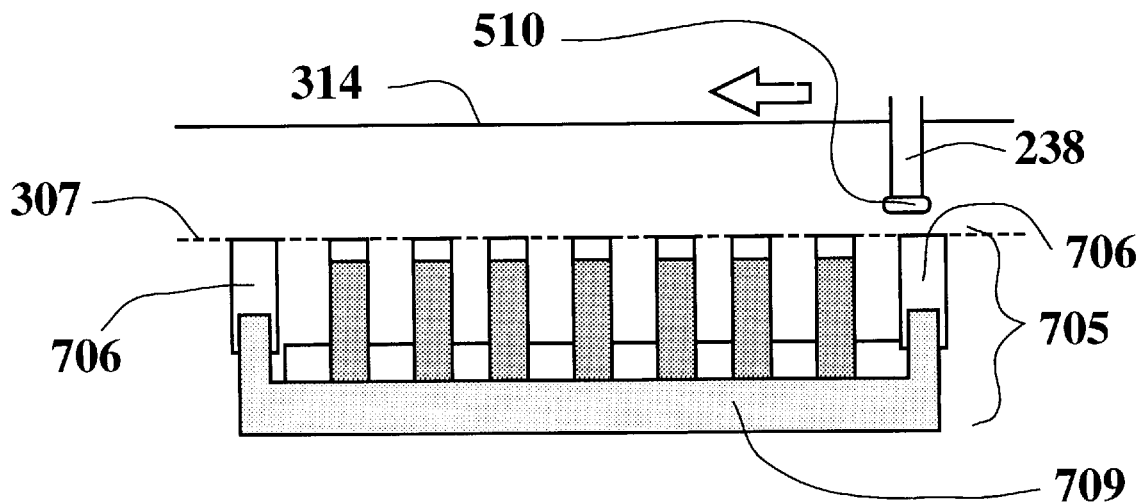
Figure 65:
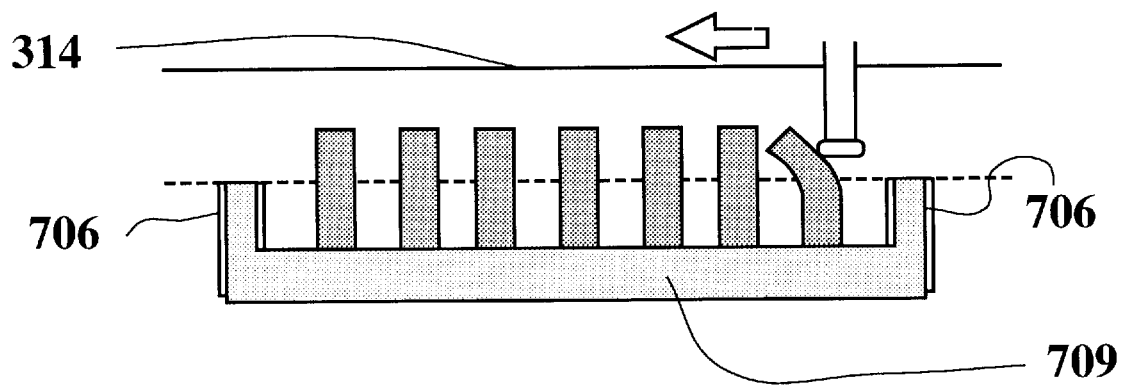
Figure 65:
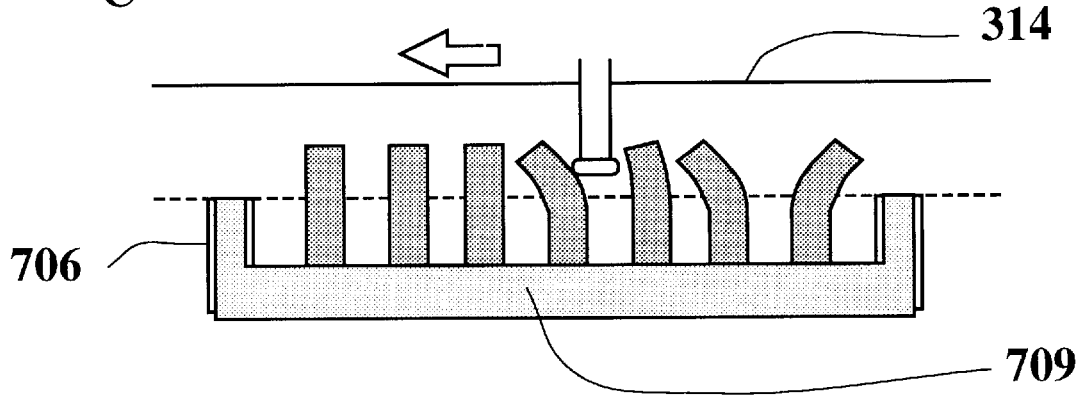

FIG. 65 shows the step figure of the operation of the pleat brake. The pleat brake is the brake system utilized when the transportation system needs to brake the pallet, the pleat (pleit) protrude into the space of the ditch from the bottom of the ditch or side wall of the ditch by the electronically controlled actuator. Then, the moving energy of the LDPF 238 is decreased by the displacement energy of the rubber to brake the travel of pallet by the road side 300.

In figure A, the LDPF 238 is traveling from right to left in the ditch 304. The pleat brake system 705 is installed just under the bottom of the ditch 307. The elastic pleat 707 are set in the holes for pleat 708. The figure shows the stage of the LDPF 238 which has the expansion section 510 from the right side.

In figure B, the actuator 706 of the pleat brake system 705 has just operated to protrude the pleat from the pleat holes. The elastic rubber on the far right side has been just displaced by the LDPF 238. Then, the moving energy of the LDPF 238 is absorbed by the elastic pleat 707 to brake the pallet.

In figure C, the LDPF 238 has displaced many elastic pleat. Thus, most of the moving energy of the LDPF is decreased by the elastic pleat 707, and braking is performed.

Figure 66:
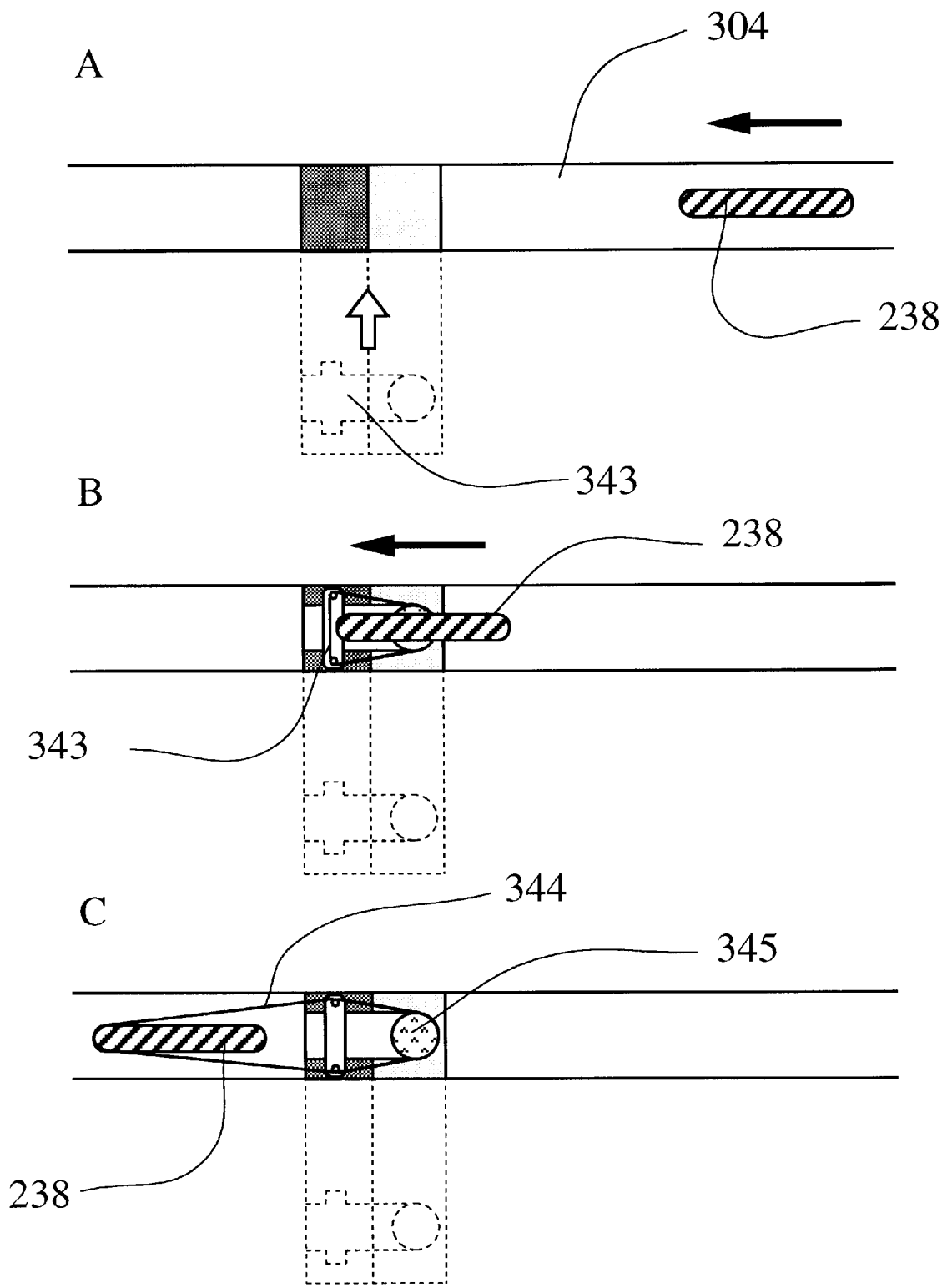

FIG. 66 shows the step figure of the operation of the wire brake 343, which is one of the infrastructure brake systems, from the upper view. The LDPF 238 of the pallet 200 which needs to be stopped, is approaching the section where the wire brake 343 is installed. When the pallet 200 enters in the certain area, the wire brake 343 unit slides into the inside of the ditch 304. At this time, the wire is tensioned by both sides of the walls of the ditch 337 for the wire 344 to capture the fin 238 effectively. Then, the fin 238 is captured by the wire 344. Next, the wire brakes the movement of the fin 238 as the wire 344 is tensioned. At this time, the reel 345, in which the end of the wire 344 is rolled, has a function to brake gradually. The reel is a type of internal braking system. Thus, even if the brake system of the pallet is in disorder, the pallet can be stopped securely. In addition, the wire brake system 343, namely one of the infrastructure braking systems, is installed in the adequate place in this invention transportation system with adequate intervals or at around the mode interchange.

Figure 67:
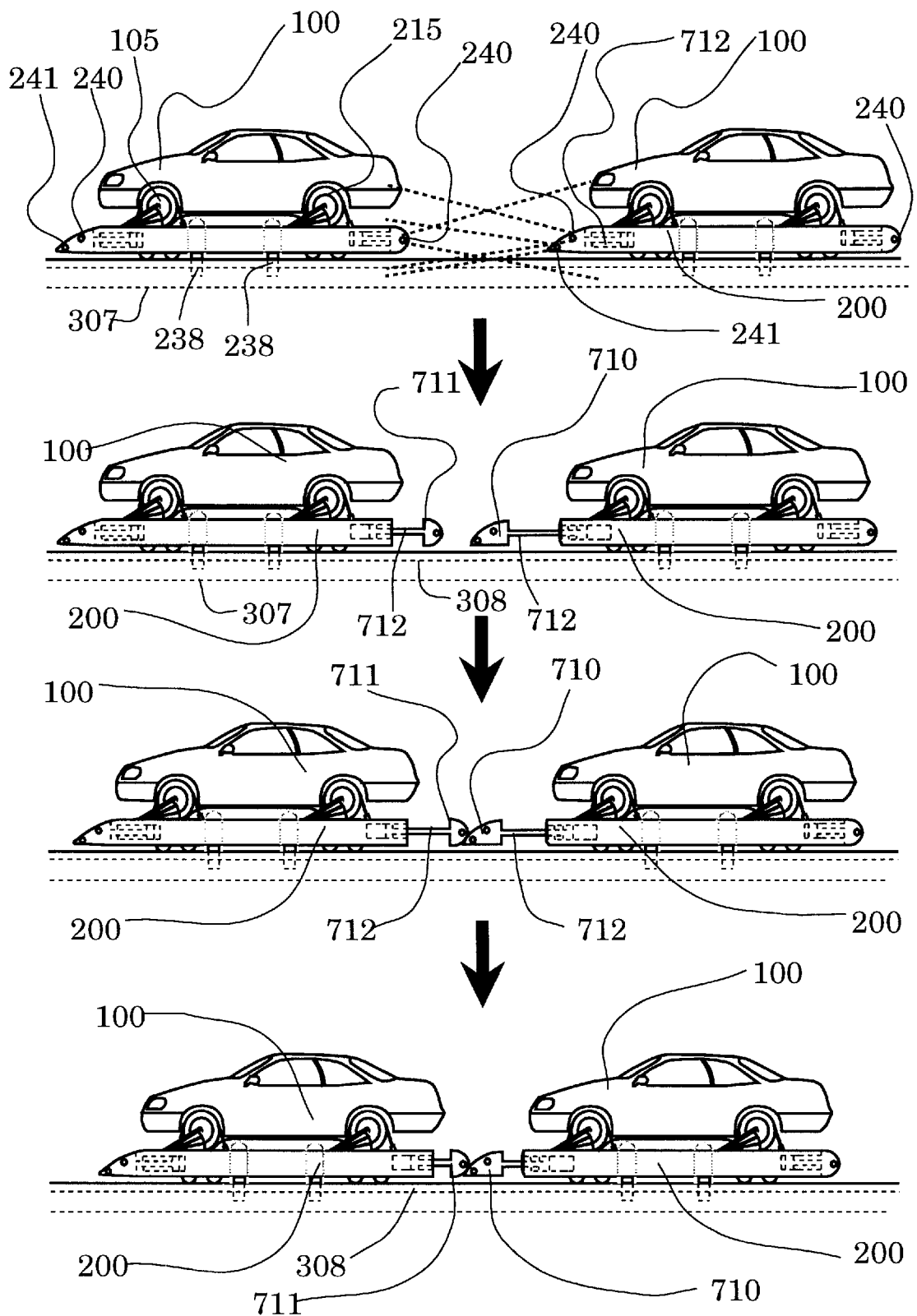

FIG. 67 shows the step figure of the extendible bumper. The extendible bumper is operated by the information which is collected by the sensors. When the CPU determined the pallet cannot avoid a collision, the CPU orders the electromagnetic valve to open and release the compressed air in the air tank to push out the bumper supporting cylinder in the longitudinal direction. Then, the extended bumper contacts with the other pallet's bumper before a collision. The impact energy is then absorbed by the cylinder as it is shrunk gradually.

In the figure A, each pallet has gotten too close for optimal headway distance. The automobile 100 is carried on the pallet 200 and the automobile is fixed on the pallet by the wheel fixing apparatus. Also, the headway distance sensor 240 and the obstacle sensor 214 is installed in the front and rear section of the pallet 200.

In the figure B, the air valve is opened by the switch, which is operated based on the signals from the sensor. Then, the released compressed air pushes out the cylinder 712 as the bumper. The front (forward) 711 and rear (backward) 712 bumper proceeds out in the longitudinal direction.

In the figure C, the extended front (forward) 711 and rear (backward) 712 bumper contact each other.

In the figure D, the extended front (forward) 711 and rear (backward) 712 bumper begin shrinking each other and compressing the air in the cylinder 711. Then, the compressed air is gradually released to dissipate the impact energy of each pallet 200.

Figure 68:
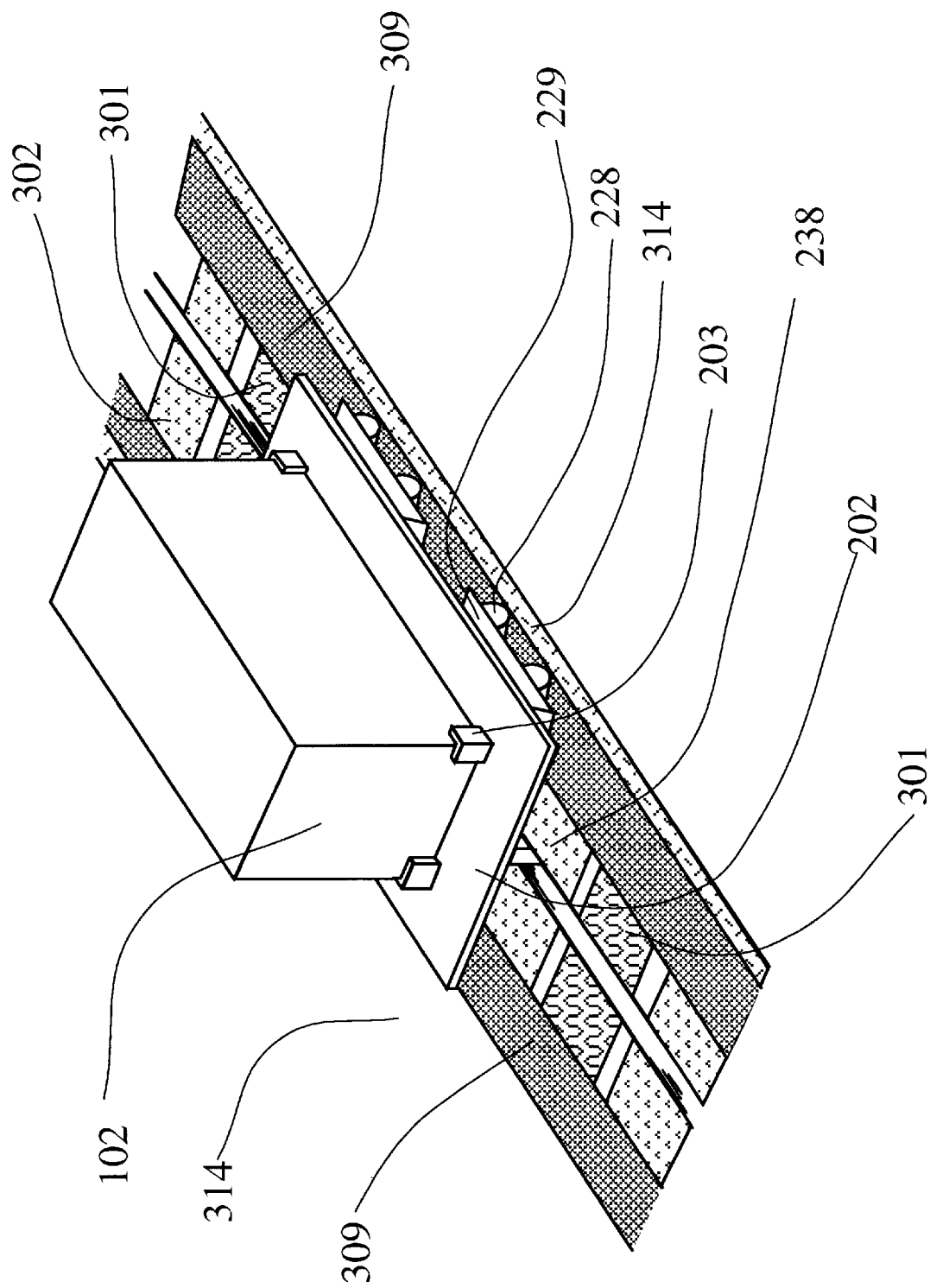

FIG. 68 shows the bird eye's view of the logistics system of this invention transportation system, and shows the pallet is traveling on the road. The freight container 102 is carried on the pallet 200, fixed by the container stoppers 203 and is traveling on the road 300. The container 102 is carried by the container designated pallet 202. The pallet 202 has multiple wheel weight equalizers 229 to disperse the total weight of the pallet and transmit the dispersed weight to the road. In this case, the two multiple tires 230 are used per one section. Also, the figure shows the pallet is traveling in a one ditch 304 road system. Thus, this invention's transportation/ logistics system is able to provide a container freight system. Also, loading and unloading the container to the pallet and loading and unloading the container to the truck is completed at the mode interchange.

Figure 69:
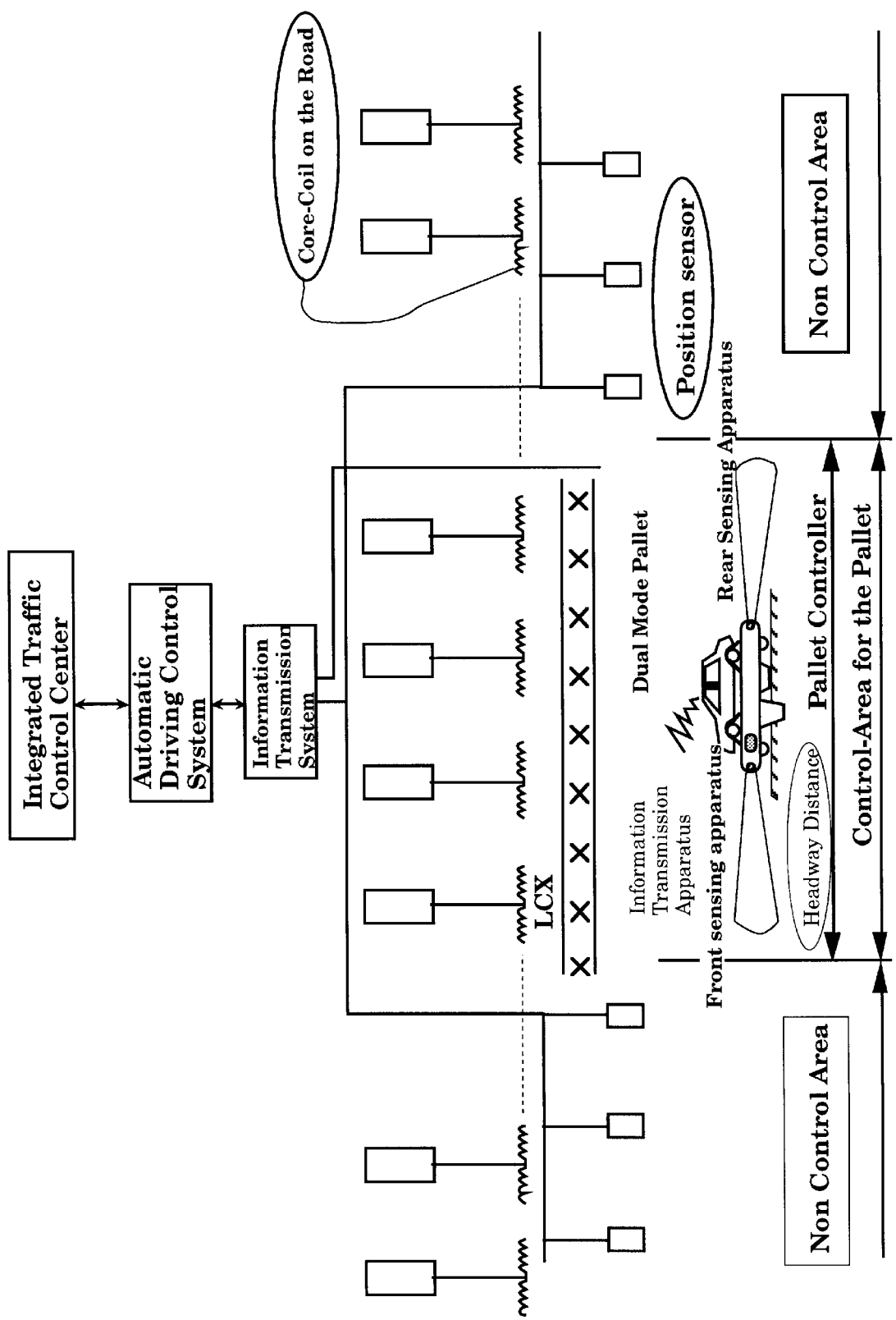

FIG. 69 shows the table.

Figure 70:
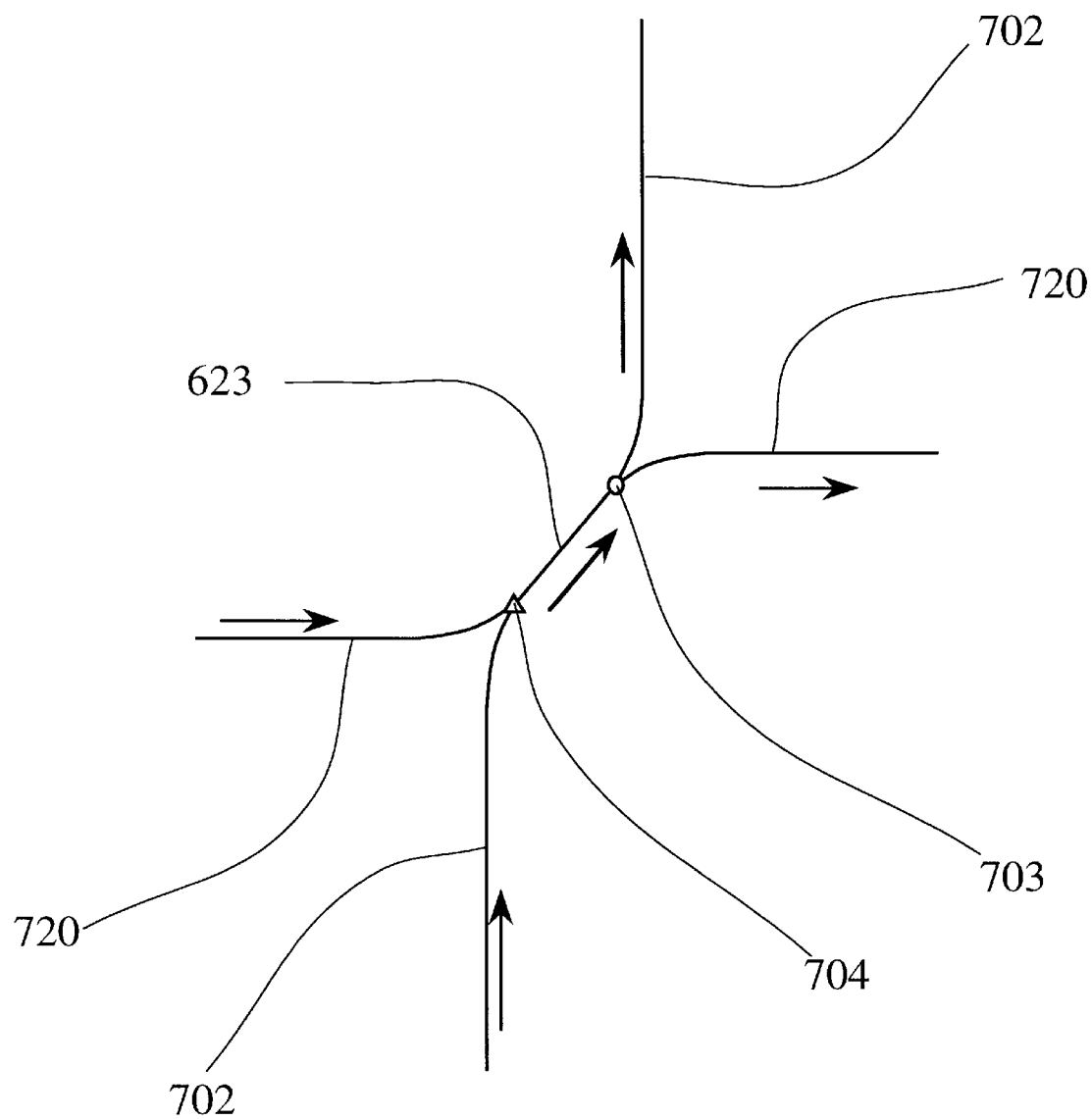

FIG. 70 shows the upper view of the crossing area of the invention transportation system which does not have an actual traffic crossing section. The main lane 702 and the branch lane 720 approach each other from different directions. These two lanes cross at the lower section in the center in this figure at the mergingsection 704. These lanes become one lane at the section (mixed lane) 623. Then, the lane enters the diverging section 703, which is shown at the upper part of the center area of this figure. Then, the lane separates into two lanes. One of the lanes return to the main lane 702, the other lane becomes the branch lane 720. Thus, in the invention transportation/logistics system, because the mechanism and the structure of the road is simple, the plane junction 700 without crossing becomes possible only by introducing simply and sequentially organized merging, mixing and diverging/branching.

Figure 71:
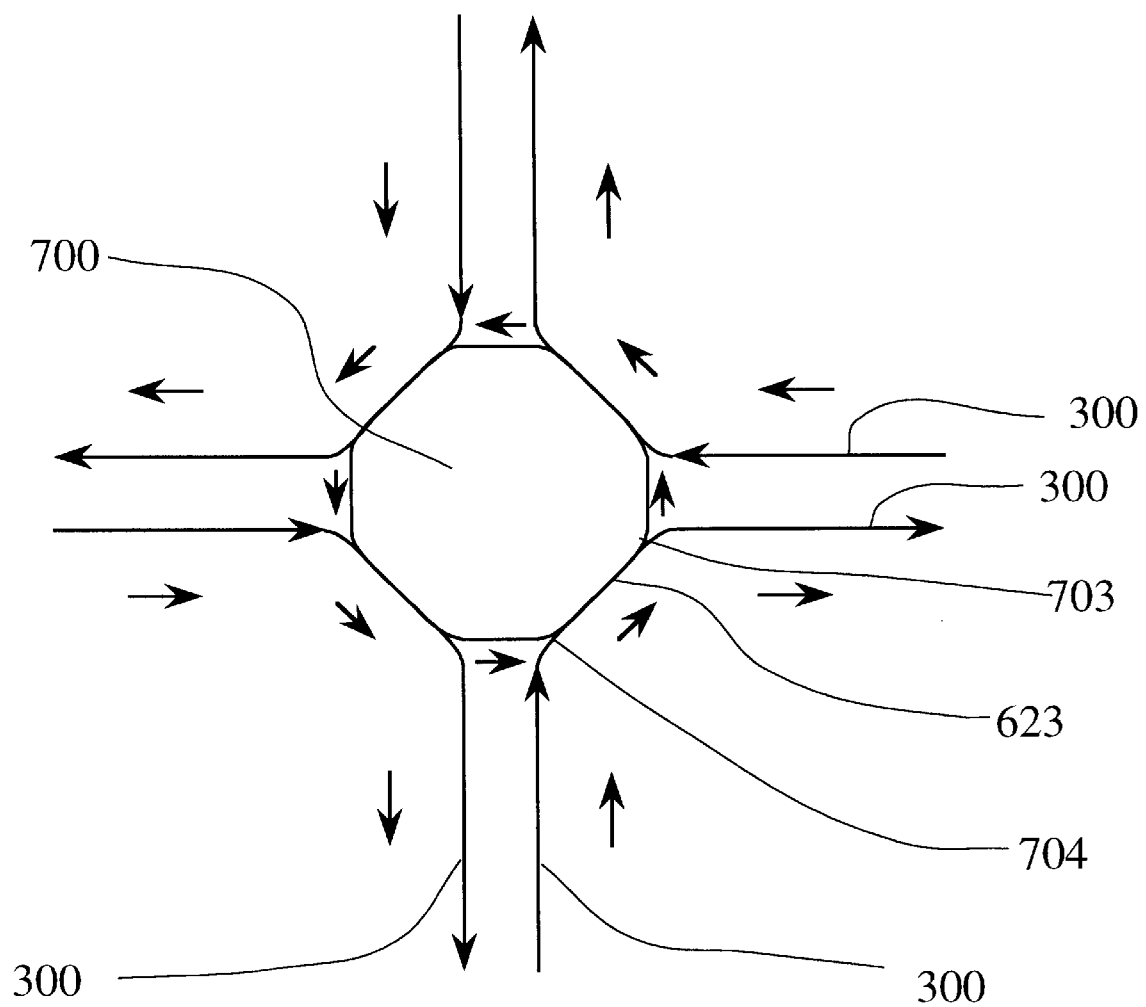

FIG. 71 shows the upper view of the non-crossing junction section of this transportation system. This figure shows an example of the two-way road interchange. In the interchange area, the circle shape plane junction 700 is constructed, and the approaching roads are connected by merging 704, mixing 623 and diverging/branching 703 as they are simply and sequentially organized. Thus, in this method, the real crossing section can not only be erased, but also once the pallet enters the plane junction 700, the pallet can proceed to any branch lane freely. Also, this junction can be used as a U-turn section.

Figure 72:
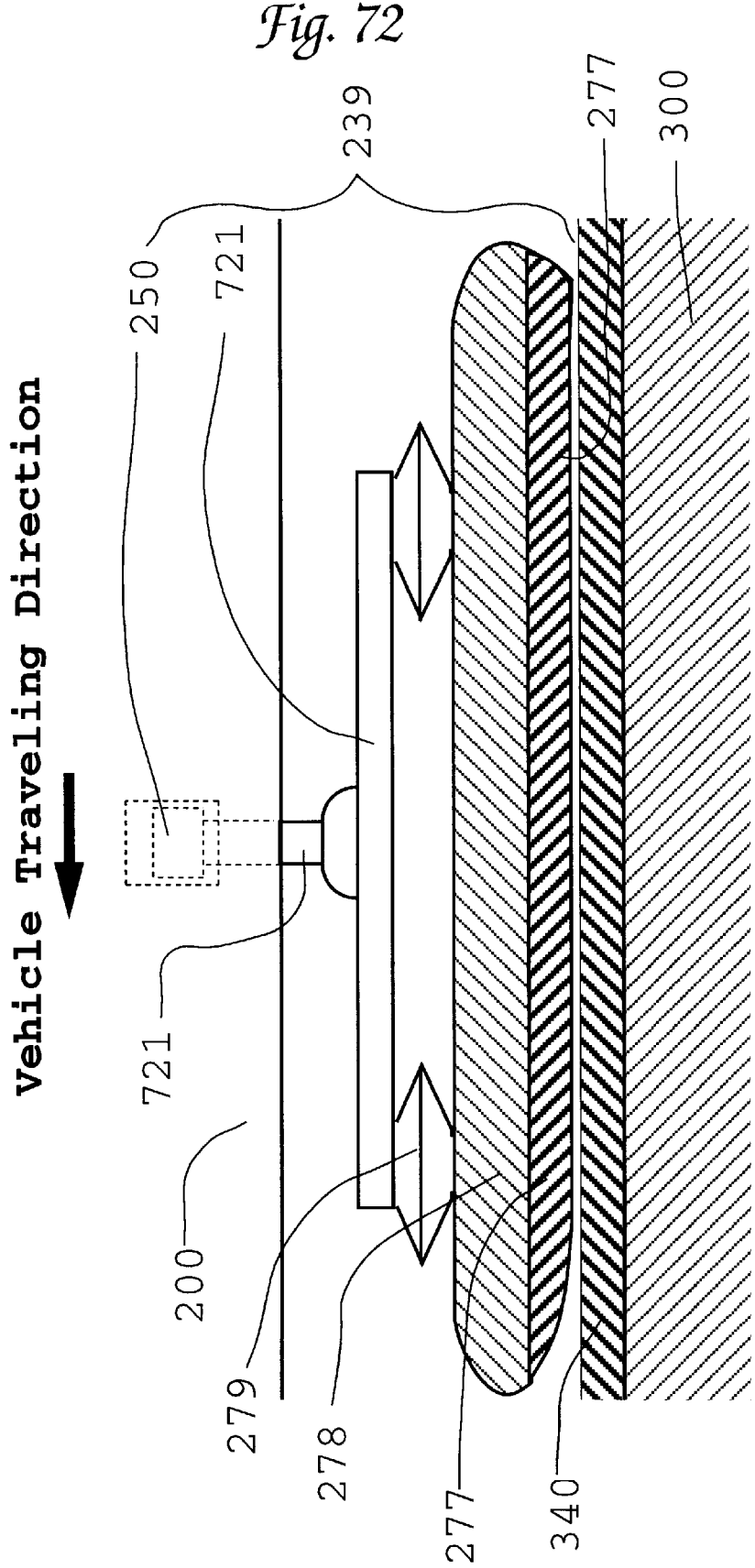

FIG. 72 shows the longitudinal cross section of the plate brake system which is used for this transportation/logistics system. The actuator and the plate brake apparatus 239 are installed through the brake supporting arm 721 on the bottom side of the pallet 200. When the brake is needed, the brake pad is dragged down by the actuator 250, then the braking pad 277 is pressed on the braking zone 340 which is installed on the surface of the road 300. Friction is generated to brake. The plate braking system 239 is comprised of the braking pad 277, which generates the friction between the road surface and the plate body of the pad 277, which maintains the contact surface plane. The pad wears out as it is used for braking, the pad is easily renewable. This plate braking system 239 is totally different from the usual brake system, because the area of the braking can be much larger. Also, the system can generate a pressing power as great as the total weigh of the pallet. Thus, the stoppage distance is significantly reduced. Moreover, the plate braking system 239 generates the braking friction using the bottom of the pallet and the road surface. Thus, even if damage to the plate brake occurs, the impact or affect on the other equipment is minimized. Therefore, the plate braking system is an ideal system to secure the whole of the transportation/logistics system.

Figure 73:
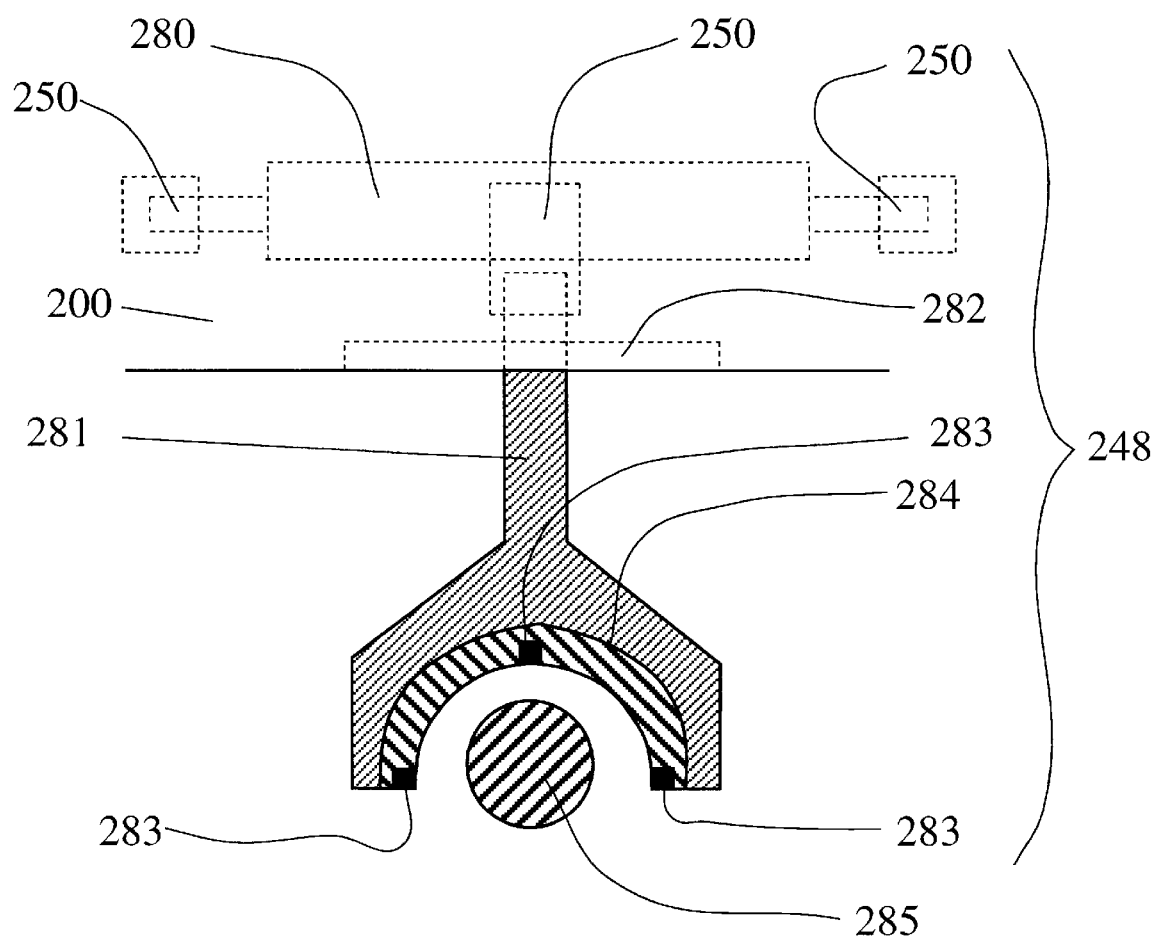

FIG. 73 shows the front cross section view of the electricity supplying system using the non-contact electricity system when the pallet travels on the invented transportation system.

In this figure, the above road core coil is installed. The electricity source, which supplies the electricity to the above road core coil, is spread out while maintaining adequate intervals. The LDPF 238 is installed on the bottom side of the pallet and is inserted in the ditch to prevent deviation from the lane. Also, the antenna is installed on the LDPF 238 to detect the position in the transportation system by communicating with the induction cable. Also, the traveling demands are transmitted to the road side by the information transmitting system using a beacon, the light communication system and the passenger who rides in the automobile (passenger car) using the remote controller. Also, the information about the traveling conditions is transmitted. The ID-tag is attached on each pallet to identify which pallet is in what condition. The sensors detect the distance of the headway of both the front and rear of the pallet. The headway distance is controlled based on the information of the aforementioned headway distance and the data of the total traffic control system.

Only the electromagnet coil, which is in the section of the front and rear of the traveling pallet, is utilized by turning on the electricity switch. The non-contact electricity collecting apparatus, which is equipped with an actuator to control the gap length, is installed on the pallet. Thus, the electricity collecting apparatus is able to collect the electricity efficiently from the core coil while maintaining a minimum gap length. Then, the collected electricity is transmitted to the linear induction motor which is installed on the pallet. The output of the linear motor is adequately controlled by the CPU. The linear motor installed on the pallet is also equipped with an actuator to maintain the minimum gap length to obtain the most efficient energy conversion. The reaction plate is installed on the road. The reaction plate has two types of actuators. One is for maintaining a minimum gap length, and the other is for the non-contact electricity collecting apparatus. These apparatuses can be combined when installed.

Figure 74:
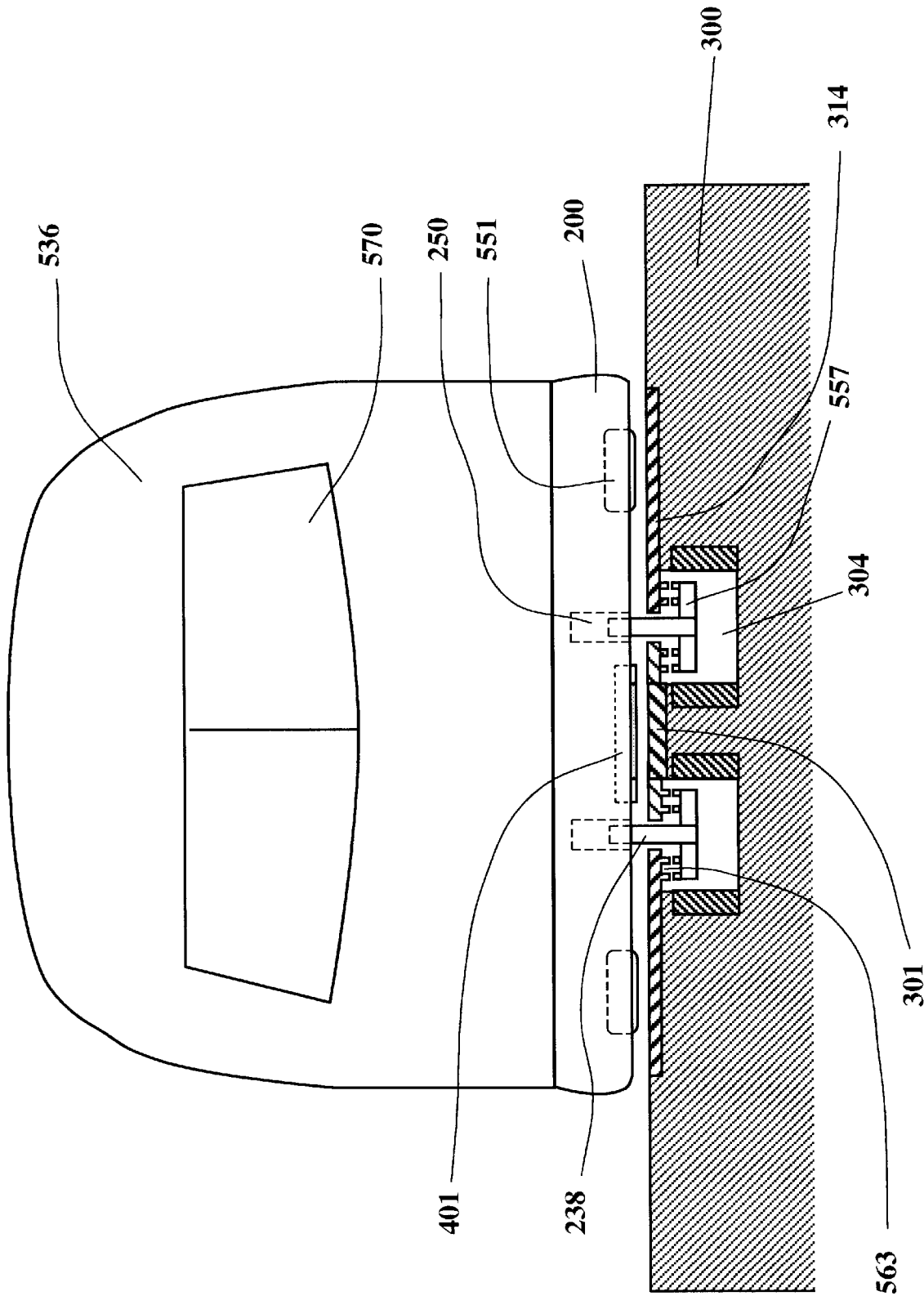

FIG. 74 shows the cross section of the lane of the invention's transportation/logistics system which contains three lanes per one direction. In this case, two lanes for the light vehicle 341 such as passenger automobile and the other one lane for large/heavy duty 342 vehicles such as trucks or trailers. And the lane for the large/heavy duty 342 is installed in between the lanes for light 341 vehicles. Thus, the construction cost for the lane for light vehicle 341 is reduced due to the manner of lateral distribution of the lanes. Also, the total load force to the road 300 is equalized and averaged. Thus, the area of the cross section of this method of the lateral distribution of the lane is designed to be smaller. Therefore, the total construction cost is reduced significantly, especially the foundation work. Also, in this case, tow lanes for light vehicles 341 which are located next to the large/heavy duty lane 342 can be separately designated as one lane for high speed traveling the other lane for low speed traveling to accommodate the different demands of traveling speeds.

Figure 75:
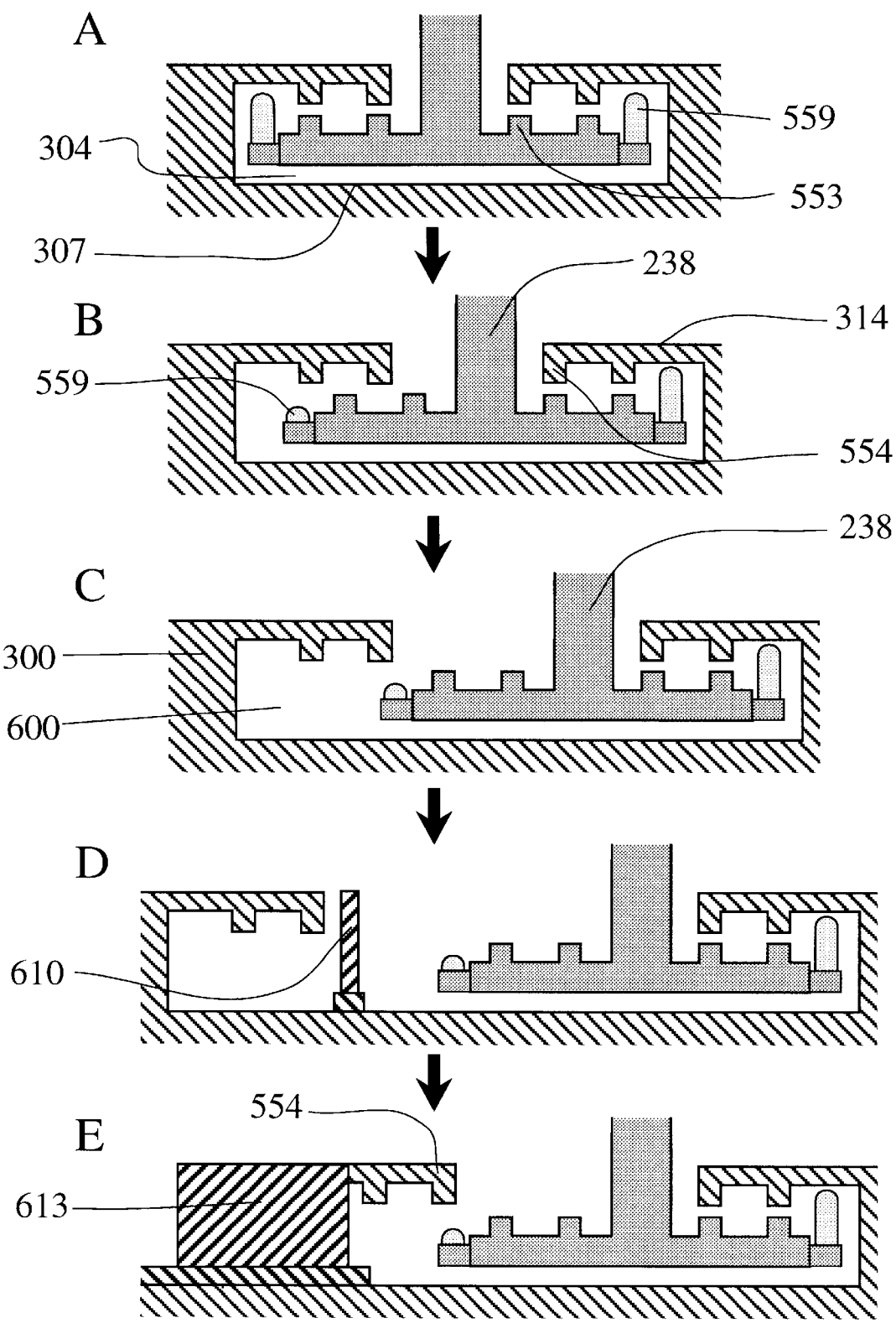

FIG. 75 shows the step wise figure of the cross section of the road which indicates that the pallet is diverging from the magnetic levitation system, and it shows the front view of the fin.

The ditch 304 is installed in the road 300, and the LDPF 238 is inserted in the ditch 304. Also, on the surface of the road 300, the overhang section 314 is installed. The reversed U-shape rail 554 is installed under the overhang section 314. The guiding skid 559 is installed on the LDPF 238, and the electromagnetically operated actuator is atached to be expandable. In figure A, the LDPF 238 is traveling on the main lane. At this time, both sides of the electromagnet 553 which are placed on the right and left wing of the fin, are excited electromagnetically. Both of guiding skids 559 are stood up to prevent the LDPF 238 from deviating from this certain limited area. Next is figure B. In this figure, the pallet travels just before it enters the divergent section. Only the right side electromagnet 553 is excited, and the left side of the electromagnet is turned off. Also, the guiding skid 559 is retracted. Because one side of the electromagnet is turned off on the LDPF 238, the rolling force is generated to the pallet, then the pallet leans. However, the attitude of the pallet is maintained by both of the LDPFs 238 which are controlled by the output of the electromagnet. In figure C, the width of the ditch is expanded because the pallet is just traveling on the preparation section for the divergence. The ditch is turned into a divergent ditch 600 in the figure C already. At this time, only the right side of the electromagnet on the LDPF 238 is operating to levitate and to guide. In figure D, the pallet has already passed the divergent point. In the figure, the shape is not symmetric. But in reality, the shape is in symmetry. The divergent nose section 610 is located on the left side of the LDPF 238. When the pallet approaches this point, the LDPF will not enter the wrong ditch. It is physically prevented not only by the guiding skid security system, but also by the divergent nose section 610. In figure E, the pallet has just entered the diverging arranging section. In this situation, the reversed U-shape rail 554 is installed under the overhang section of the divergent triangle section 613. Then the width of the ditch becomes narrower. Also, the left side of the electromagnet 553 of the LDPF 238 is turned on to return to the excited state.

Figure 76:
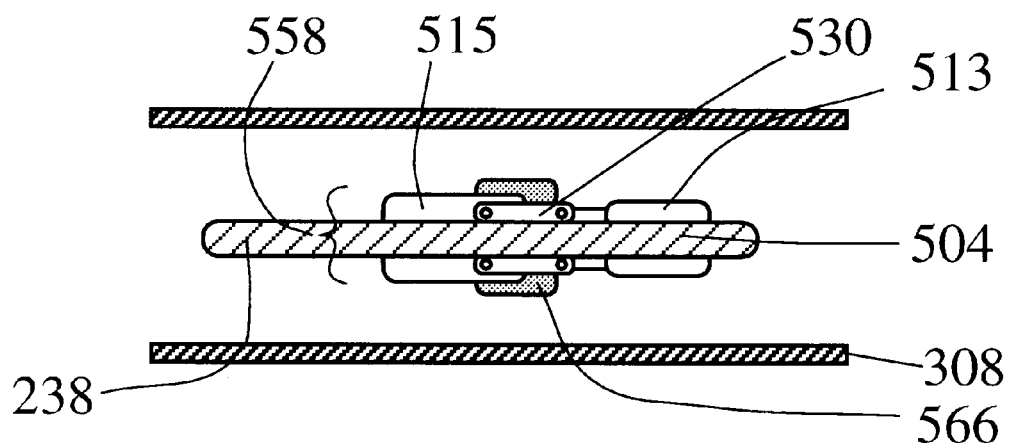
Figure 76:
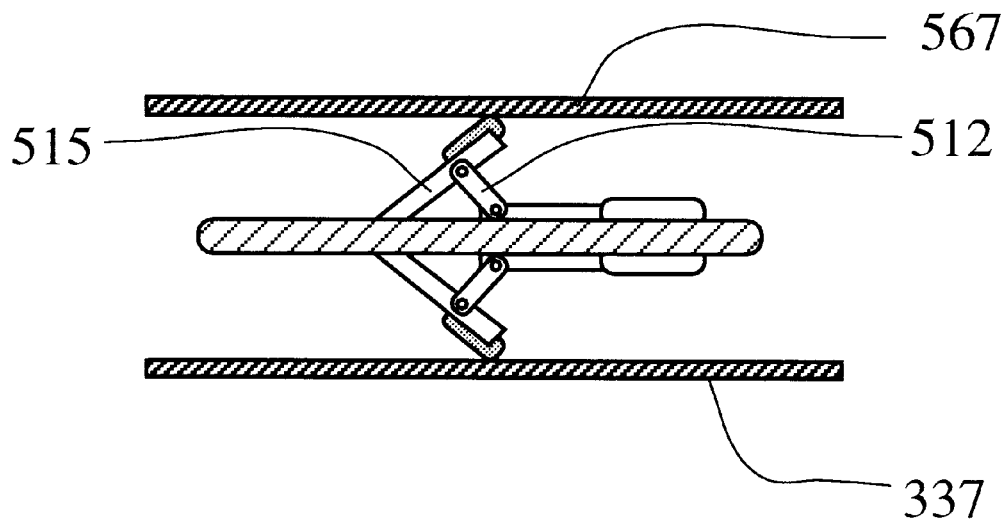

FIG. 76 shows the upper view of the fan-shaped brake system which is attached on the LDPF.

The LDPF 238 moves in the center of betweem the overhang sections 308 of the ditch.

The LDPF 238 is equiped with the expandable plate 515, the actuator for the expander 513 and the link mechanism 566. The brake pad for the fan-shaped braking system 566 is installed on the edge of the expandable plate 515. The lower figure shows the operation of braking, The expandable arm of the link mechanism 530 is expanded by the actuator for the expander 513. Then, the expandable plate 515 is pushed down to the ditch-braking pad 567 which is installed on the side wall 337 of the road. Thus, a significant friction force is generated to brake.

Figure 77:
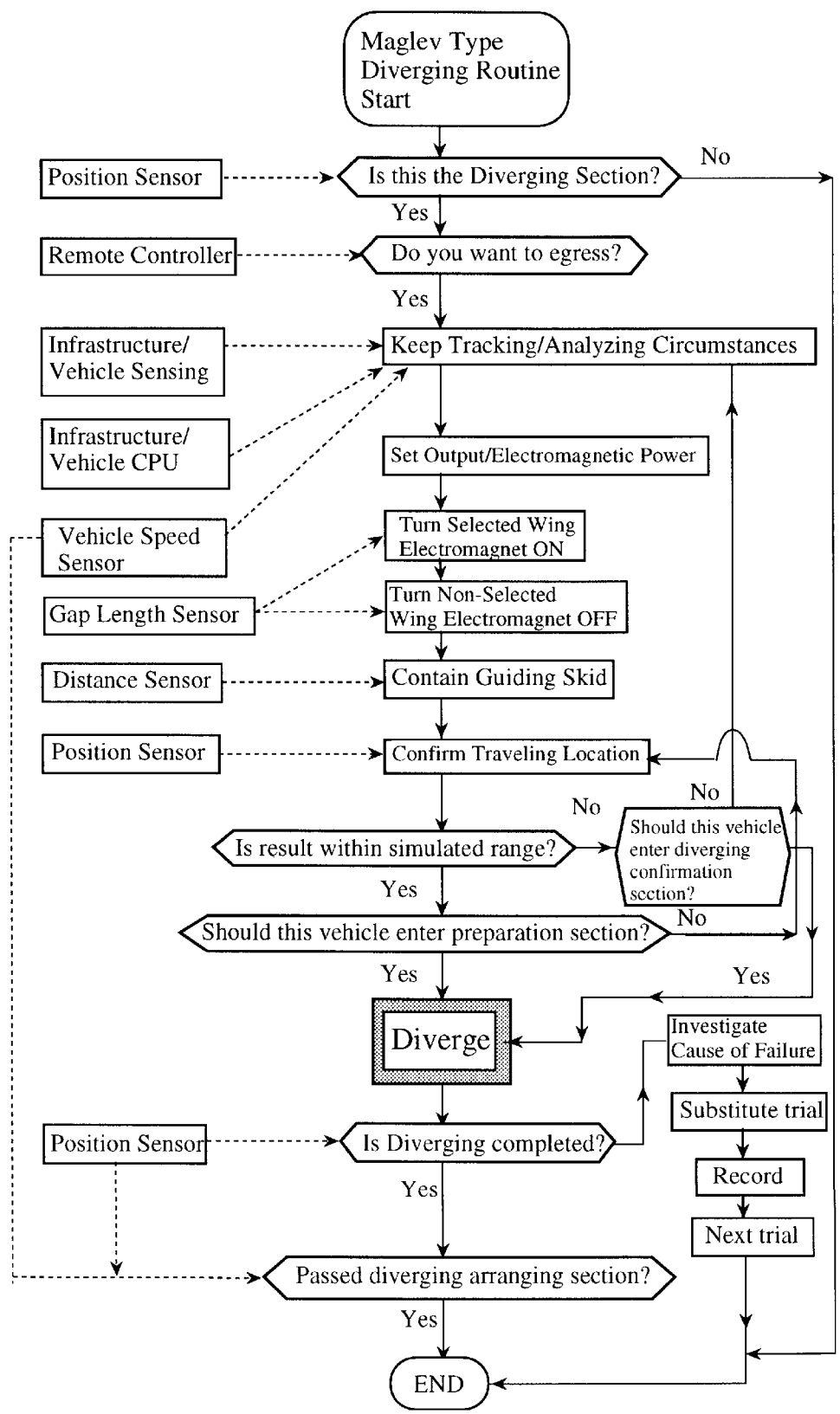

FIG. 77 shows the flow chart of the diverging routine in the case of the magnetic levitation type.

The main sensors which are involved in the routine of the diverging flow chart are listed on the left side. First of all, the sensors check whether the pallet enters in the diverging preparation section. When the pallet enters the diverging preparation section, the system asks whether the passenger wants to branch out or not. If the passenger wants to branch out from the main lane, the sensing is completed for the pallet to travel on the branching lane. If the passenger wants to keep the main lane, the sensing is completed for the pallet to keep traveling on the main lane. Basically, the sensing is performed by the infrastructure and the vehicle side. Then, the lane is selected by the demand of the passenger using the infrastructure and the vehicle side CPU. After the lane is selected, only the side of selected electromagnet on the wing is turned on, then the other side of the electromagnet is turned off. The attitude of the pallet is always checked by the gap length detecting sensors to keep the same distance on both sides, right and left, between the electromagnet and the reversed U-shape rail. The guiding force is generated by the absorption force between the reversed U-shape rail and the electromagnet on the fin. Thus, the pallet moves toward the direction of the selected lane automatically. Also, the guiding skid is stood up to prevent the fin to from deviating the selected lane. In addition, in the case of diverging the not selected side of the guiding skid is turned back into the house, so that the fin become free. Thus, the pallet is diverged as it is explained above. After the pallet enters the diverging confirmation section, the pallet travels according to the selected lane. Even if the selected lane is wrong the pallet goes along with the selected direction of the lane and passes the divergent point, except for emergency cases. When the divergence is successfully, the pallet passes the divergent arranging section, the divergent routine is finished. However, if the divergence is not successful as planned, the real cause of the failure is researched, and the alternative routine is reconsidered and all the traveling information is recorded. Finally the next routine schedule is re-programmed.

Figure 78:
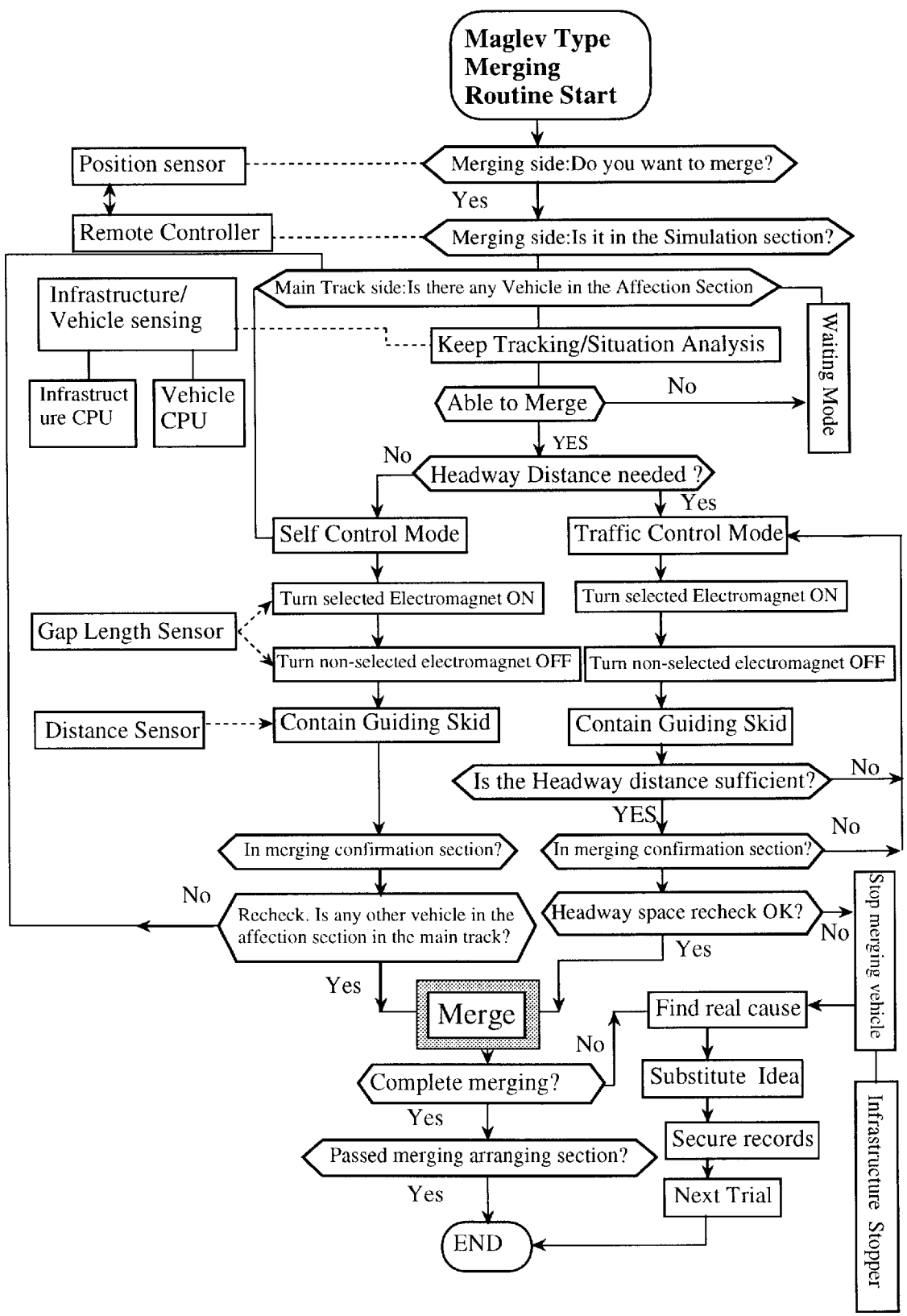

FIG. 78 shows the flow diagram of the merging routine of the magnetic levitation type.

The merging section is the area where the pallet approaches to the merging point to merge into the main lane from the branch lane. The merging section is comprised of the simulation section, which is located on the merging ramp, the merging confirmation section, the affection section to the main lane and the merging arranging section for both the lane main and the branch lane.

First, the movement of the pallet which enters the merging ramp, simulates the timing of the approach to the merging point in the simulation section by both of the computer road side and vehicle side. If the other pallet is traveling on the merging affecting section on the main lane, the speed of the pallet is regulated so as not to collide at the merging section until the pallet passes the merging confirmation section, which is installed on the merging ramp. When the linear motor is uses as the generating the propulsion force, the output of the road side linear motor is controlled to regulate he speed.

The pallet travels on the main lane and has the right to continue to drive without slowing down. However, the traffic conditions of the main lain is the most crucial issue for the other pallets on the merging ramp. Thus, the pallet on the main lane must transmit the information by the road side/vehicle side sensors. The information provides whether the pallet is in the merging affecting area or not to the related CPU which is carried on the pallet and the infrastructure CPU.

The pallet on the merging ramp wants to merge into the main lane starts regulating the merging headway distance. If there is another pallet on the merging affecting section on the main lane, and the system determines that the merging is not possible, the pallet on the merging ramp changes to the waiting mode. The pallet then waits until the pallet on the main lane passes through the merging point. If the system determines that headway space is needed, the mode changes to traffic regulation mode. The pallet is regulated in the confirmation section to maintain a safe headway space and keeps traveling toward the merging point. The merging confirmation section is the final section to confirm whether the pallet is able to merge or not. Merging is reconfirmed by the simulation based on the sensed information and the electronic signals.

In detail, all the movement of the pallet is virtually simulated by the road side computer based on the information of the position and the speed of the pallet and geographical data Then, the speed of the pallet on the merging ramp is regulated so as not to collide with the pallet on the main lane. The result of the simulation by the road side computer is fed back to the speed regulation of the pallet on the merging ramp. When the linear motor is used as a propulsion force, the speed regulation is perfectly completed within the merging confirmation section. The acceleration and deceleration force by utilized the linear motor is strong Even if the pallet cannot have the confirmation of a safe headway space, at least the pallet can brake within this length in the section.

The pallet of the magnetic levitation type is supported by the fin which has electromagnetic power. The reversed U-shape rail which is connected to the main lane is always excited to support the body of pallet. On the other hand, the electromagnet on the opposite side of the wing is turned off, because the reversed U-shape is disrupted. Thus, the guiding skid on the side of the disrupted rail is not needed to stand up.

If the electromechanical fail safe mechanism malfunctions or is out of order, the infrastructure stopper is installed in order to stop the pallet compulsively from the infrastructure at the section of mechanically to avoid a collision. This infrastructure stopper is installed in the end section of the merging confirmation section. Therefore, even if enough headway distance is not obtained in the merging confirmation section, the pallet is stopped by the infrastructure stopper system immediately.

Thus, if the approaching pallet to the merging area fails the traffic arrangements with the other pallets, which are traveling on the main lane, the approaching pallet is guided to the stop section mechanically. As a result, the approaching pallet is stopped at the stopping lane, then the possibility of a collision is safely avoided.

When the arrangement of a safe headway distance between the other pallets and the arrangement in the affecting section are completely finished, the pallet on the branch lane is allowed to merge into the main lane. Then, the results of the merging are transmitted to the infrastructure CPU. Then, the pallet passes the merging arrangement section to finish the whole procedure of merging.

Figure 79:
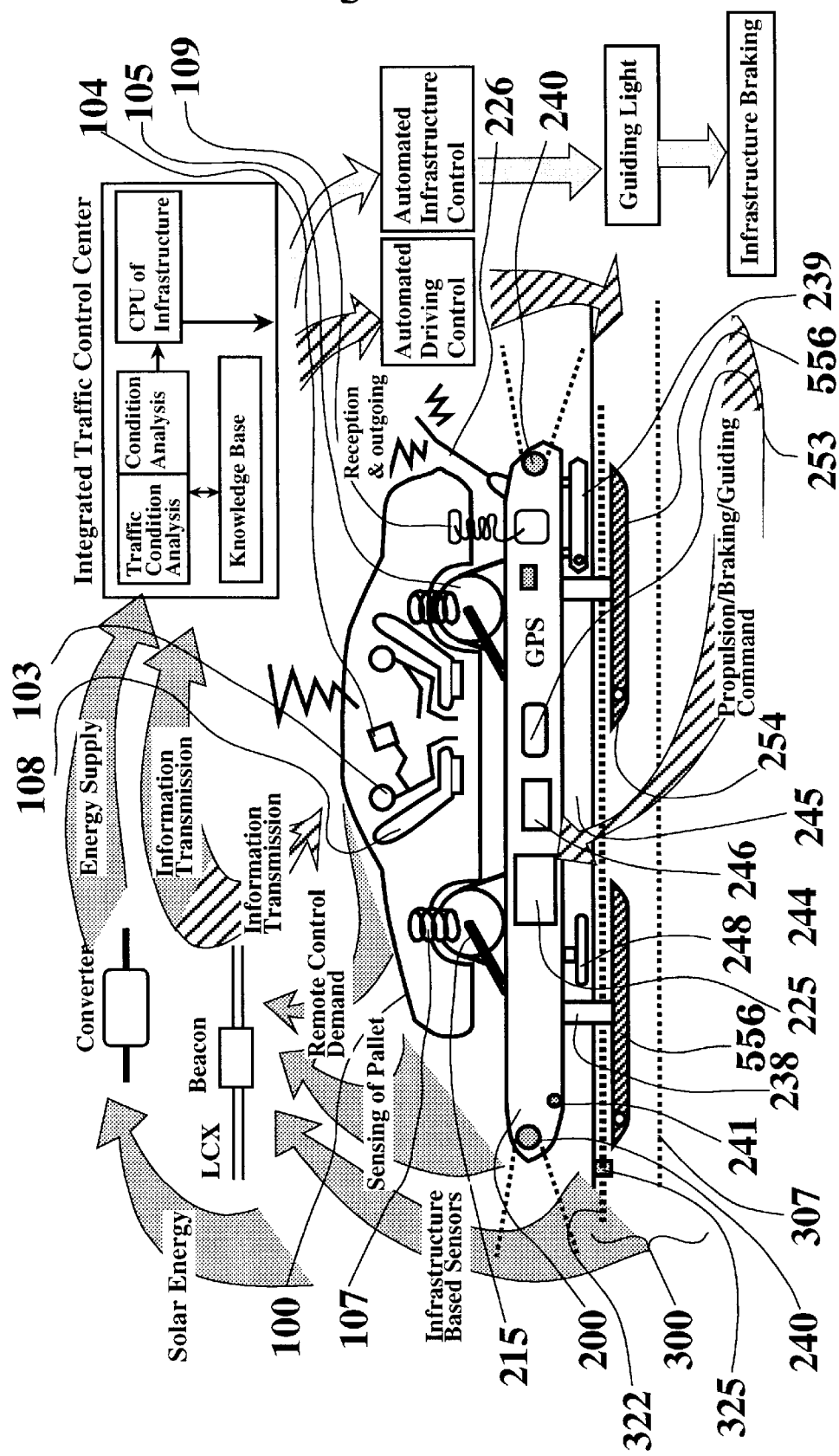

FIG. 79 shows the diagram of the operation system of the invention transportation system including the automobile (car) 100, the pallet 200, the road 300, and the passenger 103.

The automobile (car) is carried on the pallet 200, and it is fixed on the floor of the pallet by the wheel fixing apparatus 215. The suspension system 107 of the automobile (car) 100 is still active even while it is fixed by the wheel fixing apparatus 215. Thus, traveling becomes comfortable for the driver and passenger 103. In this example, the automobile (car) is carried on the pallet 200 fixed by the wheel fixing apparatus 215. The pallet 200 is magnetically levitated and propelled by the magnetic levitation liner 556. The passenger 103 demands and transmits their desires such as traveling conditions to the pallet 200 by use of the remote controller 104. The traveling demand is for example, such as the final destination, the speed control of the pallet 200, passing another pallet, braking, or stopping at the service area or resting area. The traveling demands of the passenger 103 are transmitted by the road 300 side beacon through the remote controller 104 to the ITCC. The passenger 103 is sitting on the rotating seat 108. As the transportation system is fully automated, the rotational seat 108 is installed in the automobile (car) 100, the front seat is rotated to face backwards. The necessary electricity for the internal room of the automobile (car) 100 is provided from the pallet 200 and is supplied by the non-contact electricity collecting apparatus 109. Thus, the air conditioner in the car can be operated without turning on it's engine. The distance sensors 240, which are installed on the pallet 200, sense the front and rear of the pallet (pallet sensing). The results of the sensing are sent to the pallet central control module 225. At the same time, the information is sent to the leaky coaxial cable (LCX) and the beacon in the road side. Also, on the road 300 side, the road condition such as wetness, temperature and obstacles are sensed (infrastructure sensing) by the road surface sensor 325, obstacle sensors 241. and cameras. Then, the sensed information is sent to the ITCC and the pallet central control module 225 at the same time. The information is sent through the beacon, the leaky coaxial cable (LCX) and the pallet antenna 226. The laser transmission device on the pallet or the photo communications using the laser receiver and transmission device on the road can be used.

The ITCC recognizes the traffic conditions such as each pallet's 200 position, traveling speed and expected route as explained above. Also, the ITCC refers the intelligent database such as accumulated traffic models and past records of the traffic to analyze the circumstances and predict traffic volume. Then, the infrastructure CPU judges how to control the pallet. The final order to the automatic traveling system and infrastructure controlling system is made to control the pallet 200. The automatic traveling system controls the traveling speed by ordering (propulsion command) the linear motor which is installed on the magnetic levitation liner 556 of the pallet 200. The automatic traveling system orders to the pallet central control module 225 to control the plate brake system 239 (braking command). The automatic infrastructure control system orders to control the on-off mode of the streetlight (guide-light) to match with the traveling of the pallet, or to control the infrastructure stopper in the ditch to brake the pallet if necessary.

The pallet 200 obtains it's necessary electricity from the non-contact electricity collecting apparatus 248. The non-contact electricity collecting apparatus 248 is electronically controlled by the actuator to maintain a certain distance to the on-road core-coil 322 which is installed on the road 300 efficiently. Also, the pallet ID-tag is attached on each pallet to recognize the pallet 200. The ID-tag signal is detected by the road side antenna. The detected signal is then transmitted to the computer of the ITCC through the communication control converter. Thus, the ITCC totally grasps the all traffic conditions according to the traveling demands, which are initiated by the passenger 103 who is riding on the automobile (car) 100, fixed on the pallet 200. Then, two-way communication between the automobile (car) on the pallet 200 and the road side 300 is completed through the pallet central control module 225, the beacon, the leaky coaxial cable (LCX) and the photo communication system. The operation system of the transportation realizes that the travel of the automobile (pallet) is adequately and automatically control and harmonized not only for each pallet, but also for all of the automobiles. Also, the light and heat collection unit 302 is installed in the road 300 to collect sun light and heat with the solar cells. Then the collected energy is transformed to electricity to utilize for the operation of the invention transportation system. Thus, this invented transportation system is an environmentally friendly system.

The magnetic levitation liner 556 is absorbed by the reversed U-shape rail, which is installed on the wall of the ditch. Thus, the pallet 200 is levitated.

| | List of Reference |
|---|---|
| 100 | automobile |
| 101 | truck |
| 102 | container |
| 103 | passenger |
| 104 | remote-controller |
| 105 | wheel/tire |
| 106 | wheel/tire for two axes truck |
| 107 | suspension system |
| 108 | rotating seat |
| 109 | non-contact electricity collecting apparatus |
| 110 | socket for information system |
| 111 | socket for electricity |
| 112 | information device inside of a vehicle |
| 113 | CRT(display) |
| 114 | head-up-mount |
| 115 | non-contact electricity collecting apparatus |
| 116 | automatic steering apparatus |
| 117 | propulsion engine (motor) |
| 118 | antenna |
| 119 | lane deviation preventing fin (LDPF) |
| 120 | distance sensor |
| 121 | headway sensor |
| 122 | plate brake |
| 123 | obstacle sensor |
| 124 | vehicle CPU |
| 200 | pallet |
| 201 | pallet for large vehicles |
| 202 | pallet for container |
| 203 | container stopper |
| 204 | roller for container |
| 205 | flexibleball screw |
| 206 | front nose section |
| 207 | bottom of the pallet |
| 208 | aerodynamic body |
| 209 | aerodynamic wing |
| 210 | flap |
| 211 | front air flow rectifier |
| 212 | air flow rectifier |
| 213 | vertical tail wing |
| 214 | lateral rudder |
| 215 | wheel fixing apparatus |
| 216 | wheel side supporting apparatus |
| 217 | belt |
| 218 | detecting sensor of the wheel fixing |
| 219 | retractor |
| 220 | electronic locking buckle |
| 221 | vehicle weight sensor |
| 222 | hinge |
| 223 | bellows-airbag |
| 224 | pallet recognition ID tag |
| 225 | pallet central control module |
| 226 | pallet antenna |
| 227 | pallet suspension system |
| 228 | pallet-wheel |
| 229 | equalizer |
| 230 | multiple-tire |
| 231 | automatic steering apparatus |
| 232 | reaction plate |
| 233 | reaction plate storage box |
| 234 | high speed motor |
| 235 | low speed motor |
| 236 | air inlet |
| 237 | radiator |
| 238 | lane deviation preventing fin (LDPF) |
| 239 | plate brake apparatus |
| 240 | distance sensor |
| 241 | obstacle sensor |
| 242 | speed sensor |
| 243 | acceleration sensor |
| 244 | distance sensor |
| 245 | gap sensor |
| 246 | battery |
| 247 | generator |
| 248 | non-contact electricity collecting apparatus |
| 249 | drive-recorder |
| 250 | electronically controlled actuator |
| 251 | electricity supplying unit |

-continued

| | List of Reference |
|---|---|
| 252 | electricity supplying cable |
| 253 | laser gap sensor |
| 254 | right front distance sensor |
| 255 | left front distance sensor |
| 256 | x1: distance |
| 257 | x2: distance |
| 258 | y1: distance |
| 259 | y2: distance |
| 260 | laser distance measuring sensor |
| 261 | P0: the first position |
| 262 | P1: the next position |
| 263 | P2: the LDPF's position |
| 264 | P3: the LDPF's position |
| 265 | x'1: front left distance |
| 266 | x'2: front right distance |
| 267 | y'1: left side distance |
| 268 | y'2: right side distance |
| 269 | X1: front left distance |
| 270 | X2: front right distance |
| 271 | Y1: left side distance |
| 272 | Y2: right side distance |
| 273 | X"1: front left distance |
| 274 | x"2: front right distance |
| 275 | y"1: left side distance |
| 276 | y"2: right side distance |
| 277 | braking pad |
| 278 | left side distance sensor |
| 279 | right side distance sensor |
| 280 | base of electricity collecting device |
| 281 | arm of electricity collecting device |
| 282 | right and left slider |
| 283 | gap sensor for electricity collecting device |
| 284 | electricity collecting device |
| 285 | core-coil on road |
| 286 | inverter |
| 287 | linear induction motor (LIM) |
| 288 | differential gear |
| 289 | vehicle fixing apparatus |
| 300 | road |
| 301 | LIM (primary side) unit |
| 302 | solar energy unit |
| 303 | heat pump |
| 304 | ditch |
| 305 | double sided ditch |
| 306 | drain for ditch |
| 307 | bottom of the ditch |
| 308 | overhang sections |
| 309 | wheel rolling road surface |
| 310 | perforated steel plate |
| 311 | buffer pad |
| 312 | bolt |
| 313 | slab unit |
| 314 | raod surface |
| 315 | road bed |
| 316 | non water permeable roadbed |
| 317 | subgrade |
| 318 | natural roadbed |
| 319 | side slope |
| 320 | drip hole |
| 321 | side gutter |
| 322 | on-road core-coil |
| 323 | beacon |
| 324 | cross-induction coil |
| 325 | surface sensor |
| 326 | leaky coaxial cable (LCX) |
| 327 | slit for the LCX |
| 328 | information cable (optic fiber) |
| 329 | electricity supplying cable |
| 330 | wheel rolling road surface side gutter |
| 331 | wheel rolling road surface drain mouth |
| 332 | lane deviation preventing ditch |
| 333 | ditch for the linear motor |
| 334 | linear motor |
| 335 | drain side gutter |
| 336 | drain holes |
| 337 | wall of the ditch |
| 338 | electromagnet unit |

-continued

List of Reference

| | |
|---|---|
| 339 | road surface for supplemental roller |
| 340 | braking zone |
| 341 | light vehicle |
| 342 | lane for large/heavy duty vehicle |
| 343 | wire brake |
| 344 | wire |
| 345 | reel |
| 346 | reaction plate |
| 347 | hole for bolt |
| 400 | propulsion module |
| 401 | reaction plate |
| 402 | LIM supporting frame |
| 403 | LIM supporting arm |
| 404 | aerodynamic wing |
| 405 | air flow guide |
| 406 | front air inlet |
| 407 | flow of compressed air |
| 408 | compressed air transferring pipe |
| 409 | outlet of the compressed air |
| 410 | exiting air flow |
| 411 | side supporting arm |
| 412 | supplemental roller |
| 413 | permanent magnet unit |
| 414 | superconductive magnet unit |
| 415 | cooling pipe |
| 416 | circulating water |
| 417 | carburetor |
| 418 | main shaft |
| 419 | counter |
| 420 | main hinge |
| 421 | spring for brake |
| 422 | gap sensor |
| 423 | sliding mechanism |
| 424 | attitude control actuator |
| 425 | main electronically controlled actuator |
| 426 | cylinder |
| 427 | suspension |
| 428 | main shaft hinge |
| 429 | fixed hinge |
| 430 | link mechanism supporting frame |
| 431 | LIM sided hinge |
| 432 | sliding mechanism |
| 433 | attitude hinge |
| 434 | acceleration sensor |
| 435 | gap sensor |
| 436 | aerodynamic front nose |
| 502 | cylinder type LDPF |
| 503 | fin strut |
| 504 | main body of the LDPF |
| 505 | settling box |
| 506 | up and down actuator |
| 507 | up and down ball screw mechanism |
| 508 | fin nose |
| 509 | flap actuator |
| 510 | fin expansion section |
| 511 | right and left side guidance roller |
| 512 | expandable arm |
| 513 | expanding actuator |
| 514 | expanding ball screw mechanism |
| 515 | expandable plate |
| 516 | expanding hinge |
| 517 | right and left side guidance roller |
| 518 | roller for preventing the pulling out |
| 519 | permanent magnet unit |
| 520 | aerodynamic fin nose |
| 521 | main body of aerodynamic fin |
| 522 | braking pad |
| 523 | rotation sensor for roller |
| 524 | side way distance sensor |
| 525 | steering sensor (vehicle direction sensor) |
| 526 | steering angle control device |
| 527 | perpendicular gap sensor |
| 528 | obstacle sensor |
| 529 | antenna for LCX |
| 530 | link mechanism |
| 531 | shock absorber |
| 532 | directing hinge |

-continued

List of Reference

| | |
|---|---|
| 533 | rotational cylinder |
| 534 | rotation sensor |
| 535 | laser gap sensor |
| 536 | obstacle detecting sensor |
| 537 | washer |
| 538 | sensor supporter |
| 539 | angled sliding gutter |
| 540 | housing for fin |
| 541 | gear wheel structure |
| 542 | electronically controlled actuator |
| 543 | lateral leaning hinge |
| 544 | side spring |
| 545 | strut supporting cylinder |
| 546 | contact point |
| 547 | solid electricity wire |
| 548 | electricity insulator |
| 549 | framework |
| 550 | electricity collecting pantagraph |
| 551 | skid |
| 552 | gap distance sensor |
| 553 | electromagnet |
| 554 | U-shaped rail |
| 555 | electromagnet coul |
| 556 | magnetic levitation runner |
| 557 | levitation/guidance electromagne |
| 558 | fan-tailed shape brake system |
| 559 | guiding skid |
| 560 | guiding actuator |
| 561 | magnetic field shield |
| 562 | left side reversed U-shaped rail |
| 563 | right side reversed U-shaped rail |
| 564 | left fin wing |
| 565 | right fin wing |
| 566 | link mechanism |
| 567 | ditch-braking pad |
| 568 | steering rod |
| 569 | steering actuator |
| 570 | wind shield of car |
| 600 | divergent ditch |
| 601 | front nose section |
| 602 | nose strut |
| 603 | strut spring |
| 604 | strut tread |
| 605 | shock absorbing spring cylinder |
| 606 | main supporting plate |
| 607 | plate hinge |
| 608 | nose roller |
| 609 | side roller |
| 610 | divergent nose section |
| 611 | branching out ramp |
| 612 | side ditch of main track |
| 613 | diverging zone |
| 614 | Y-shaped expanding ditch section |
| 615 | diverging point |
| 616 | diverging electromagnet unit |
| 617 | X-Y direction LIM unit |
| 618 | side wall roller |
| 619 | roller |
| 620 | rolling belt |
| 621 | side wall of main lane |
| 622 | bottom expanded area |
| 623 | front nose |
| 700 | plane junction |
| 701 | weaving section |
| 702 | main lane |
| 703 | diverging section |
| 704 | merging section |
| 705 | pleat brake system |
| 706 | actuator |
| 707 | elastic pleat |
| 708 | holes for pleat |
| 709 | pleat support |
| 710 | bumper (front section) |
| 711 | bumper (rear section) |
| 712 | cylinder |
| 713 | radiator |
| 714 | water |

-continued

List of Reference

| 715 | water-jacket |
| 716 | reserve tank |
| 717 | water pump |
| 718 | bellows |
| 719 | pipe |
| 720 | branch lane |
| 721 | brake supporting arm |

What is claimed is:

1. A transportation/logistics system for transporting vehicles or containers between entrance and exit points comprising
   a plurality of pallets, each of which is suitable for carrying a vehicle or container and is supported by wheels, each of the plurality of pallets including
      an electromagnetically powered propulsion system; and
      a steering system for said wheels which includes:
         a deviation sensing system which senses the location of the pallets based on obtained information, and which confirms whether the pallet is traveling in an objected to location in a main lane of the transportation/logistics system;
         a guidance sensing system which collects information to be used to control the steering system, including steering information, location of obstacles, headway distance and traveling speed, from sensors, which include a location display, an imaging apparatus, a vehicle detection sensor and a gap detection mechanism installed on the main lane, or on the pallet; and
         a lane deviation preventing fin which protrudes downward from the bottom of each of said pallets and on which is positioned the gap detection mechanism,
      wherein the gap detection mechanism detects a gap between said lane deviation prevention fin and front headway and/or side wall of a ditch which is installed in the main lane;
   a road system on which each of said pallets can travel, including the main lane having the ditch in which said lane deviation preventing fin can be positioned, wherein the dimensions of the ditch are selected so that said lane deviation preventing fin is able to move in said ditch without contacting the side walls of the ditch and so that the pallet is mechanically prevented from deviating from the main lane in the event the lane deviation preventing fin makes contact with the side wall of the ditch;
   wherein the steering system is responsive to the location of the pallet, the confirmation that the pallet is traveling in an objected to location in the main lane, and the information from the guidance sensing system, and steers the pallet so that the lane deviation prevention fin of the pallet travels in the ditch without contacting the side walls of the ditch;
   a mode-interchange at which the vehicle or container can be loaded on said pallet or unloaded from said pallet;
   a driving control system providing driving control of the propulsion, braking and steering for each individual pallet based upon information regarding driving conditions collected from
      sensors installed on the main lane, which include a position display apparatus, vehicle detecting sensors, and an image treating apparatus;
      from the sensors on the pallet which relate to the driving condition of the pallet,
      from communication apparatus which is installed on the road and from communication between pallets;
   a diverging system in which the direction of the pallet is controlled automatically by the steering system to exit from the main lane and enter a different target lane at a diverging section of the road system and, wherein the different target lane has a ditch and the steering system controls the pallet based on diverging signals from the pallet, from a remote controller associated with the pallet, and from road side and position information at the diverging section, so that the lane deviation preventing fin does not contact the wall of the ditch in the different target lane;
   a merging system, in which the direction of the pallet is controlled automatically by the steering system to enter the main lane from a branch lane at a merging section of the road, wherein the branch lane has a ditch in which the lane deviation can travel without contacting the walls of the ditch and the steering system controls the pallet based on merging signals from the pallet, from the remote controller associated with the pallet, and from road side and position information at the merging section so that the lane deviation preventing fin does not contact the side wall of the ditch in the branch lane;
   a motor system formed between the pallet and the road which provides a propulsion force for the pallet and which is designed not to be directly loaded by the weight of the pallet.

2. A transportation/logistics system for transporting vehicles or containers between entrance and exit points
   a plurality of pallets, each of which is suitable for carrying a vehicle or container and each of which includes
      a linear motor powered propulsion system and a magnetically levitated pallet body supporting system,
      a magnetically levitated guiding system which includes,
         a traveling position sensor which detects the traveling position of said pallet, and wherein the guiding system determines whether or not said pallet is traveling in a planned position based on said detected traveling position information,
         a sensing system which collects information for control of the magnetically levitated pallet body supporting system and the magnetically levitated guiding system, including vehicle position and obstacle detection information, headway distance, and traveling speed, wherein the information originates from sensors which are installed on the road or on a pallet, which include, a location display apparatus, vehicle detection sensors, and imaging apparatuses,
      a pair of lane deviation preventing fins which protrude from the bottom of said pallet and on which is positioned a gap detection mechanism which detects a distance between the lane deviation prevention fins and the headway in front of the lane deviation preventing fin or the distance between the side of the lane deviation preventing fin and side walls of a pair of ditches which are installed in a main lane,
      wherein the magnetically levitated guiding system is responsive to the information collected by the sensing system and traveling position sensor and guides the pallet magnetically so that the lane deviation preventing fins travel in the ditches without contacting the walls of the ditches, a control system for the magnetically levitated pallet body supporting system, including electromagnets installed on right and left sides of the lane deviation preventing fins, absorption plates installed on a section of the ditches of the main lane and which absorb the force generated by the electromagnets, and distance sensors which measure the height of the magnetic levitation generated by the magnetically levitated pallet body supporting system, wherein the control system controls the force generated by the electromagnets, a road, in which the pallet travels, and which includes the main lane having the ditches in which the lane deviation preventing fins can be positioned, wherein the dimensions of the ditches are selected so that said lane deviation preventing fins can move in the ditches without contacting the side walls of the ditches, and so that said lane deviation preventing fins mechanically prevent the pallet from deviating from the main lane in the event contact is made with the side wall of the ditches, a mode-interchange at which the vehicle or container can be loaded on said pallet or unloaded from said pallet, a driving control system providing driving control of the propulsion, braking and magnetic levitation for each individual pallet based upon information regarding driving conditions collected from sensors installed on the main lane, which include a position display apparatus, vehicle detecting sensors, and an image treating apparatus.

from sensors on the pallet and a remote controller associated with the pallet which relate to the driving conditions of the pallet, and information from communication apparatus, which is installed on the road, and from communication between pallets, a diverging system in which the direction of the pallet is controlled automatically by the magnetically levitated guiding system to exit from the main lane and enter a different target lane at a diverging section of the road system by controlling the power of the electromagnetic field of the electromagnets on the lane deviation preventing fins in response to diverging signals which come from the pallet, the remote controller associated with the pallet, and from road side and position information at the diverging section so that the lane deviation preventing fins do not contact the side walls of the ditches in the road, a merging system in which the direction of a pallet is controlled automatically by the magnetically levitated guiding system to enter the main lane from a branch lane at a merging section by controlling the power of the electromagnetic field of the electromagnets on the lane deviation preventing fins based on merging signals from the pallet, the remote controller and the road side and position information at the merging section so that the lane deviation preventing fins do not contact the side walls of the ditches in the road.

3. The transportation/logistics system of claim 1 or 2, wherein the steering system steers the pallet based on information regarding traveling position and from the gap detection mechanism, using the following method, after a certain interval following completion of a steering adjustment, a first steering step of maintaining the steering condition if the result of the steering adjustment is that the pallet follows a desired course, or causing the steering condition to be pushed back by a first steering angle amount if the result of the steering adjustment is that the pallet does not follow the desired course so as to return the normal position of the steering, if the first steering step is not sufficient to cause the pallet to follow the desired course, a second steering step of causing the steering condition to be pushed back by a deeper steering angle, if after an interval following completion of the second steering step, the pallet does not follow the desired course, a third steering step is made in the same manner as the second steering step, then, the first, second, and third steering steps are repeated in order until the pallet is made to approach the desired course along the track.

4. The transportation/logistics system of claim 2, wherein on the road a rail is installed on an overhang section which is protruding from the side wall of the ditch to match with the electromagnets of the magnetically levitated body supporting system which are installed on the side of the lane deviation preventing fin.

5. The transportation/logistics system of claim 1 or 2, wherein the road comprises the ditch in which the lane deviation preventing fin can be inserted, a structure of road pavement which is composed of a plane road surface suitable for the rolling of a wheel, and a road shoulder which is installed on both sides of said road, wherein the road has a road bed, a road floor and a side wall, and further wherein said road pavement, road bed, road floor and the side wall along the longitudinal direction of traveling is made from concrete or other rigid material.

6. The transportation/logistics system of claim 1 or 2, in which the road is comprised of a road floor structure which is installed under a road bed, and is filled with water permeable material, a road body which is installed under the road floor structure to support the road bed, and is filled with non-water permeable material or non-water permeable sheets to cover the boundaries of the road floor structure.

7. The transportation/logistics system of claim 1 or 2, wherein a steel plate is installed on a plane road surface of the road on which the wheels of the pallet can roll.

8. The transportation/logistics system of claim 1 or 2, wherein plane steel plates are installed on a plane road surface of the road and have a plurality of holes.

9. The transportation/logistics system of claim 1 or 2, wherein steel plates are installed on a plane road surface of the road on which the wheels of the pallet can roll, and a slanted joint is used between the steel plates.

10. The transportation/logistics system of claim 1 or 2, wherein solar cells and heat collection panels are installed on a surface of said road.

11. The transportation/logistics system of claim 1 or 2, wherein a longitudinal direction braking zone is installed on a plane road surface of the road parallel to a tracking line along which the wheels of the pallet are to be rolling.

12. The transportation/logistics system of claim 1 or 2, wherein a primary side or a reaction plate of a linear induction motor is installed under an overhang section of the ditch which is installed in the road, and further wherein the primary side of the linear induction motor or the reaction plate cooperates with an electromagnetically functional section of said lane deviation preventing fin to provide magnetic levitation.

13. The transportation/logistics systems of claim 1 or 2, wherein a photo reflection plate or a electromagnetic field reflection plate is installed on a side wall or bottom section of the ditch.

14. The transportation/logistics system of claim 1 or 2, further including a braking mechanism which brakes the movement of the lane deviation preventing fin which is inserted in said ditch.

15. The transportation/logistics system of claim 1 or 2, further including
- a center lane for accommodating large or heavy pallets, and
- other side lanes, on either side of the center lane for accommodating passenger or light weight pallets.

16. The transportation/logistics system of claim 1 or 2, wherein a vehicle is loaded or unloaded from a pallet at the mode interchange and wherein the mode interchange comprises
- an entrance mode interchange at which the lane deviation preventing fin is deployed from the bottom side of the pallet when the vehicle enters the transportation/logistics system, and the lane deviation prevention fin is inserted into the ditch of a lane of the transportation/logistics system, and at which the vehicle is loaded onto the pallet and is fixed to the pallet,
- an exit mode interchange at which the lane deviation preventing fin is drawn out of the ditch and pushed back into the bottom of the pallet, and at which the vehicle is unlocked and unloaded from the pallet when the vehicle exits the transportation/logistics system,
- a yard which is capable of storing the pallets or containers at a location between the entrance mode interchange and the exit mode interchange.

17. The transportation/logistics system of claim 1 or 2 wherein the lane deviation preventing fin is installed in the bottom of the pallet with a hinge or an expandable member, so that the lane deviation preventing fin can be deployed or stored as needed.

18. The transportation/logistics system of claim 17, wherein the lane deviation preventing fin includes a sliding system to reduce friction positioned on the right and left sides of the lane deviation preventing fin.

19. The transportation/logistics system of claim 1 or 2, wherein the lane deviation preventing fin is formed in the shape of a cylinder or disc and includes a mechanism which permits the lane deviation prevention fin to be pulled down in the perpendicular direction from the bottom of the pallet.

20. The transportation/logistics system of claim 1 or 2, wherein the lane deviation preventing fin includes
- a front nose section which is movable in a lateral direction with respect to the longitudinal traveling direction of the pallet.

21. The transportation/logistics system of claim 1 or 2, wherein the lane deviation preventing fin includes an expandable section located on the lower part of the lane deviation preventing fin which expands after it is inserted into the ditch, and which expands in a lateral direction with respect to both the right and left of the longitudinal traveling direction of the pallet.

22. The transportation/logistics system of claim 1 or 2, wherein the lane deviation preventing fin includes two distance measurement sensors positioned on the right and left sides and toward the front of the lane deviation preventing fin and so that the two distance measurement sensors will be positioned in the ditch when the lane deviation preventing fin is inserted in the ditch.

23. The transportation/logistics system of claim 1 or 2, wherein electromagnets are installed on the right and left sides of the lane deviation preventing fin and magnet units are installed along walls of the ditch, so that while the pallet is diverging or merging in a selected direction, said electromagnets can be excited to the same side as the selected direction to cause the lane deviation preventing fin to be shifted toward the selected direction in the ditch, and so that the diverging or merging can be completed by operating said electromagnets.

24. The transportation/logistics system of claim 1 or 2, wherein the lane deviation preventing fin is installed on the bottom of the pallet/vehicle by way of a hinge so that the lane deviation preventing fin is movable laterally with respect to the longitudinal direction of the traveling direction of the pallet, and further wherein the lane deviation preventing fin includes
- an elastic member connecting the lane deviation preventing fin to a protector frame, wherein the dimensions of the protector frame are selected to cover a portion of said fin, and wherein the elastic member maintains a selected orientation of said lane deviation prevention fin, and
- a touch sensor which is in communication with a traffic control section and is installed on an outer frame of said fin protector and positioned on the outer frame so that when the lane deviation prevention fin touches a side wall of the ditch contact is made with said sensor if said lane deviation prevention fin departs from the selected orientation by a predetermined amount.

25. The transportation/logistics system of claim 1 or 2, further including
- an expandable shock absorbing bumper installed on the pallet, a connection member through which said bumper is connected to the pallet, wherein the connection member includes an expandable member which has a shock absorbing capability against external impact forces,
- a sensor installed on the pallet or road which detects a near miss of the pallet with other pallets which are traveling on the transportation/logistics system,
- wherein the expandable shock absorbing bumper is operable so that when the danger/possibility of a collision, based on the information of a near miss, is detected by said sensor, said expandable bumper is expanded before said pallets/vehicles collide.

26. The transportation/logistics system of claim 1 or 2, further including a plate brake system comprising
- a plate having an upper part and a lower section,
- a support body member installed on the upper part of the plate, wherein said plate is installed on the bottom of the pallet through said support body member, and
- further wherein said plate is capable of being positioned toward the surface of the road so that said plate can make contact with the road parallel to the road surface, and the lower section said plate produces friction as the plane moves against the road surface.

27. The transportation/logistics system of claim 26, wherein said plate brake system includes a sensor which installed on the pallet or road and which is capable of detecting a near miss of the pallet with other pallets which are traveling on the transportation/logistics system, so that when the danger or possibility of a collision is detected based on the information detected by said sensor, or the passenger of the pallet decides to stop the pallet, or an unpredictable disaster such as an earthquake, fire or traffic accident occurs in the transportation/logistics system, the plate support body member is operable to position the plate toward the road surface to stop the pallet.

28. The transportation/logistics system of claim 1 or 2, wherein said diverging section includes a divergence preparation section, a divergence confirmation section, a divergence arranging section, a divergence point and a finish section for diverging.

29. The transportation/logistics system in claim 1 or 2, wherein the diverging section includes a diverging triangle section and further wherein a sliding body member is installed on both sides of the diverging triangle section.

30. The in claim 1 or 2, wherein the diverging system is a electromagnetic type divergent system which includes an electromagnet installed on the side wall of a portion of the ditch which precedes the diverging section.

31. The transportation/logistics system of claim 1 or 2, wherein the diverging section includes
    a structure which has a triangle shape divergent front nose members, a channelizing island which is separated from the front nose member, and an expandable body member which connects and supports the front nose member to the channelizing island.

32. The transportation/logistics system of claim 31, wherein a sliding body member is installed on a side of said divergent front nose member.

33. The transportation/logistics system of claim 1 or 2, wherein the diverging section includes a divergent front nose member which is operable so that a front end of said divergent front nose can slide laterally both right and left with respect to the direction of the travel of the pallet.

34. The transportation/logistics system of claim 1 or 2, wherein said merging section comprises a merging simulation section, a merging confirmation section, a merging arranging section, a merging point and a finishing section of merging.

35. The transportation/logistics system of claim 1 or 2, wherein the merging section includes an electromagnetic type merging system which has an electromagnet installed on the side wall of the ditch which precedes the merging section.

36. The transportation/logistics system of claim 1 or 2, wherein the merging section includes
    an electromagnetic type merging system which has an electromagnet which is installed on a side wall of a ditch in a merging lane and which is installed inside of the ditch which is located in the main lane with which the merging lane is to merge.

37. The transportation/logistics system in claim 1 or 2, wherein pallets traveling in a lane cross another lane by way of a sequence of diverging and merging sections.

38. The transportation/logistics system in claim 37, wherein a circular loop traveling lane is installed at a crossing point of plural lanes each of which provides travel in a different direction, the circular loop traveling lane including a merging area in which a pallet in a lane traveling in a first direction merges into the circular loop traveling lane, and a diverging area which the a pallet traveling in the circular loop traveling lane diverges into a lane providing travel in a second different direction, and an accessing lane connected to the circular loop by which a pallet can enter the circular loop traveling lane, so that a pallet can enter a selected lane to change or transfer lanes.

39. The transportation/logistics system of claim 1 or 2, wherein distance measurement sensors are installed on the right and left sides of the lane deviation preventing fin and positioned in the longitudinal direction of travel of the pallet, and further wherein the distance measurement sensors detect the distance between the sensor and the internal side wall of the ditch, and said steering system is operated so that the lane deviation preventing fin is realigned to the center of the ditch and is regulated so that it does not contact the side wall of the ditch according to the error ratio=$(a1-a2)/t$
    wherein a1 is a distance between the first measurement from a distance measurement sensor and the internal side wall of the ditch, a2 is a distance between the second measurement of the distance measurement sensor and the internal side wall of the ditch, and t is a time interval between a1 and a2.

40. The transportation/logistics system of claim 39, wherein a laser light, infrared light or electromagnetic field is adopted as the medium for said distance measurement sensor.

41. The transportation/logistics system of claim 1 or 2, wherein distances measured by the distance measurement sensors, are expressed as follows, x1: the distance between the distance measurement sensor located on the left side and a point of intersection of a hypothetical line, drawn from said left distance measurement sensor parallel to the traveling direction of the pallet, with the side wall of the ditch, x2: the distance between the distance measurement sensor located on the right side and a point of intersection of a hypothetical line, drawn from said right distance measurement sensor parallel to the traveling direction of the pallet, with the side wall of the ditch, y1: the distance between the left distance sensor and a point of intersection of a hypothetical line, drawn from said left distance sensor transversely to the traveling direction and the side wall of the ditch, y2: the distance between the right distance sensor and a point of intersection of a hypothetical line drawn from said right distance sensor transversely to the traveling direction and the side wall of the ditch, and further including a traveling condition detecting member, which detects an error according to an equation, error=$x1/y1$ or $x2/y2$.

42. The transportation/logistics system of claim 41, wherein the steering system of the pallet is controlled based on said error
    and further wherein, a curving ratio in front of the pallet/vehicle is calculated from the error, and
    the automated steering system is operated according to said calculated curving ratio to control the traveling of the pallet.

43. The transportation/logistics system of claim 1 or 2 further including a non contact electricity collecting apparatus, comprising
    an upper road surface core coil installed on the surface of the road, and stacked along the traveling lane,
    an electricity collecting body member installed on the bottom of the pallet and having a perpendicularly movable support body member,
    a sensor which detects the distance between said electricity collecting body member and said upper road surface core coil, and
    an actuator which works to maintain a constant distance between the electricity collecting body member and said upper road surface core coil by regulating the length of the perpendicularly movable supporting body member.

44. The transportation/logistics system of claim 1 or 2, wherein the propulsion system is a linear motor system comprising a primary side of a linear induction motor and a reaction plate, one of which is installed along the lane on the road surface on both the right and left sides in the ditch and the other of which is installed on the bottom side of the pallet.

45. The transportation/logistics system of claim 44 wherein the linear motor system includes an air splash mechanism comprising an air inlet which is installed on a front nose section of the pallet, piping which connects the air inlet to the linear motor system so that air can flow from the air inlet to the linear motor system outlet piping which is installed on the bottom of a portion of said linear motor system on the pallet and which permit air flowing through the linear motor from the air inlet to exit the air splash mechanism.

46. The transportation/logistics system of claim 44 wherein the linear motor system includes, an air compressing apparatus which is installed on the piping and which directs air intake from the air inlet.

47. The transportation/logistics system of claim 1 or 2 wherein the propulsion system comprises a linear induction motor separated from the road surface by a gap length, and further wherein the linear induction motor is operated to control the gap length to minimize the gap length by controlling the displacement of an actuator, which is installed on the linear induction motor, in accordance with information obtained from road unevenness sensors which are carried on the pallet or from gap length measuring sensors which are installed on the bottom of the linear induction motor.

48. The transportation/logistics system of claim 44, in which the lane deviation preventing fin is installed on the bottom side of the linear induction motor which is installed on the bottom of the pallet.

49. The transportation/logistics system of claim 44, wherein coolant is circulated around said linear induction motor through the piping from a cooling unit which is installed on the pallet.

50. The transportation/logistics system of claim 44, wherein one end of a support is installed on the linear induction motor and the support is coupled to the body of the pallet in a hinged arrangement, a counter weight is installed on an other of the support, and an actuator is connected to the support.

51. The transportation/logistics system of claim 44, wherein an electromagnet or a magnetic member which supports the linear induction motor is installed on the bottom side of the linear induction motor.

52. The transportation/logistics system of claim 1 or 2, wherein the pallet includes a suspension mechanism in which an electromagnet is used for levitation of the pallet and is installed on a support body member which protrudes in both the right and left lateral directions with respect to the traveling direction of the pallet and said support body member is installed on the bottom of the lane deviation preventing fin, and further wherein a magnetic member which interacts with the electromagnet to provide the levitation of the pallet is installed in the ditch of the road.

53. The transportation/logistics system of claim 52, wherein the primary side of a linear induction motor is installed on the support body member and said support body member is installed on the bottom of the lane deviation preventing fin, and a reaction plate is installed on the upper portion of the inside of the side wall of the ditch to interact with the primary side of the linear induction motor.

54. The transportation/logistics system of claim 52, wherein a linear motor for propulsion is installed on the support body member.

55. The transportation/logistics system of claim 52, further including a supplemental divergent mechanism positioned in the diverging section, wherein the supplemental divergent mechanism includes a guiding skid, located on a lower part of the lane deviation preventing fin, and on the side toward which the pallet is to diverge, and further wherein the guiding skid is pushed out from the supporting body member so that said skid is fit into the space between a rail which is installed above both right and left side of the ditch in the divergent section, and an upper part of the side wall area.

56. The transportation/logistics system of claim 52, wherein electromagnets for levitation are installed on both the right and left sides of a lower part of the supporting body member and are individually controlled.

57. The transportation/logistics system of claim 52, wherein, when the pallet is diverging, the electromagnet for the levitation on the same side as the direction in which the diverging is occurring is turned on, and the electromagnet for the levitation on the opposite side of the direction of the diverging is turned off to complete the divergence.

58. The transportation/logistics system of claim 52, wherein the propulsion system includes a linear induction plate installed on the lane deviation preventing fin, and a reaction plate installed under the bottom of an overhang section of the ditch in the road.

59. The transportation/logistics system of claim 1 or 2, wherein an automobile is carried by the pallet and a final destination for the automobile is designated by an occupant of the automobile, and further wherein information about the final destination, the expected environmental conditions and an ID-tag number for the pallet are registered with an integrated traffic control center, wherein the ID-tag number is registered based on information from said automobile, and further wherein basic condition recognition related to the traveling on the system is analyzed to optimize traveling performance and to regulate the pallet based on information from an intelligent data base which is accumulated from the road or the infrastructure of said transportation/logistics system, the recognized conditions are then analyzed, and the results of the analysis are then sent to the integrated traffic control center, and traveling is controlled by the integrated traffic control center.

60. The transportation/logistics system of claim 1 or 2, wherein information obtained from a beacon, a leaky coaxial cable, an induction cable magnet, a marker detectable as a track separation line, sensors which detect the road condition/headway in the front and rear of the pallet, and a finishing switch, which are installed in the road or infrastructure, is converted into pallet/vehicle confirmation information, pallet positioning, speed and condition information in order to assess the circumstances of traveling, and further wherein said converted information is sent to an I/O port of the pallet, together with weather information, traffic related information, line shape of the road and geographical information of the road, and further wherein said information is then treated by a central processing unit on the pallet, and the pallet's propulsion and diverging and merging is controlled based on said information.

61. The transportation/logistics system of claim 1 or 2, wherein an automobile is carried by the pallet and the automobile further includes, an information unit, such as a heads-up mount display or CRT and a vocal information communication instrument, an information treatment instrument which treats the information from said vocal information communication instrument as information from inside the automobile, a transmitter remote controller which transmits the information from said information communication instrument, said information treatment instrument and a final destination designated by a driver or passenger of said automobile.

62. The transportation/logistics system of claim 1 or 2, wherein a beacon transmission and receiving instrument, bar code, IC card, and global positioning system are installed as confirmation communication apparatuses, and further wherein a lateral acceleration sensor, a forward or backward acceleration sensor, a steering angle sensor, a speed sensor, a body height sensor, a magnetic field sensor, a photo-sensor, a camera, radar, and an ultrasonic sensor are installed as detection apparatuses, and the information obtained from said confirmation communication apparatuses and from said detection apparatuses is sent to an I/O port to be converted and sent to a computer which is installed on the pallet for further processing.

63. The transportation/logistics system of claim 1 or 2, wherein the propulsion system is a linear motor system, and further including a gap length controlling system which controls the gap length between a primary side and a secondary side of the linear motor, and further wherein the gap length is controlled by regulating an actuator based on the information which is sent from a gap length measurement sensor which is installed on the pallet, or information sent from the computer which is installed on the pallet.

64. The transportation/logistics system of claim 1 or 2, further including a fixation confirming sensor which is installed on a wheel fixing apparatus of the pallet which carries the vehicle or container, and wherein the fixation confirmation sensor transmits an emergency signal under unusual conditions, and the pallet is then stopped in response to said emergency signal, or the transportation/logistics system causes said pallet to go to an evacuation area.

65. The transportation/logistics system of claim 1 or 2, including an electricity supplying system installed under the control of an integrated traffic control center for each traveling section, including an automated traveling control apparatus for each electricity supplying section, and wherein information collected from communication apparatus is sent to said automated traveling control apparatus, and the pallet further includes a linear motor controlled by an inverter or through the electricity supply system automated traveling control apparatus based on decisions made from all said collected information.

66. The transportation/logistics system of claim 1 or 2, including an automated traveling system comprising, a pallet propulsion system which is propelled by a linear motor, a braking system which controls the operation of the linear motor, a plate braking system, a disc braking system, a guiding system which operates the steering system, and wherein the lane deviation prevention fin operates as a guiding system as needed.

67. The transportation/logistics system of claim 1 or 2, wherein the mode interchange includes a mode interchange entrance area, a mode interchange exit area, and a pallet stock and checking area which is installed between said entrance and said exit.

68. The transportation/logistics system of claim 67, wherein said entrance area provides the entrance to the transportation/logistics system from an ordinary road at which information is collected such as vehicle number, type of vehicle, and vehicle weight and size, the mode interchange further including an automatic gate-in section at which the vehicle is loaded onto an empty pallet which is transferred from the pallet stock-checking area, and is firmly fixed to the pallet by the wheel fixing apparatus and thereafter the pallet on which the vehicle is loaded is routed to the merging section through which said pallet proceeds into the main lane.

69. The transportation/logistics system of claim 67, wherein a pallet recovered from the mode interchange exit is transferred to the pallet stock and checking area, and further wherein said pallets are controlled by the individual pallet driving control system, a pallet in and out system and a pallet check system, and wherein a pallet is sent out from the pallet stock and checking area to the entrance of the mode interchange when necessary.

70. The transportation/logistics system of claim 67, wherein a pallet which carries an automobile enters a connection area of the mode interchange from a road of the transportation/logistics system where a wheel fixing apparatus, which is attached on the pallet and fixes the automobile to the pallet, is unlocked at a pallet returning system and is the pallet is emptied, and further wherein the empty pallet is sent out from said pallet returning system to a pallet/automobile stock-check section, and the automobile is then sent to an automatic gate out section, and thereafter to the ordinary road after the fee is paid at a toll gate.

71. The transportation/logistics system of claim 1 or 2, further including a preventive safety system including an alarm system which is composed of a monitor system, a check system, a remote control display system and an internal CRT display system, a lane deviation preventing system and accident avoiding system which include the lane preventing fin and the automatic steering system, a damage reducing system which include an air bag system and a flexible bumper system, a wheel fixing/releasing system, and a lane evacuation system.

72. The transportation/logistics system of claim 71, including a monitoring system comprising a vehicle condition monitoring system, headway distance monitoring system, behind vehicle monitoring system, lane deviation prevention monitoring system, road surface condition monitoring system and traffic condition monitoring system.

73. The transportation/logistics system of claim 71, further including an obstacle detecting system, earthquake detecting system, and fire detecting system.

74. The transportation/logistics system of claim 1 or 2, wherein an automobile is traveling while fixed to the pallet by a wheel fixing apparatus, and further wherein the operation of the wheel fixing apparatus is checked during the traveling of the pallet, and an automated traveling control system is provided which confirms whether the pallet is, carrying an automobile or not by using a weight sensor, confirms whether the pallet is traveling or not by using a speed sensor, confirms whether the wheel fixing apparatus is fixing the wheel or not by using a wheel fixing confirming sensor, operates the linear motor braking system, and operates the plate braking system.

75. The transportation/logistics system ofclaim 1 or 2, wherein information is collected about a distance error between the lane deviation preventing fin in the traveling direction and the side wall of the ditch, the distance error information including information about the separation between the lane deviation preventing fin in both right and left lateral directions and the side wall of the ditch, the headway distance to a front traveling pallet, traveling information from the infrastructure such as the ditch and the traveling road, and information which is collected by the sensors, which are installed on the pallet, and further wherein said above information is sent to a computer on the pallet, and after said information is treated, an angle of steering is determined based on the analysis of the accumulated data and said treated information, and the steering system is operated based on said determined information.

76. The transportation/logistics system of claim 1 or 2, wherein a diverging pallet carries a vehicle having a passenger, and further wherein the diverging section confirms whether the diverging pallet is in a divergent preparation section by using a position sensor, confirms the passenger's diverging intention using a communication tool which is located in the vehicle and which transmits said confirmed intention, analyzes the collected information from the sensors which are installed on either the road system or the pallet, controls the angle of the automatic steering system based on information from said analyzed collected information, operates an X-Y direction linear motor based on speed information from the speed sensor which is installed on the pallet, operates the steering system based on steering angle information from a steering angle sensor which detects the angle of the steering, determines the position of the lane deviation preventing fin in the ditch based on a distance sensor which detects distances between the lane deviation prevention fin and the side walls of the ditch in directions which are longitudinal to the traveling direction of the diverging pallet, determines the position of the pallet using a position or contact sensor which is installed on the road system or pallet, determines whether said pallet is in an expected area, confirms whether said pallet/vehicle enters a divergence confirmation section, confirms whether said pallet did enter the scheduled lane using a position determining or contact sensors which are installed on the road system or pallet, further wherein, when a scheduled divergence is unsuccessful, the diverging system determines the cause of unsuccessful divergence, and whether the divergence should be changed at the next divergence, proceeds with the changed traveling schedule, and confirms whether said pallet has passed a divergent arrangement section.

77. The transportation/logistics system of claim 1 or 2, wherein a merging pallet carries a vehicle having a passenger and further wherein the merging section confirms whether or not the merging pallet is in a preparation section of the merging section by using a position sensor, confirms the passenger's merging intention using a communication tool which is located in the vehicle and which transmits the confirmed said intention, confirms whether or not the merging pallet enters the simulation section when the merging pallet is traveling on a merging branch lane, confirms whether or not there is another pallet on the main lane, when the merging pallet is traveling on the merging branch lane, analyzes the collected information from the sensors which are installed on either the infrastructure side or the merging pallet, to determine the output to control the angle of the automatic steering system confirms whether or not the merging is successful, confirms whether or not sufficient headway space is securely maintained in relation to the interval between said merging pallet and other pallets on the main lane, determines the output to control the angle of the automatic steering system based on the analyzed collected information, operates an X-Y direction linear motor based on speed information from a traveling speed sensor which is installed on the merging pallet, operates the steering system based on the steering angle information from a steering angle sensor which detects the angle of the steering, determines the position of the lane deviation preventing fin in the ditch based on a distance sensor which detects distances between the lane deviation preventing fin and the side walls of the ditch in directions which are longitudinal to the traveling direction of the merging pallet, confirms whether or not the position of the merging pallet is in the merging confirmation section, reconfirms whether or not there are other pallets in the merging section of the merging system, halts said merging pallet from entering the merging section, if there is another pallet/vehicle in the merging affection section, confirms whether or not said merging pallet did merge into the scheduled lane using a position determinant or contact sensors which are installed on the road system or the merging pallet, and further wherein, when a scheduled merging is unsuccessful the merging system determines the cause of the merging failure and how to respond to the next movement, and notifies the integrated traffic control center of a change in schedule, and confirms if said merging pallet has passed through the merging section.

78. The transportation/logistics system of claim 1 or 2, wherein the pallet has a horizontal wing which is attached with an ascent/descent flap on both the right and left side of the pallet, and a vertical wing which has a rudder at the front or rear section of the pallet.

79. The transportation/logistics system of claim 78, wherein the pallet has an aerodynamic body and travels at high speed, and further wherein a gap length between a reaction plate of a linear motor and an induction plate of the linear motor is controlled by operating the ascent/descent flap and the rudder, wherein the weight load of the pallet is reduced by operating said ascent/descent flap and the rudder, and the pallet is levitated by operating said ascent/descent flap and the rudder.

80. The transportation/logistics system in claim 1 or 2, wherein said pallet is capable of carrying a container.

81. The transportation/logistics system of claim 1 or 2, wherein the pallet can be extended to match the size of the vehicle being carried.

82. The transportation/logistics system of claim 1 or 2, wherein said lane deviation prevention fin has an electricity collecting apparatus on the lower section of said fin.

* * * * *